United States Patent
Hasegawa et al.

(10) Patent No.: US 6,438,350 B1
(45) Date of Patent: Aug. 20, 2002

(54) IMAGE READING APPARATUS AND IMAGE FORMING APPARATUS

(75) Inventors: Kazuhiko Hasegawa, Abiko; Norio Kajiwara, Ichikawa; Toshiyuki Takano, Toride; Yoshiyuki Nakayama, Toride; Tsuyoshi Yoshida, Toride, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/558,510

(22) Filed: Apr. 26, 2000

(30) Foreign Application Priority Data

| Apr. 26, 1999 | (JP) | 11-117994 |
| May 17, 1999 | (JP) | 11-135335 |
| May 17, 1999 | (JP) | 11-135336 |
| Jun. 1, 1999 | (JP) | 11-154107 |
| Feb. 29, 2000 | (JP) | 2000-053771 |

(51) Int. Cl.$^7$ .................................. G03G 15/00
(52) U.S. Cl. .......................... 399/374; 358/498
(58) Field of Search .................... 358/496, 498, 358/296, 300; 399/364, 374; 355/23, 24

(56) References Cited

U.S. PATENT DOCUMENTS

| 4,475,128 A | * 10/1984 | Koumura | 358/296 |
| 4,743,974 A | * 5/1988 | Lockwood | 358/494 |
| 5,157,521 A | * 10/1992 | Chung | 358/498 |
| 5,298,937 A | * 3/1994 | Telle | 355/23 |
| 5,396,344 A | * 3/1995 | Kimura et al. | 358/444 |
| 5,438,435 A | * 8/1995 | Lawiczak | 358/496 |
| 5,995,801 A | * 11/1999 | Katsuta et al. | 399/367 |
| 6,081,688 A | * 6/2000 | Okada et al. | 399/374 |
| 6,181,443 B1 | * 1/2001 | Takahashi et al. | 358/498 |

FOREIGN PATENT DOCUMENTS

| JP | 01-126870 | * 5/1989 |
| JP | 09-046472 | * 2/1997 |

* cited by examiner

*Primary Examiner*—Robert Beatty
(74) *Attorney, Agent, or Firm*—Fitzpatrick, Cella, Harper & Scinto

(57) ABSTRACT

The present invention relates to an image reading apparatus comprising an original document conveying route, original document conveying mechanism for conveying original documents along the original document conveying route, first reading unit for reading an image on one side of the original document; and second reading unit for reading an image on the other side of the original document. The first reading unit reads an image on one side of the original document while the original document is conveyed in a forward direction at a first speed by the original document conveying mechanism, and then after the original document is conveyed in a reverse direction at a second speed, the second reading unit reads the other side of the original document while the original document is again conveyed in the forward direction. The second speed is faster than the first speed.

39 Claims, 101 Drawing Sheets

FIG.79
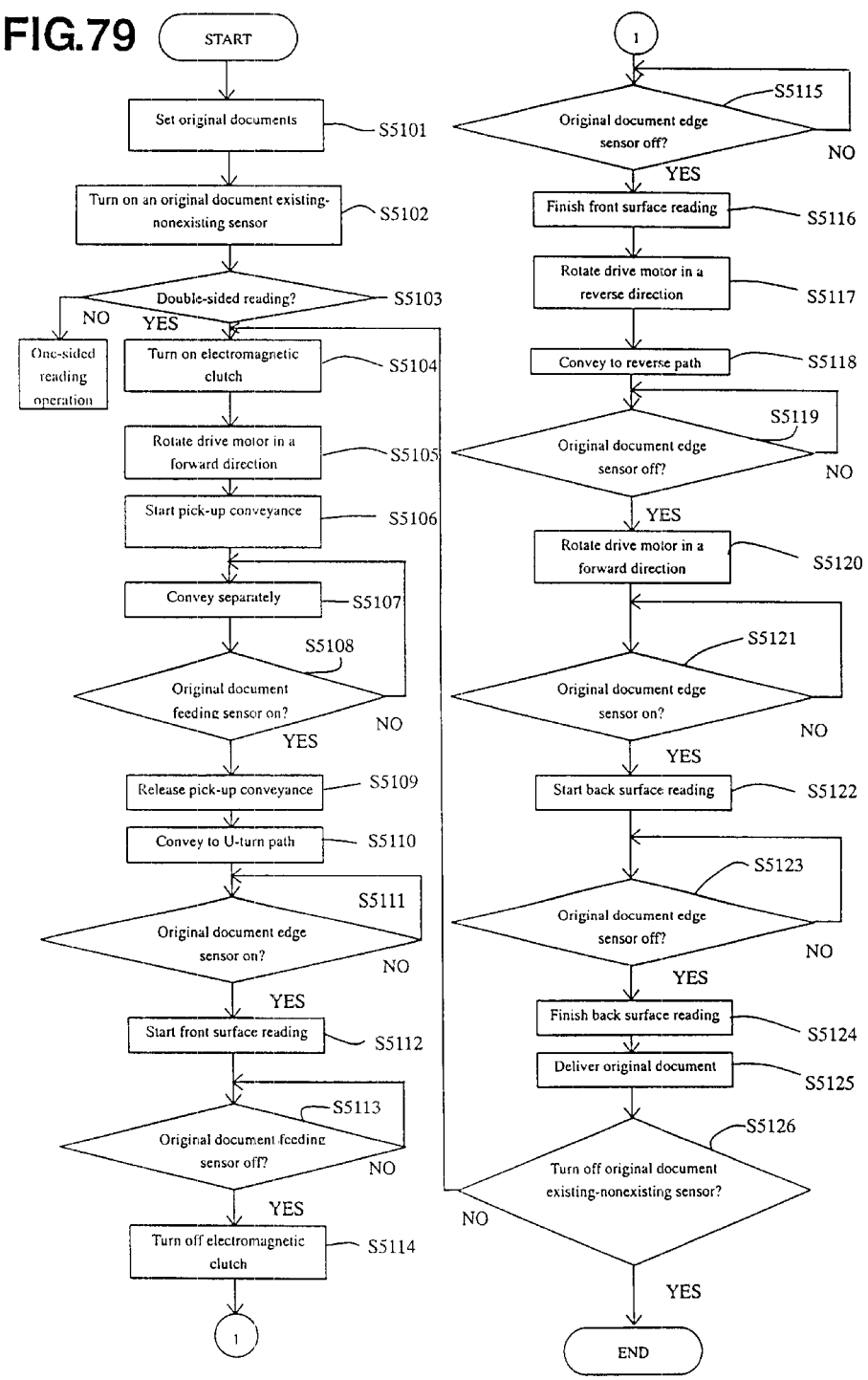
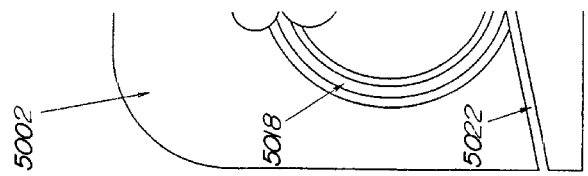

IMAGE READING APPARATUS AND IMAGE FORMING APPARATUS

BACKGROUND OF THE INVENTION

1. Filed of the Invention

The present invention relates to a double-sided image reading apparatus and to an image forming apparatus, such as an image copying apparatus, a facsimile machine, or a composite apparatus combining the above, utilizing the double-sided image reading apparatus.

2. Related Background Art

Conventionally, an apparatus for reading images recorded on both sides of an original document has been proposed, and in Japanese Unexamined Patent Publication Showa No. 60-126964 (first prior art), for example, a structure with two image reading means opposing each other for reading simultaneously double sides of an original document by one-time feeding of the original document is suggested.

Also in Japanese Unexamined Patent Heisei No. 1-126870 (second prior art), a structure having two image reading means opposing each other which sandwich an original document pressing roller for reading respectively each side of an original document by switching back the original document is suggested.

In the above-described first prior art, however, the two image reading means require two image processing means, thereby increasing the production cost. In addition, when an apparatus for one-sided reading as a standard configuration which optionally has a double-sided reading function is to be developed, the standard configuration having a one-sided reading function still requires two image processing means for the optional double-sided reading function cost advantage provided by an apparatus having only a one-sided reading function.

Also, in the above-described second prior art, an original document returned by switching back is to be read from the rear end of the sheet, which causes the image information to be sent upside down, page by page, when, for example, the information is sent as FAX images. In order to avoid this situation, a means for reversing the up or down side of an image or a conveying means for reversing the up or down side of an image is required, thus making the apparatus structure complicated.

Furthermore, in the conventional original document conveying route of the image reading apparatus, especially an original document conveying route having a U-turn section for sequentially feeding by a plurality of original document conveying means, when a part of the original document conveying means conveys original documents at a slow speed, the speed as a whole for processing the original documents becomes slow; or when a preceding original document conveying means is fast while a following original document conveying means is slow, the original document conveying means does not fit in the original document conveying route, hindering the image reading means from reading images precisely.

SUMMARY OF THE INVENTION

Therefore, it is an object of the present invention to provide an image reading apparatus and an image forming apparatus which are excellent without defects, and more specifically to achieve miniaturization and cost lowering of an image reading apparatus and an image forming apparatus mounting the image reading apparatus.

Also it is an object of the present invention to provide an image reading apparatus and an image forming apparatus capable of reading good images while improving an operating efficiency of the reading process of the original documents by differentiating the conveying speeds between the original document conveying means.

To accomplish the above objects, a representative structure of a double-sided image reading apparatus according to the invention is to structure an original document conveying route, an original document conveying means for conveying an original document along the original document conveying route, a first reading means for reading an image on one side of the original document, and a second reading means for reading an image on the other side of the original document, where an image on one side of an original document is read at the first reading means while the original document is forwardly conveyed by the original document conveying means and then after being conveyed in a reverse direction, the other side of the original document is read at the second reading means while being conveyed forward again.

According to the above-mentioned image reading apparatus, the image information on both sides of the original document can be read one by one as well as in the same direction with respect to the up side and the down side of the original document, which allows feeding the original document data to a single image processing means, there is no need for providing a plurality of the image processing means, and, therefore, it is possible to simplify the circuit and miniaturize the base board, thereby reducing cost.

As another structure of the invention, the image reading apparatus of the same as the mentioned above can form a branching conveying route branching off from the original document conveying route at an upstream side, in the conveying direction, of at least one of the image reading means, the branching conveying route capable of guiding the original document conveyed by the original document conveying means.

Because the above-mentioned image reading apparatus has, in addition to the original document conveying route, another branching conveying route for making the original document conveyed in the reverse direction temporarily escape, the original document can escape smoothly even if the original document conveying route has a U-turn shape.

As another structure of the invention, the image reading apparatus might include an original document conveying route having at least a partial curvature section having a U-turn shaped portion and a reverse path branching off from a midway point on the original document conveying route, the reverse path having at least a partial curvature section having a U-turn shaped portion.

According to the above-mentioned image reading apparatus, when conveyed in a reverse direction for escape, the original document is returned on an original document mounting tray serving as an original document feeding means, thereby making an apparatus installation space smaller.

As another structure of the invention, an image reading apparatus includes an original document feeding means for feeding stacked original documents, an original document conveying route for conveying the original documents fed from the original document feeding means, at least one image forming means placed in a midway point on the original document conveying route, and a plurality of original document conveying means for conveying the original documents in the original document conveying route, each of the original document conveying means having a document conveying speed different from that of at least one adjacent original document conveying means.

In the above-mentioned image reading apparatus, an original document processing efficiency can be improved as a whole in the original document conveying route and also a degree of tension and a degree of flexion of the original documents can be controlled between the plurality of original document conveying means. Therefore the image reading means can read good images.

BRIEF DESCRIPTION OF THE DRAWINGS

The above and other objects and features of the invention are apparent to those skilled in the art from the following embodiments thereof when considered in conjunction with the accompanying drawings, in which:

FIG. 79 is a flow chart showing an operation of the image reading apparatus according to the seventh embodiment.

DESCRIPTION OF THE PREFERRED EMBODIMENTS

[First Embodiment]

Figure 1:
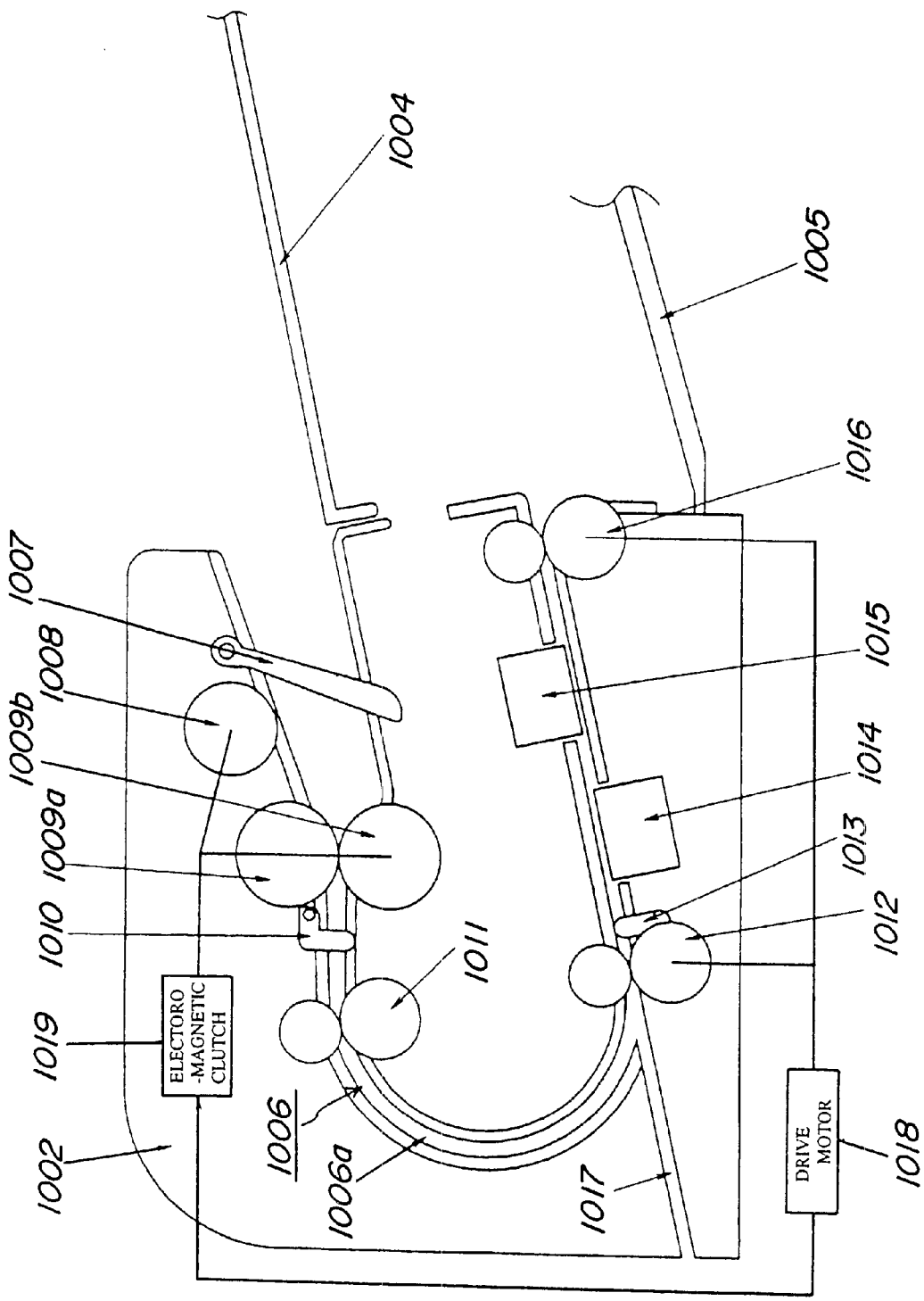
FIG. 1 is a cross-sectional view showing an image reading apparatus of a first embodiment.
Figure 2:
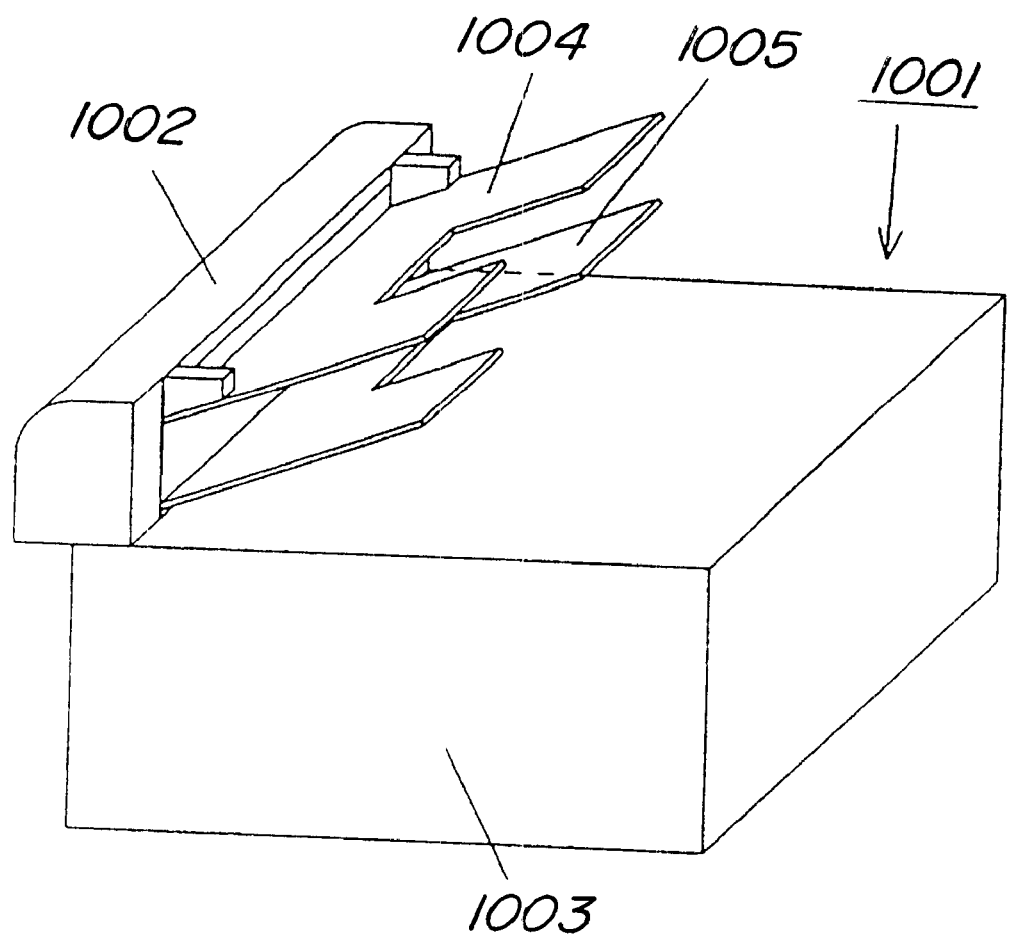
FIG. 2 is a perspective view showing an exterior appearance of a facsimile machine mounting the image reading apparatus according to the first embodiment.
Figure 3:
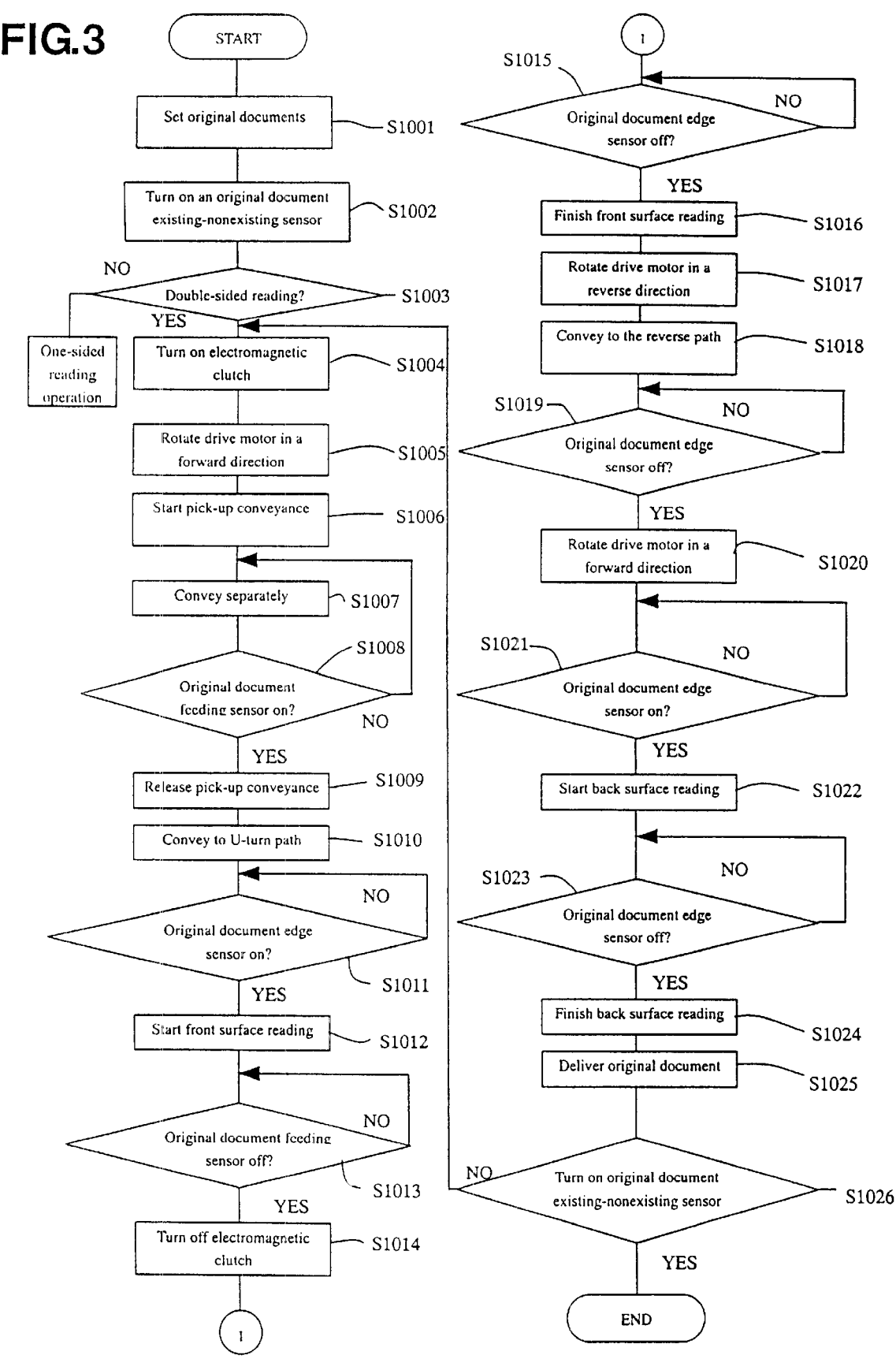
FIG. 3 is a flow chart showing an operation of the image reading apparatus according to the first embodiment.
Figure 4:
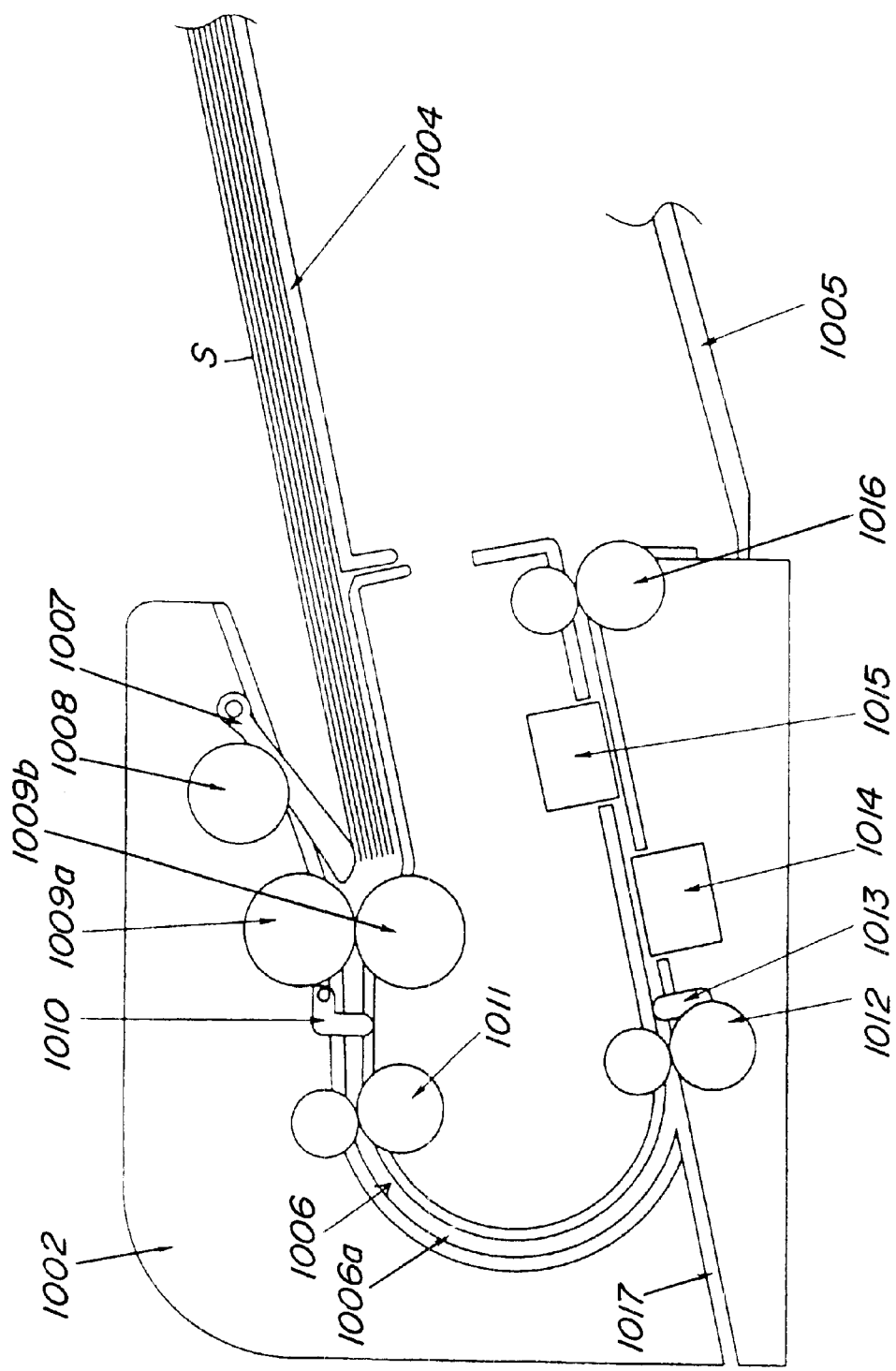
FIG. 4 to FIG. 13 are illustrations showing operations of the image reading apparatus according to the first embodiment.
Figure 5:
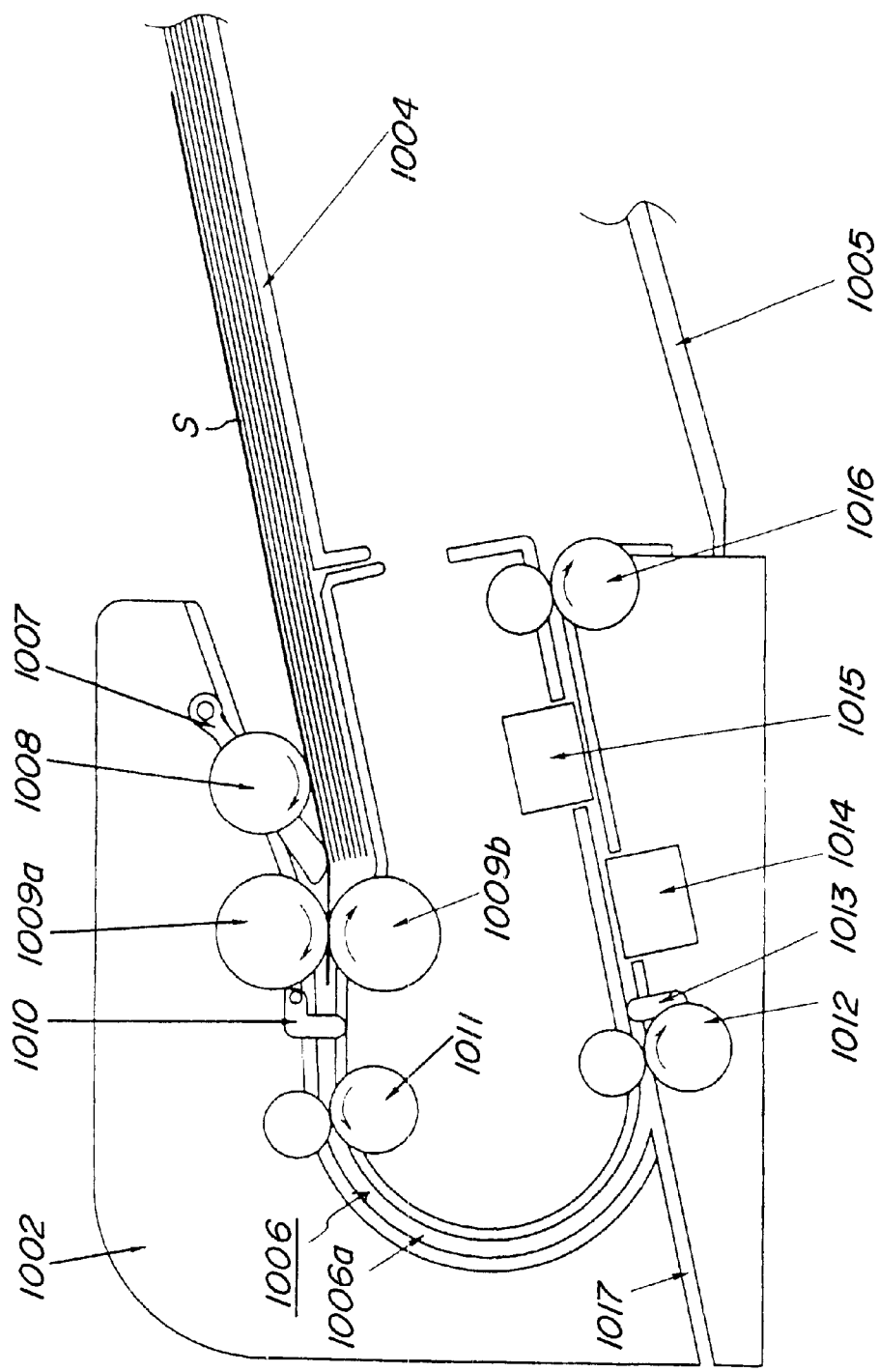

A first embodiment of a double-sided image reading apparatus according to the invention will hereinafter be described with reference to the drawings. FIG. 1 is a cross-sectional view showing a double-sided image reading apparatus according to the invention. FIG. 2 is a perspective view showing an exterior appearance of the double-sided image reading apparatus. FIG. 3 is a flow chart showing an operation of the double-sided image reading apparatus. FIG. 4 to FIG. 13 are illustrations showing operations of the double-sided image reading apparatus. In the present embodiment, a facsimile machine used as the double-sided image reading apparatus is described.

A main body 1001 of the facsimile machine shown in FIG. 2 forms, on its upper portion, an image reading section 1002 utilizing the double-sided image reading apparatus of the invention and, on its lower portion, an image forming section 1003. The image reading section 1002 has an original document tray 1004 on which original documents are stacked to be read and a delivering tray 1005 for discharging and stacking the original documents when the reading operation is completed.

Inside the image reading section 1002 as shown in FIG. 1, a conveying route 1006 is provided so as to form a U-turn shape leading from the original document tray 1004 to the delivering tray 1005. On an upstream side of the U-turn portion 1006a of the conveying route 1006, there are provided an original document existing-nonexisting sensor 1007, a pickup roller 1008 for feeding stacked original documents, a separating roller 1009a and a reverse roller 1009b working in cooperation with each other to separate and feed the original; documents, an original document feeding sensor 1010 for detecting a front end and a rear end of the separated original document, and a conveying roller 1101 serving as an original document conveying means for conveying the separated original documents to the U-turn portion 1006a.

On a downstream side of the U-turn portion 1006a, there are provided a front surface reading section 1014 serving as the first reading means composed of a pressing type image sensor, a forward and reverse rotatable pair of conveying rollers 1012 for conveying the original documents to the front surface reading section 1014, an original document edge sensor 1013 for determining the timing of starting and finishing of the reading operation of the original documents, a back surface reading section 1015 serving as the second reading means composed of a pressing type image sensor, and a forward and reverse rotatable pair of delivering rollers 1016 for delivering the original documents to the delivering tray 1005. Also, on an upstream side of the conveying roller pair 1012, a reverse path 1017 serving as a bypass means during a reversing operation is provided to be structured so that the original documents are not returned to an upstream side of the U-turn portion 1006*a*.

In addition, a drive motor 1018 is provided in the image reading section 1002, transferring the driving to the pickup roller 1008, the separating roller 1009*a*, the reverse roller 1009*b*, the conveying roller pair 1011, 1012, and the delivering roller pair 1016. Furthermore, the driving is transferred via an electromagnetic clutch 1019 to the pickup roller 1008, the separating roller 1009*a*, and the reverse roller 1009*b*, making it possible to block temporarily the transferring of the driving.

Operation of the double-sided image reading apparatus thus constituted as mentioned above will be explained referring to FIG. 3 and FIG. 4 to FIG. 13. First, a user sets original documents S on the original document tray 1004 (S1001), and then the original documents S are detected by the original document existing-nonexisting sensor 1007 (S1002, FIG. 4). After the user selects whether the operation is for double-sided reading or not (S1003), the image reading process starts where the electromagnetic clutch 1019 is connected to provide the driving force to the pickup roller 1008, the separating roller 1009*a*, and the reverse roller 1009*b* (S1004). At this time, the drive motor 1018 rotates in a forward direction (S1005), and the pickup roller 1008 directly contacts with the original documents S to feed them to the interior of the apparatus (S1006, FIG. 5). Next, the original documents are separated sheet by sheet by means of the separating roller 1009*a* and the reverse roller 1009*b*, and only an uppermost sheet of the original documents S is conveyed (S1007, FIG. 5).

Figure 6:
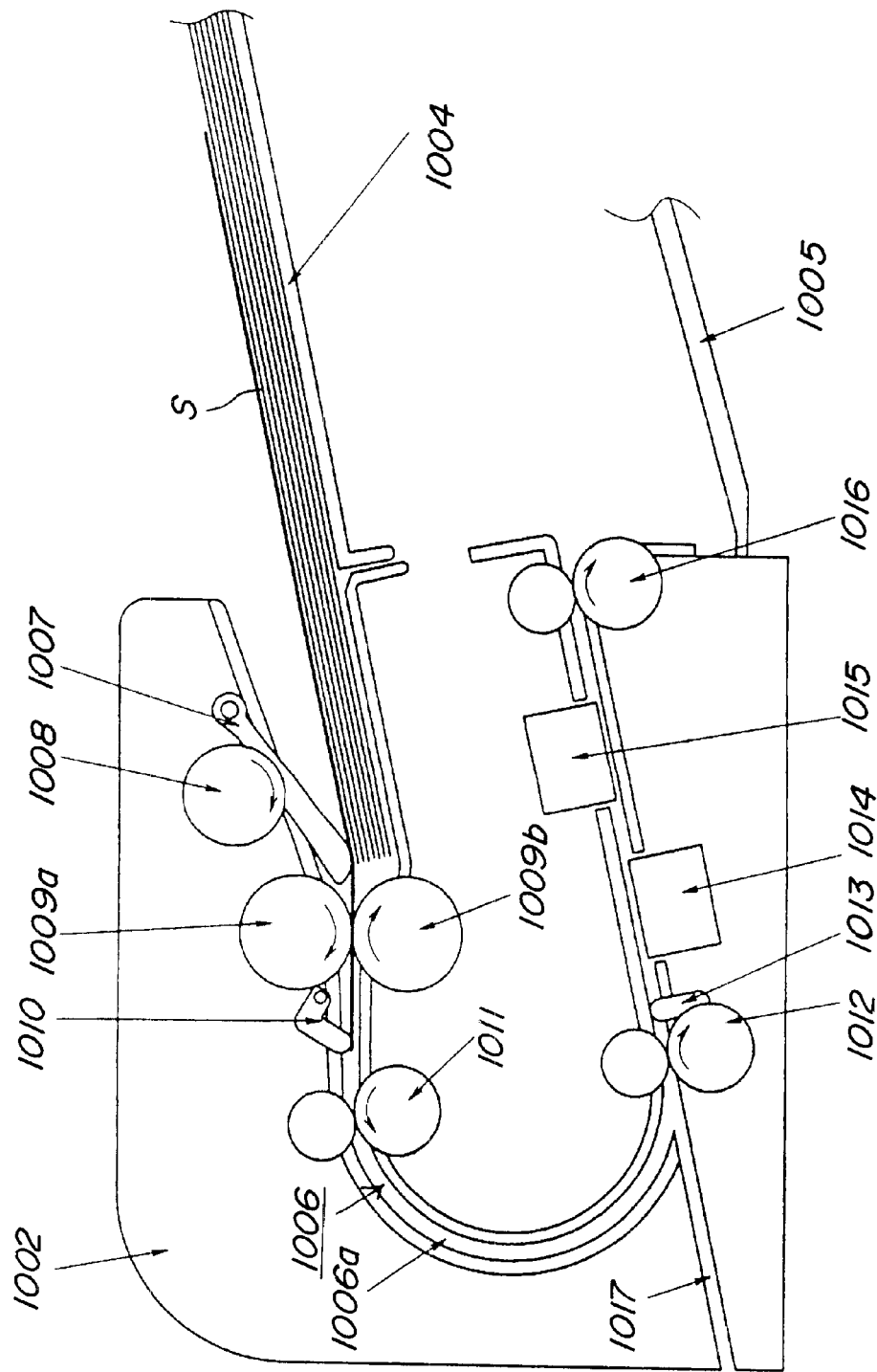
Figure 7:
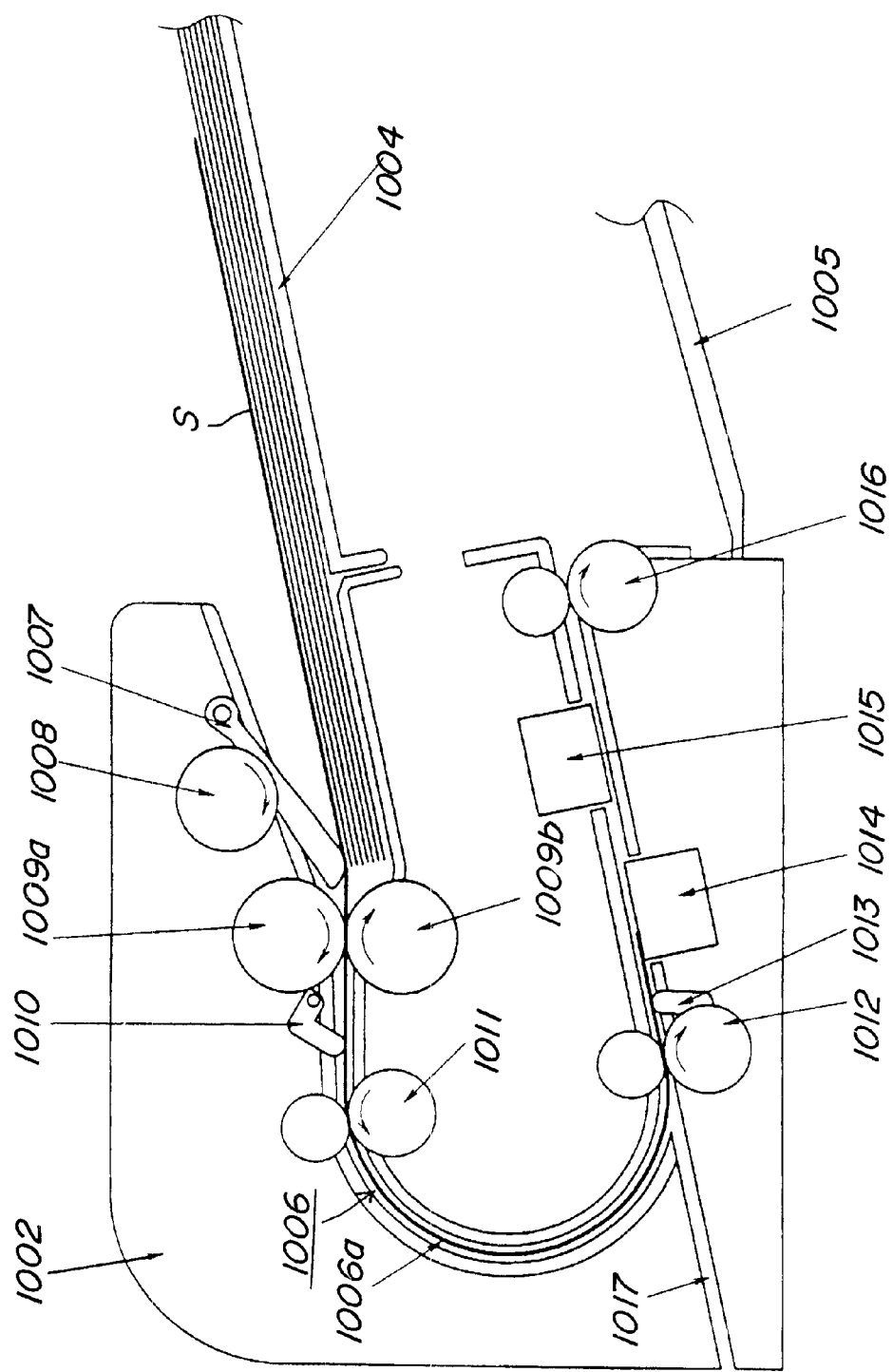

When the original document feeding sensor 1010 detects the front end of the original document (S1008), the pickup roller 1008 is withdrawn from the original documents S, releasing them from the feeding operation (S1009, FIG. 6). Then, the separated original document S is conveyed to the U-turn portion 1006*a* by the conveying roller pair 1011 (S1010). After passing the U-turn portion 1006*a*, the original document S is conveyed by the conveying roller pair 1012, and then after the front end of the original document is detected by the original document edge sensor 1013 (S1011), the front surface reading section 1014 starts reading the front surface of the original document at the place where the paper is conveyed by a predetermined amount from the original document edge sensor 1013 (S1012, FIG. 7).

Figure 8:
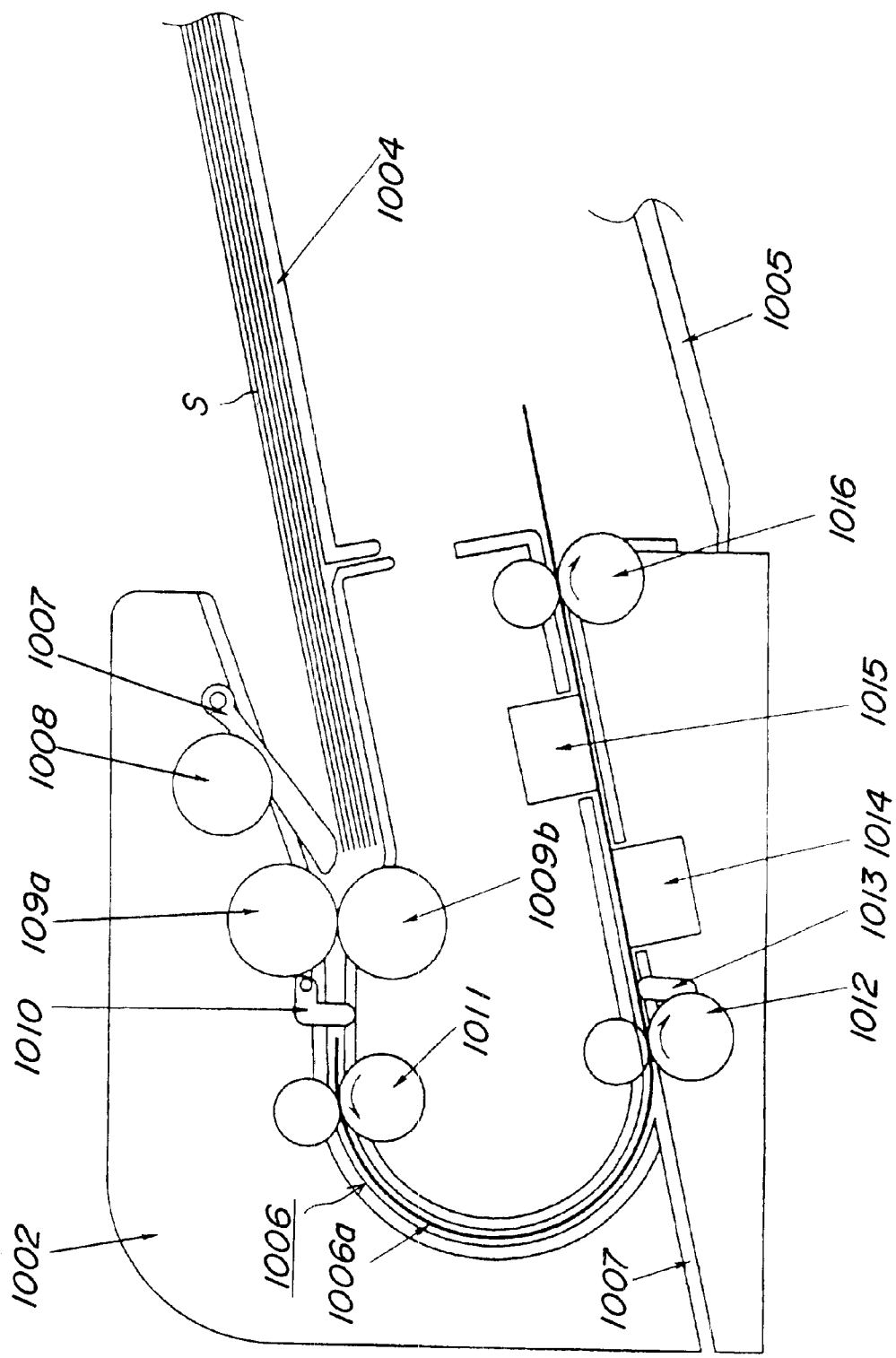
Figure 9:
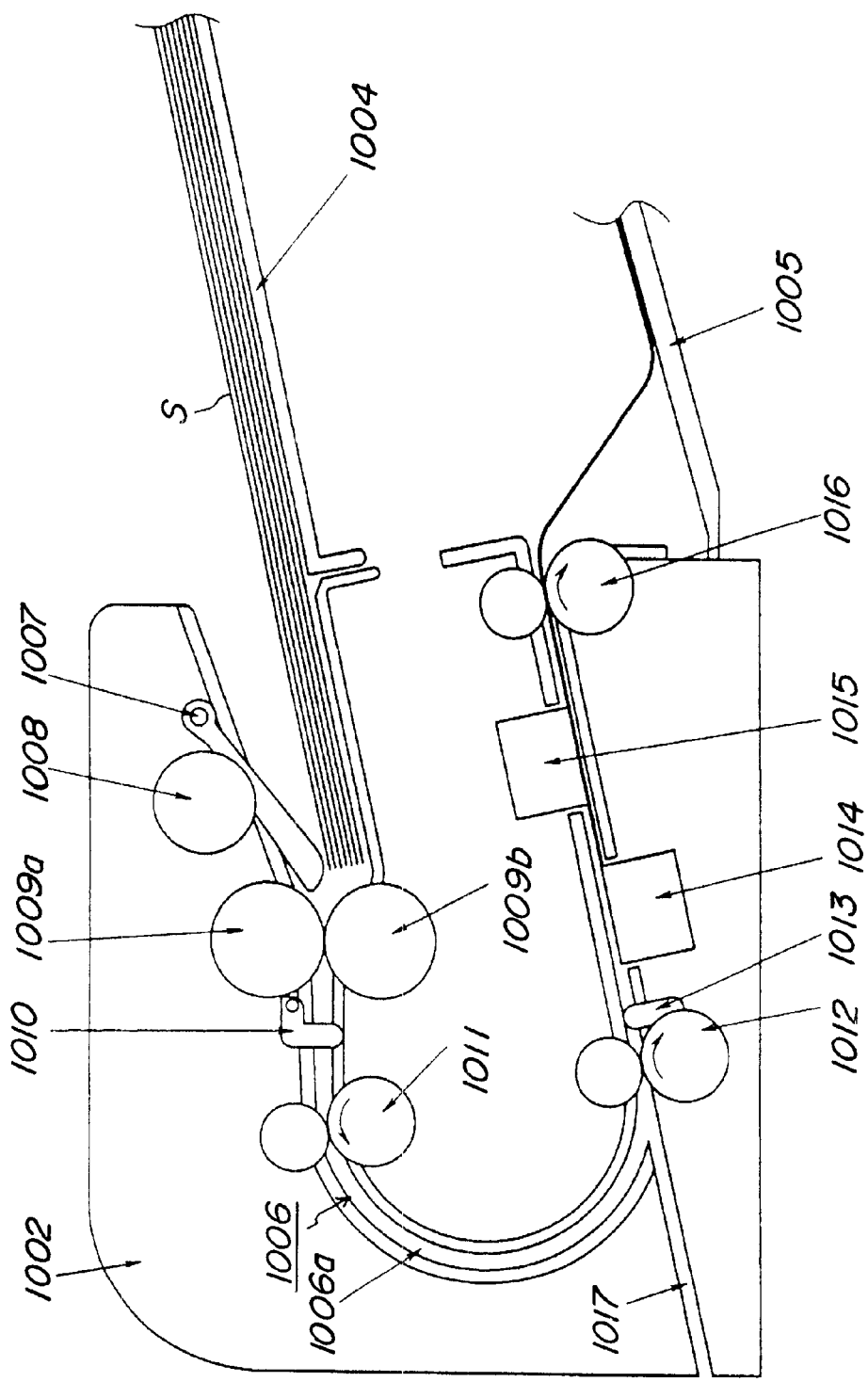

When the original document feeding sensor 1010 detects the rear end of the original document (S1013), the electromagnetic clutch 1019 blocks the driving of the pickup roller 1008, the separating roller 1009*a*, and the reverse roller 1009*b*, so that the following documents S are not conveyed (S1014, FIG. 8). After the rear end of the original document is detected by the original document edge sensor 1013 (S1015), the front surface reading section 1014 finishes reading the front surface of the original document at the place where the paper is conveyed by a predetermined amount from the original document edge sensor (S1016, FIG. 9).

Figure 10:
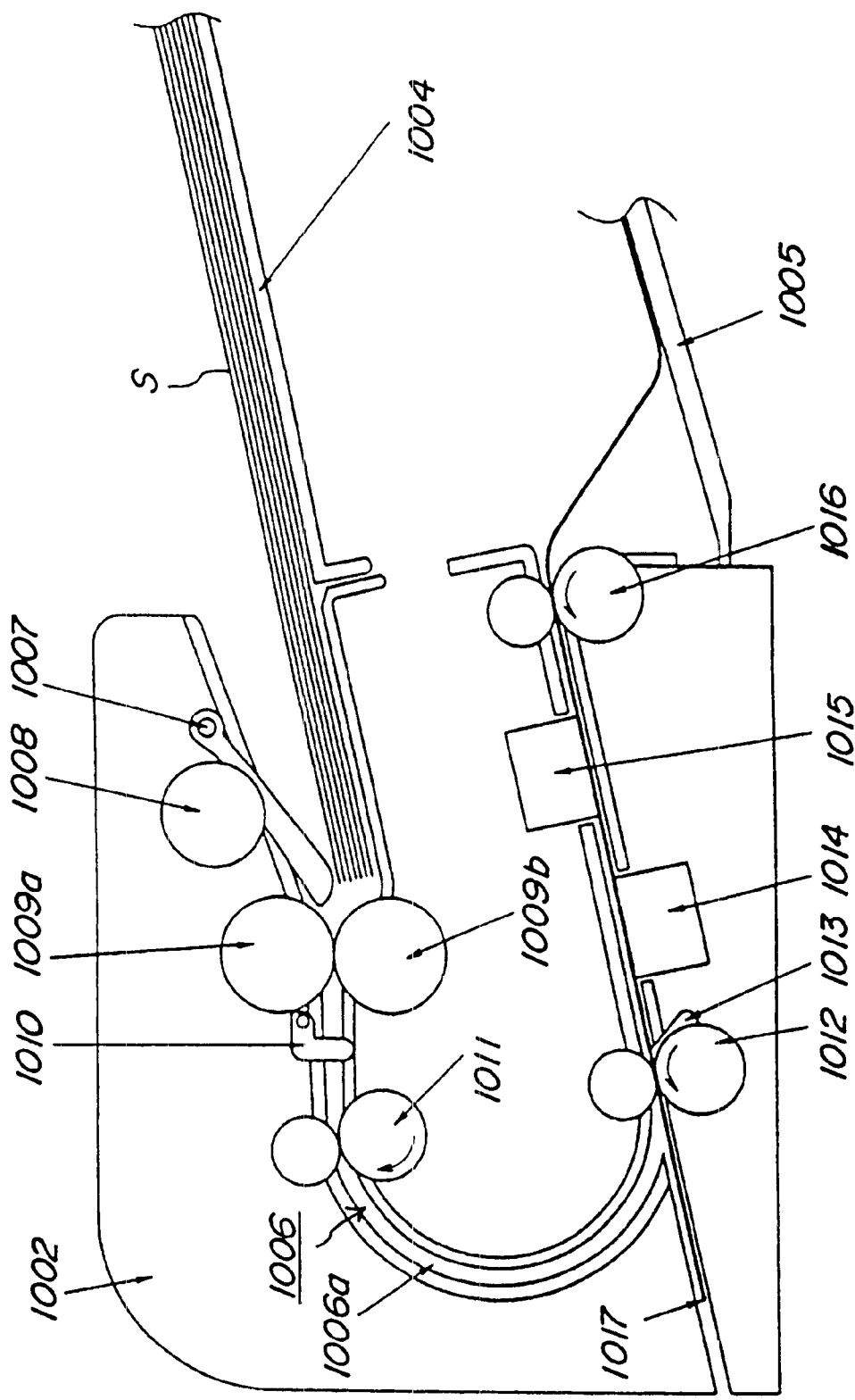
Figure 11:
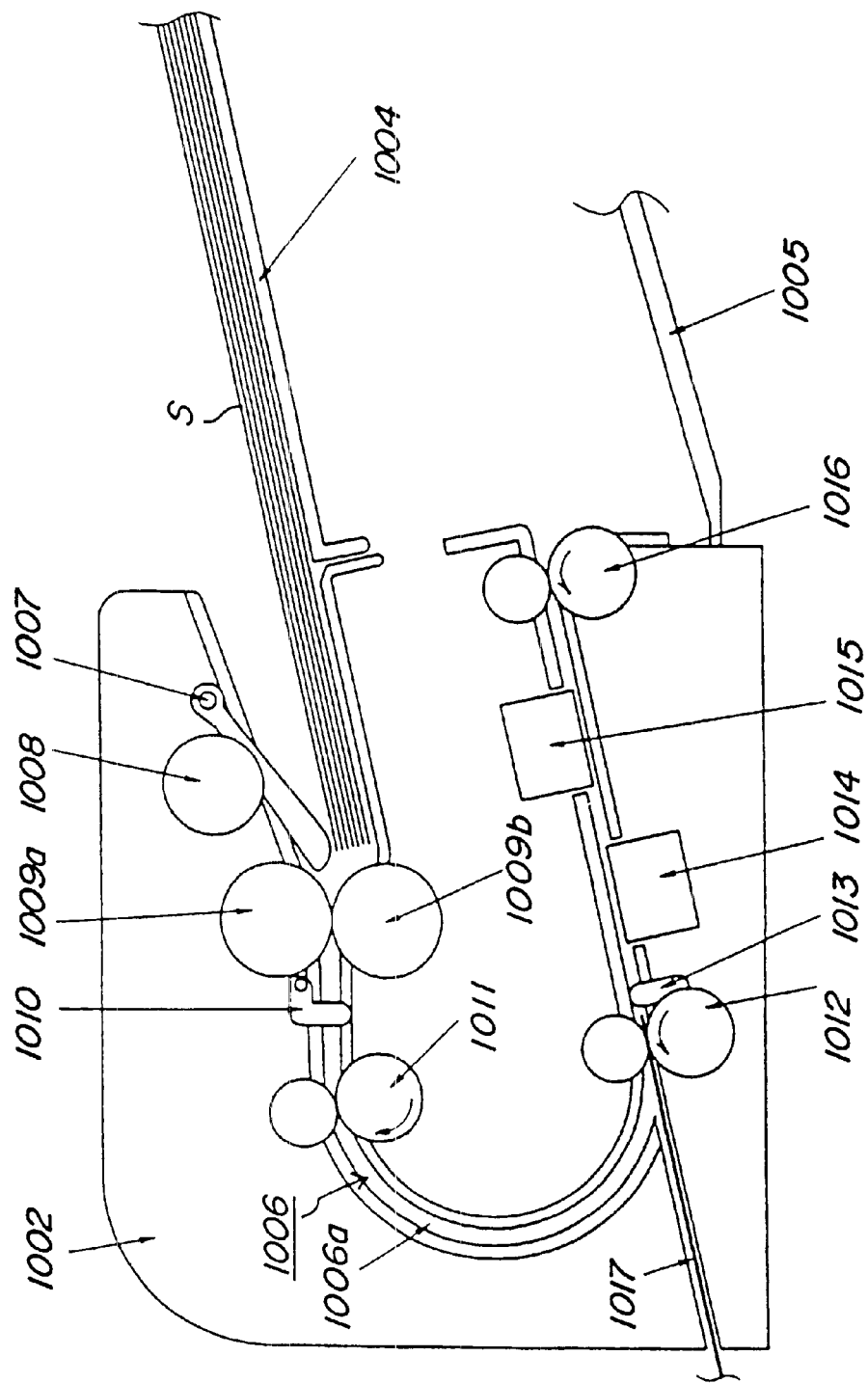
Figure 12:
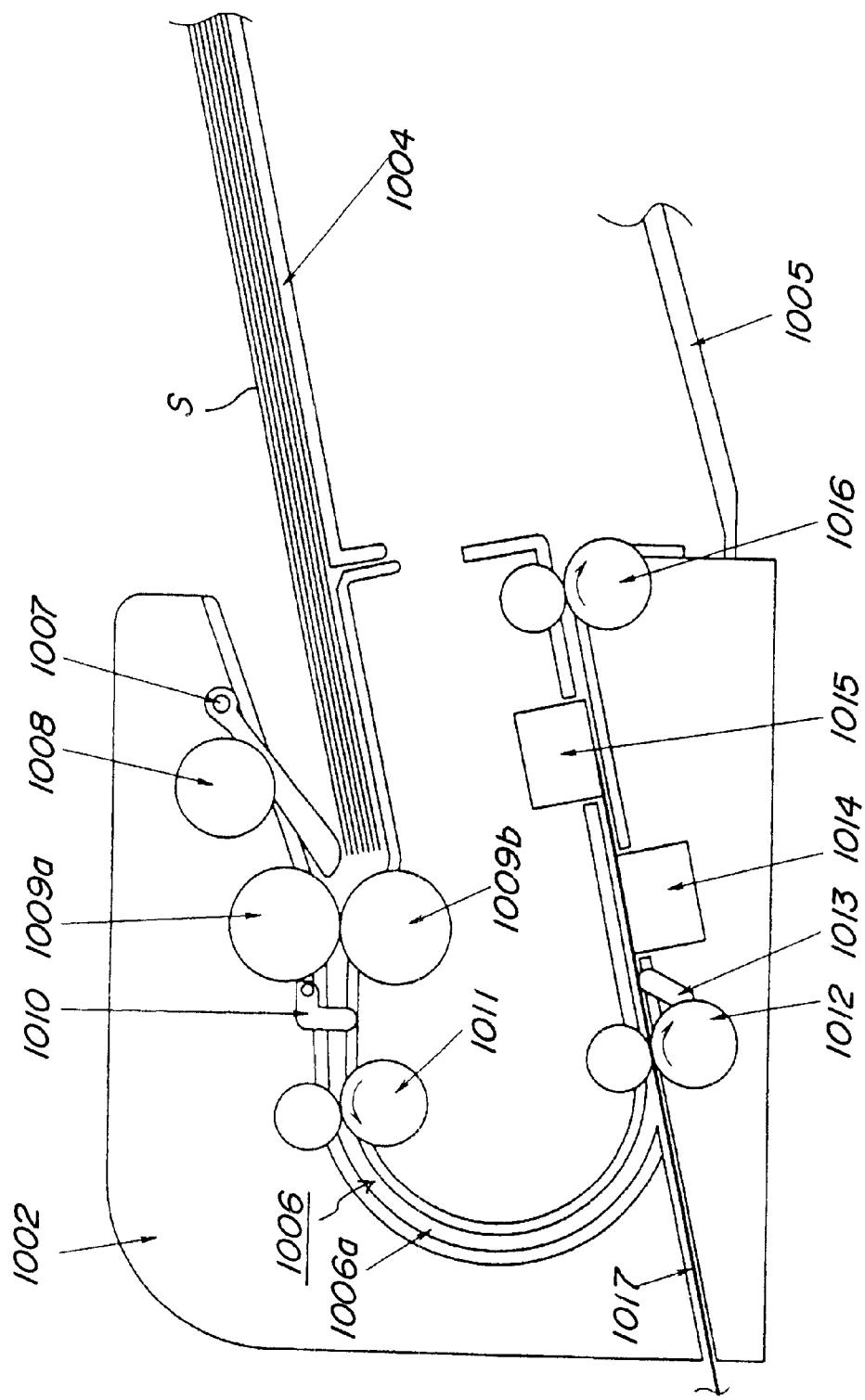

Then, the drive motor 1018 is rotationally driven in a reverse direction (S1017), and consequently the original document S is conveyed in a reverse direction by the conveying roller pair 1012 and the delivering roller pair 1016, and further conveyed to the reverse path 1017 by means of the shape of the intersecting portion of the U-turn portion 1006*a* and the reverse path 1017 (S1018, FIG. 10). Furthermore, the original document edge sensor 1013 detects the back end of the original document S as it is reversely conveyed. In other words, because the reverse path 1017, which is downstream of the U-turn portion 1006*a*, is provided lower than, as well as straight with respect to, the conveying route 1006, the original document which is reversely conveyed is naturally led to the reverse path 1017 front by its own weight. When the original document edge sensor 1013 detects the front end of the original document S (S1019, FIG. 11), the drive motor 1018 again rotates in a forward direction (S1020). When the original document edge sensor 1013 again detects the front end of the original document S (S1021), the back surface reading section 1015 starts reading the back surface of the original document S at the place where the original document is conveyed by a predetermined amount from the original document edge sensor 1013 (S1022, FIG. 12).

Figure 13:
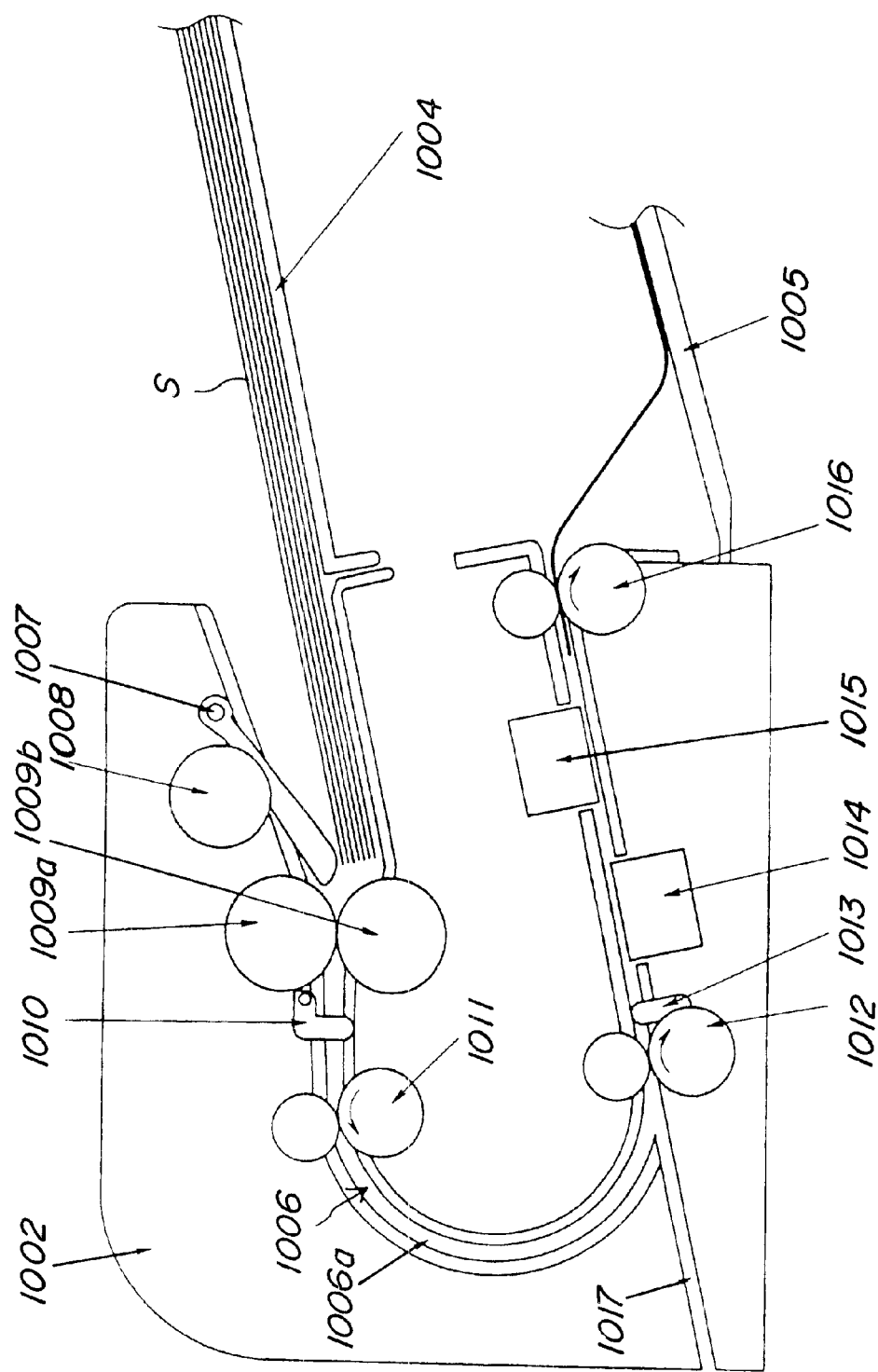

When the original document edge sensor 1013 detects the rear end of the original document S (S1023), the back surface reading section 1015 finishes reading the back surface of the original document at the place where the original document is conveyed by a predetermined amount from the original document edge sensor 1013 (S1024), and then the delivering roller pair 1016 delivers and mounts the original document on the delivering tray 1005 (S1025, FIG. 13). When the original document existing-nonexisting sensor 1007 detects original documents, the following original document S is conveyed by going back to Step 1004; when the sensor does not detect any documents, the reading operation is completed (S1026).

The structure as mentioned above can sequentially send the image information read from both sides of the original document to a single image processing means, so a plurality of the image processing means are not required, thereby making it possible to simplify the circuit, miniaturize the base board, and also to achieve a reduction of the production costs.

In addition, when an apparatus is made with one-sided reading as a standard configuration and has a double-sided reading as an function added configuration, the type of configuration can be changed with or without changing the single image reading means, thereby making the apparatus simple and inexpensive.

Furthermore, the apparatus can start reading from the front end of the original document in both cases of the front surface and back surface (both sides) reading operations, so an image processing means or an original document reverse means used for reversing the image data is not needed. Thus, it is possible to simplify the circuit, miniaturize the base board, and also simplify the structure of the apparatus to reduce the production cost.

[Second Embodiment]

Figure 14:
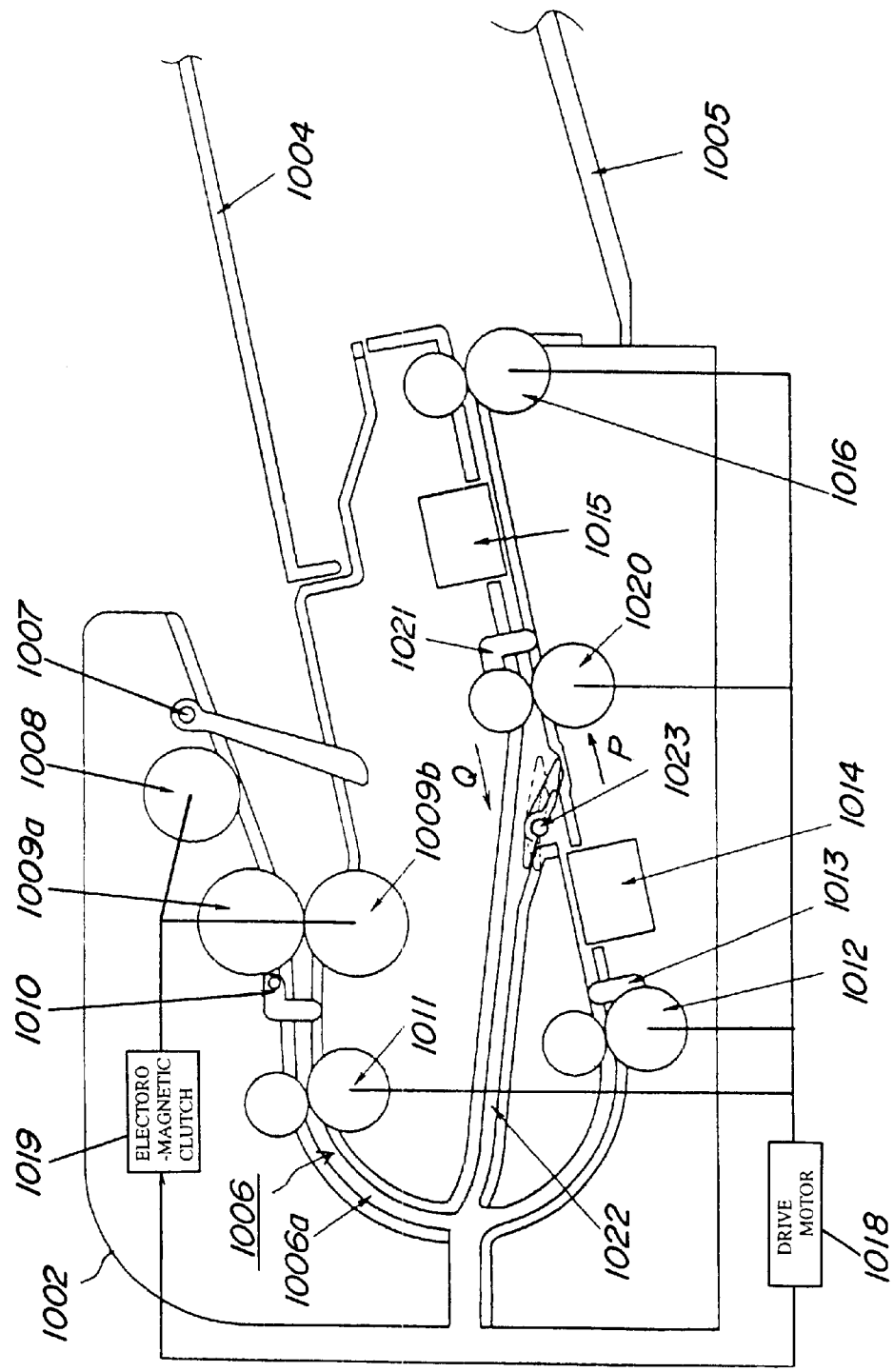
FIG. 14 is a cross-sectional view showing an image reading apparatus of a second embodiment.
Figure 15:
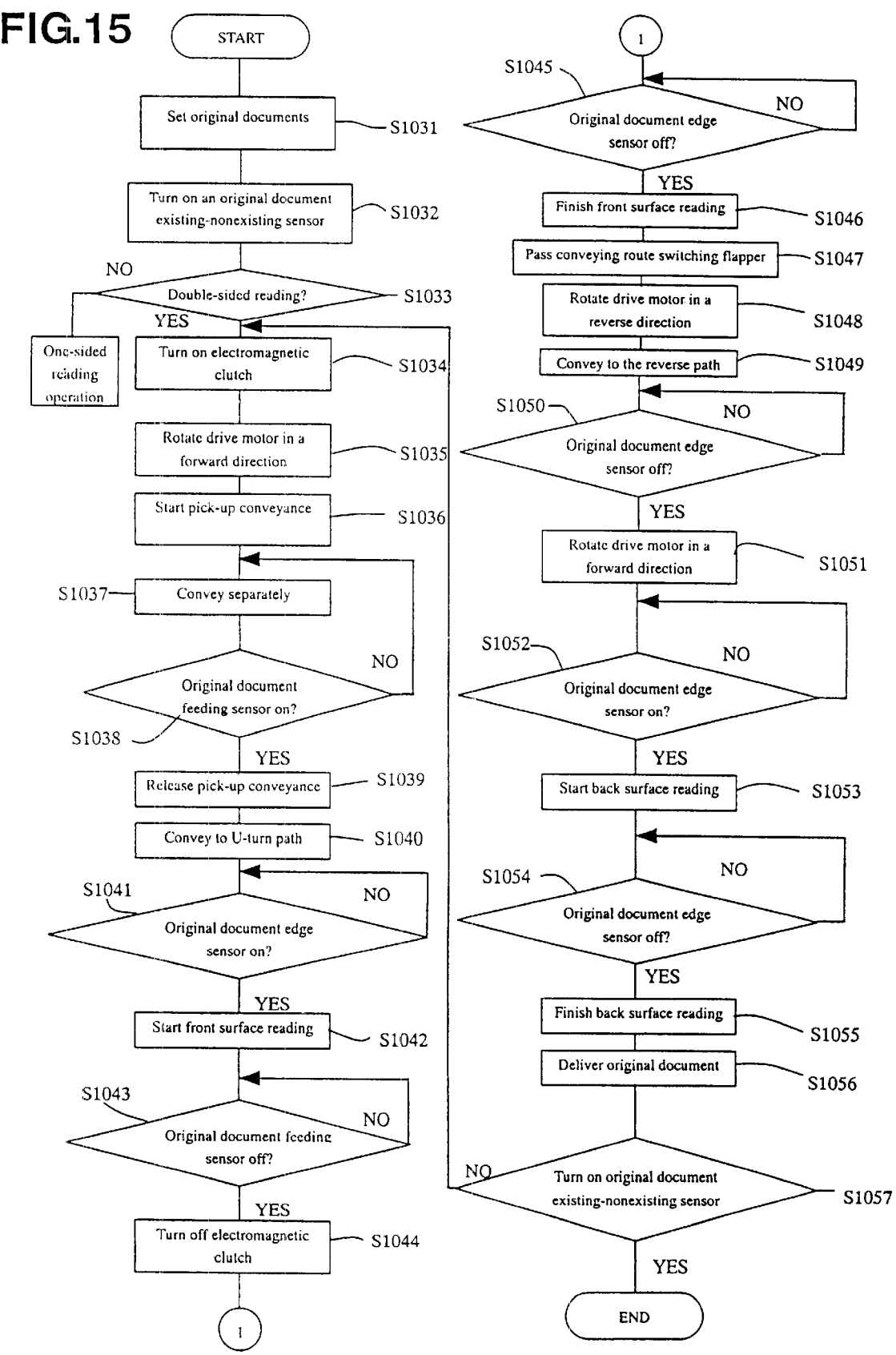
FIG. 15 is a flow chart showing an operation of the image reading apparatus according to the second embodiment.
Figure 16:
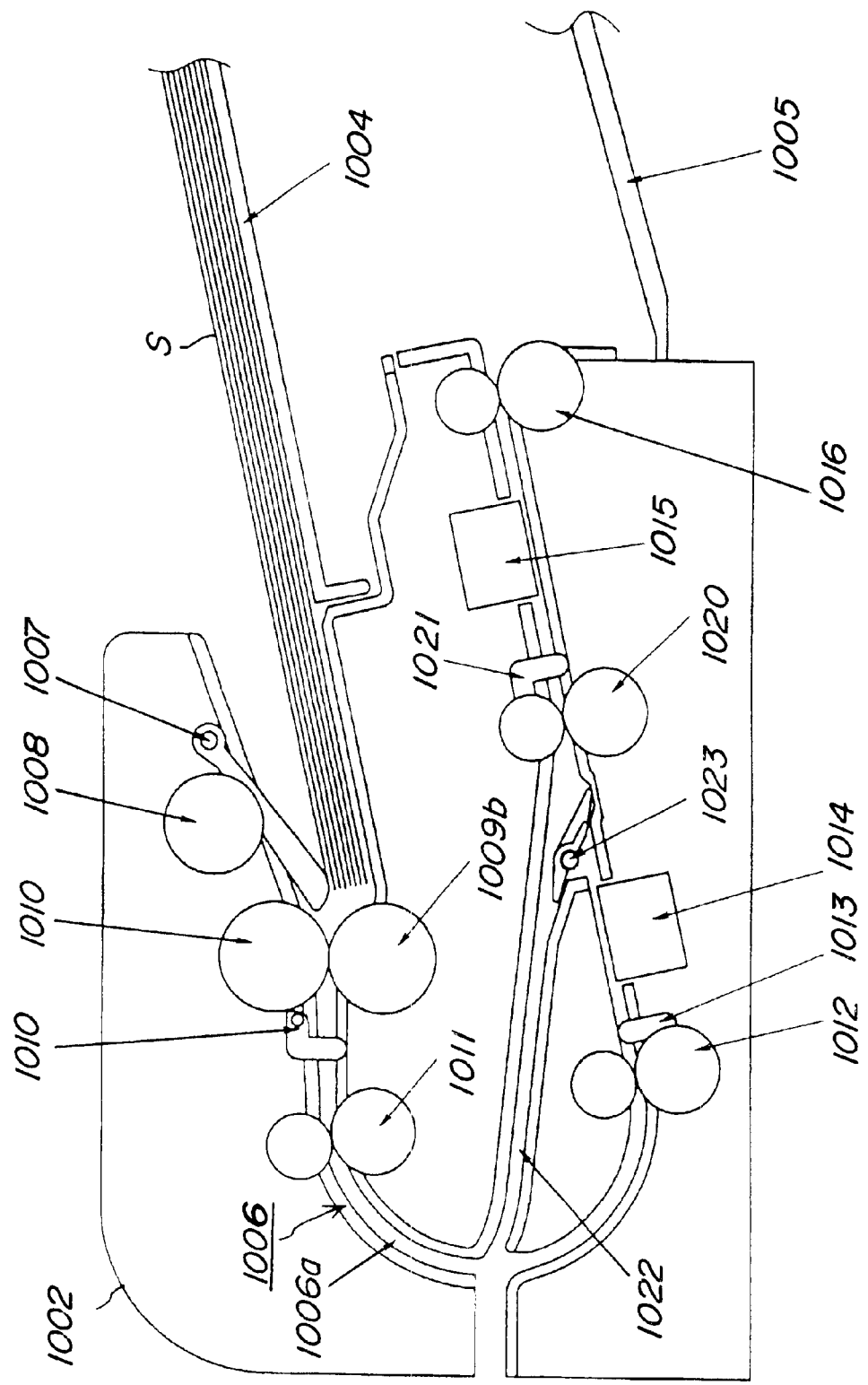
FIG. 16 to FIG. 25 are illustrations showing operations of the image reading apparatus according to the second embodiment.
Figure 17:
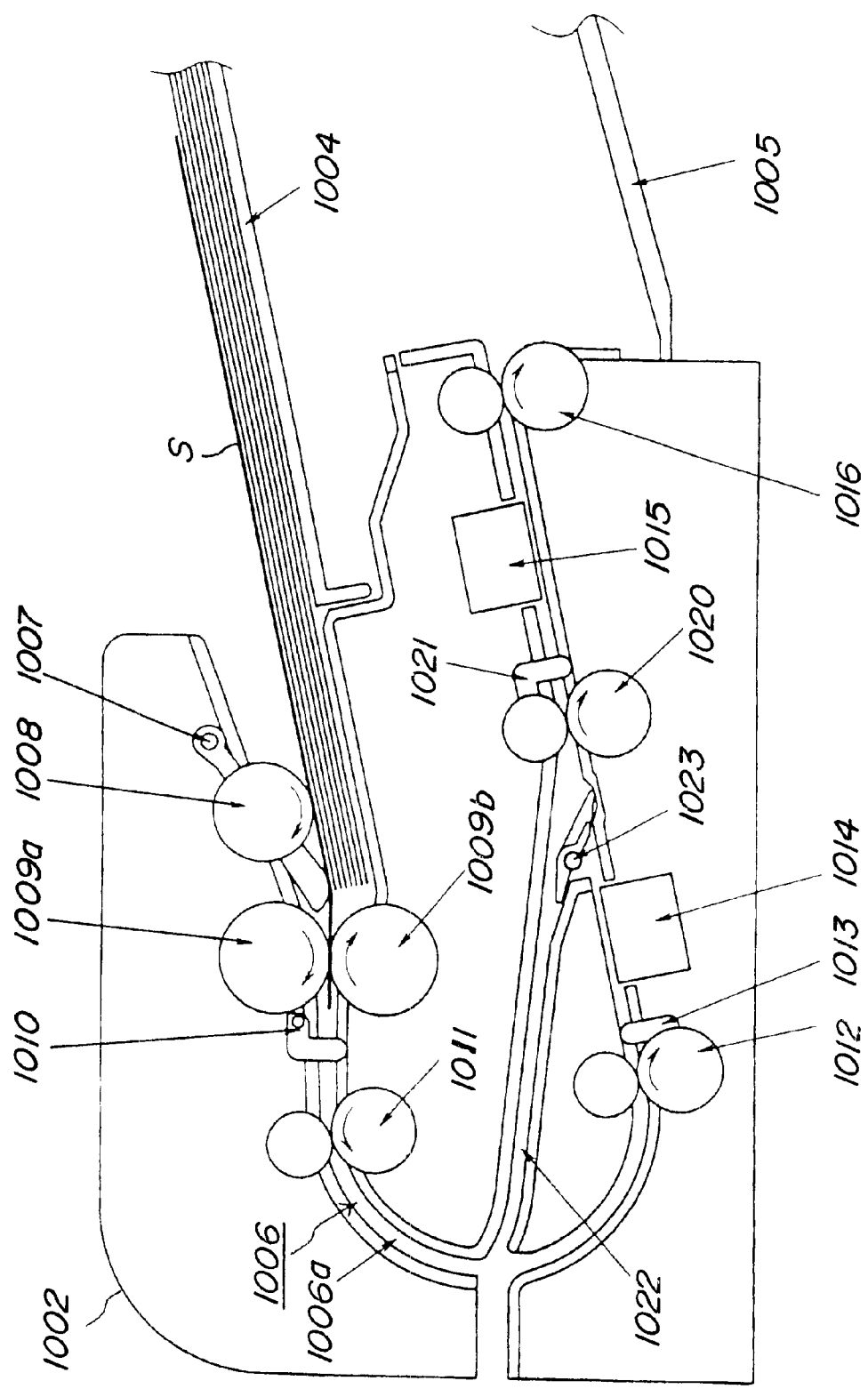

A second embodiment of the double-sided image reading apparatus will be explained with reference to the figures. FIG. 14 is a cross-sectional view showing an image reading apparatus of the second embodiment; FIG. 15 is a flow chart showing an operation of the image reading apparatus; and FIG. 16 to FIG. 25 are illustrations showing operations of the image reading apparatus. The redundant part of the description mentioned in the first embodiment will be omitted by providing the same symbols. The present embodiment has a bypass means with a structure that is different from that of the first embodiment as mentioned above.

In this embodiment, a forward and reverse rotatable conveying roller pair 1020 is attached upstream of the back surface reading section 1015, and attached downstream of the conveying roller pair 1020 is an original document edge sensor 1021 for detecting a front end and rear end of original documents S in order to determine the timing of starting and finishing of the back surface reading operation by the back surface reading section 1015.

In addition, a reverse path 1022 leading from the conveying roller pair 1020 to the outside of the apparatus is structured to prevent the original document S from passing the front surface reading section 1014 when conveyed in a reverse direction. A conveying route switching flapper 1023 is provided at an intersecting portion of the reverse path 1022 and the conveying route 1006 for conveying the original document S in a forward direction (Arrow P direction) by opening the conveying route 1006 or for leading the original document S in a reverse direction (Arrow Q direction) by shutting down the conveying route 1006, thus leading the original document S to the reverse path 1022.

Operation of the double-sided image reading apparatus of the second embodiment will be explained referring to FIG. 15 and FIG. 16 to FIG. 25. First, a user sets original documents S on the original document tray 1004 (S1031), and then the original documents S are detected by the original document existing-nonexisting sensor 1007 (S10032, FIG. 16). After the user chooses whether the operation is for double-sided reading or not (S1033), the image reading process starts where the electromagnetic clutch 1019 is connected to provide the driving force to the pickup roller 1008, the separating roller 1009*a*, and the reverse roller 1009*b* (S1034). At this time, the drive motor 1018 rotates in a forward direction (S1035), and the pickup roller 1008 directly contacts with the original documents S to feed them to the interior of the apparatus (S1036). Next, the original documents S are separated sheet by sheet by means of the separating roller 1009*a* and the reverse roller 1009*b*, and only an uppermost sheet of the original documents S is conveyed (S1037, FIG. 17).

Figure 18:
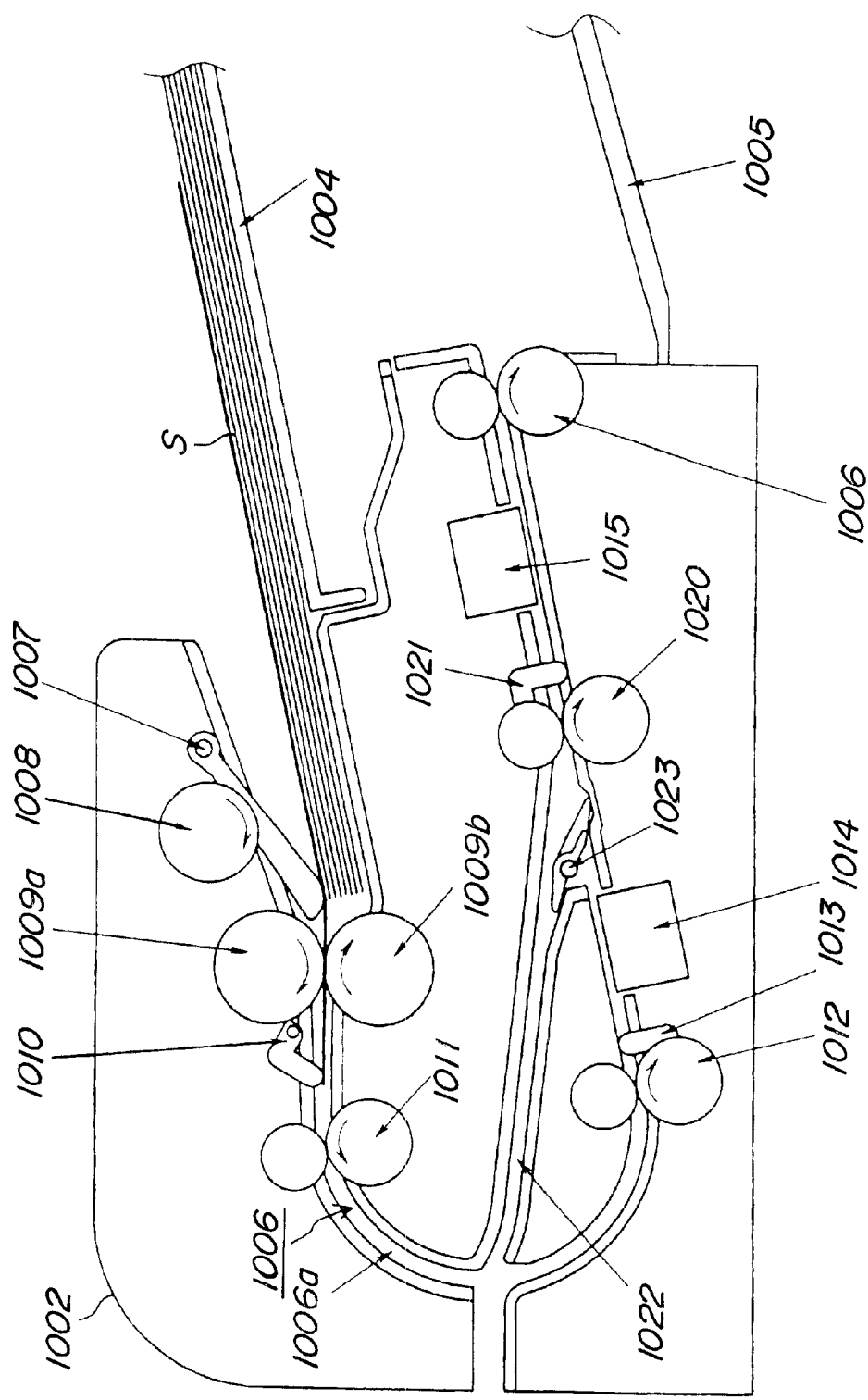
Figure 19:
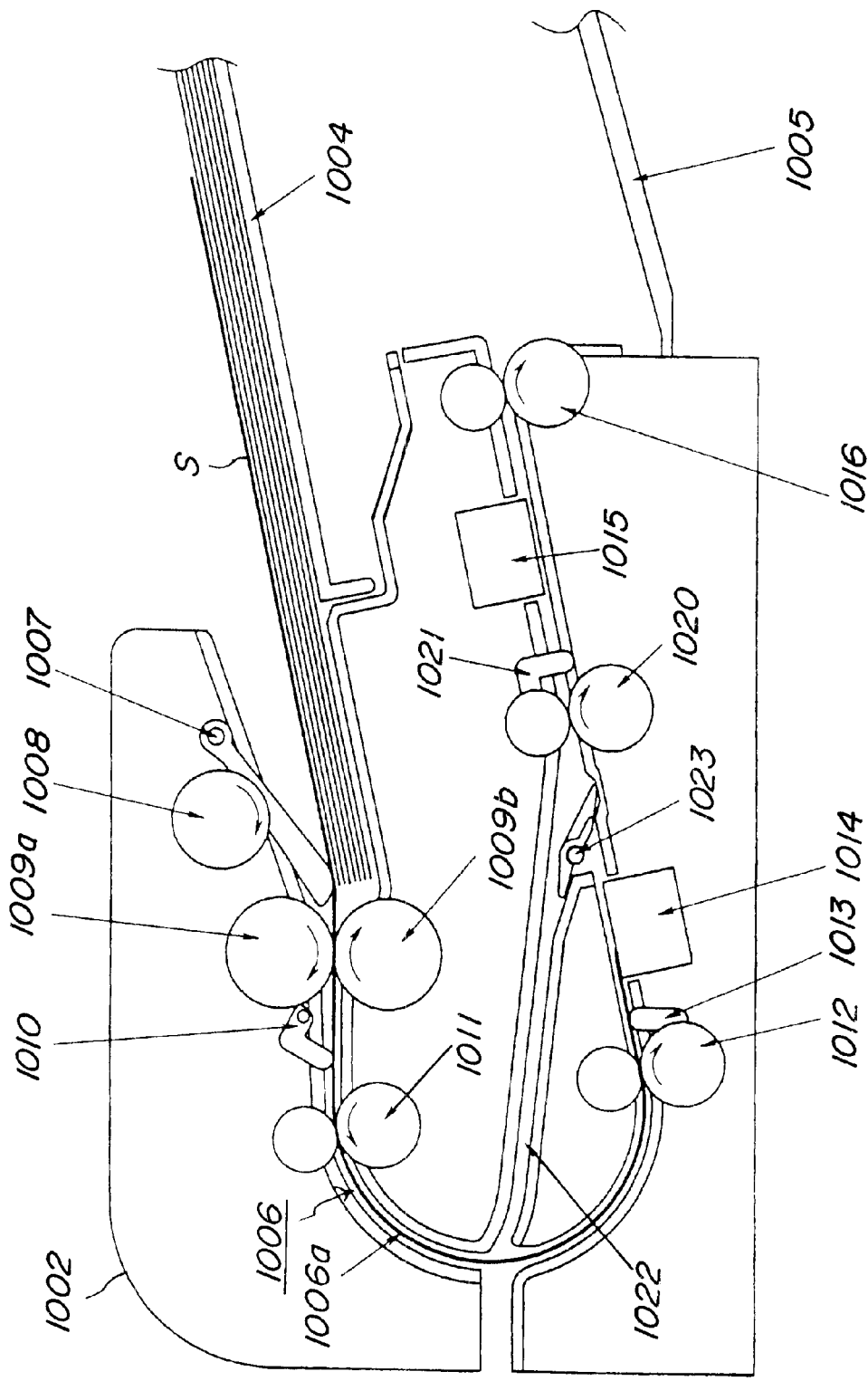

When the original document feeding sensor 1010 detects the front end of the original document (S1038), the pickup roller 1008 is withdrawn from the original documents S, releasing then from the feeding operation (S1039, FIG. 18). Then, the original document S thus separated is conveyed to the U-turn portion 1006*a* by the conveying roller pair 1011 (S1040). After passing the U-turn portion 1006*a*, the original document is conveyed by the conveying roller pair 1012, and then after the front end of the original document is detected by the original document edge sensor 1013 (S1041), the front surface reading section 1014 starts reading the front surface of the original document at the place where the paper is conveyed by a predetermined amount from the original document edge sensor 1013 (S1042, FIG. 19).

Figure 20:
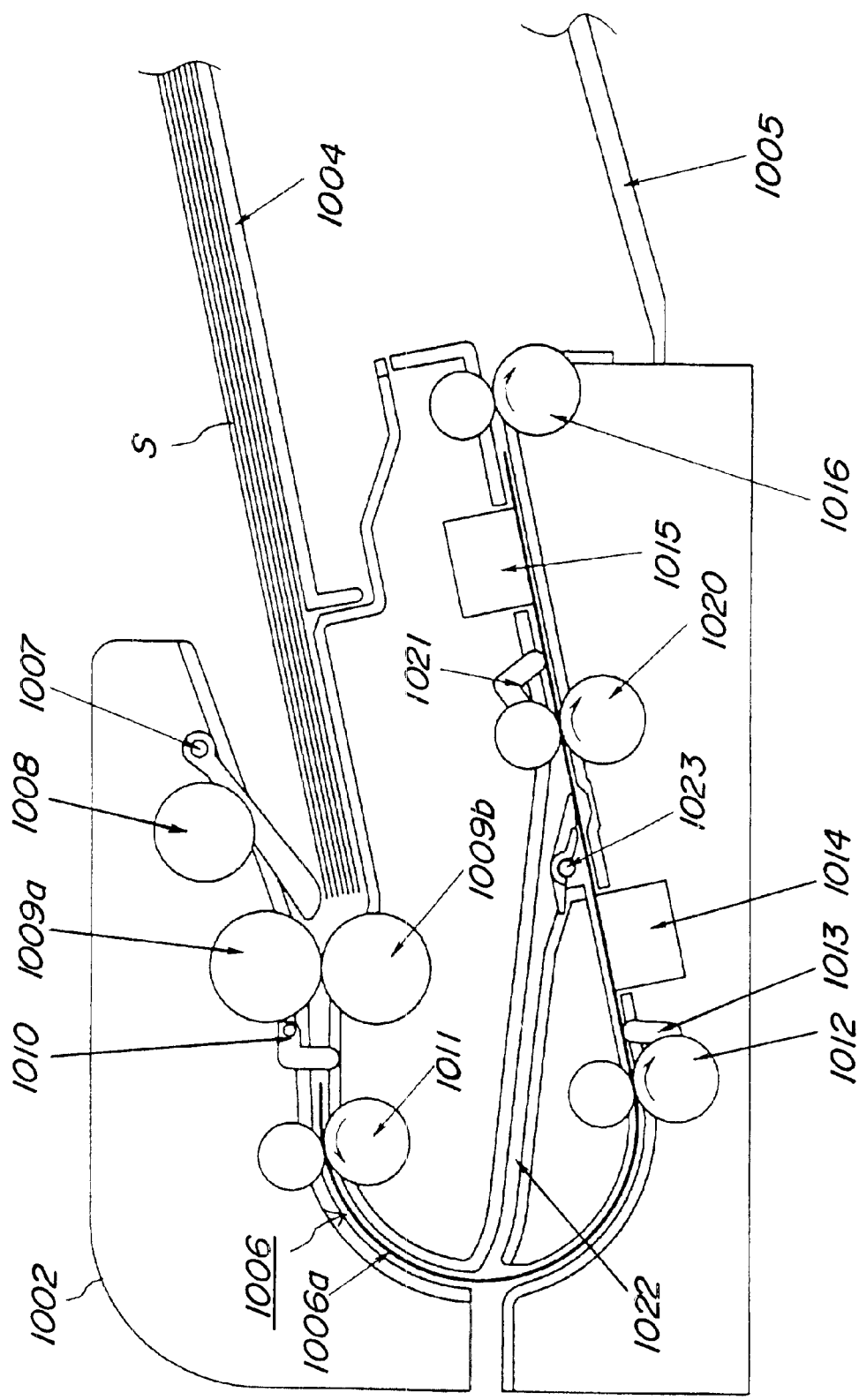
Figure 21:
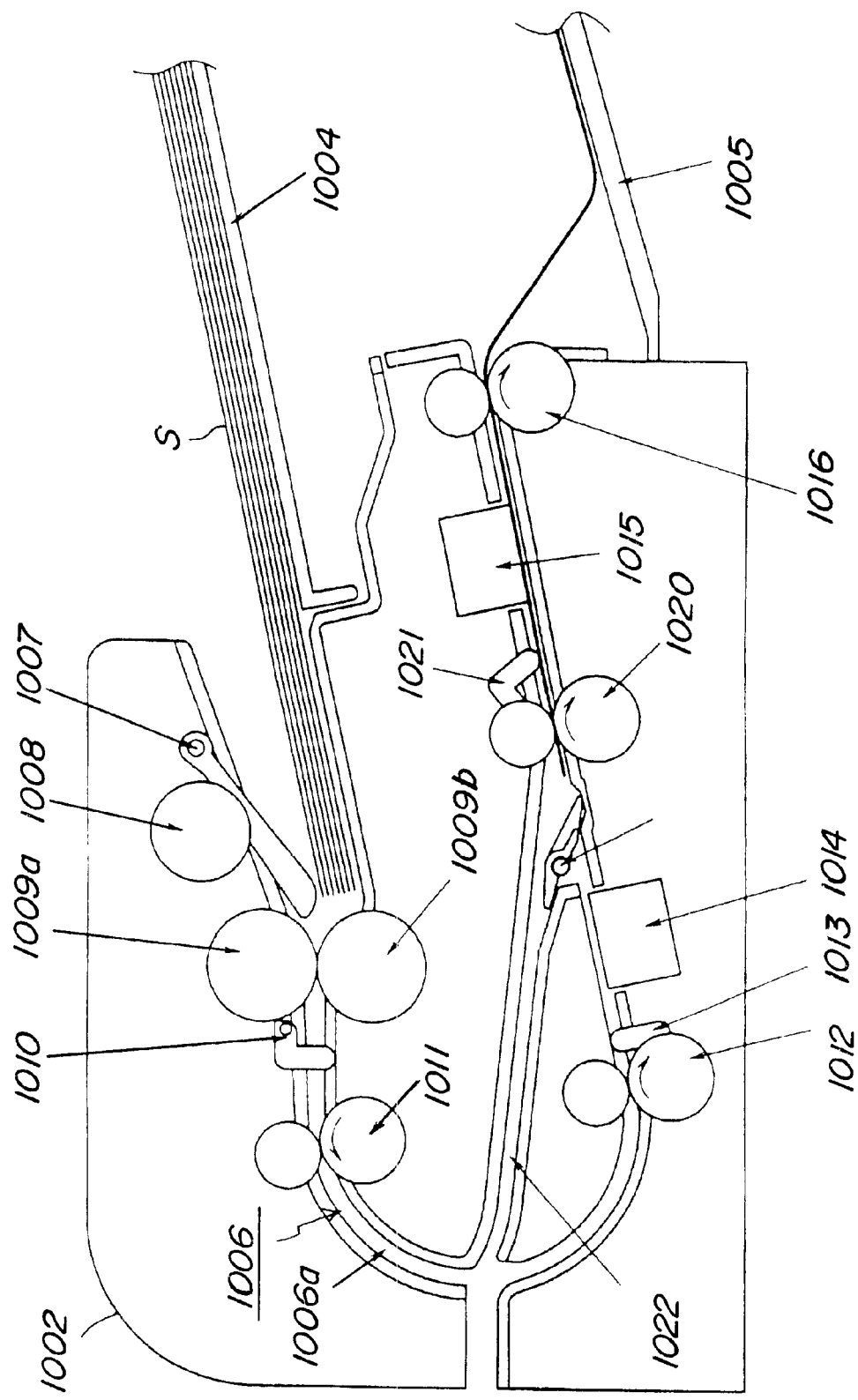
Figure 22:
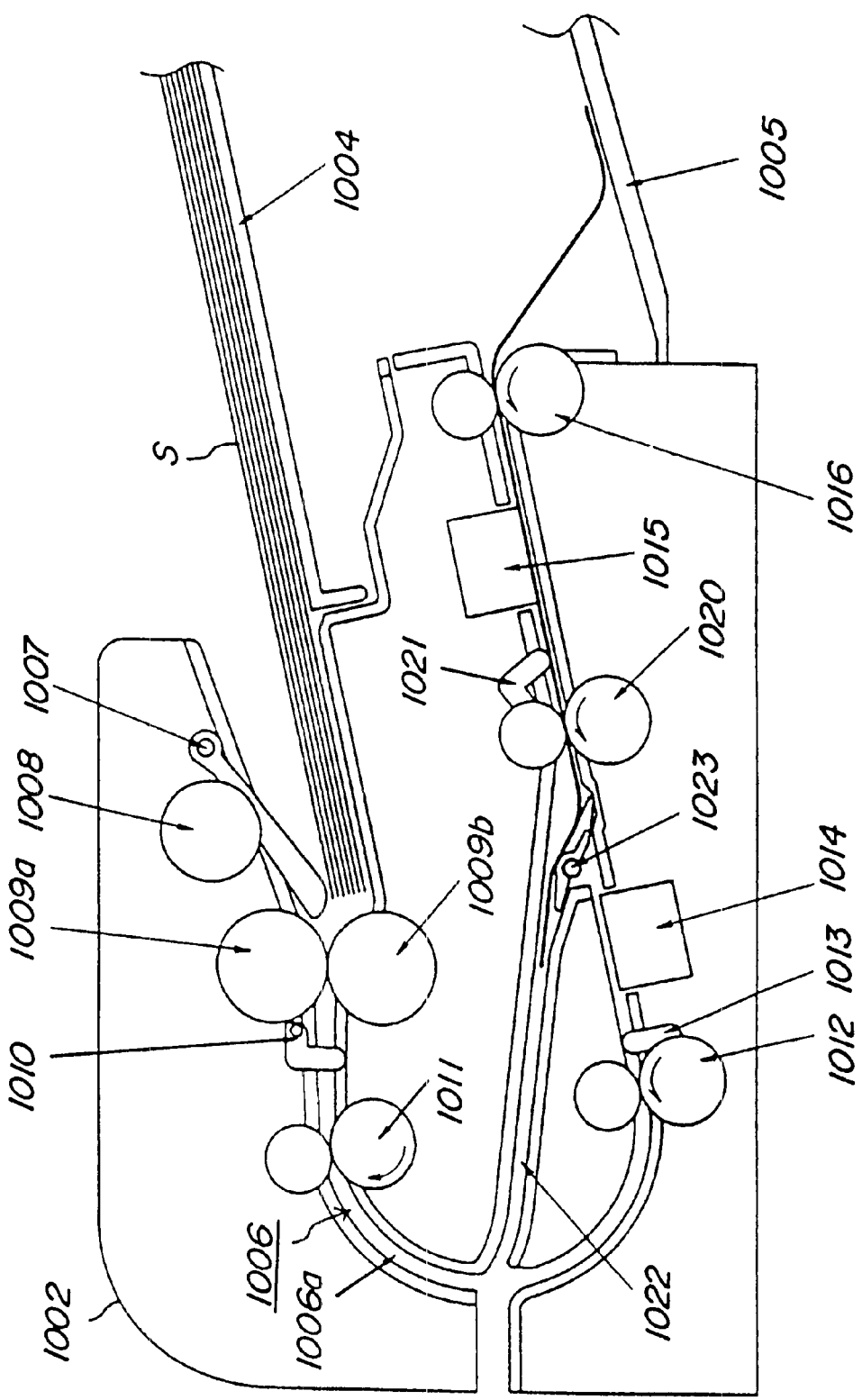
Figure 23:
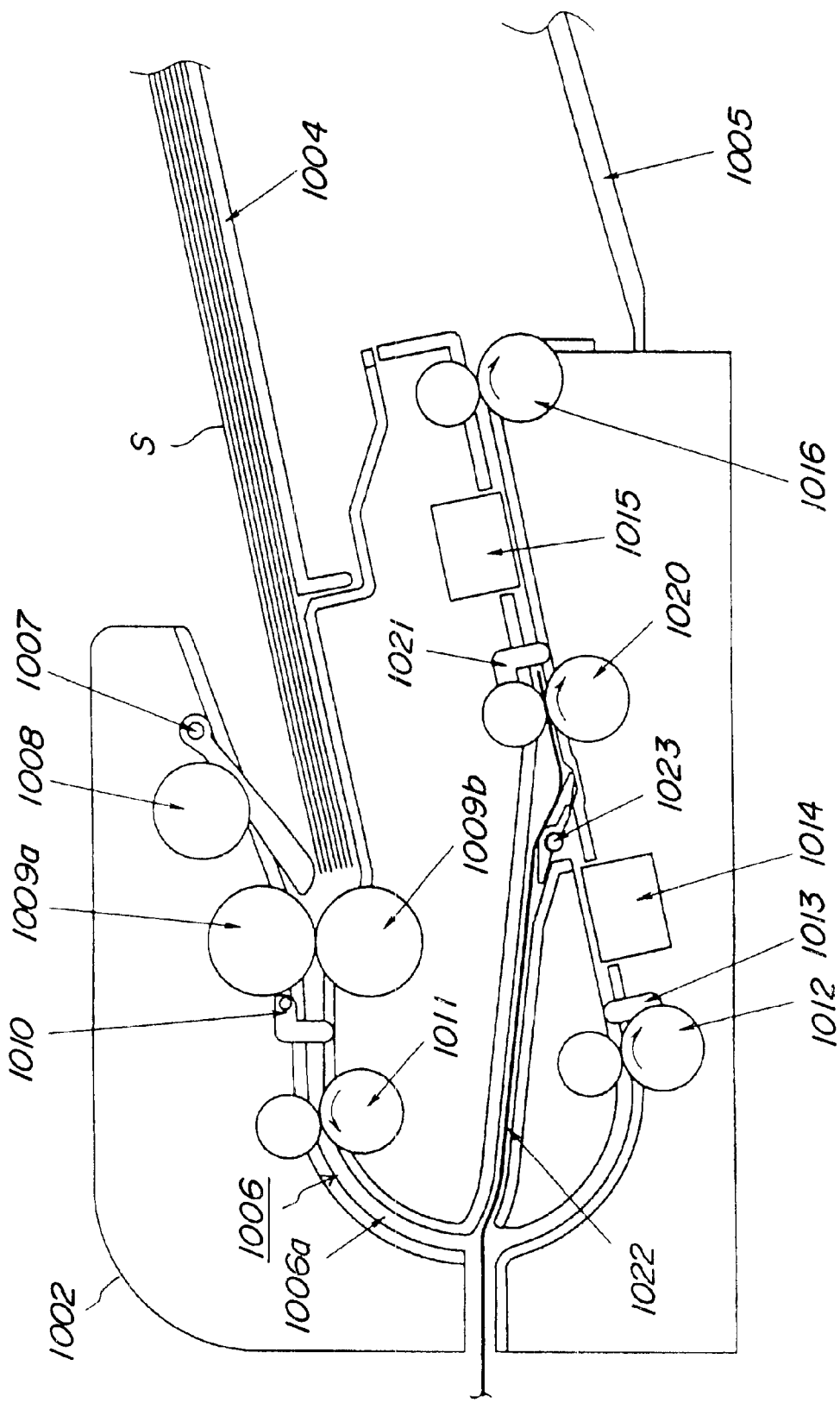
Figure 24:
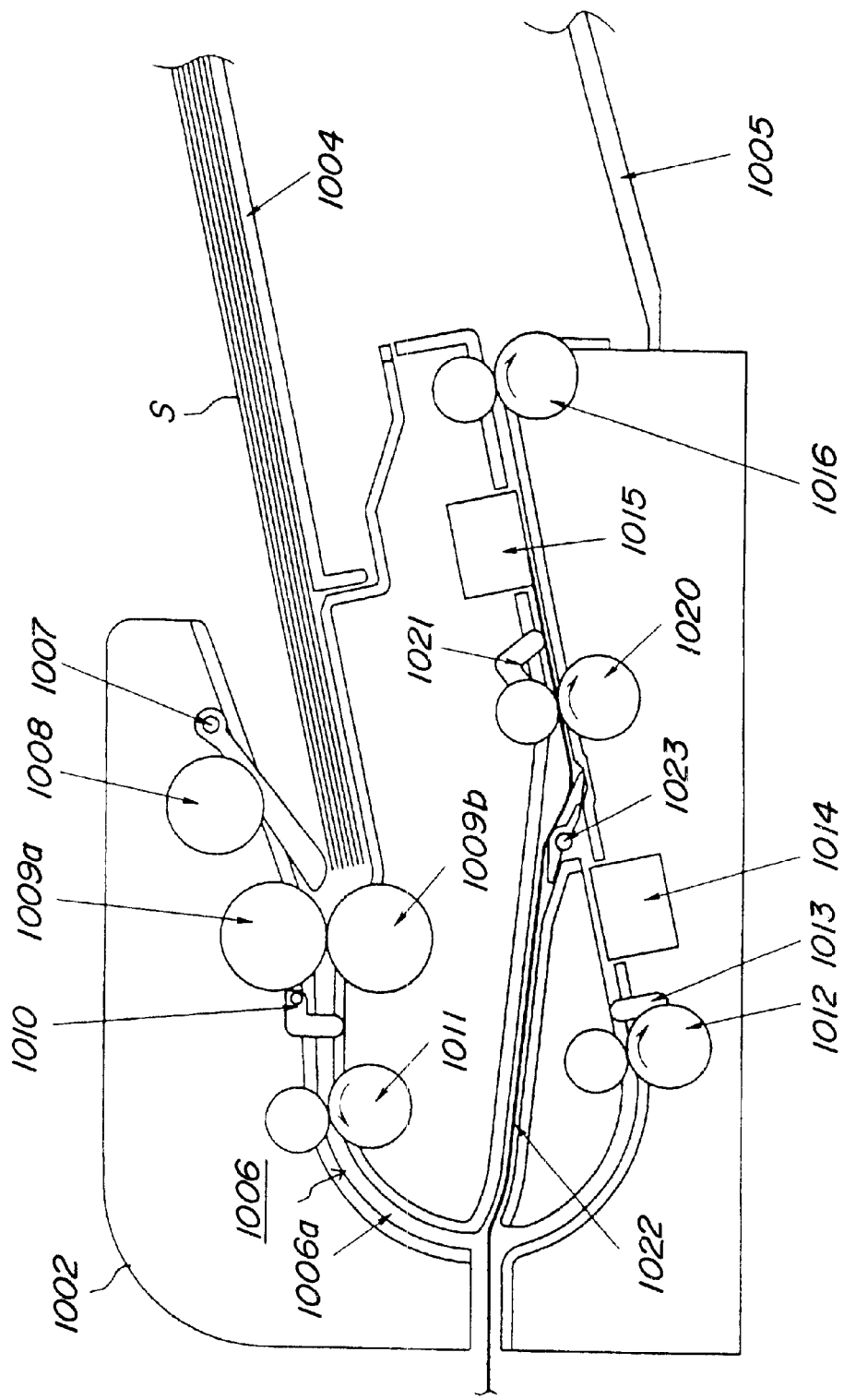

When the original document feeding sensor 1010 detects the rear end of the original document (S1043), the electromagnetic clutch 1019 blocks the driving of the pickup roller 1008, the separating roller 1009*a*, and the reverse roller 1009*b*, so that the following documents are not conveyed (S1044, FIG. 20). After the rear end of the original document S is detected by the original document edge sensor 1013 (S1045), the front surface reading section 1014 finishes reading the front surface of the original document at the place where the paper is conveyed by a predetermined amount from the original document edge sensor 1013 (S1046, FIG. 21).

The original document S is conveyed further downstream by the conveying roller pair 1020, and when the rear end of the original document passes the conveying route switching flapper 1023 (S1047), the drive motor 1018 rotates in a reverse direction (S1048). Subsequently, the original document S is conveyed in a reverse direction by the conveying roller pair 1020 and the delivering roller pair 1016 and led to the reverse path 1022 by the conveying route switching flapper 1023 (S1049, FIG. 22).

When the original document edge sensor 1021 detects the front end of the original document S (S1050, FIG. 23), the drive motor 1018 again rotates in a forward direction (S1051). When the original document edge sensor 1021 again detects the front end of the original document (S1052), the back surface reading section 1015 starts reading the back surface of the original document S at the place where the original document S is conveyed by a predetermined amount from the original document edge sensor 1021 (S1049, FIG. 24).

Figure 25:
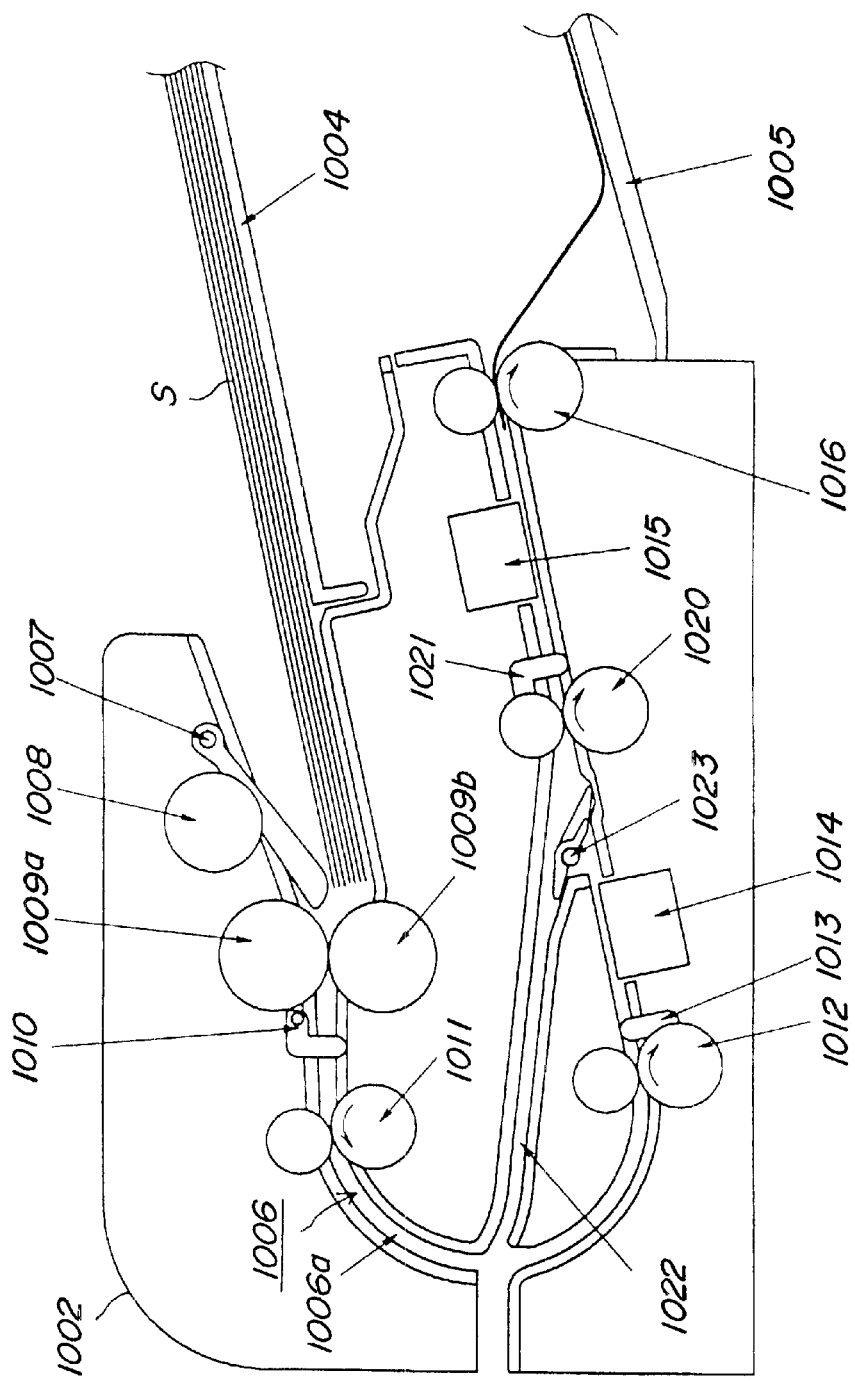

When the original document edge sensor 1021 detects the rear end of the original document S (S1054), the back surface reading section 1015 finishes reading the back surface of the original document S at the place where the original document is conveyed by a predetermined amount from the original document edge sensor 1021 (S1055), and then the delivering roller pair 1016 delivers and mounts the original document S on the delivering tray 1005 (S1056, FIG. 25). When the original document existing-nonexisting sensor 1007 detects original documents, the operation is returned to S1034 where the following original documents are conveyed; when the sensor does not detect any documents, the reading operation is completed (S1057).

The structure as mentioned above can sequentially send the image information read from both sides of the original document to a single image processing means, so plurality of the image processing means are not required, thereby making it possible to simplify the circuit, miniaturize the base board, and also to achieve reduction of the production costs.

In addition, when an apparatus is made with one-sided reading as a standard configuration and has a double-sided reading function as an added configuration, the type of configuration can be changed with or without changing the single image reading means, thereby making the apparatus simple and inexpensive.

Furthermore, the apparatus can start reading from the front end of the original document in both cases of the front surface and back surface (both sides) reading operations, so an image processing means or an original document reverse means used for reversing the image data is not needed. Thus, it is possible to simplify the circuit miniaturize the base board, and also simplify the structure of the apparatus to reduce the production cost.

A third embodiment of the image reading apparatus applying the invention will hereinafter be described with reference to the drawings.

[Third Embodiment]

An image reading apparatus according to a third embodiment will hereinafter he described with reference to FIG. 26 to FIG. 38. In the present embodiment, a structure of an image reading apparatus in a facsimile machine is explained by way of example.

Figure 27:
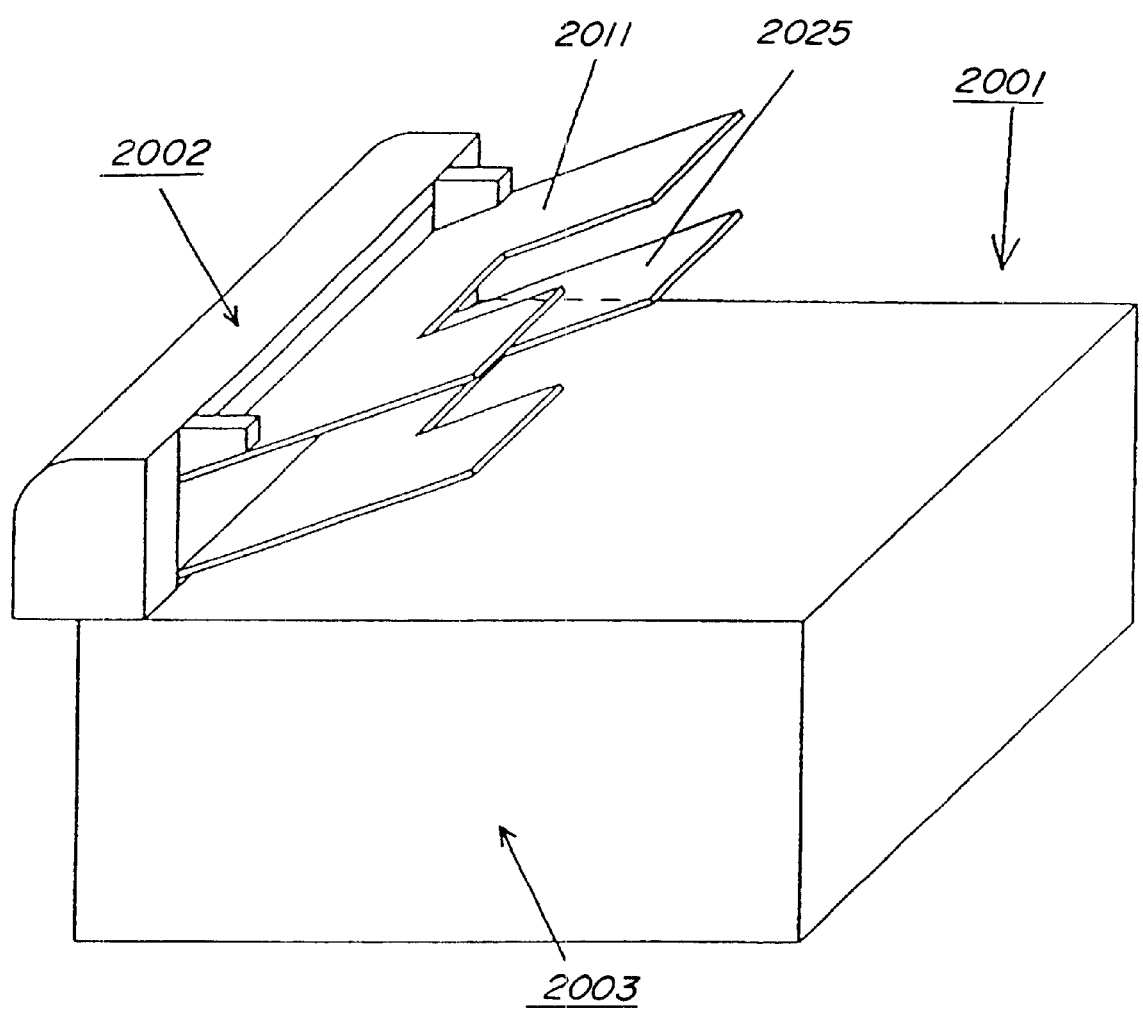
FIG. 27 is a perspective view showing an exterior appearance of a facsimile machine mounting the image reading apparatus according to the third embodiment.

FIG. 27 is a perspective view showing an exterior appearance of a facsimile machine. In FIG. 27, numeral 2001 refers to a main body of the machine; numeral 2002 refers to an image reading section according to the invention arranged in an upper portion of the machine main body 2001; numeral 2003 refers to an image forming section arranged in a lower portion of the machine main body 2001; numeral 2011 refers to an original document mounting tray structured so as to stack a plurality of original documents D; and numeral 2025 refers to a sheet delivering tray.

Figure 26:
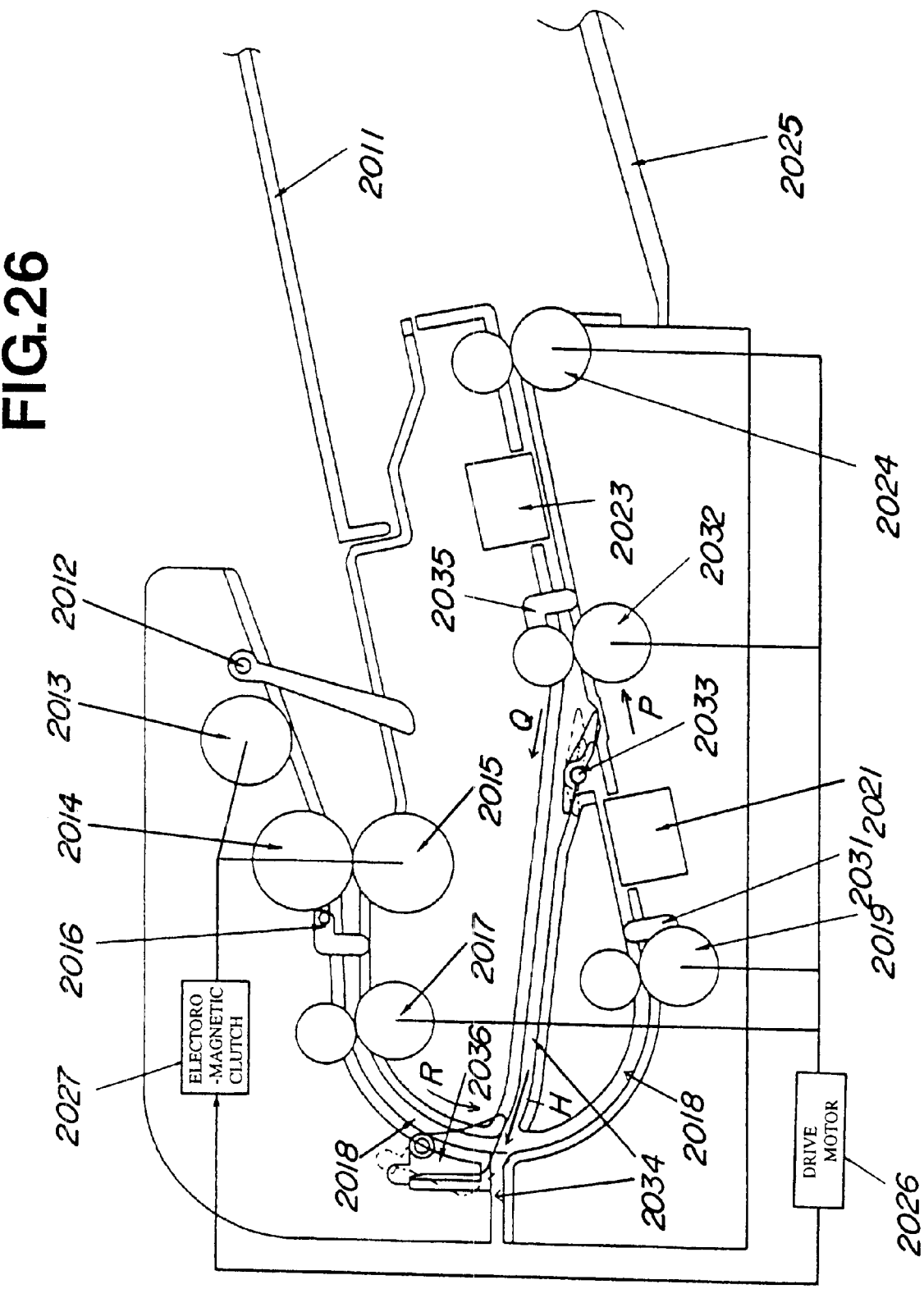
FIG. 26 is a cross-sectional view showing an image reading apparatus of a third embodiment.

FIG. 26 is a typical cross-sectional view showing a schematic structure of the image reading section 2002 in the facsimile machine. In FIG. 26, numeral 2012 is an original document existing-nonexisting detecting sensor for detecting whether or not original documents D are set on the original document mounting tray 2011; numeral 2013 is a pickup roller for feeding the original documents D set on the original document mounting tray 2011 to the interior of the image reading section 2002; numeral 2014 and 2015 are respectively a separating roller and a reverse roller working in cooperation with each other for separating a single document D from the plurality of original documents D and for feeding the separated document; numeral 2016 is an original document feeding sensor for detecting a front end or rear end of the separated original document D; numeral 2017 is a conveying roller pair for conveying the separated original document D to a U-turn path 2018 which is a U-turn shaped conveying route; numeral 2019 is a conveying roller pair for conveying the original document D after performing a U-turn to a front surface reading section 2021 composed of a pressing type image sensor; numeral 2031 is an original document edge sensor for detecting a front end and a rear end of the original document D in order to determine timing of starting and finishing of the reading operation of the front surface of the original document D by the front surface reading section 2021; numeral 2032 is a forward and reverse rotatable conveying roller pair for conveying the original document D further downstream when the front surface is read; numeral 2033 is a conveying route switching flapper freely and rotatably attached at a portion (branching portion) between the U-turn path 2018 and a reverse path 2034, the conveying route switching flapper 2033 opening the U-turn path 2018 when an end of the original document D enters from a forward direction (Arrow P direction) or closing the U-turn path 2018 to lead the original document to the reverse path 2034 when an end of the original document D enters from a reverse direction (Arrow Q direction); numeral 2035 is an original document edge sensor for detecting a front end or rear end of the original document D in order to determine timing of starting and finishing of the reading operation of the back surface of the original document D by a back surface reading section 2023 composed of a pressing type image sensor; numeral 2036 is a conveying route switching flapper freely and rotatably attached at a portion (intersecting portion) between the U-turn path 2018 and the reverse path 2034, the conveying route switching flapper 2036 opening the U-turn path 2018 when an end of the original document D enters from an Arrow R direction or shutting down the U-turn path 2018 to lead the original document to the reverse path 2034 when an end of the original document D enters from an Arrow H direction; numeral 2024 is a forward and reverse rotatable sheet delivering roller pair for delivering the original document D after being read onto the sheet delivering tray 2025; numeral 2026 is a drive motor for driving the pickup roller 2013, the separating roller 2014, the reverse roller 2015, the conveying roller pairs 2017, 2019, 2032, and the sheet delivering roller pair 2024; and numeral 2027 is an electromagnetic clutch for temporarily blocking the driving provided by the drive motor 2026 for the pickup roller 2013, the separating roller 2014 and the reverse roller 2015.

The above-mentioned conveying route switching flapper 2033 is freely and rotatably attached at the branching portion of the reverse path 2034 which branches off from the U-turn path 2018 on an upstream side of the back surface reading section 2023 serving as a reading means provided on a downstream side in the conveying direction. On the other hand, the conveying route switching flapper 2036 is freely and rotatably attached at the intersecting portion of the U-turn path 2018 and the reverse path 2034, the intersecting portion located on a downstream side, in the conveying direction, of the conveying roller pair 2017 as well as on an upstream side, in the conveying direction, of the branching portion as mentioned above.

The conveying route switching flappers 2033 and 2036 are so structured as to be moved rotationally by the original document D conveyed in a forward direction in the U-turn path 2018 to open the path 2018, and function as a guide for the path 2018 at the branching portion with or the intersecting portion with the reverse path 2034.

Furthermore, the conveying route switching flappers 2033 and 2036 are so constructed as to move rotationally by passage of the rear end of the original document D, thereby shutting down the path 2018 to move to a position which leads the original document D to the reverse path 2034, and function as a guide for the reverse path 2034 at the branching portion or the intersecting portion of the U-turn path 2018 and the reverse path 2034.

The image reading section 2002 is so structured to be suitably controlled by the controlling circuit (controlling means) although not shown in the figures; for example, control is excercised over such circuits as an image processing circuit (image processing means) for processing the image information of the original document D read by the front surface reading section 2021 and the back surface reading section 2023 and a switching circuit (switching means) for switching, as an inputting source of the image information, to the front surface reading section 2021 or to the back surface reading section 2023. Or, based on detecting signals from the original document existing-nonexisting detecting sensor 2012, original document feeding sensor 2016, original document edge sensor 2031, 2035 or the like, control is excercised over as driving or drive switching by the drive motor 2026 which rotationally drives the pickup roller 2013, separating roller 2014, and reverse roller 2015 constituting the original document feeding means, as well as the conveying roller pair 2017, 2019, 2032, and the sheet delivering roller pair 2024 constituting the original document conveying means; turning-on or -off of the electromagnetic clutch 2027 for temporarily blocking the driving of the drive motor 2026 for the pickup roller 2013, separating roller 2014, and the reverse roller 2015; and timing of starting and finishing of the reading operation by the front surface reading section 2021 and the back surface reading section 2023.

Figure 28:
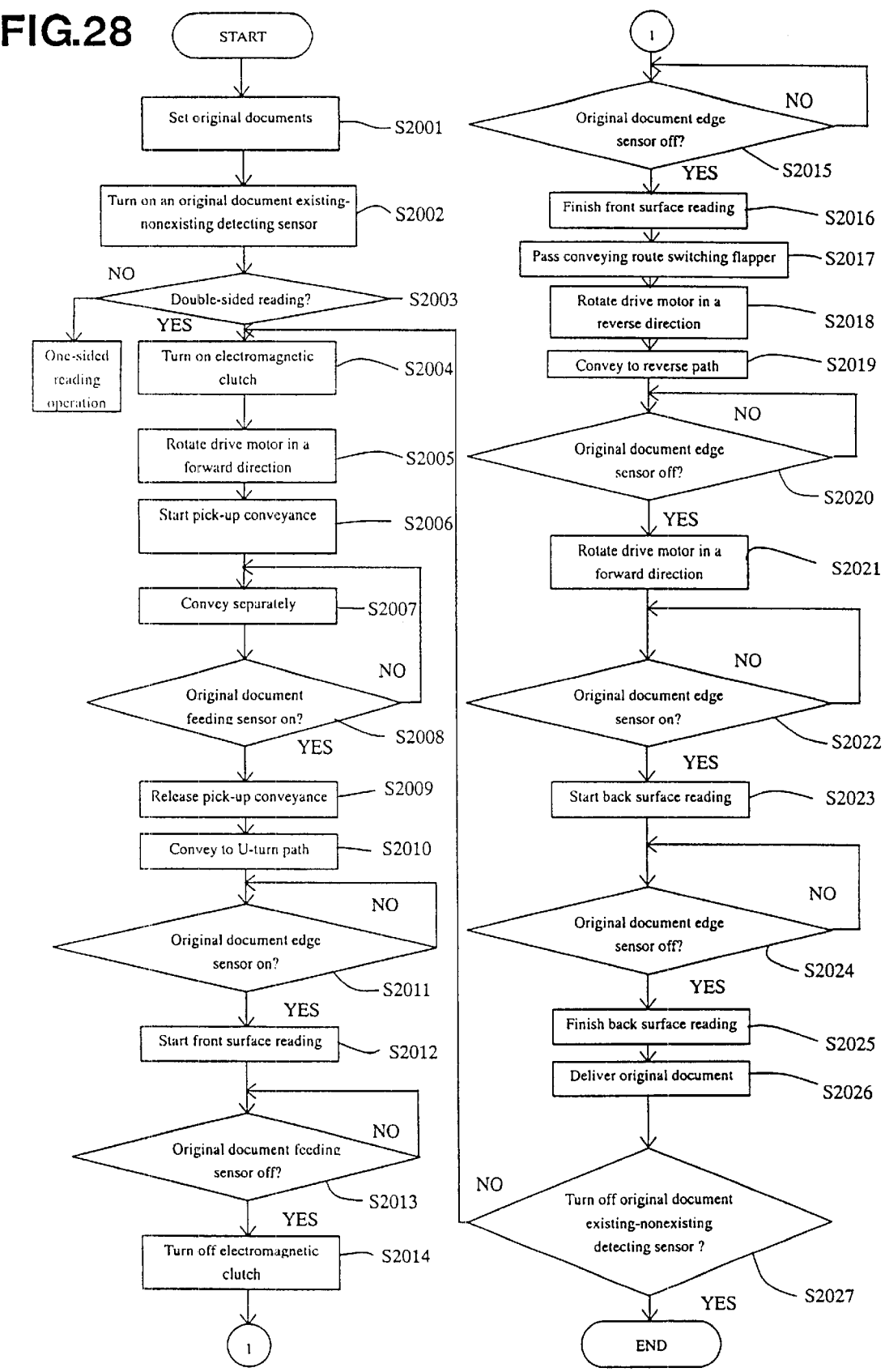
FIG. 28 is a flow chart showing an operation of the image reading apparatus according to the third embodiment.

Next, operation of the image reading section 2002 will be explained based on the flow chart shown in FIG. 28 with reference to FIG. 29 to FIG. 38.

Figure 29:
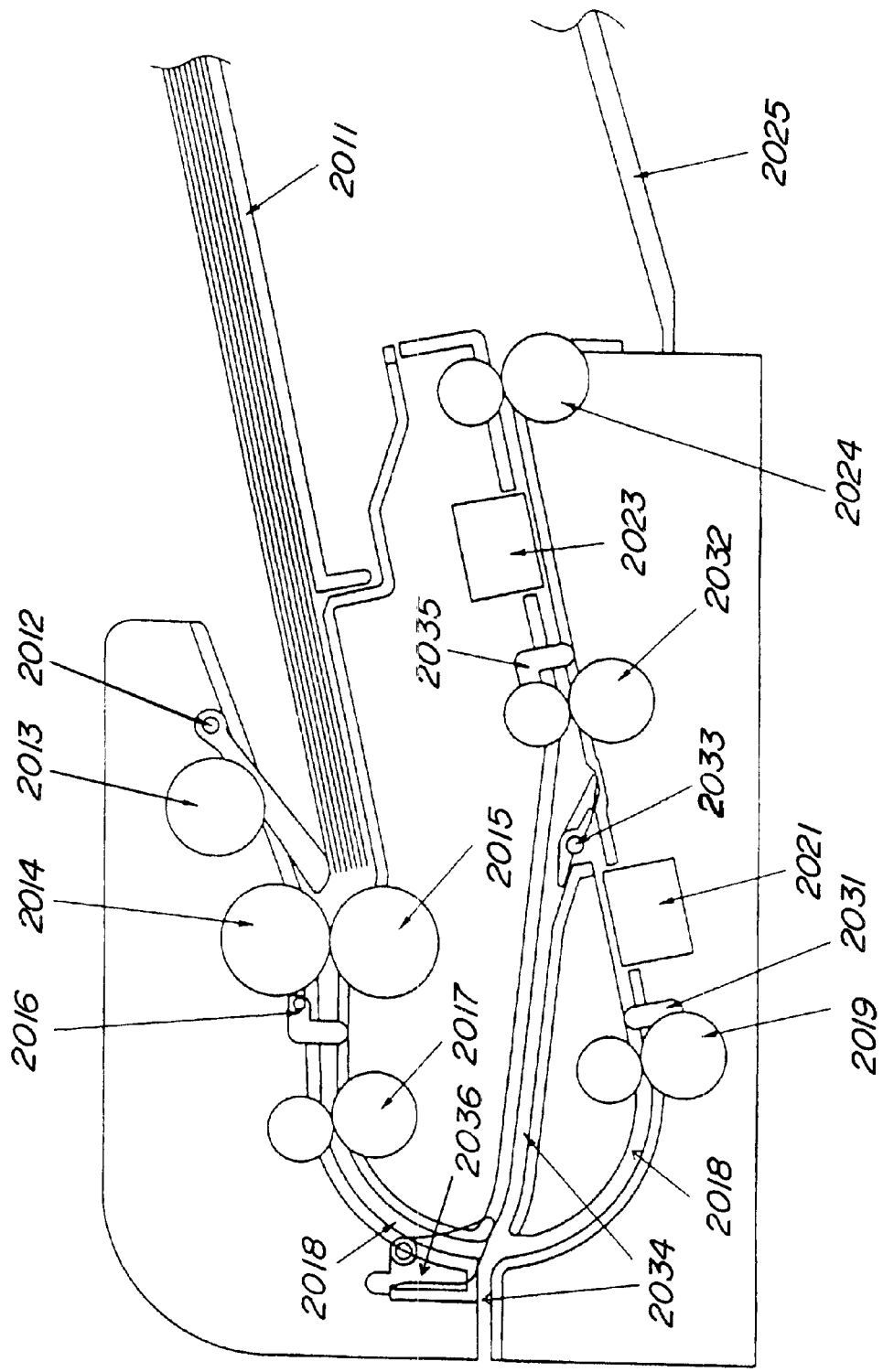
FIG. 29 to FIG. 38 are illustrations showing operations of the image reading apparatus according to the third embodiment.

When a user sets original documents D on the original document mounting tray 2011 (S2001), the original document existing-nonexisting detecting sensor 2012 detects the original documents (See, S2002, FIG. 29).

The user selects a double-sided reading mode, and then directs the start of a reading operation (S2003). Here, when a one-sided reading mode is selected, the operation is switched to the conventionally known one-sided reading operation (detailed description omitted).

After receiving the direction for starting the two-sided reading operation, the electromagnetic clutch 2027 connects the driving for the pickup roller 2013, the separating roller 2014, and the reverse roller 2015 (S2004).

The drive motor 2026 rotates in a forward direction (S2005), and then the pickup roller 2013 directly presses the original documents D set on the original document mounting tray 2011 to start picking-up conveyance of the original document D into the inside of the apparatus (S2006).

Figure 30:
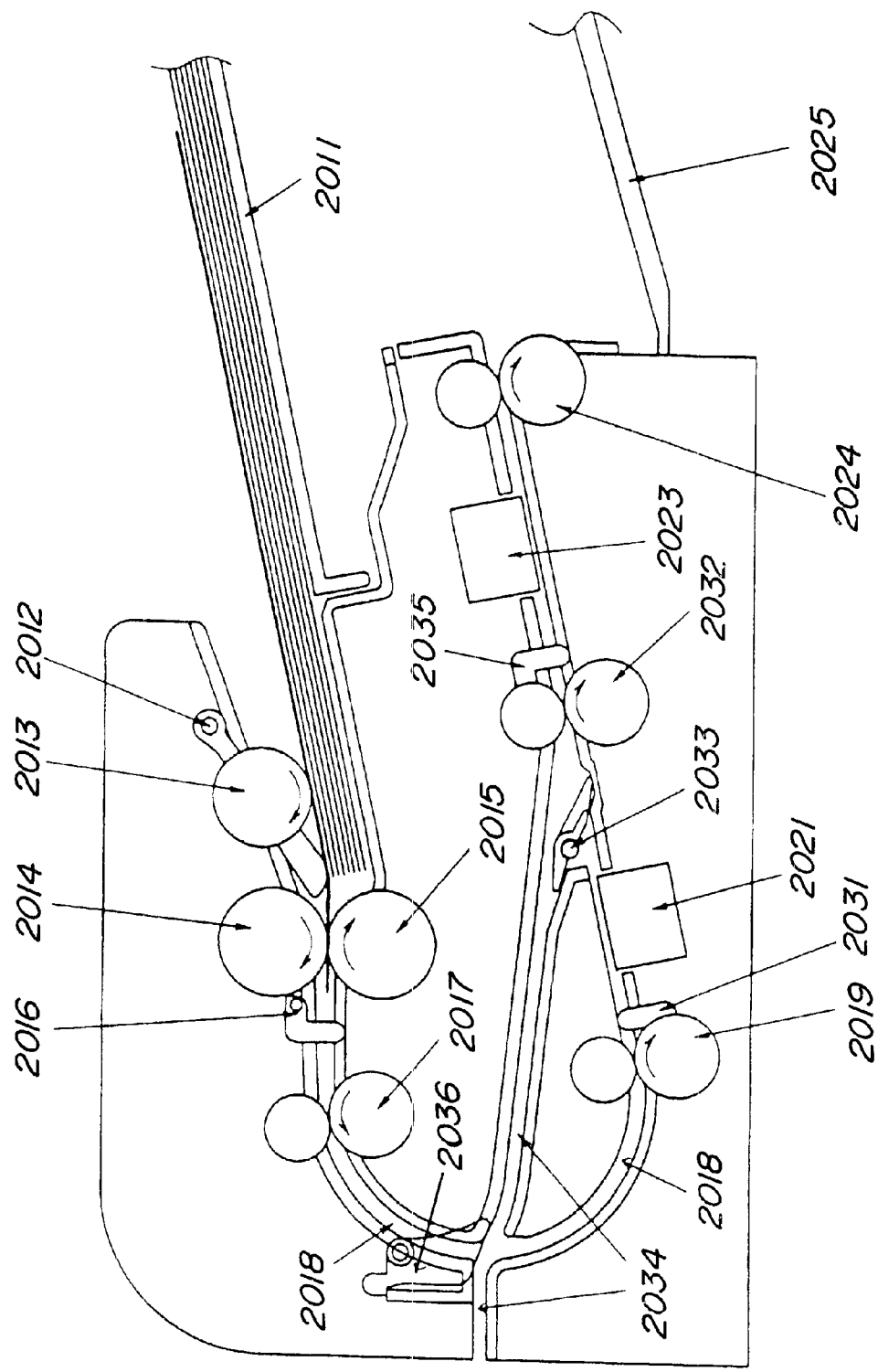

The original documents D are separated by the separating roller 2014 and the reverse roller 2015, and an uppermost sheet of the original documents D is fed separately (See, S2007, FIG. 30).

Figure 31:
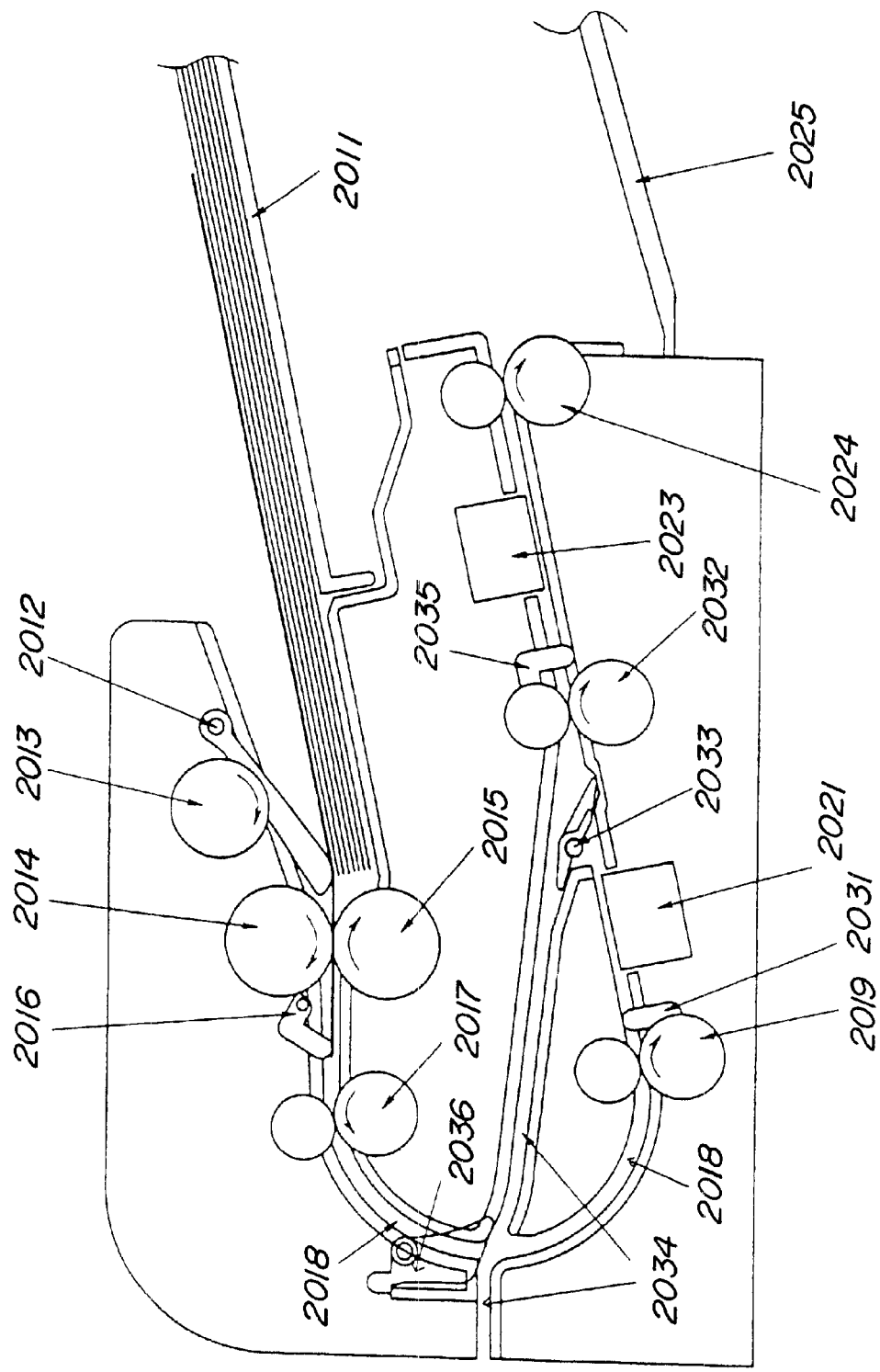
Figure 32:
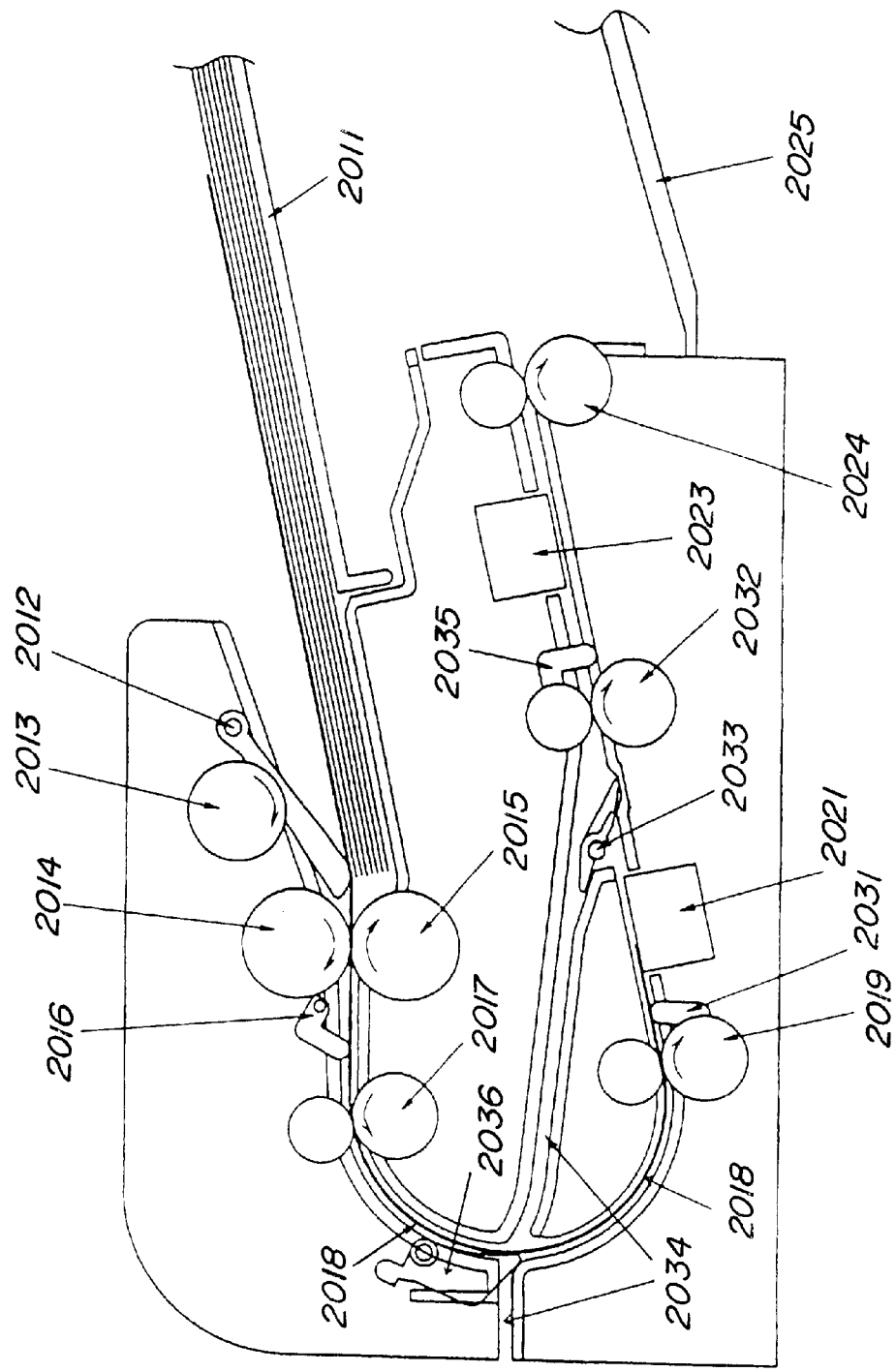

When the original document feeding sensor 2016 detects the front end of the original document D (S2008), feeding of the original documents D by the pickup roller 2013 is cancelled (See, S2009, FIG. 31).

Then, the original document D thus separated as a sheet is conveyed to the U-turn path 2018 by means of the conveying roller pair 2017 (S2010).

The original document D thus conveyed to this U-turn path 2018 makes the conveying route switching flapper 2036 move rotationally, thus opening the U-turn path 2018. The conveying route switching flapper 2036 thus moving rotationally has a shape smoothly connecting to the U-turn path 2018, thereby preventing the rear end of the original document from flapping at a space where the U-turn path 2018 intersects with the reverse path 2034 (See, FIG.32).

The original document D is conveyed by the conveying roller pair 2019, and the front end of the original document D is detected by the original document edge sensor 2031 (S2011). Then, at the place where the original document is conveyed by a predetermined amount from the original document edge sensor 2031, the front surface reading section 2021 starts reading the front surface of the original document D (See, S2012, FIG. 32).

Figure 33:
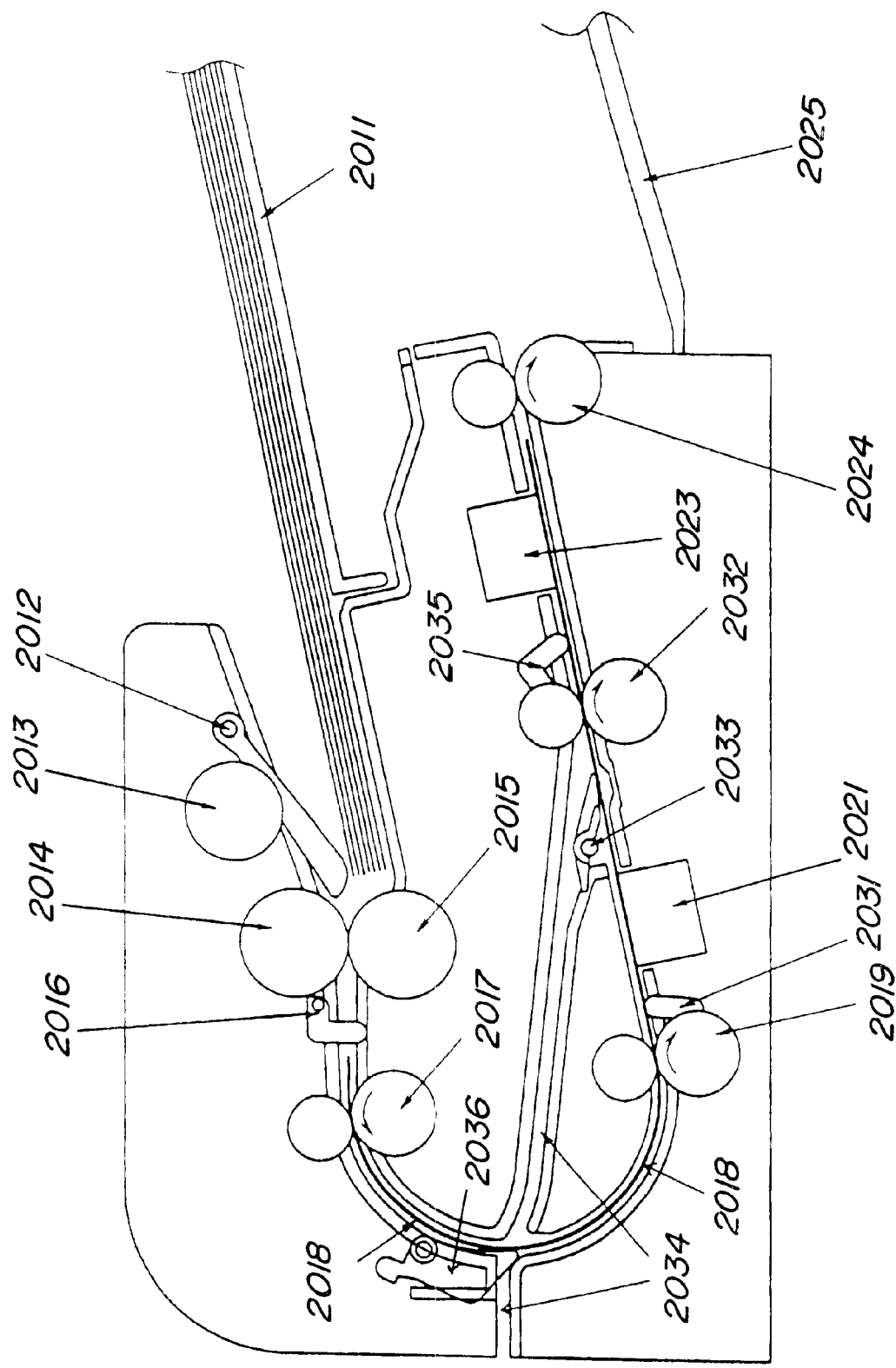

When the original document feeding sensor 2016 detects the rear end of the original document D (S2013), the electromagnetic clutch 2027 blocks the driving for the pickup roller 2013, the separating roller 2014, and the reverse roller 2015, and consequently the following original documents D are stopped without being conveyed (See, S2014, FIG. 33).

Figure 34:
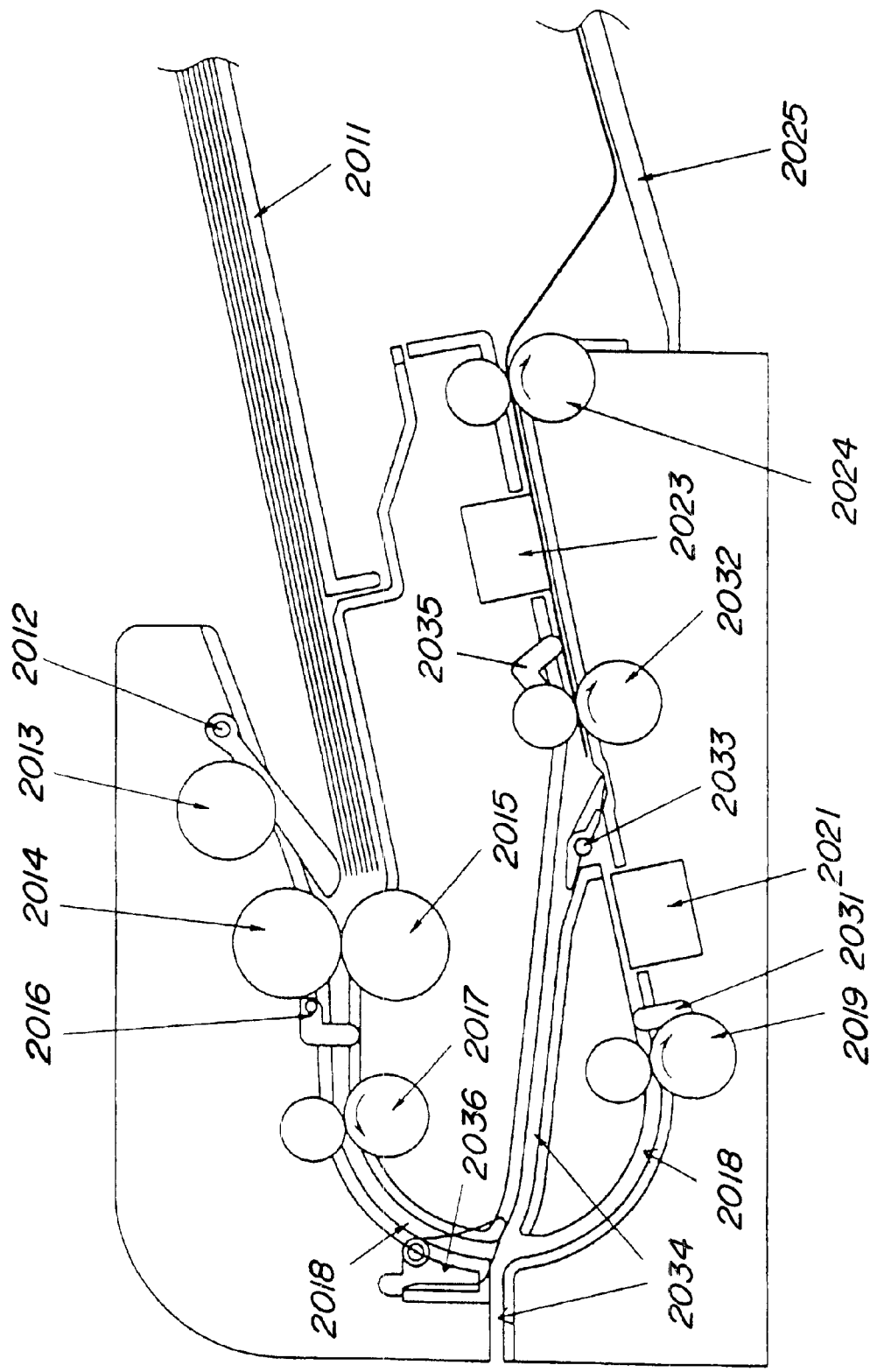

When the rear end of the original document D passes the conveying route switching flapper 2036, the conveying route switching flapper 2036 moves rotationally to shut down the U-turn path 2018, and moves to the position for leading the original document D to the reverse path 2034 (See, FIG. 34). At this time, the conveying route switching flapper 2036 can prevent the original document from entering the U-turn path 2018 by mistake because it functions as a guide for the reverse path 2034 as well, and, therefore, stable conveying performance can be gained.

When the original document edge sensor 2031 detects the rear end of the original document D (S2015), the front surface reading section 2021 finishes the reading operation of the front surface of the original document D at a place where the original document D is conveyed by a predetermined amount from the original document edge sensor 2031 (S2016).

The original document D is conveyed by the conveying roller pair 2032 further to the downstream side, and when the rear end of the original document passes the conveying route switching flapper 2033 (See, S2017, FIG. 34), the drive motor 2026 rotates in a reverse direction (S2018).

Figure 35:
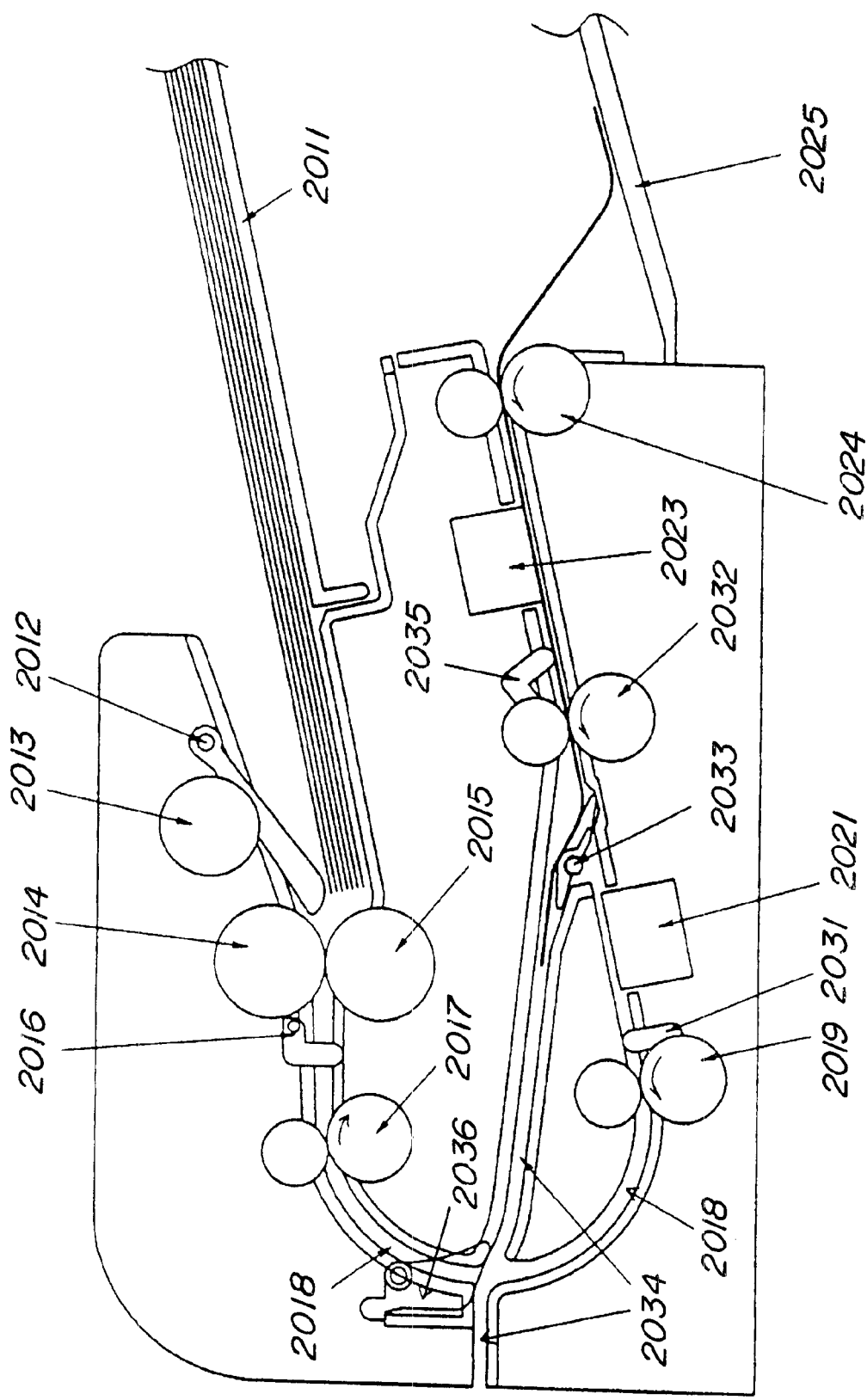

Then the original document D is conveyed in a reverse direction by the conveying roller pair 2032 and the sheet delivering roller pair 2024 and is led to the reverse path 2034 by the conveying route switching flapper 2033 (See, S2019, FIG. 35).

Figure 36:
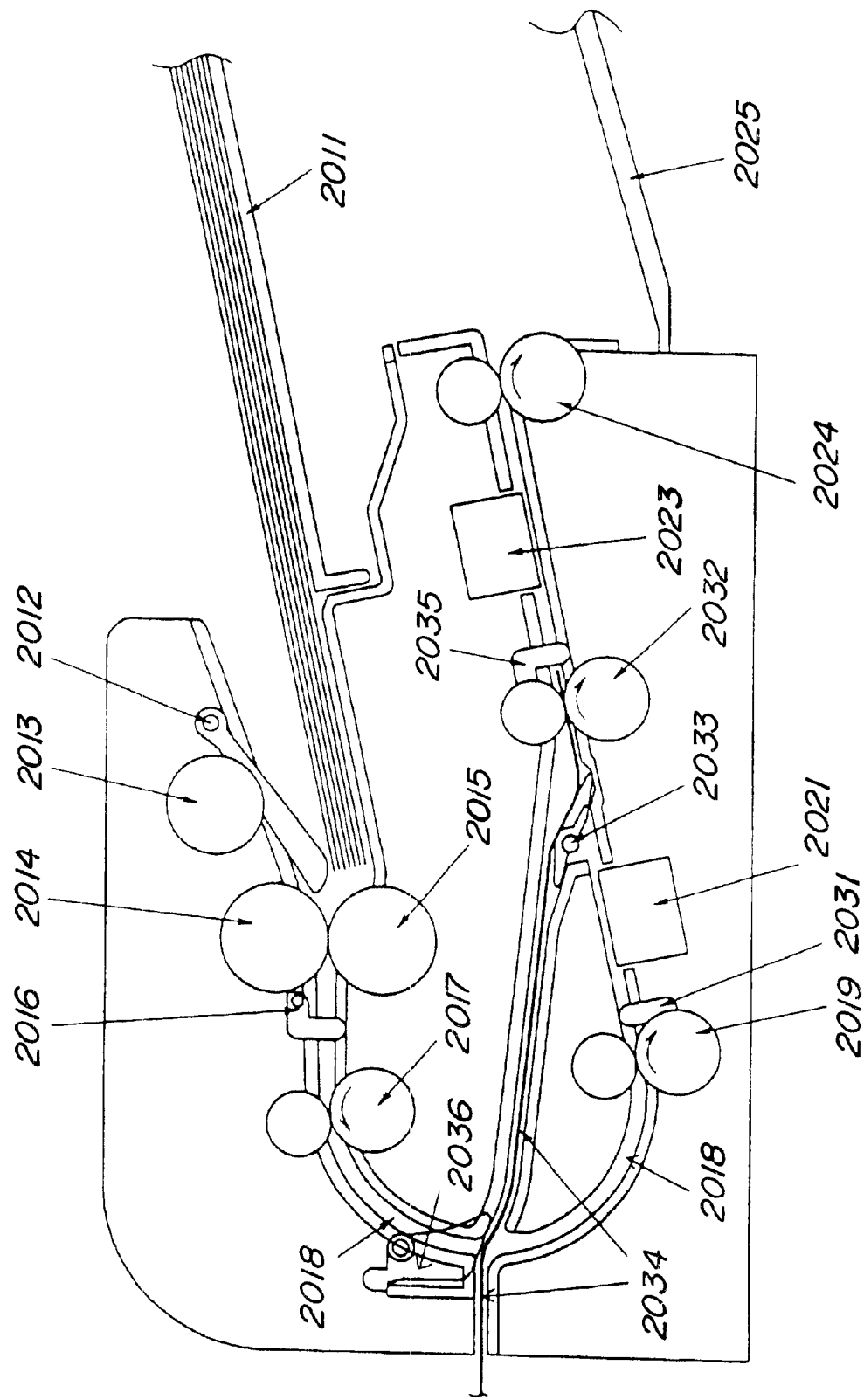

When the original document edge sensor 2035 detects the front end of the original document D (S2020), the drive motor 2026 rotates again in a forward direction (See, S2021, FIG. 36).

Figure 37:
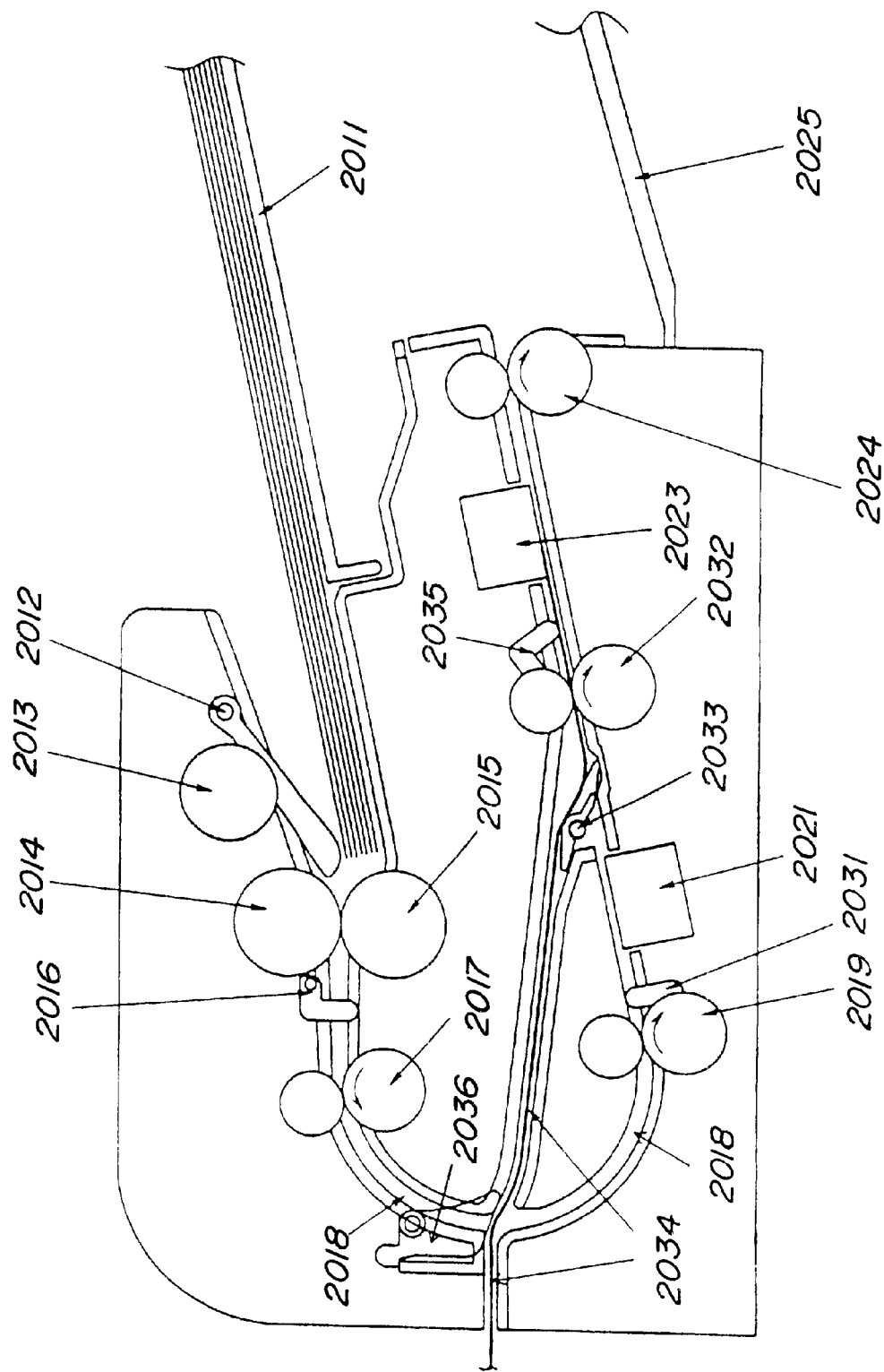
Figure 38:
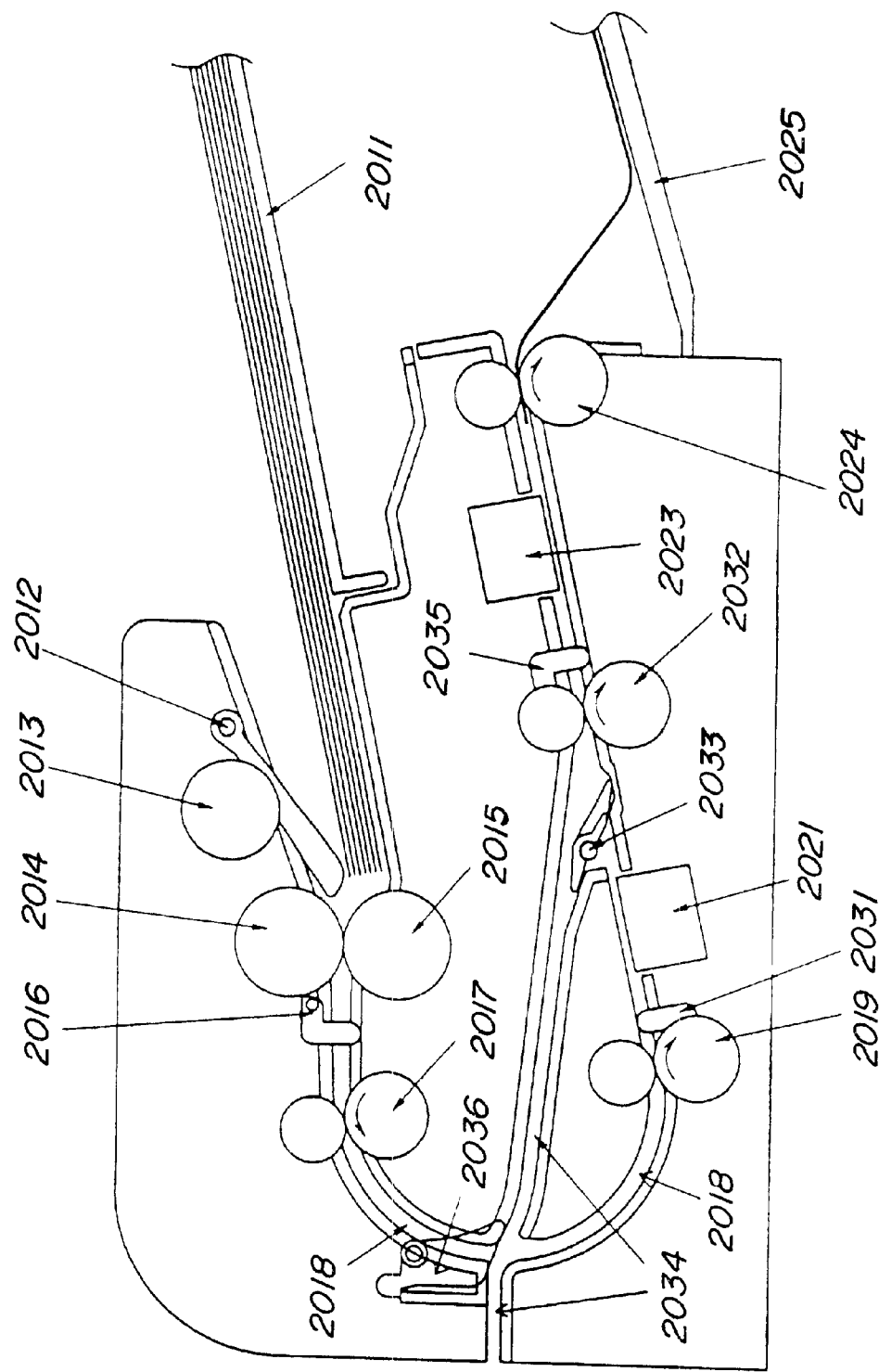

The original document edge sensor 2035 detects the front end of the original document D (S2022), and at a place where the original document is conveyed by a predetermined amount from the original document edge sensor 2035, the back surface reading section 2023 starts a reading operation of the back surface of the original document (See, S2023, FIG. 37).

The original document edge sensor 2035 then detects the rear end of the original document D (S2024), and at a place where the original document is conveyed by a predetermined amount from the original document edge sensor 2035, the back surface reading section 2023 finishes the reading operation of the back surface of the original document (S2025). Then, the original document D is delivered by the sheet delivering roller pair 2024 onto the sheet delivering tray 2025 (See, S2026, FIG. 38).

When the original document existing-nonexisting detecting sensor 2012 detects original documents D, operation is returned to Step S2004, as mentioned above, where the electromagnetic clutch 2027 connects the driving for the pickup roller 2013, the separating roller 2014, and the reverse roller 2015, thereby conveying the following original documents D; if the sensor 2012 detects no documents, then the reading operation is completed (S2027).

According to the third embodiment, as mentioned above, respective image information can be sequentially sent to single a image processing means by switching to two reading means (front surface reading section 2021 and back surface reading section 2023), and, therefore, a plural number of the image processing means are not required, and also simplification of the electric circuit, as well as miniaturization of the base board, can be achieved, thereby lowering the cost.

In addition, when an apparatus is made with one-sided reading as a standard configuration and has a double-sided reading function as an additional, optional configuration, just one image processing means can realize both the standard configuration and the optional added configuration, thereby making the cost lower in comparison with that of a structure having two image processing means.

Furthermore, in both the case of the front surface and back surface reading operations, the apparatus can start reading the image information from the front end of the original document D, so an image reverse means for reversing the image information thus read or an original document reverse means for reversing the original document to be upside down is not required. Therefore, it is possible to simplify the electric circuit, miniaturize the base board, lower the cost for an apparatus, and simplify the structure of the apparatus.

Also, the conveying route switching flappers 2033 and 2036 are moved rotationally by the original document D conveyed in a forward direction in the U-turn path 2018, and the conveying route switching flapper 2036 has a shape for smoothly connecting to the U-turn path 2018, preventing the rear end of the original document from flapping at a space where the U-turn path 2018 intersects with the reverse path 2034 (branching portion or intersecting portion), which prevents noise during the conveying of the original documents.

The conveying route switching flapper 2033 or 2036 is structured, when the rear end of the original document D passes the conveying route switching flapper 2033 or 2036, so as to move rotationally to shut down the U-turn path 2018, and then to move to the position for leading the original document D to the reverse path 2034. At this time, the conveying route switching flappers 2033 and 2036 can prevent the original document D from entering the U-turn path 2018 by mistake because it functions as a guide for the reverse path 2034 as well, and, therefore, stable conveying performance can be gained.

[Variations of the Third Embodiment]

In the above-mentioned embodiment, a U-turn path is exemplified as an original document conveying route, but the present invention is not limited to this; for example, a straight path can provide the same advantage.

Also in the above-mentioned embodiment, a flapper is exemplified as a conveying route switching means, but the invention is not limited to this; for example, a Mylar or the like can be used where the sheet may progress by pushing the Mylar in a forward direction while progressing in a reverse direction by introduction of the Mylar along it.

In the above-mentioned embodiment, an image reading section in a facsimile machine is exemplified as an image reading apparatus, but the present invention is not limited to this; the same advantage can be obtained by applying the present invention to, for example, a scanner unit as an image reading apparatus, an image reading apparatus in a copying machine, or an image reading apparatus or the like in a composite apparatus suitably combining a printing function, facsimile function, copying function or the like.

According to the embodiment, as mentioned above, respective image information can be sequentially sent to single image processing means by switching between two reading means, and, therefore a plural number of the image processing means are not required, and also simplification of the electric circuit as well as miniaturization of the base board, can be achieved, thus making cost reductions possible.

In addition, when an apparatus is made with only one-sided reading as a standard configuration and has a double-sided reading function as an added, optional configuration, just one image processing means can realize both the standard configuration and the optional added configuration, thereby making the cost lower in comparison with that of a structure having two image processing means.

Furthermore, in both the case of the front surface and back surface reading operations, the apparatus can start reading the image information from the front end of the original document D, so an image reverse means for reversing the image information thus read or an original document reverse means for reversing the original document to be upside down is unnecessary. Therefore, it is possible to simplify the electric circuit, miniaturize the base board, lower the cost for an apparatus, and simplify the structure of the apparatus.

Also, a conveying route switching means is moved rotationally by an original document D conveyed in a forward direction in an original document conveying route, and the conveying route switching means has a shape for smoothly connecting to the guiding shape of the original document conveying route, preventing the rear end of the original document from flapping at a space where the original document conveying route intersects with a branching conveying route (branching portion or intersecting portion), which prevents noise during the conveying of the original documents.

The conveying route switching means is structured, when the rear end of the original document passes the conveying route switching means, so as to move rotationally to shut down the original document conveying route, and then move to the position for leading the original document to the branching conveying route. At this time, the conveying route switching means can prevent the original document from entering the original document conveying route by mistake, because it functions as a guide for the branching conveying route as well, and, therefore, stable conveying performance can be gained.

[Fourth Embodiment]

An image reading apparatus according to a fourth embodiment will hereinafter be described with reference to FIG. 39 to FIG. 51. In the present embodiment, a structure of an image reading apparatus in a facsimile machine is explained by way of example.

Figure 40:
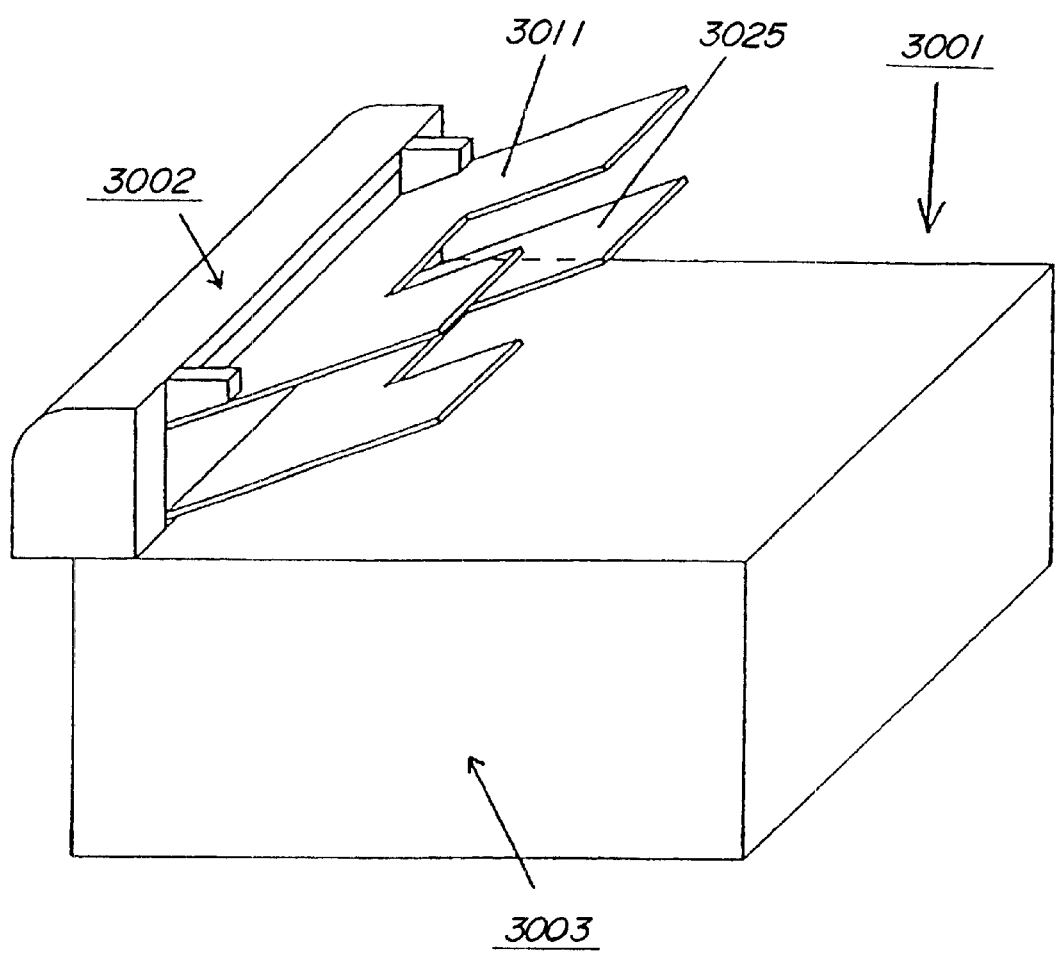
FIG. 40 is a perspective view showing an exterior appearance of a facsimile machine mounting the image reading apparatus according to the fourth embodiment.

FIG. 40 is a perspective view showing an exterior appearance of a facsimile machine. In FIG. 40, numeral 3001 refers to a main body of the machine; numeral 3002 refers to an image reading section according to the invention arranged in an upper portion of the machine main body 3001; numeral 3003 refers to an image forming section arranged in a lower portion of the machine main body 3001; numeral 3011 refers to an original document mounting tray structured so as to stack a plurality of original documents D; and numeral 3025 refers to a sheet delivering tray.

Figure 39:
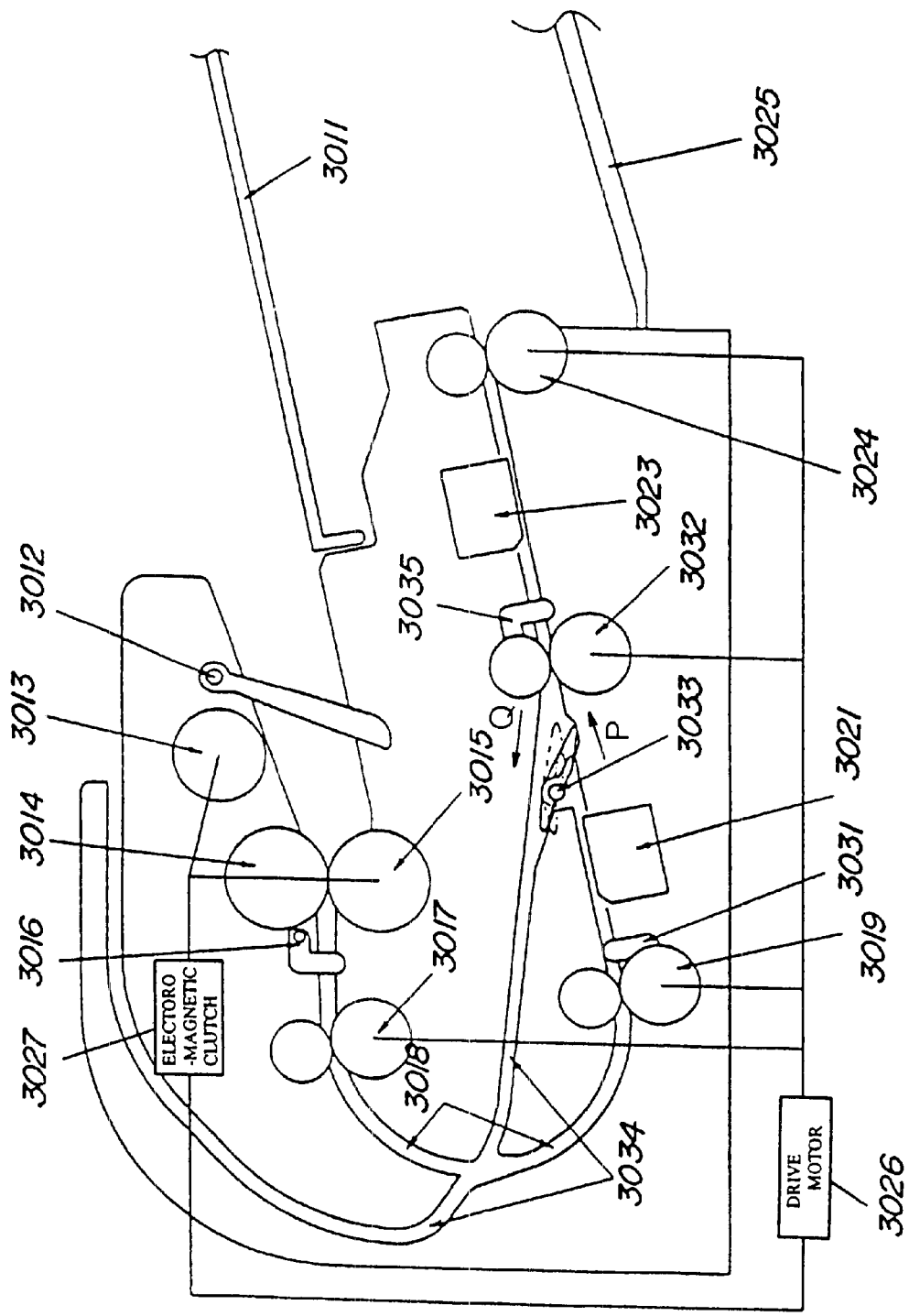
FIG. 39 is a cross-sectional view showing an image reading apparatus of a fourth embodiment.

FIG. 39 is a typified cross-sectional view showing a schematic structure of the image reading section in the facsimile machine. In FIG. 39, numeral 3012 is an original document existing-nonexisting detecting sensor for detecting whether or not original documents D are set on the original document mounting tray 3011; numeral 3013 is a pickup roller for feeding the original documents D thus set to the interior of the image reading section 3002; numeral 3014 and 3015 are a separating roller and a reverse roller working in cooperation with each other for separating a sheet from the plurality of the original documents D and for feeding the separated sheet of the original documents; numeral 3016 is an original document feeding sensor for detecting a front end or rear end of the separated original document D; numeral 3017 is a conveying roller pair for conveying the separated original document D to a U-turn path 3018 which is a U-turn shaped conveying route; numeral 3019 is a conveying roller pair for conveying the original document D after performing a U-turn to a front surface reading section 3021 composed of a pressing type image sensor; numeral 3031 is an original document edge sensor for detecting a front end and rear end of the original document D in order to determine the timing of starting and finishing of the reading operation of the front surface of the original document D by the front surface reading section 3021; numeral 3032 is a forward and reverse rotatable conveying roller pair for conveying the original document D, further downstream when the front surface is read; numeral 3033 is a conveying route switching flapper freely, rotatably attached at a part (branching portion) between the U-turn path 3018 and a reverse path 3034, the conveying route switching flapper opening the U-turn path 3018 when an end of the original document D enters from a forwarding direction (Arrow P direction) or shutting down the U-turn path 3018 to lead the original document D to the reverse path 3034 when an end of the original document D enters from a reverse direction (Arrow Q direction); numeral 3035 is an original document edge sensor for detecting a front end or rear end of the original document D in order to determine the timing of starting and finishing of the reading operation of the back surface of the original document by a back surface reading section 3023 composed of a pressing type image sensor; numeral 3024 is a forward and reverse rotatable sheet delivering roller pair for delivering the original document D after being read onto the sheet delivering tray 3025; numeral 3026 is a drive motor for driving the pickup roller 3013, the separating roller 3014, the reverse roller 3015, the conveying roller pairs 3017, 3019, 3032, and the sheet delivering roller pair 3024; and numeral 3027 is an electro-magnetic clutch for temporarily blocking the driving provided by the drive motor 3026 for the pickup roller 3013, the separating roller 3014 and the reverse roller 3015.

The above-mentioned conveying route switching flapper 3033 is freely, rotatably attached at the branching portion of the reverse path 3034 which branches off from the U-turn path 3018 on an upstream side of the back surface reading section 3023 serving as a reading means provided on a downstream side in the conveying direction.

The conveying route switching flapper 3033 is structured so as to be moved rotationally by the original document D conveyed in a forward direction in the U-turn path 3018 to open the path 3018, functioning as a guide for the path 3018 at the branching portion with the reverse path 3034.

Furthermore, the conveying route switching flapper 3033 is constructed so as to be moved rotationally by passage of the rear end of the original document D, thereby shutting down the path 3018 to move to a position which leads the original document to the reverse path 3034, functioning as a guide for the reverse path 3034 at the branching portion with the U-turn path 3018 and the reverse path 3034.

The above-mentioned reverse path 3034 is structured, after crossing the U-turn path 3018, so as to form a U-turn shaped path extending upward from a portion between the front surface reading section 3021 and the conveying roller pair 3032 toward a portion between the conveying roller pair 3017 and the conveying roller pair 3019, thus making it possible to lead the original document D conveyed in a reverse direction onto the original document mounting tray 3011.

Also, an original document sandwiching part of the conveying roller pair 3019, an original document sandwiching part of the sheet delivering roller pair 3024, an original document sandwiching part of the conveying roller pair 3032, an original document reading position by the front surface reading section 3021 and an original document reading position by the back surface reading section 3023 are positioned to be approximately in a straight line.

The image reading section 3002 is structured so as to be suitably controlled by a controlling circuit (controlling means) although not shown in the figures; for example, control is excercised over such circuits as an image processing circuit (image processing means) for processing the image information of the original document D read by the front surface reading section 3021 and the back surface reading section 3023 and a switching circuit (switching means) for switching, as an inputting source of the image information, to the front surface reading section 3021 or to the back surface reading section 3023. Or, based on detecting signals from the mentioned original document existing-nonexisting detecting sensor 3012, original document feeding sensor 3016, original document edge sensor 3031, 3035 or the like, control is excercised over driving or drive switching by the drive motor 3026 for rotary driving of the conveying means constituted of the pickup roller 3013, separating roller 3014, and reverse roller 3015, conveying roller pair 3017, 3019, 3032, sheet delivering pair 3024 or the like; turning-on or -off of the electromagnetic clutch 3027 for temporarily blocking the driving of the drive motor 3026 for the pickup roller 3013, separating roller 3014, and the reverse roller 3015; and timing of starting and finishing of the reading operation by the front surface reading section 3021 and the back surface reading section 3023.

Figure 41:
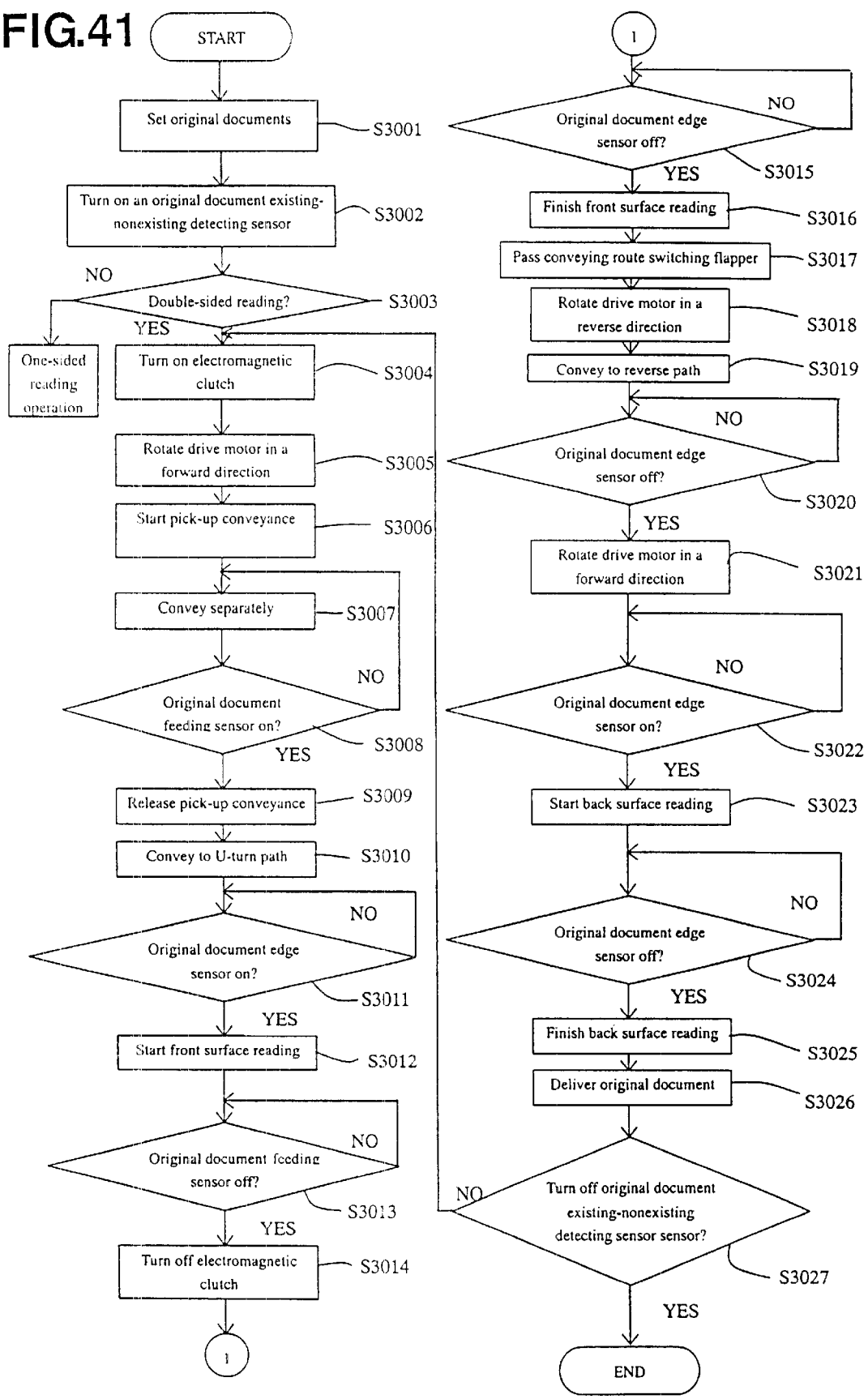
FIG. 41 is a flow chart showing an operation of the image reading apparatus according to the fourth embodiment.

Next, operation of the image reading section 3002 will be explained based on the flow chart shown in FIG. 41 with reference to FIG. 42 to FIG. 51.

Figure 42:
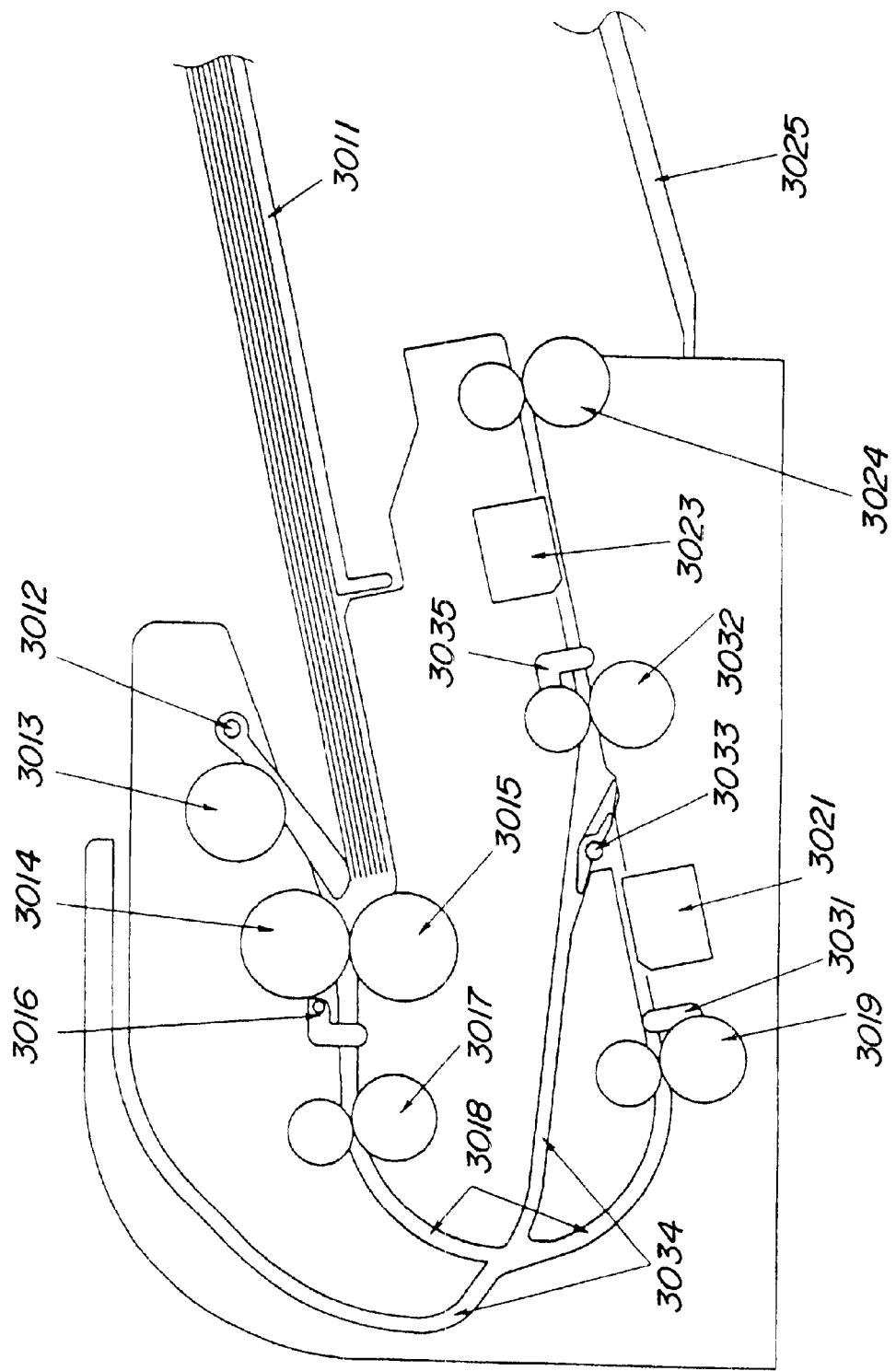
FIG. 42 to FIG. 51 are illustrations showing operations of the image reading apparatus according to the fourth embodiment.

When a user sets original documents D on the original document mounting tray 3011 (S3001), the original document existing-nonexisting detecting sensor 3012 detects the original documents (See, S3002, FIG. 42).

The user selects a double-sided reading mode, and then directs the start of a reading operation (S3003). Here, when the one-sided reading mode is selected, the operation is switched to the conventionally known one-sided reading operation (detailed description omitted).

After receiving the direction for starting a two-sided reading operation, the electromagnetic clutch 2027 connects the driving for the pickup roller 3013, the separating roller 3014, and the reverse roller 3015 (S3004).

The drive motor 3026 rotates in a forward direction (S3005), and then the pickup roller 3013 directly presses the original documents D set on the original document mounting tray 3011 to start picking-up and conveying the original document D to the inside of the apparatus (S3006).

Figure 43:
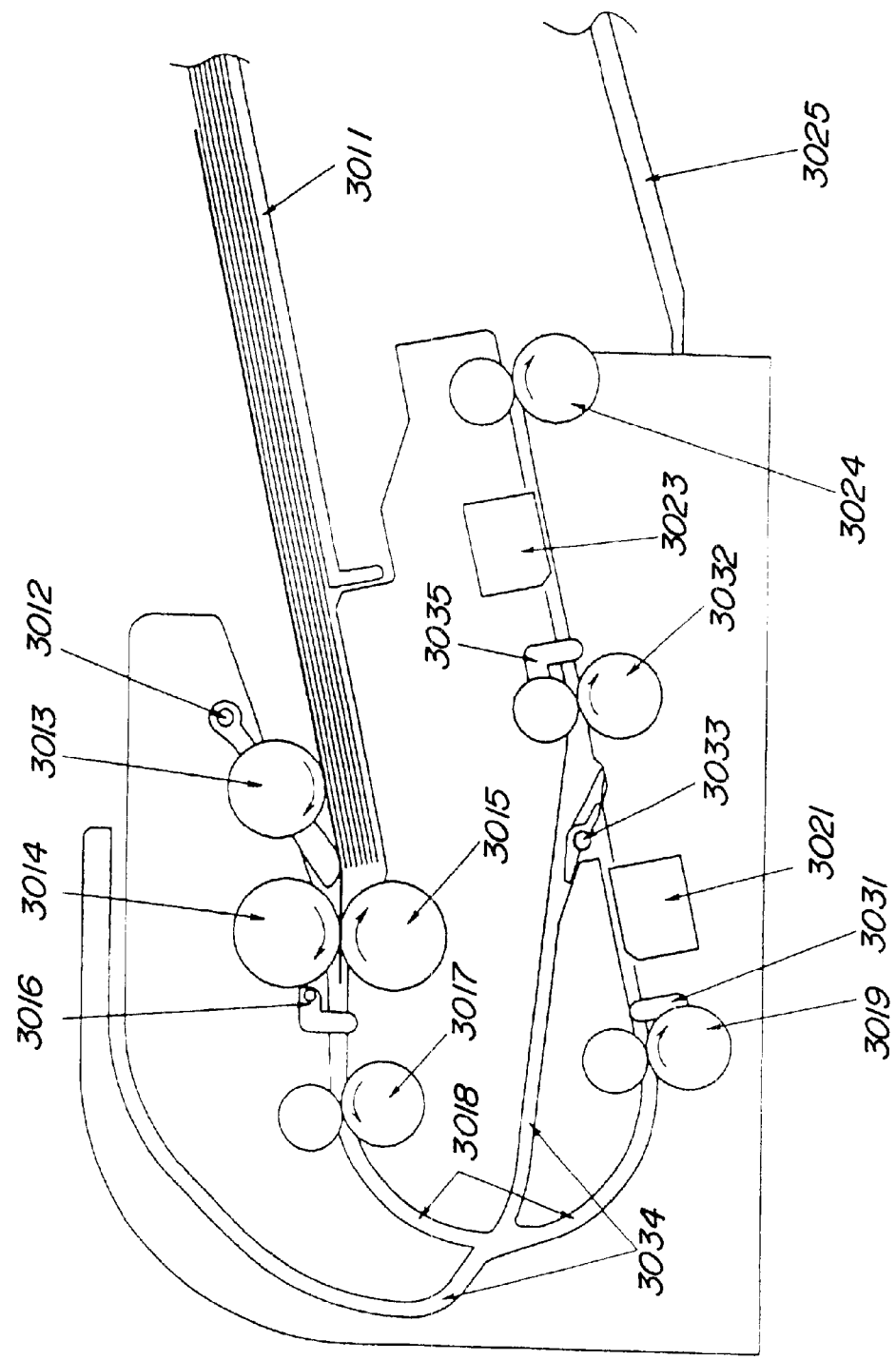

The original documents D after being picked up and conveyed are to be separated by the separating roller 3014 and the reverse roller 3015, and an uppermost sheet of the original documents D is fed separately (See, S3007, FIG. 43).

Figure 44:
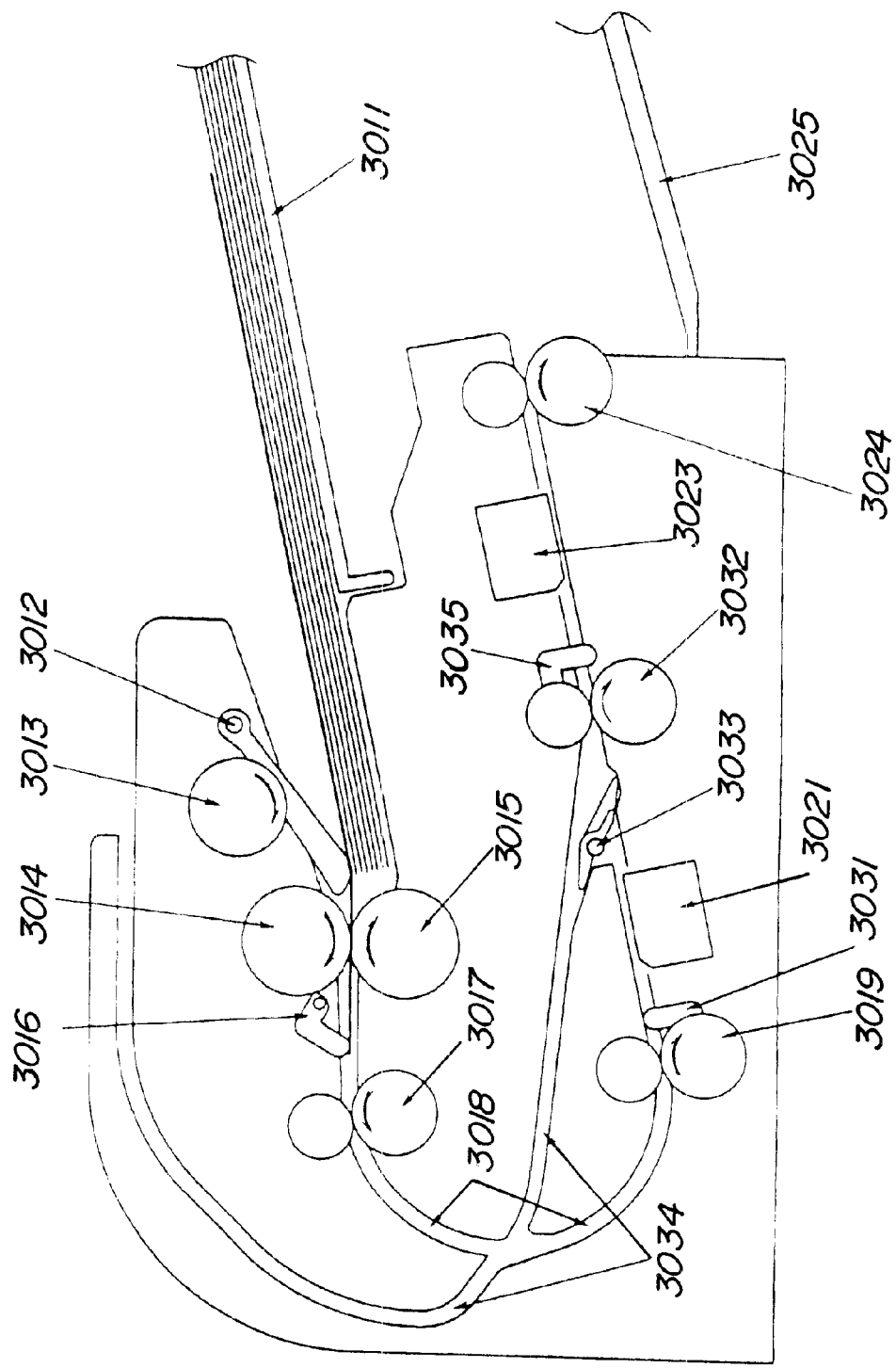

When the original document feeding sensor 3016 detects the front end of the original documents D (S3008), feeding of the original document by the pickup roller 3013 is cancelled (See, S3009, FIG. 44).

Then, the original document D thus separated as a sheet is conveyed to the U-turn path 3018 by means of the conveying roller pair 3017 (S3010).

Figure 45:
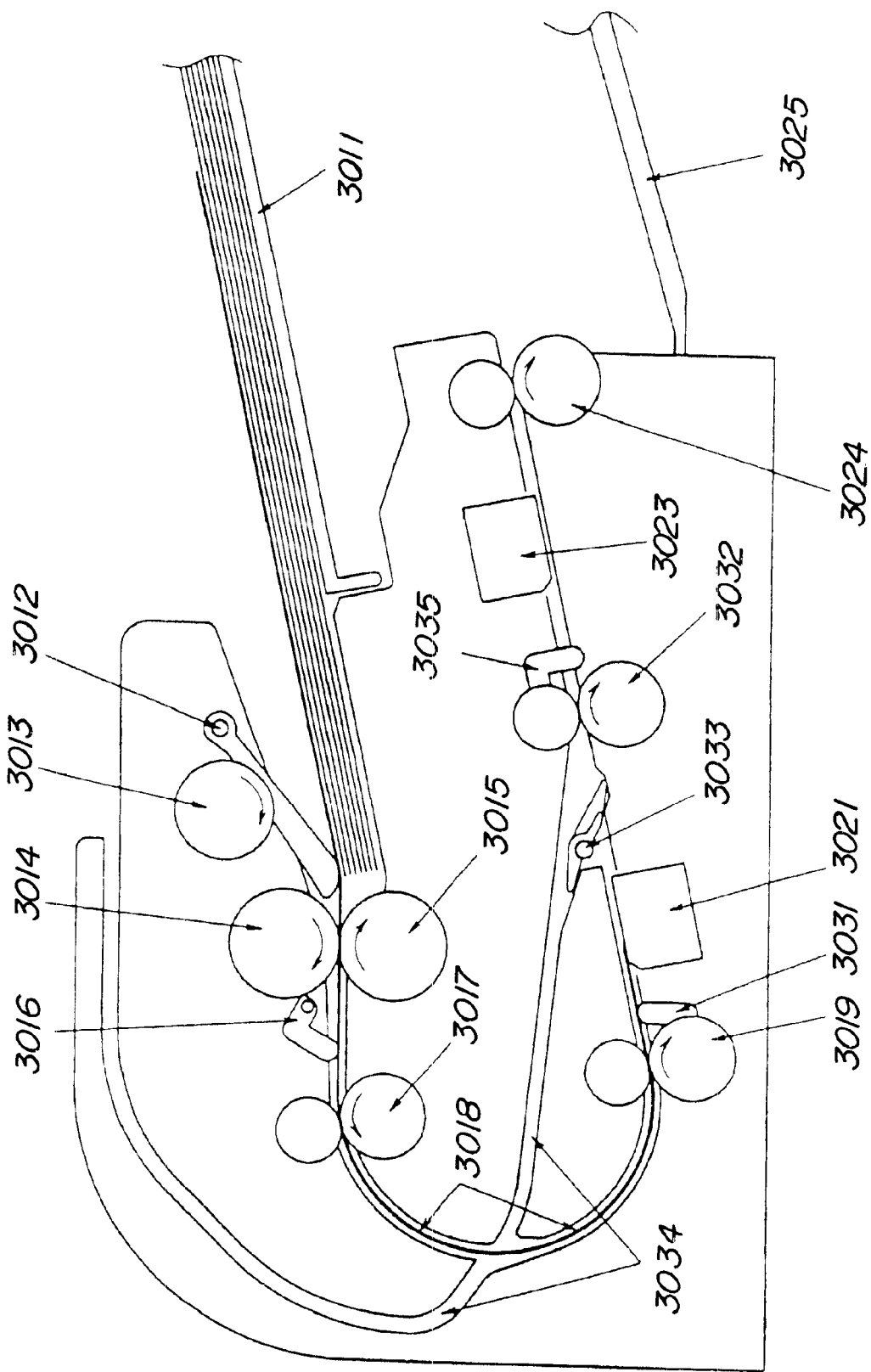

Furthermore, the original document D after performing a U-turn is conveyed by the conveying roller pair 3019, the front end of the original document D is detected by the original document edge sensor 3031 (S3011), and then at the place where the original document is conveyed by a predetermined amount from the original document edge sensor 3031, the front surface reading section 3021 starts reading the front surface of the original document (See, S3012, FIG. 45).

Figure 46:
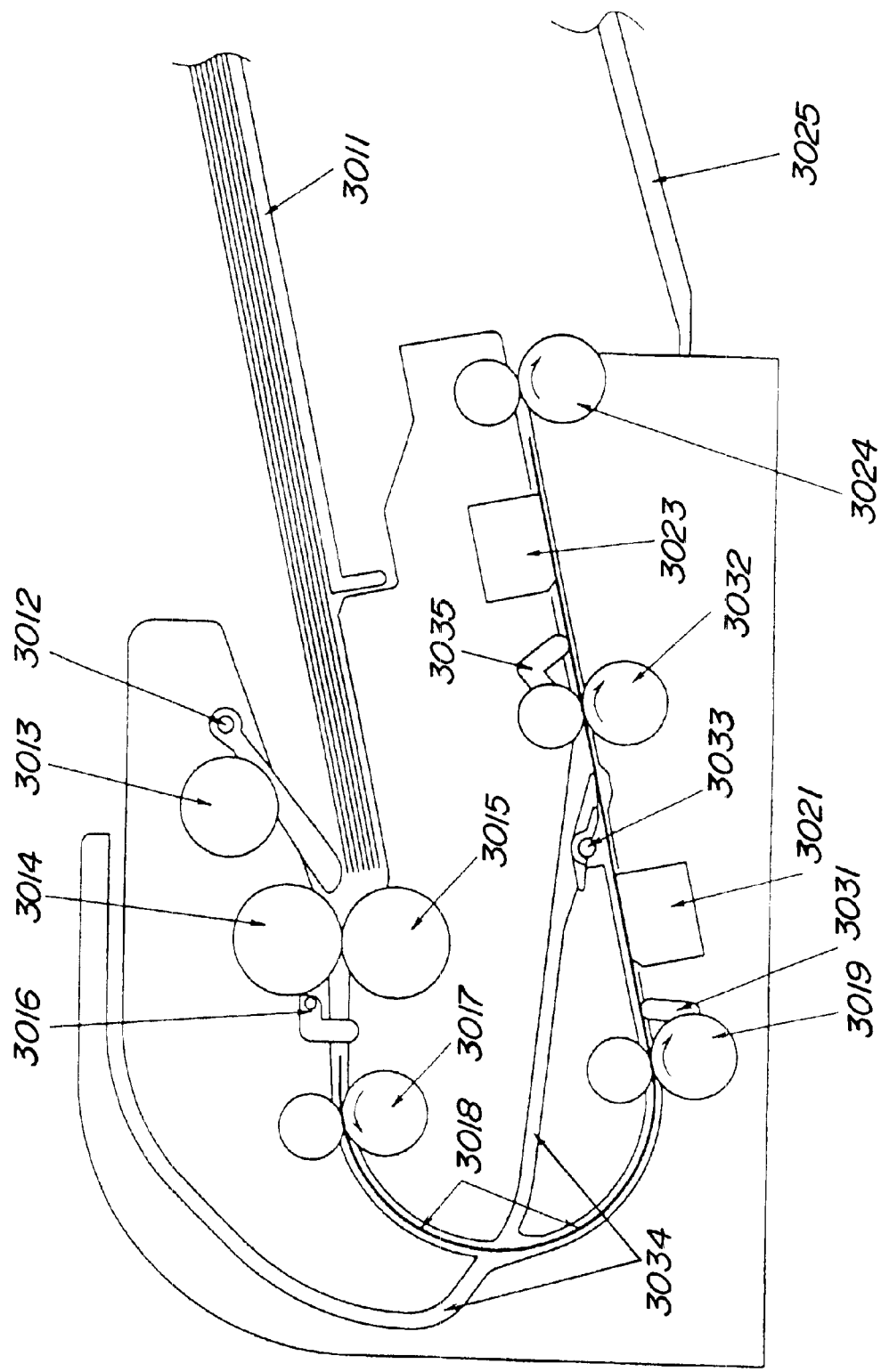
Figure 47:
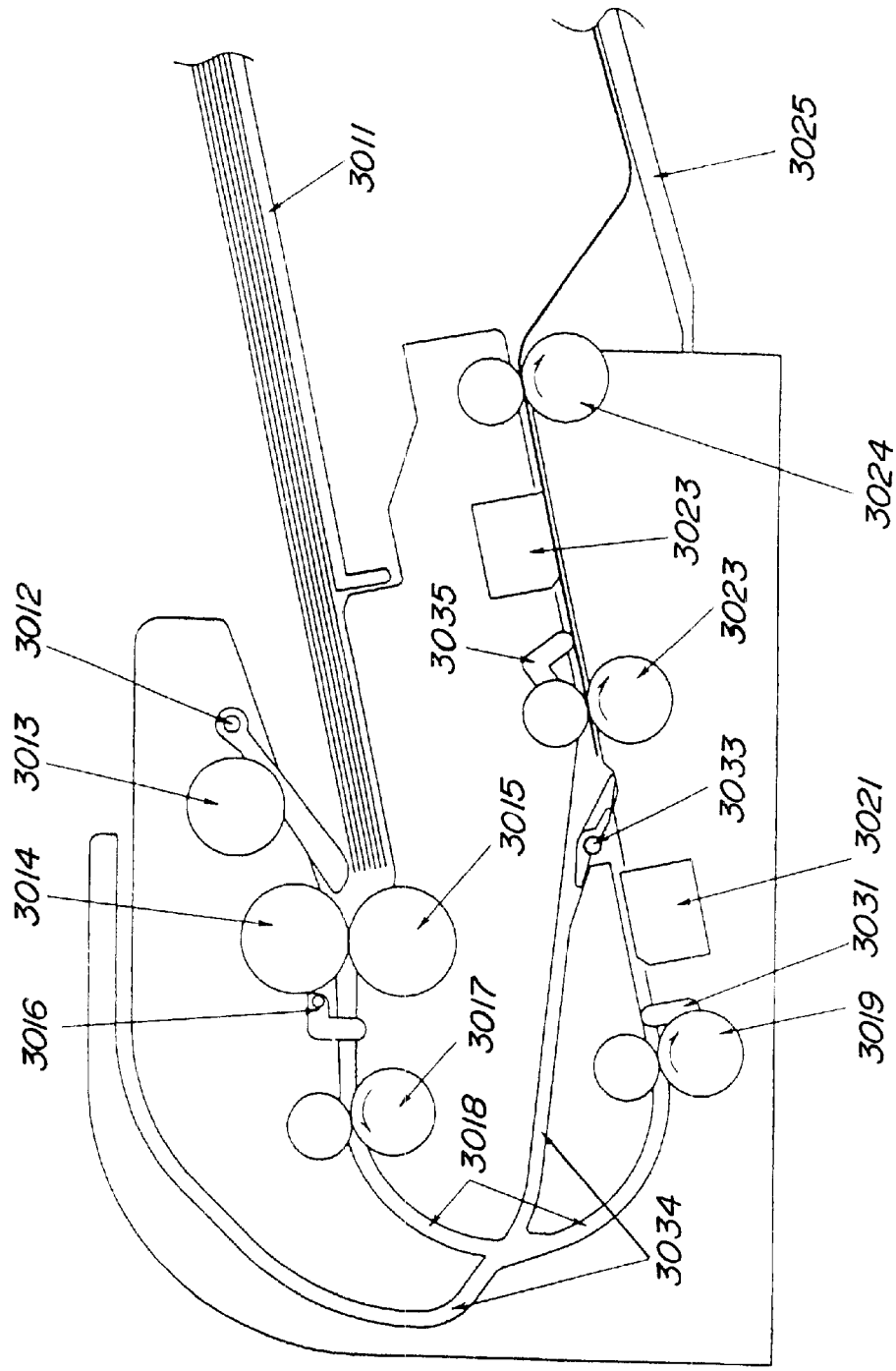

When the original document feeding sensor 3016 detects the rear end of the original document D (S3013), the electromagnetic clutch 3027 blocks the driving for the pickup roller 3013, the separating roller 3014, and the reverse roller 3015, and consequently the following original documents are not being conveyed (See, S3014, FIG. 46).

When the original document edge sensor 3031 detects the rear end of the original document D (S3015), the front surface reading section 3021 finishes the reading operation of the front surface of the original document at a place where the original document is conveyed by a predetermined amount from the original document edge sensor 3031 (S3016).

The original document D is conveyed by the conveying roller pair 3032 further downstream, and when the rear end of the original document passes the conveying route switching flapper 3033 (See, S3017, FIG. 47), the drive motor 3026 rotates in a reverse direction (S3018).

Figure 48:
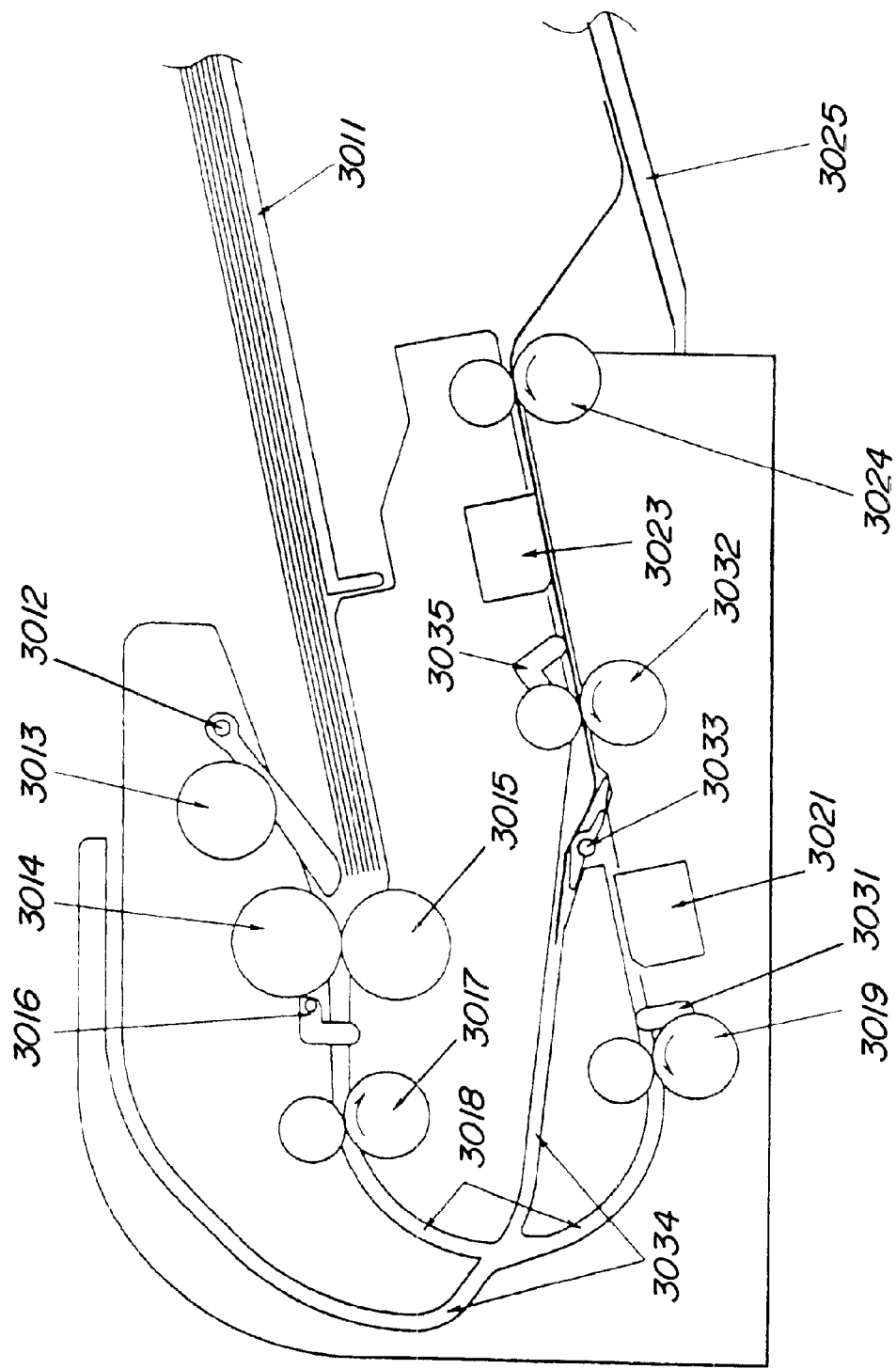

Then, the original document D is conveyed in a reverse direction by the conveying roller pair 3032 and the sheet delivering roller pair 3024 and is led to the reverse path 3034 by the conveying route switching flapper 3033 (See, S3019, FIG. 48).

Figure 49:
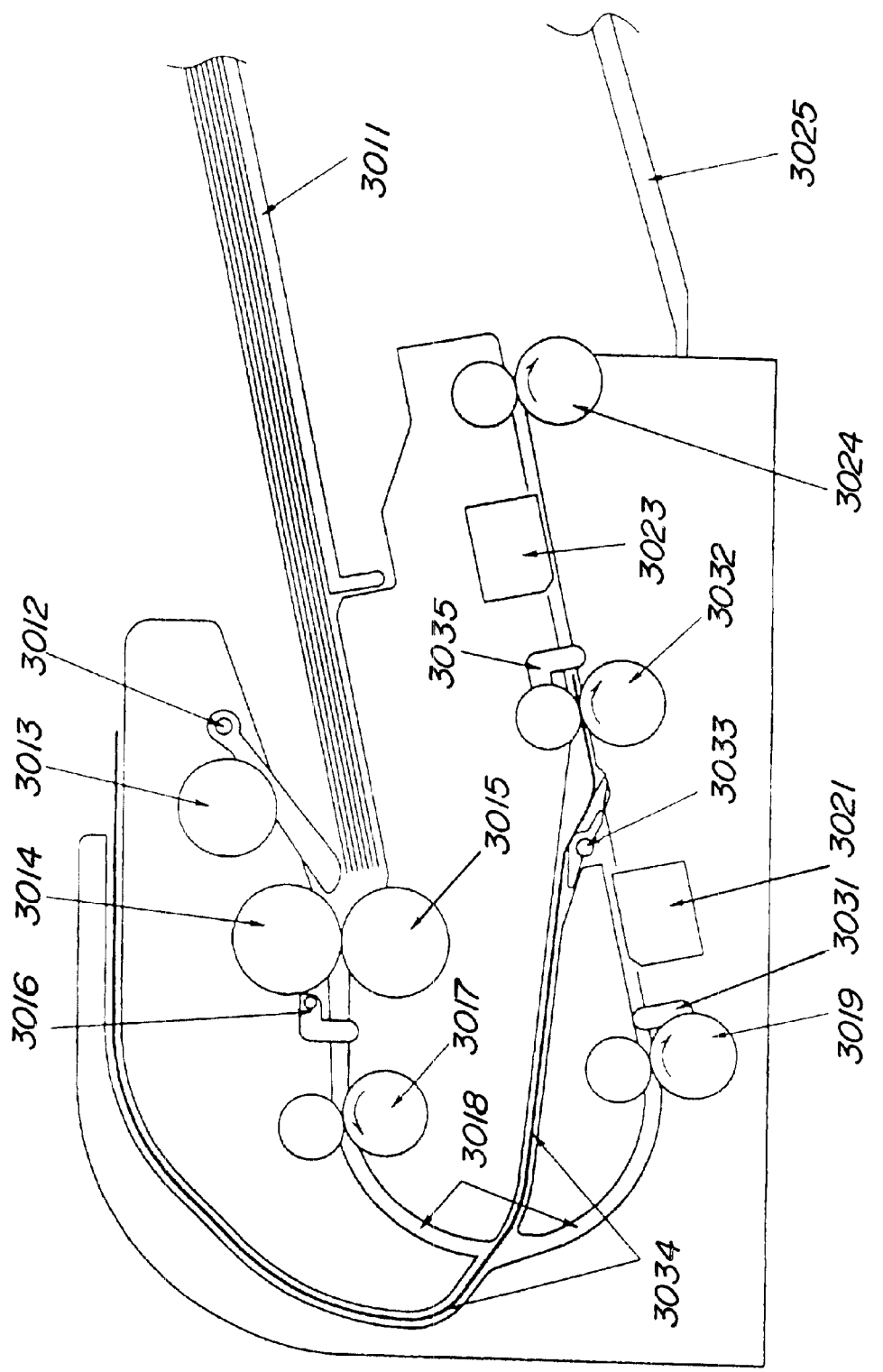

When the original document edge sensor 3035 detects the front end of the original document D (S3020), the drive motor 3026 rotates again in a forward direction (See, S3021, FIG. 49).

Figure 50:
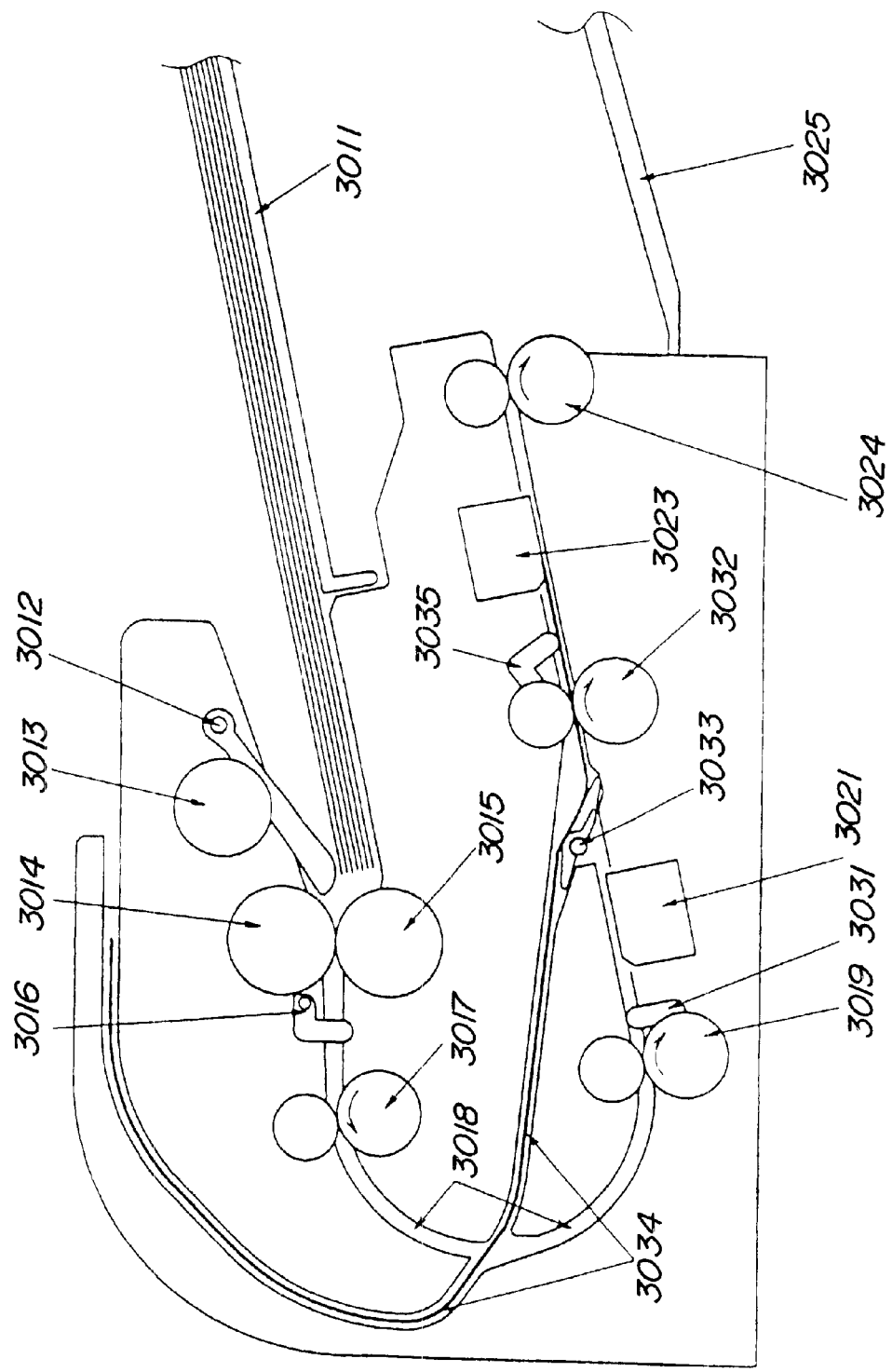
Figure 51:
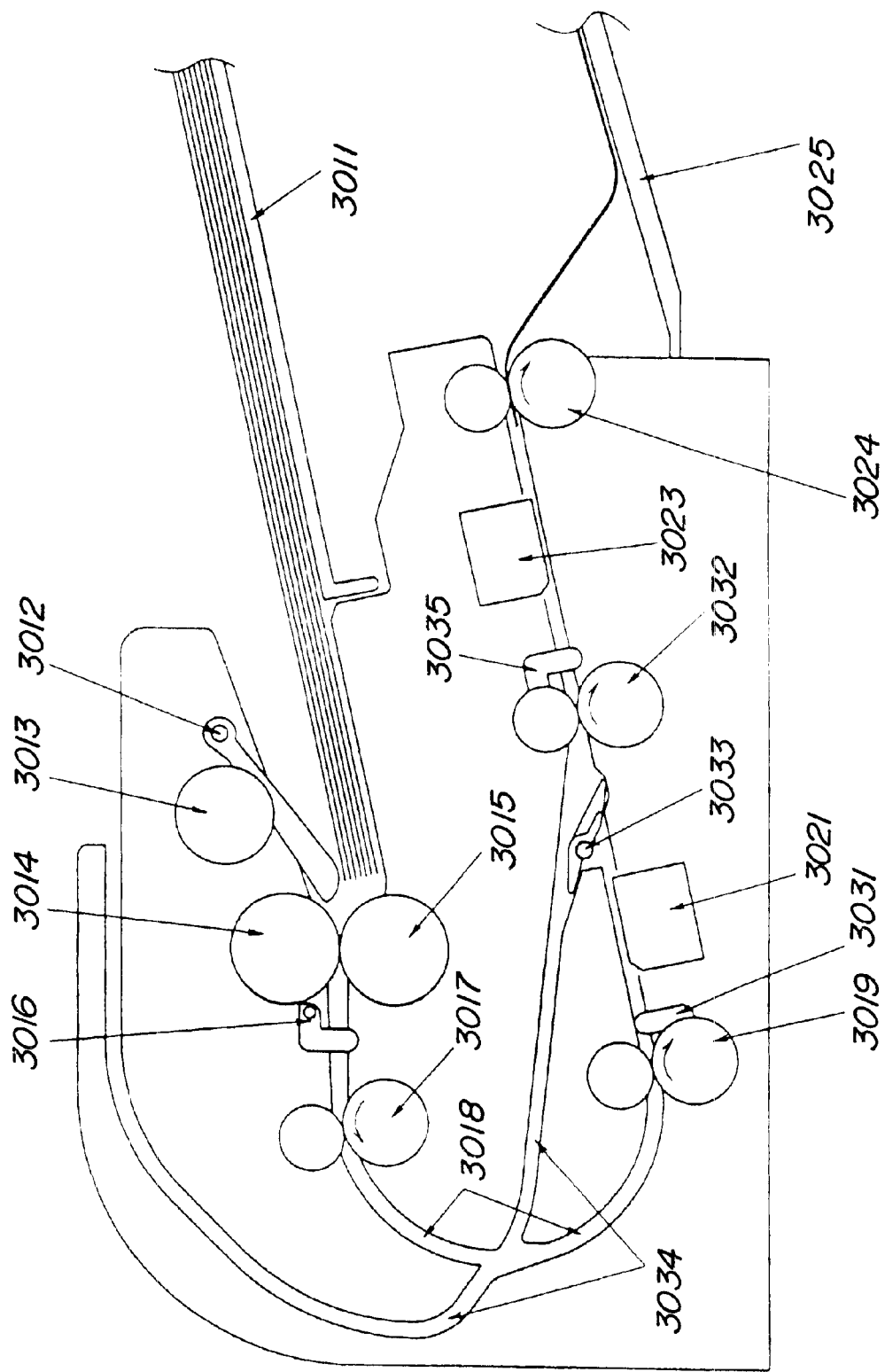

The original document edge sensor 3035 detects the front end of the original document D (S3022), and at a place where the original document D is conveyed by a predetermined amount from the original document edge sensor 3035, the back surface reading section 3023 starts a reading operation of the back surface of the original document D (See, S3023, FIG. 50).

The original document edge sensor 3035 then detects the rear end of the original document D (S3024), and at a place where the original document is conveyed by a predetermined amount from the original document edge sensor 3035, the back surface reading section 3023 finishes the reading operation of the back surface of the original document (S3025). Then, the original document D is delivered by the sheet delivering roller pair 3024 onto the sheet delivering tray 3025 (See, S3026, FIG. 51).

When the original document existing-nonexisting detecting sensor 3012 detects following original documents D, operation is returned to Step S3004, as mentioned above, where the electromagnetic clutch 3027 connects the driving for the pickup roller 3013, the separating roller 3014, and the reverse roller 3015, thereby conveying the following original documents D; if the sensor 3012 detects no documents, then the reading operation is completed (S3027).

In this embodiment, as mentioned above, because the reverse path 3034 is structured so as to cross the U-turn path 3018 in a manner of extending from a portion between the front surface reading section 3021 and the conveying roller pair 3032 toward a portion between the conveying roller pair 3017 and the conveying roller pair 3019, the original document does not enter into the front surface reading section 3021 even if it is conveyed in a reverse direction. In other words, it is not necessary to structure the front surface reading section 3021 so as to be capable of being entered from both the upstream and downstream sides, and the front surface reading section 3021 can have a common structure with the rear surface reading section 3023, thus making lower costs possible.

Also, since the reverse path 3034 is so structured as mentioned above, the apparatus is not made larger compared with the apparatus having a general U-turn conveying route.

Furthermore, since the reverse path 3034 is constructed so as to form an upwardly U-turn shaped conveying route after crossing the U-turn path 3018, thereby leading the original document D onto the original document mounting tray 3011, a space for installing the apparatus can be made as small as possible.

In this embodiment, the respective original document sandwiching part of the conveying roller pair 3019, sheet delivering roller pair 3024, and conveying roller pair 3032 and the respective original document reading positions of the front surface reading section 3021 and the back surface reading section 3023 are positioned approximately in a straight line, and, therefore, the original document D is pressed firmly with the original document reading positions of the front surface reading section 3021 and the back surface reading section 3023, and also the rear end of the original document does not flap wildly after passing through the conveying roller pair 3019 and the conveying roller pair 3032, thus making a good reading operation possible without image shocks.

According to the embodiment, as mentioned above, respective image information can be sequentially sent to a single image processing means by switching between two reading means (front surface reading section 3021 and back surface reading section 3023), and, therefore, a plural number of the image processing means are not required, and also simplification of the electric circuit, as well as miniaturization of the base board, can be achieved, thereby lowering the cost.

In addition, when an apparatus is made with only one-sided reading as a standard configuration and has a double-sided reading function as an added, optional configuration, just one image processing means can realize both the standard configuration and the optional added configuration, thereby making the cost lower in comparison with that of a structure having two image processing means.

Furthermore, in both the case of the front surface and back surface reading operations, the apparatus can start reading the image information from the front end of the original document D, so an image reverse means for reversing the image information thus read or an original document reverse means for reversing the original document to be upside down is not required. Therefore, it is possible to simplify the electric circuit, miniaturize the base board, lower the cost for an apparatus, and simplify the structure of the apparatus.

[Variations of the Fourth Embodiment]

In the above-mentioned embodiment, a U-turn path is exemplified as an original document conveying route, but the present invention is not limited to this; for example, a straight path can provide the same advantage.

Also in the above-mentioned embodiment, a flapper is exemplified as a conveying route switching means, but the invention is not limited to this; for example, a Mylar or the like can be used where the sheet may progress in a forward direction by pushing the Mylar, while progressing in a reverse direction by introduction of the Mylar along it.

In the above-mentioned embodiment, an image reading section in a facsimile machine is exemplified as an image reading apparatus, but the present invention is not limited to this; the same advantage can be obtained by applying the present invention to, for example, a scanner unit as an image reading apparatus, an image reading apparatus in a copying machine, or an image reading apparatus or the like in a composite apparatus suitably combining a printing function, facsimile function, copying function or the like.

According to the embodiment, as mentioned above, respective image information can be sequentially sent to single image processing means by switching between two reading means, and, therefore, a plural number of the image processing means are not required, and also simplification of the electric circuit as well as miniaturization of the base board, can be achieved, thus making reduced costs possible.

In addition, when an apparatus is made with only one-sided reading as a standard configuration and has a double-sided reading function as an added, optional configuration, just one image processing means can realize both the standard configuration and the optional added configuration, thereby making the cost lower in comparison with that of a structure having two image processing means.

Furthermore, in both the case of the front surface and back surface reading operations, the apparatus can start reading the image information from the front end of the original document D, so an image reverse means for reversing the image information thus read or an original document reverse means for reversing the original document to be upside down is not required. Therefore, it is possible to simplify the electric circuit, miniaturize the base board, achieve lower cost for an apparatus, and simplify the structure of the apparatus.

In addition, because the branching conveying route is structured from a portion between the first reading means and the second reading means so as to cross the U-turn conveying route, the original document does not enter again into the first reading means even if it is conveyed in a reverse direction, thus making it possible to lower the cost for the first reading means, as well as to lower the height of the apparatus.

Since the branching conveying route is constructed so as to form again an upwardly U-turn shaped conveying route after crossing the U-turn conveying route, thereby leading the original document onto the original document mounting tray, a space for installing the apparatus can be reduced.

Also, the original document sandwiching part of the second conveying means, the original document sandwiching part of the third conveying means, the original document sandwiching part of the fourth conveying means, the original document reading position of the first reading means and the original document reading position of the second reading means are positioned approximately in a straight line, and, therefore, the original document is pressed firmly with the original document reading positions, and also the original document does not flap wildly, thus making it possible to perform a good reading operation without image shocks.

[Fifth Embodiment]

An image reading apparatus and an image forming apparatus of a fifth embodiment according to this invention will hereinafter be described with reference to FIG. 52 to FIG. 64.

Figure 52:
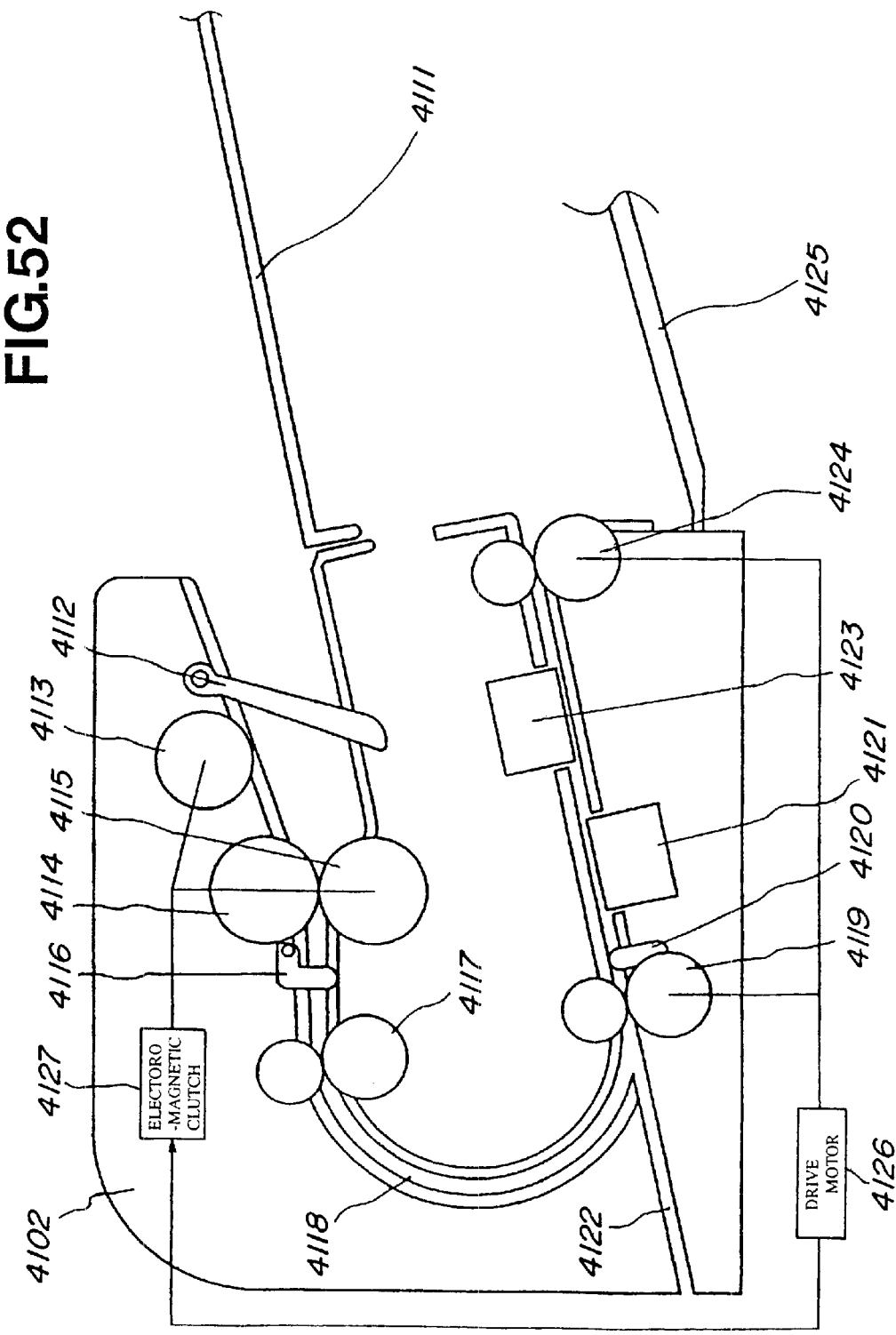
FIG. 52 is a cross-sectional view showing an image reading apparatus of a fifth embodiment.
Figure 53:
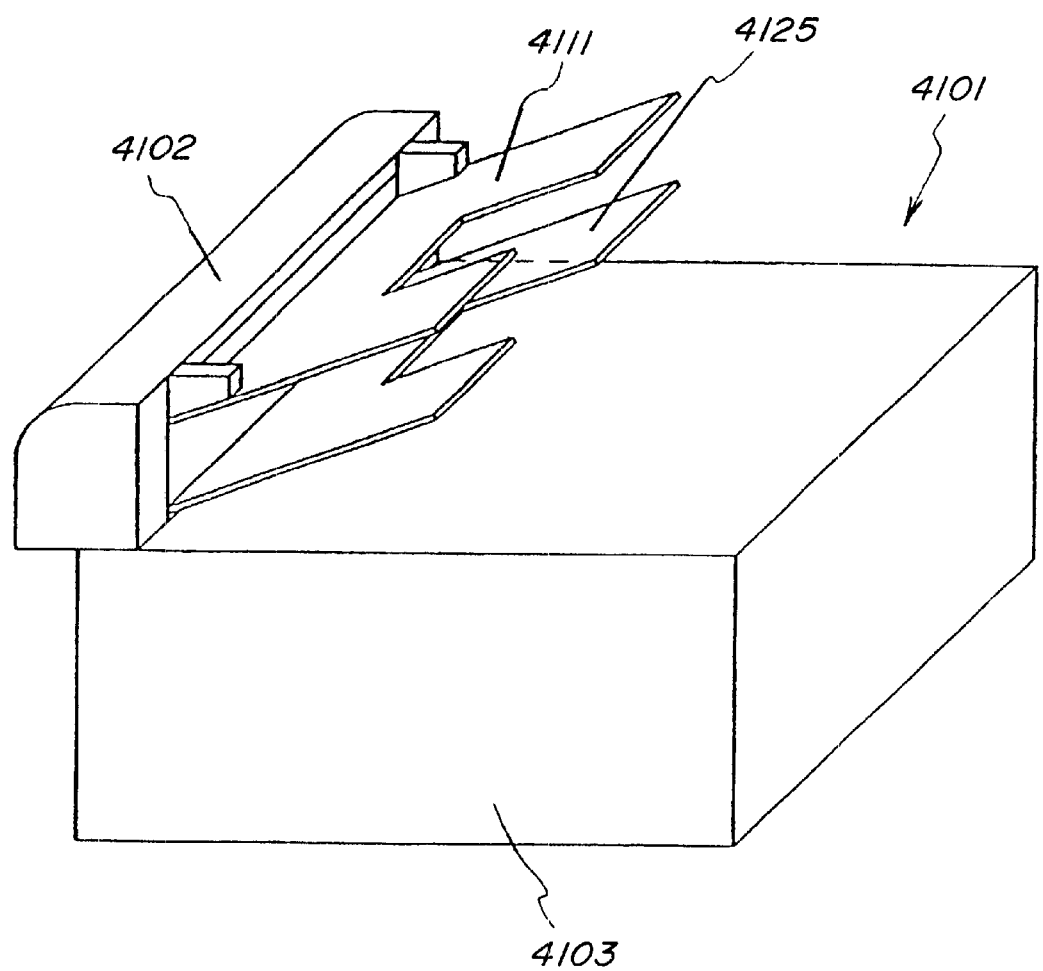
FIG. 53 is a perspective view showing an exterior appearance of a facsimile machine mounting the image reading apparatus according to the fifth embodiment.

FIG. 52 is a structural view at the time the fifth embodiment of the image reading apparatus according to this invention is applied to a facsimile machine; FIG. 53 is a perspective view showing the facsimile machine shown in FIG. 52. The facsimile machine shown in FIG. 52 and FIG. 53 is the fifth embodiment of the image forming apparatus according to the present invention.

In FIG. 52 and FIG. 53, numeral 4101 is a main body of the facsimile machine; numeral 4102 is an image reading section utilizing the double-sided image reading apparatus according to the present invention, the image reading section being arranged in an upper portion of the facsimile machine body 4101; numeral 4103 is an image forming section arranged in a lower portion of the machine main body 4101; and numeral 4111 is an original document tray on which original documents are set.

In addition, numeral 4112 is an original document existing-non-existing sensor for detecting the original documents set on the original tray 4111; numeral 4113 is a pickup roller for sending the original documents thus set to an interior of the apparatus; numeral 4114 and 4115 are respectively a separating roller and a reverse roller for separating, in cooperation with each other., the sent original documents sheet by sheet; and numeral 4116 is an original document feeding sensor for detecting a front end and rear end of a separated original document.

Numeral 4117 is a conveying roller A for conveying the separated original document to a U-turn path 4118 serving as a U-turn shaped conveying route, and numeral 4119 is a forward and reverse rotatable conveying roller B for conveying the original document after performing a U-turn to a front surface reading section 4121 composed of a pressing type image sensor.

Numeral 4120 is an original document edge sensor for detecting a front end and rear end of the original document in order to determine the timing of starting and finishing of the reading operation of the original document; numeral 4122 is a reverse path serving as a conveying route of the original document during reverse movement; numeral 4123 is a back surface reading section composed of a pressing type image sensor; and numeral 4124 is a forward and reverse rotatable sheet delivering roller for delivering the original document after being read onto a sheet delivering tray 4125.

Numeral 4126 is a drive motor for driving the pickup roller 4113, the separating roller 4114, the reverse roller 4115, the conveying roller A4117, the conveying roller B4119, the sheet delivering roller 4124 and the like, and numeral 4127 is an electromagnetic clutch for temporarily blocking the driving by the drive motor 4126 for the pickup roller 4113, separating roller 4114, reverse roller 4115 and the like.

Figure 54:
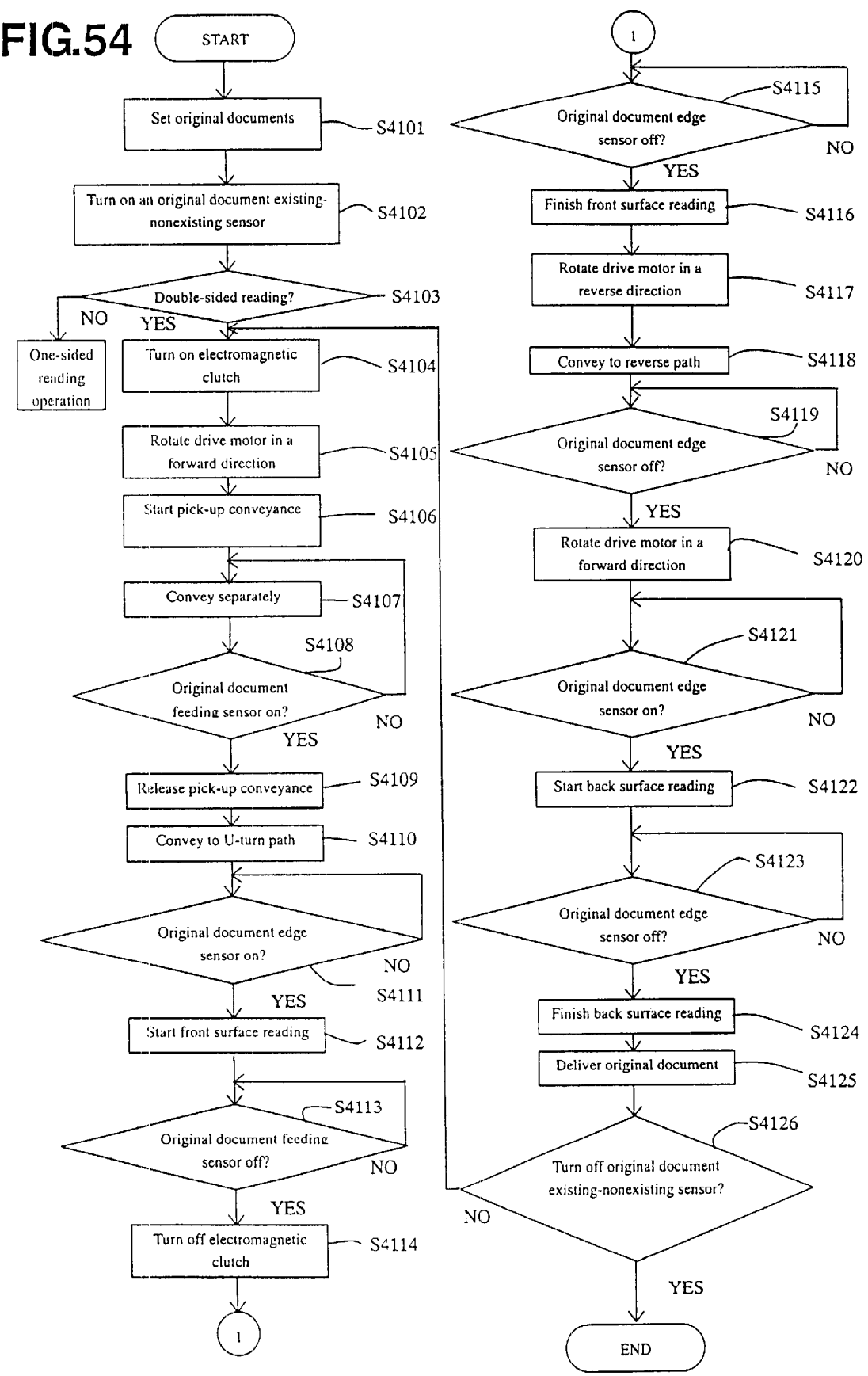
FIG. 54 is a flow chart showing an operation of the image reading apparatus according to the fifth embodiment.

Next, the operation of the fifth embodiment of the image forming apparatus according to the present invention shown in FIG. 52 and FIG. 53 will be described with reference to FIG. 54 to FIG. 64. FIG. 54 shows a flow chart of the operation of the fifth embodiment of the image forming apparatus according to the invention shown in FIG. 52 and FIG. 53, and FIG. 55 to FIG. 64 show summarized views showing operations of the image forming apparatus shown in FIG. 52 and FIG. 53.

Figure 55:
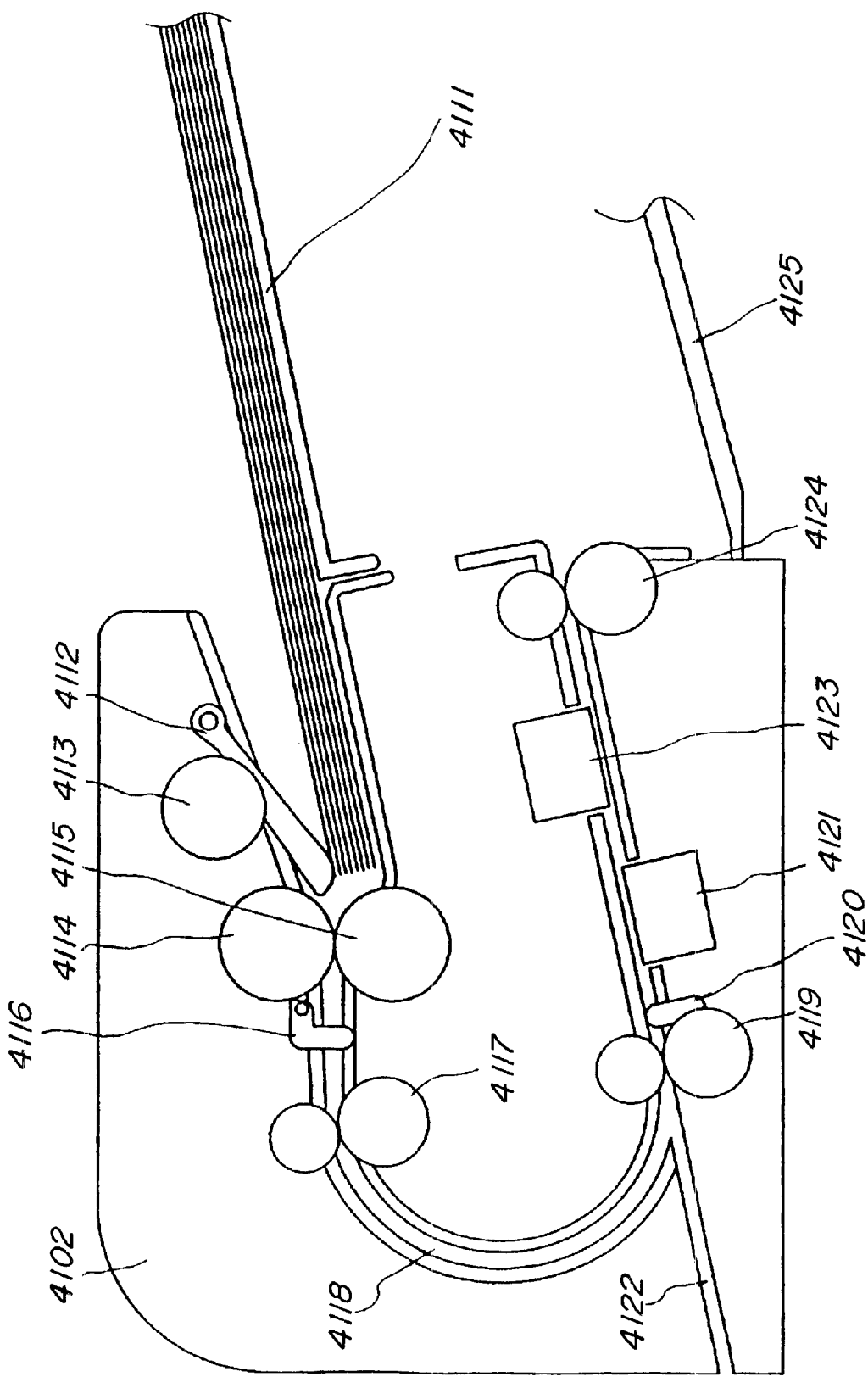
FIG. 55 to FIG. 64 are illustrations showing operations of the image reading apparatus according to the fifth embodiment.

As shown in the flow chart in FIG. 54, original documents are set on the original document tray 4111 (S4101), and the original document existing-nonexisting sensor 4112 detects the original documents (S4102, FIG. 55).

Then, a user selects a double-sided reading mode and directs the start of a reading operation (S4103), and the electromagnetic clutch 4127 connects the driving for the pickup roller 4113, the separating roller 4114, and the reverse roller 4115 (S4104).

Next, the drive motor 4126 rotates in a forward direction (S4105) to make the pickup roller 4113 directly press the original documents, thus sending the original documents to the inside of the apparatus (S4106).

Figure 56:
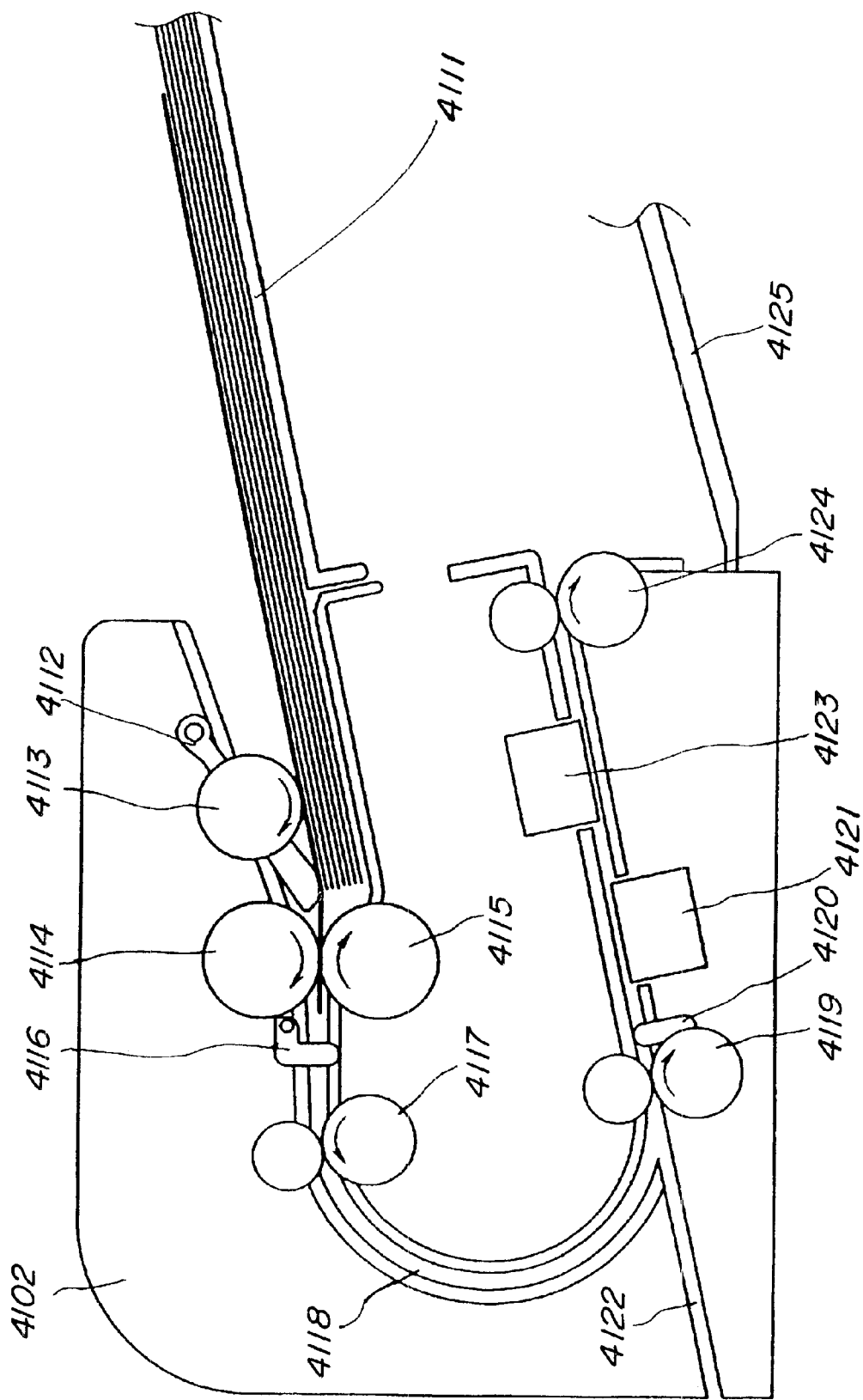

The original documents are separated by means of the separating roller 4114 and the reverse roller 4115, and an uppermost sheet of the original documents is conveyed separately (S4107, FIG. 56).

At this time, a conveying speed by the separating roller 4114 is slower than the set original document conveying speed in order to reduce damage to the original documents at the time of separation, and it is also slower because it is subjected to conveying resistance given by the reverse roller 4115.

Figure 57:
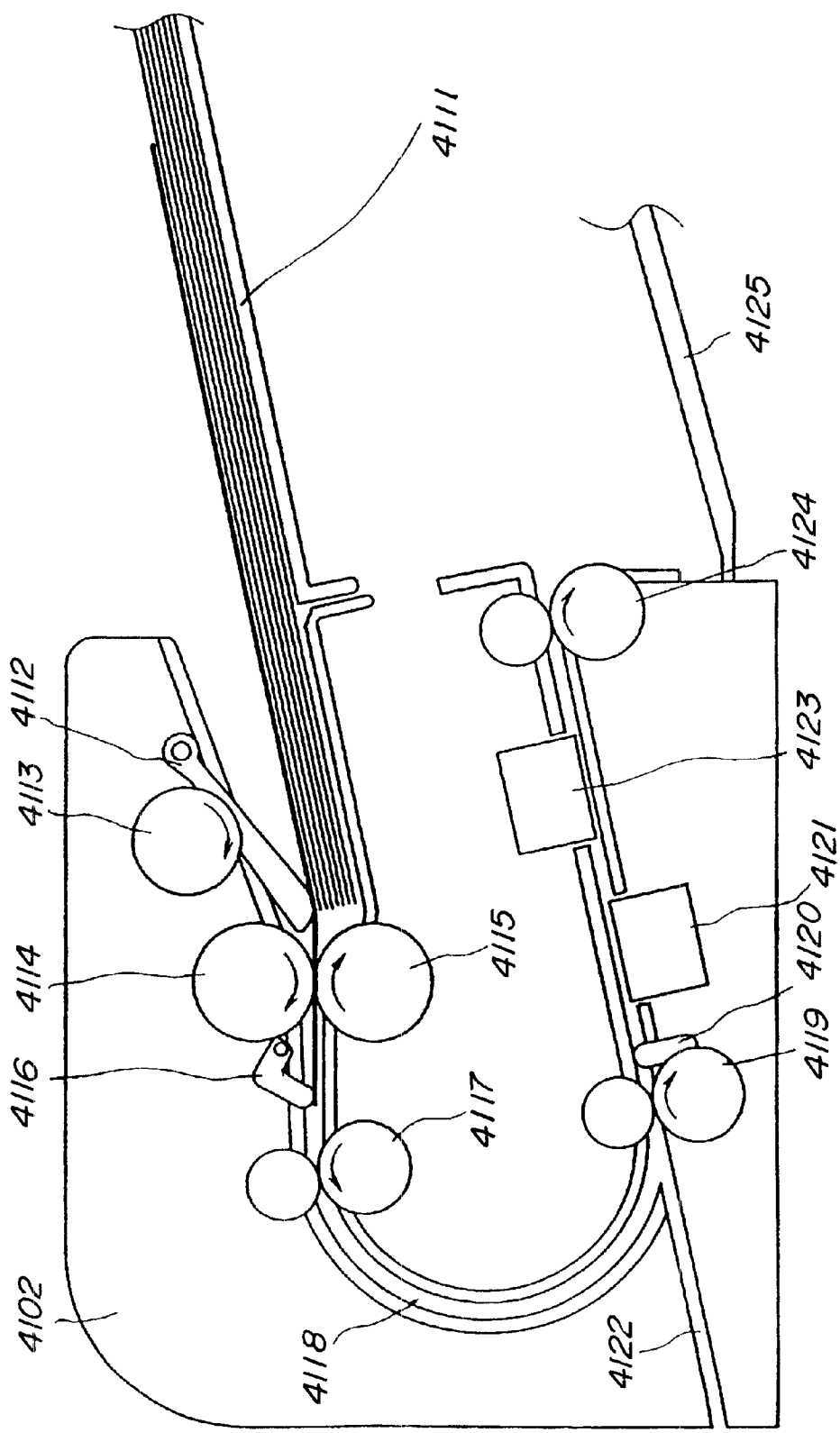

Then, when the original document feeding sensor 4116 detects the front end of the original document (S4108), the original document conveying operation by the pickup roller 4113 is released (S4109, FIG. 57).

The separated original document is conveyed to the U-turn path 4118 by the conveying roller A4117 having a circumferential speed faster than the predetermined original document conveying speed (S4110).

At this time, the conveying roller A4117 offsets the delay which is produced by the separating roller 4114 and the reverse roller 4115, and the original document is conveyed at approximately the predetermined speed. The conveying speed of the conveying roller A4117 is set beforehand so as to offset the delay by the separating roller 4114 and the reverse roller 4115.

Figure 58:
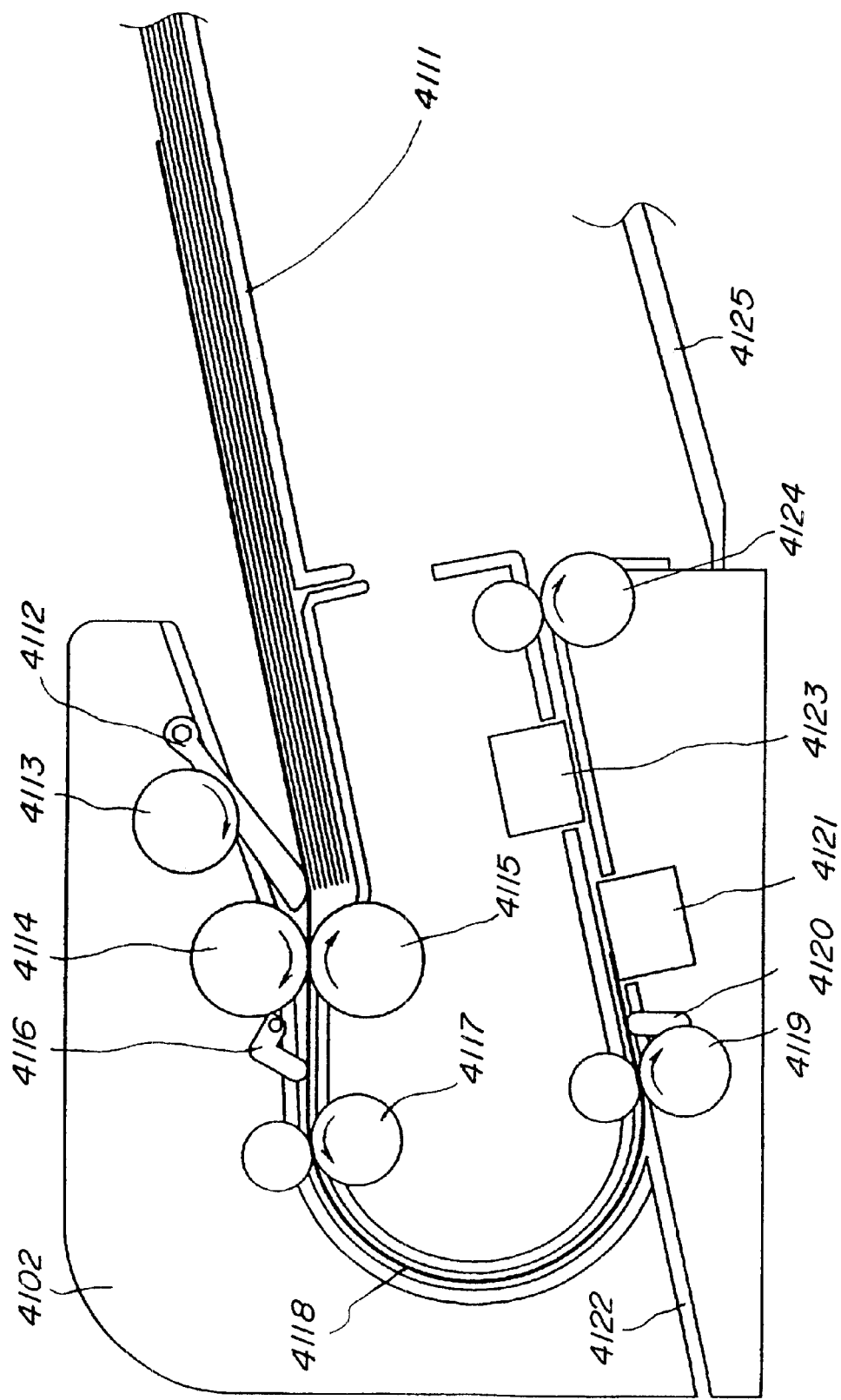

Next, the conveying roller B4119 having a circumferential speed of approximately the set original document conveying speed conveys the original document, and when the original document edge sensor 4120 detects the front end of the original document (S4111), the front surface reading section 4121 starts a reading operation of the front surface of the original document at a place where the original document is conveyed by a predetermined amount from the original document edge sensor 4120 (S4112, FIG. 58).

The original document is conveyed at approximately the set original document conveying speed. The original document conveying speed of the sheet delivering roller 4124 is set so as to be slightly faster than the set original document conveying speed, that is, the original document conveying speed of the conveying roller B4119, and the conveying force of the sheet delivering roller 4124 is set so as to be lower than that of the conveying roller B4119.

When the sheet delivering roller 4124 starts conveying the original document, a slight difference in the conveying speeds between the conveying roller B4119 and the sheet delivering roller 4124 applies tension to the original document, and the original document is conveyed in a position most suitable for reading operations by the front surface reading section 4121 and the back surface reading section 4123.

Because the difference in the conveying speeds between the conveying roller B4119 and the sheet delivering roller 4124 is slight and also that a conveying force of the sheet delivering roller 4124 is set so as to be lower than that of the conveying roller B4119, the original document is conveyed, at approximately the set original document conveying speed. That is, provided that a conveying speed of the conveying roller A4117 is V1, a conveying speed of the conveying roller B4119 is V2, and a conveying speed of the sheet delivering roller 4124 is V3, the relation of those above is shown as $V1 \geq V2$ and $V2 \leq V3$. Here, changing each diameter or circumferential speed of the rollers can change the conveying speed.

Figure 59:
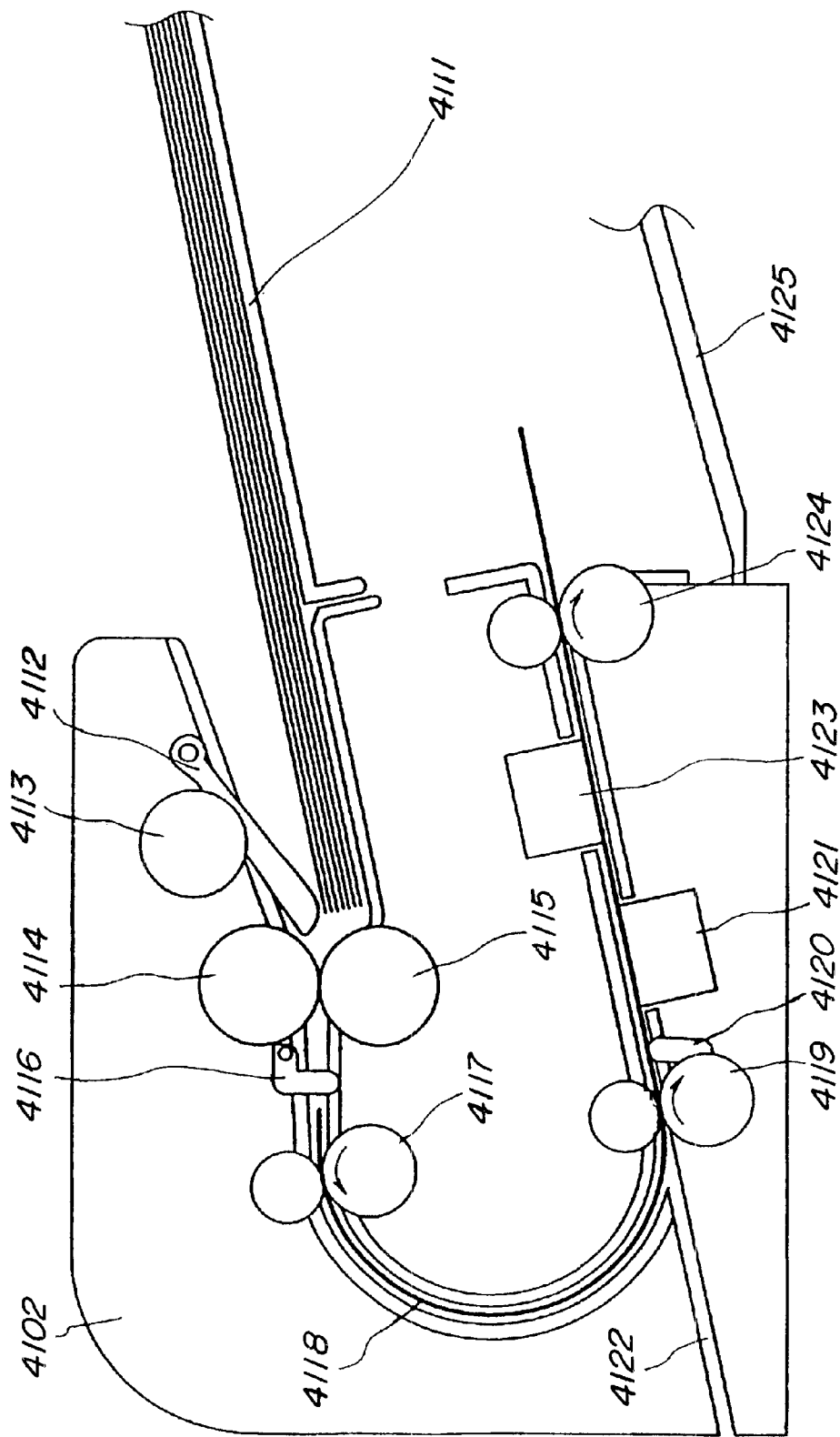

When the original document feeding sensor 4116 detects the rear end of the original document (S4113), the electromagnetic clutch 4127 blocks the driving for the pickup roller 4113, the separating roller 4114, and the reverse roller 4115, and consequently the following original documents are stopped without being conveyed (S4114, FIG. 59).

Figure 60:
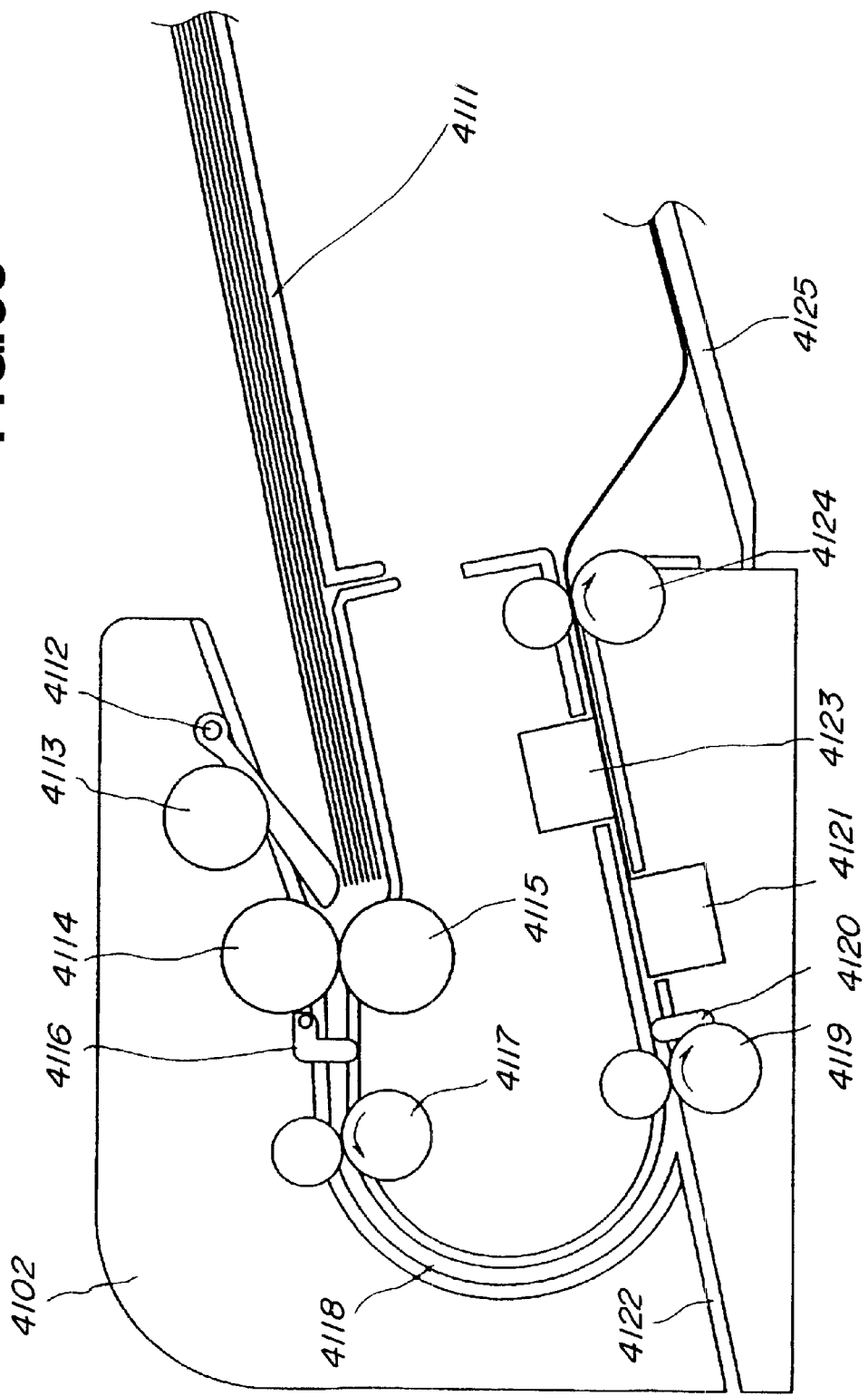

When the original document edge sensor 4120 detects the rear end of the original document (S4115), the front surface reading section 4121 finishes a reading operation of the front surface of the original document at a place where the original document is conveyed by a predetermined amount from the original document edge sensor 4120 (S4116, FIG. 60).

Figure 61:
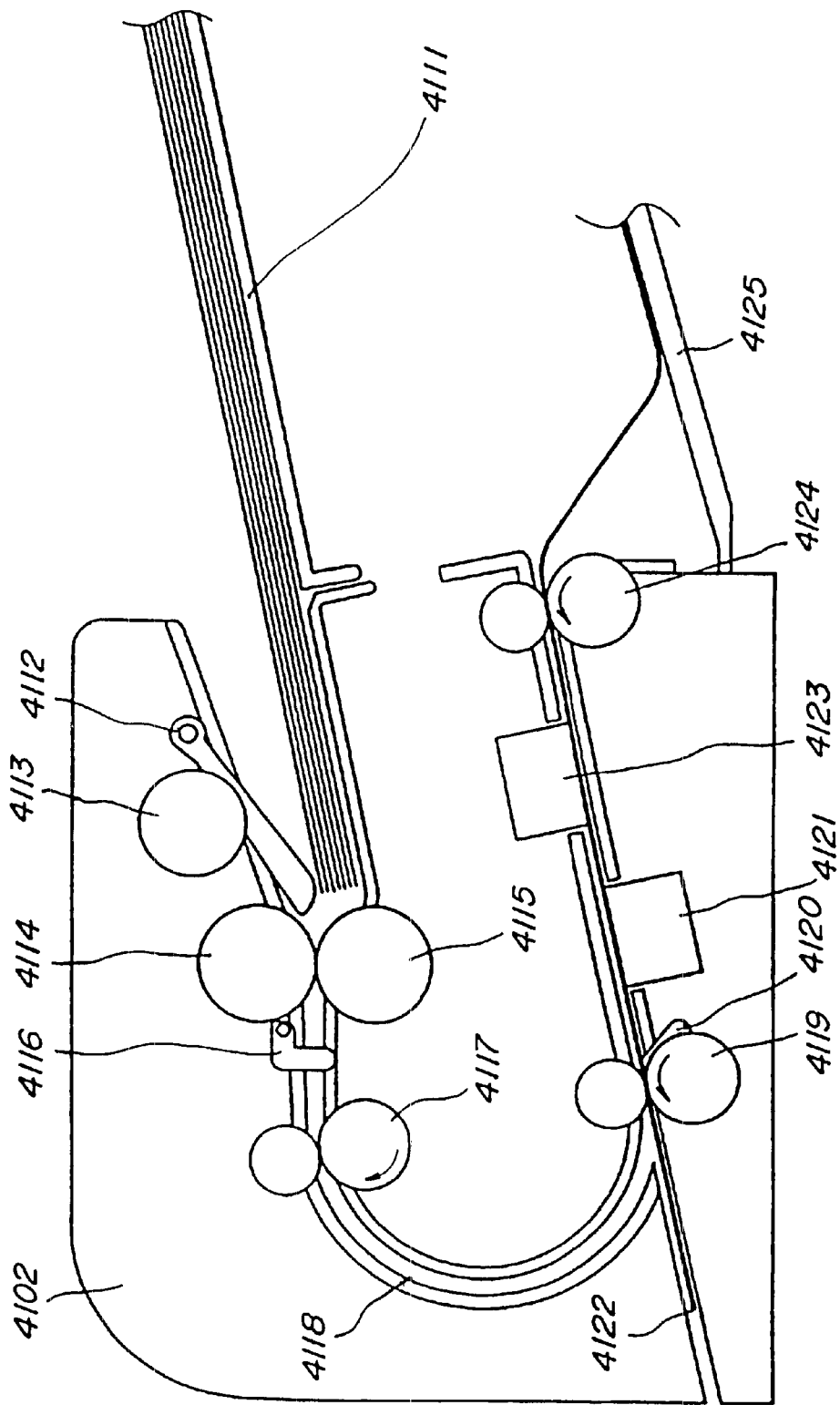
Figure 62:
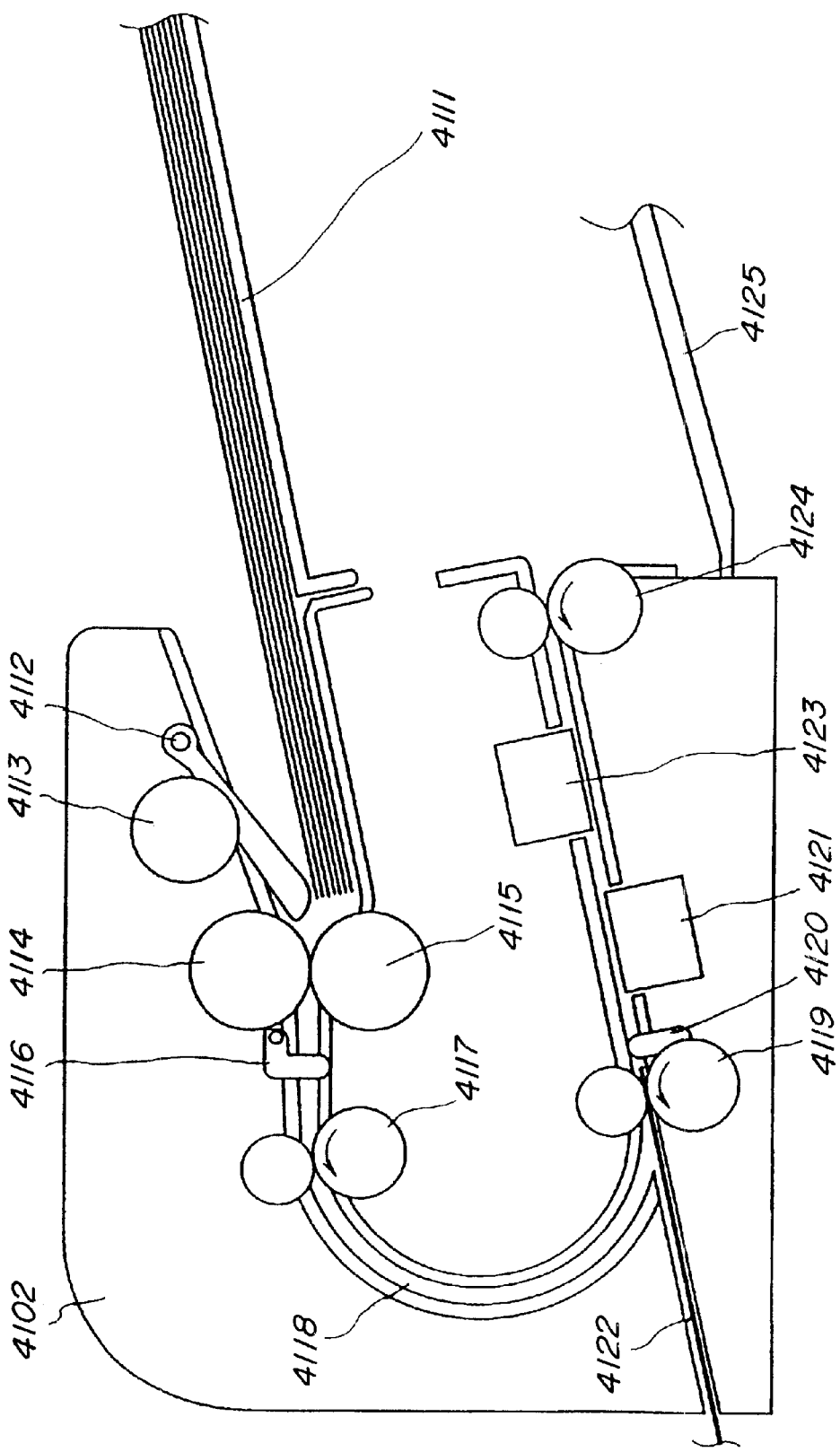

Then, the drive motor 4126 rotates in a reverse direction (S4117), and the original document is conveyed in a reverse direction by the conveying roller B4119 and the sheet delivering roller 4124, and then is conveyed to the reverse path 4122 by means of the shape of the intersecting portion of the U-turn path 4118 and the reverse path 4122 (S4118, FIG. 61).

Although the original document becomes slack little by little between the conveying roller B4119 and the sheet delivering roller 4124 by the difference in those circumferential speeds, there is no influence on images because the front surface reading section 4121 and the back surface reading section 4123 do not conduct a reading operation when the original document is conveyed in the reverse direction.

When the original document edge sensor 4120 detects passage of the end of the original document (S4119, FIG. 62), the drive motor 4126 again rotates in a forward direction (S4120). The slackness of the original document is eliminated because the original document is conveyed further to the predetermined position after passing through the sheet delivering roller 4124.

Figure 63:
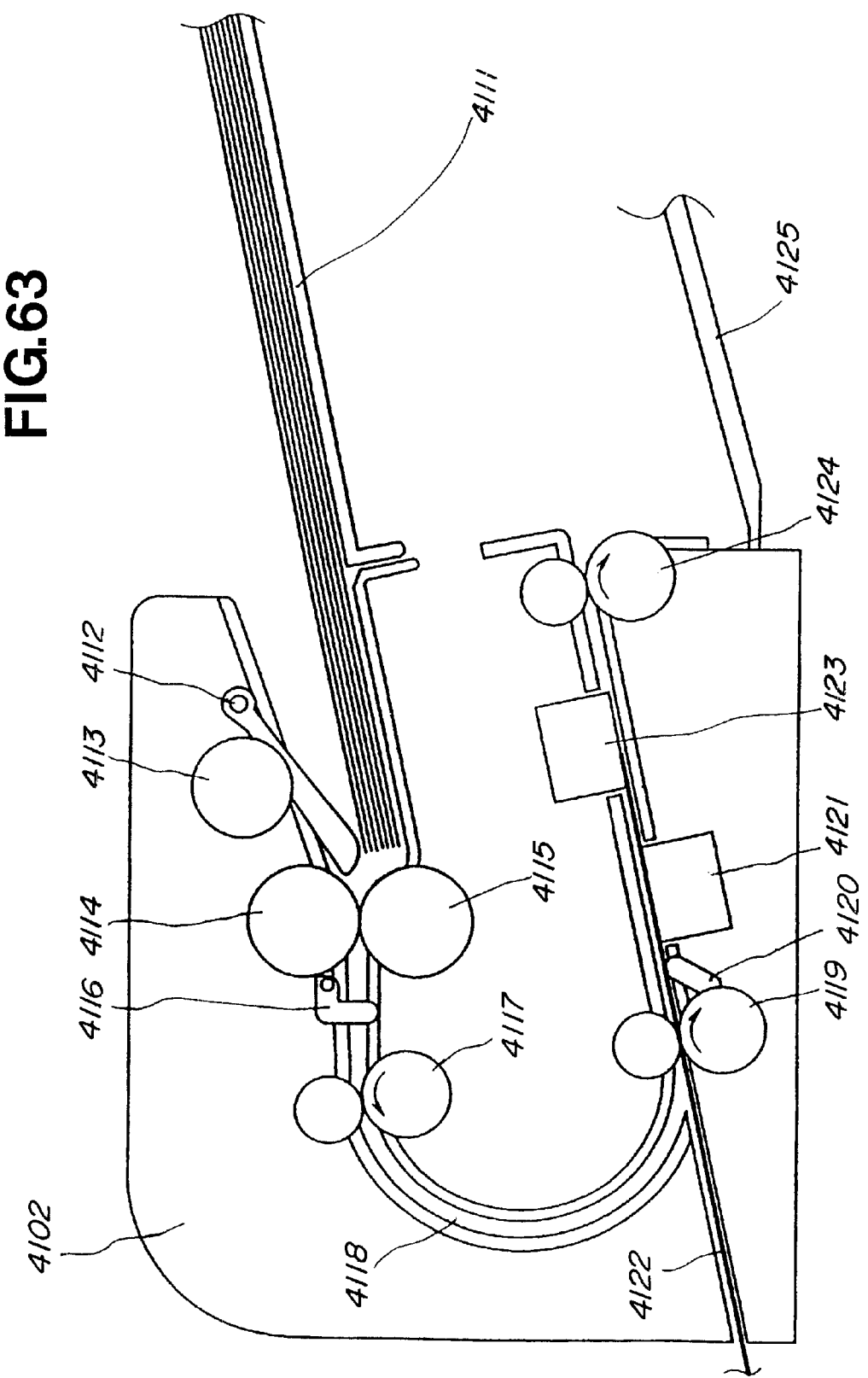

When the original document edge sensor 4120 again detects the front end of the original document (S4121), the back surface reading section 4123 starts a reading operation of the back surface of the original document at a place where the original document is conveyed by a predetermined amount from the original document edge sensor 4120 (S4122, FIG. 63).

As for the conveying state of the original document, there is a difference between conveyance by both the conveying roller A4117, conveying at a speed approximately set so as to offset the delay produced by the separating roller 4114 and the reverse roller 4115, which speed is slightly faster than the original document conveying speed; and the conveying speed of the conveying roller B4119 having a circumferential speed of approximately the set original document conveying speed, and conveyance only by the conveying roller B4119 having a conveying speed of approximately the set original document conveying speed, but, in any case, the state is the same as that of the reading operation of the front surface because the original document is conveyed at approximately the set original document conveying speed.

Figure 64:
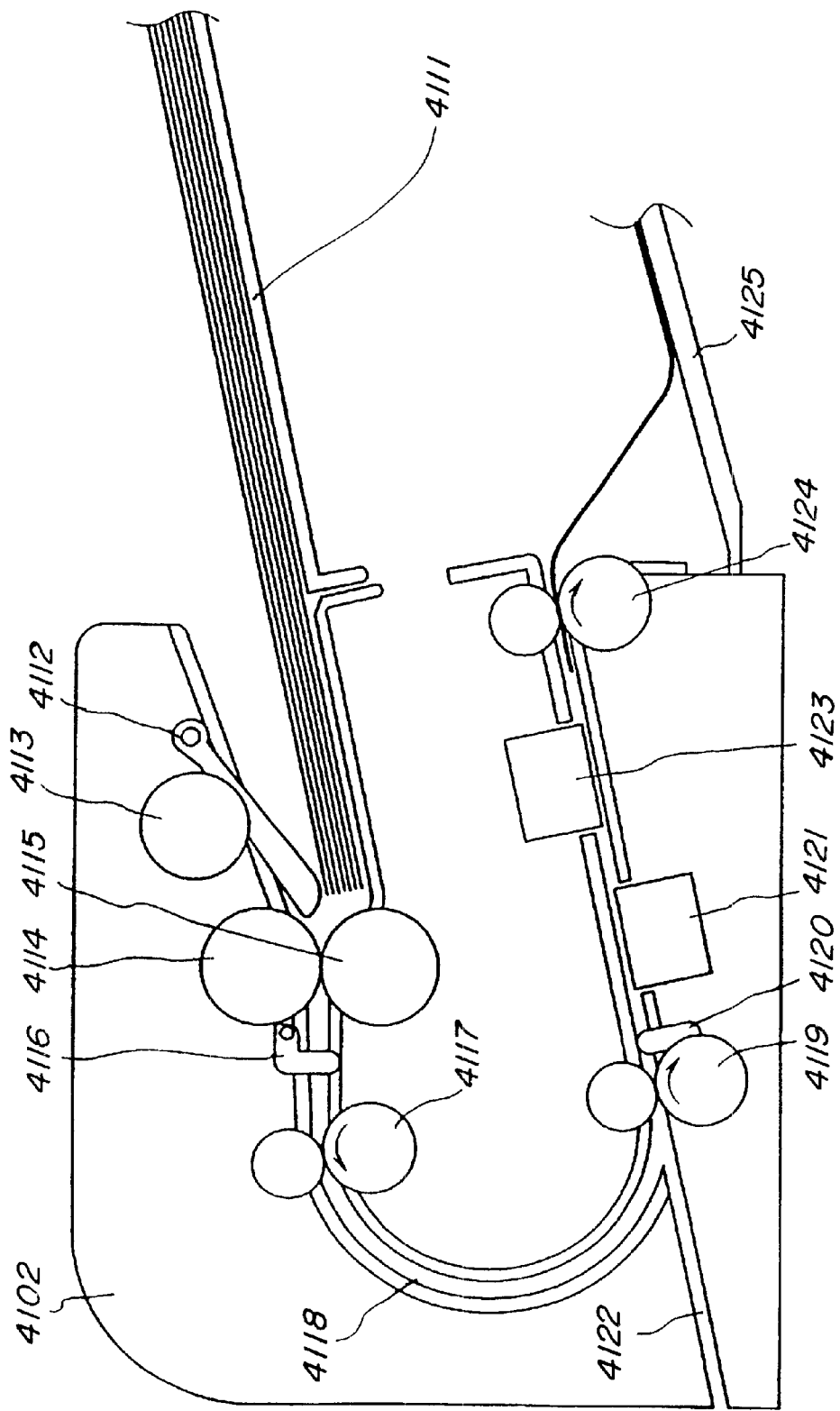

When the original document edge sensor 4120 detects the rear end of the original document (S4123), the back surface reading section 4123 finishes a reading operation of the back surface of the original document at a place where the original document is conveyed by a predetermined amount from the original document edge sensor 4120 (S4124), and consequently the sheet delivering roller 4124 delivers the original document onto the sheet delivering tray 4125 (S4125, FIG. 64).

Making the conveying speed of the sheet delivering roller 4124 faster than the set original document conveying speed can prevent the original document from being slack at the first and second reading means.

Next, when the original document existing-nonexisting sensor 4112 detects original documents, the operation is returned to Step S4104 where the electromagnetic clutch 4127 connects the driving for the pickup roller 4113, the separating roller 4114, and the reverse roller 4115 to convey the following original documents; when no original documents are detected, then the reading operation is completed (S4126).

Consequently, by making such a structure as mentioned above, the fifth embodiment of the image reading apparatus and image forming apparatus according to the invention can improve the processing ability of the apparatus, because the conveying speed of the conveying roller A4117 is set so as to offset the delay caused by the separating roller 4114 and the reverse roller 4115, and can also convey the original document in a position most suitable for a reading operation by the front surface reading section 4121 and the back surface reading section 4123, because the tension created by a slight difference of the conveying speeds between the conveying roller B4119 and the sheet delivering roller 4124 is applied to the original document.

In the fifth embodiment, the description with respect to the U-turn path is made, but it is apparent to obtain the same advantages by using a straight path.

[Sixth Embodiment]

Next, a sixth embodiment of an image reading apparatus and an image forming apparatus according to the present invention will be hereinafter described with reference to FIG. 65 to FIG. 76. Among the members shown in FIG. 65 to FIG. 76, the same members as those above-mentioned members in FIG. 54 to FIG. 64 are referred to by the same numerals.

Figure 65:
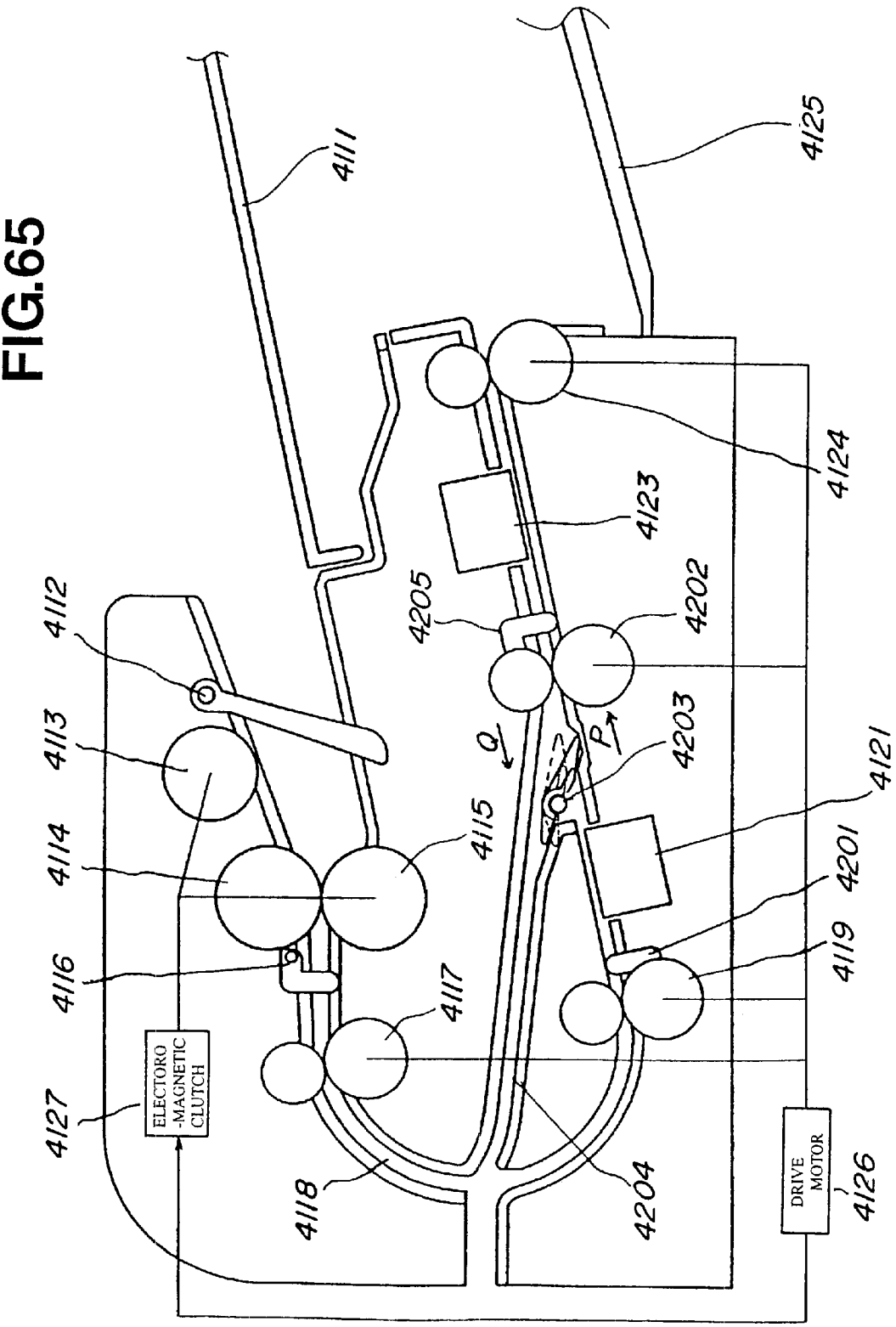
FIG. 65 is a cross-sectional view showing an image reading apparatus of a sixth embodiment.

FIG. 65 is a structural view at the time the sixth embodiment of the image reading apparatus according to this invention is applied to a facsimile machine. The facsimile machine shown in FIG. 65 is also the sixth embodiment of the image forming apparatus according to the present invention.

In FIG. 65, numeral 4111 is an original document tray on which original documents are set; numeral 4112 is an original document existing-nonexisting sensor for detecting the original document documents set on original document tray 4111; numeral 4113 is a pickup roller for sending the original documents thus set to an interior of the apparatus;

numerals 4114 and 4115 are respectively a separating roller and a reverse roller for separating, in cooperation with each other, the sent original documents sheet by sheet; and numeral 4116 is an original document feeding sensor for detecting a front end and rear end of the separated original document.

Numeral 4117 is a conveying roller A for conveying the separated original document to a U-turn path 4118 serving as a U-turn shaped conveying route; numeral 4119 is a conveying roller B for conveying the original document after performing a U-turn to a front surface reading section 4121 composed of a pressing type image sensor; and numeral 4201 is an original document edge sensor A for detecting a front end and rear end of the original document in order to determine the timing of starting and finishing the reading operation of the front surface of the original document by the front surface reading section 4121.

Numeral 4202 is a forward and reverse rotatable conveying roller C for conveying the original document further downstream after its front surface is read, and numeral 4203 is a conveying route switching flapper which is open when an end of the original document enters from a forward direction (Arrow P direction) and is closed when an end of the original document enters from a reverse direction (Arrow Q direction) to lead the original document to a reverse path 4204.

Numeral 4205 is an original document edge sensor B for detecting a front end and rear end of the original document in order to determine the timing of starting and finishing of the reading operation of the back surface of the original document by a back surface reading section 4123 composed of a pressing type image sensor, and numeral 4124 is a forward and reverse rotatable sheet delivering roller for delivering the original document after the reading operation onto a sheet delivering tray 4125.

Numeral 4126 is a drive motor for driving the pickup roller 4113, the separating roller 4114, the reverse roller 4115, the conveying roller A4117, the conveying roller B4119, the conveying roller C4202, and the sheet delivering roller 4124, and numeral 4127 is an electromagnetic clutch for temporarily blocking the driving by the drive motor 4126 for the pickup roller 4113, separating roller 4114, and reverse roller 4115.

Figure 66:
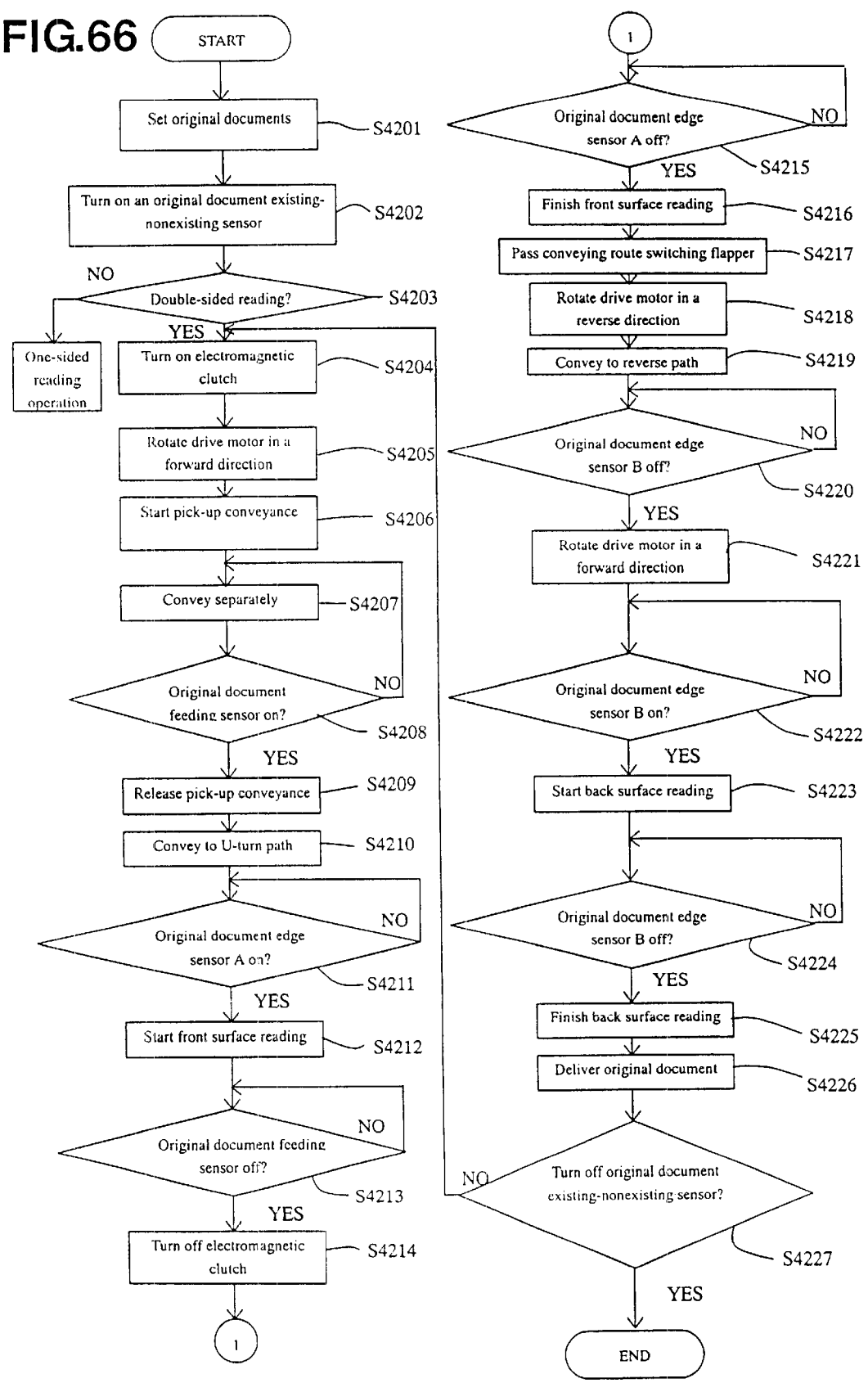
FIG. 66 is a flow chart showing an operation of the image reading apparatus according to the sixth embodiment.

Next, the operation of the sixth embodiment of the image forming apparatus according to the present invention will be described with reference to FIGS. 66 to 76. FIG. 66 shows a flow chart of the operation of the sixth embodiment of the image forming apparatus according to the invention, and FIG. 67 to FIG. 76 show summarized views showing operations of the sixth embodiment of the image forming apparatus.

Figure 67:
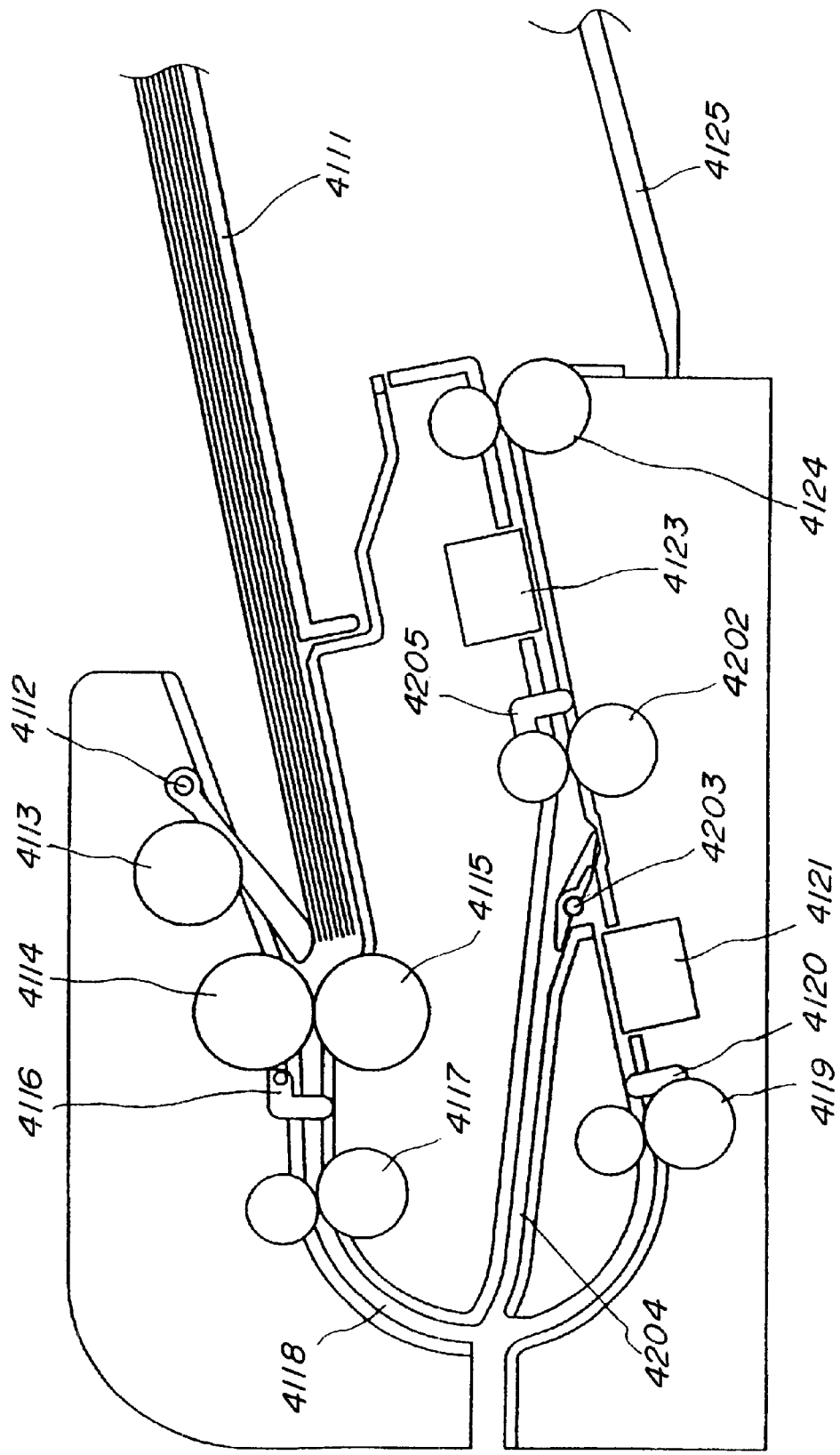
FIG. 67 to FIG. 76 are illustrations showing operations of the image reading apparatus according to the sixth embodiment.

First, a user sets original documents on the original document tray 4111 (S4201), and then the original document existing-nonexisting sensor 4112 detects the original documents (S4202, FIG. 67).

Then, the user selects a double-sided reading mode and directs the start of a reading operation (S4203), and the electromagnetic clutch 4127 connects the driving for the pickup roller 4113, the separating roller 4114, and the reverse roller 4115 (S4204).

The drive motor 4126 rotates in a forward direction (S4205), and the pickup roller 4113 is directly pressed on the original documents, thus sending the original documents to the interior of the apparatus (S4206).

Figure 68:
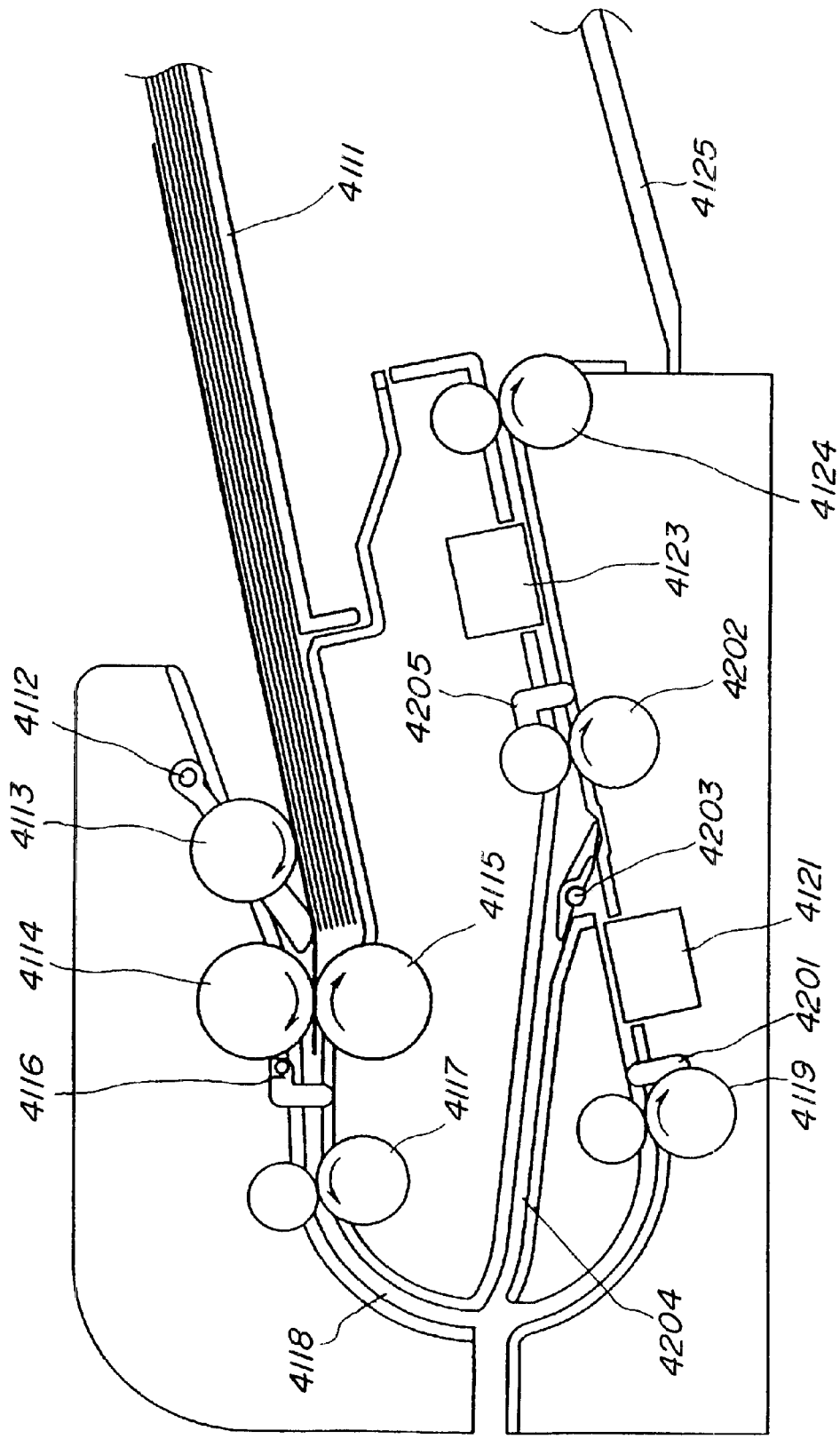

The original documents are separated by means of the separating roller 4114 and the reverse roller 4115, and an uppermost sheet of the original documents is conveyed separately (S4207, FIG. 68).

At this time, a conveying speed by the separating roller 4114 is slower than the set original document conveying speed in order to reduce damage to the original documents at the time of separation, and it is also slower because it is subjected to conveying resistance given by the reverse roller 4115.

Figure 69:
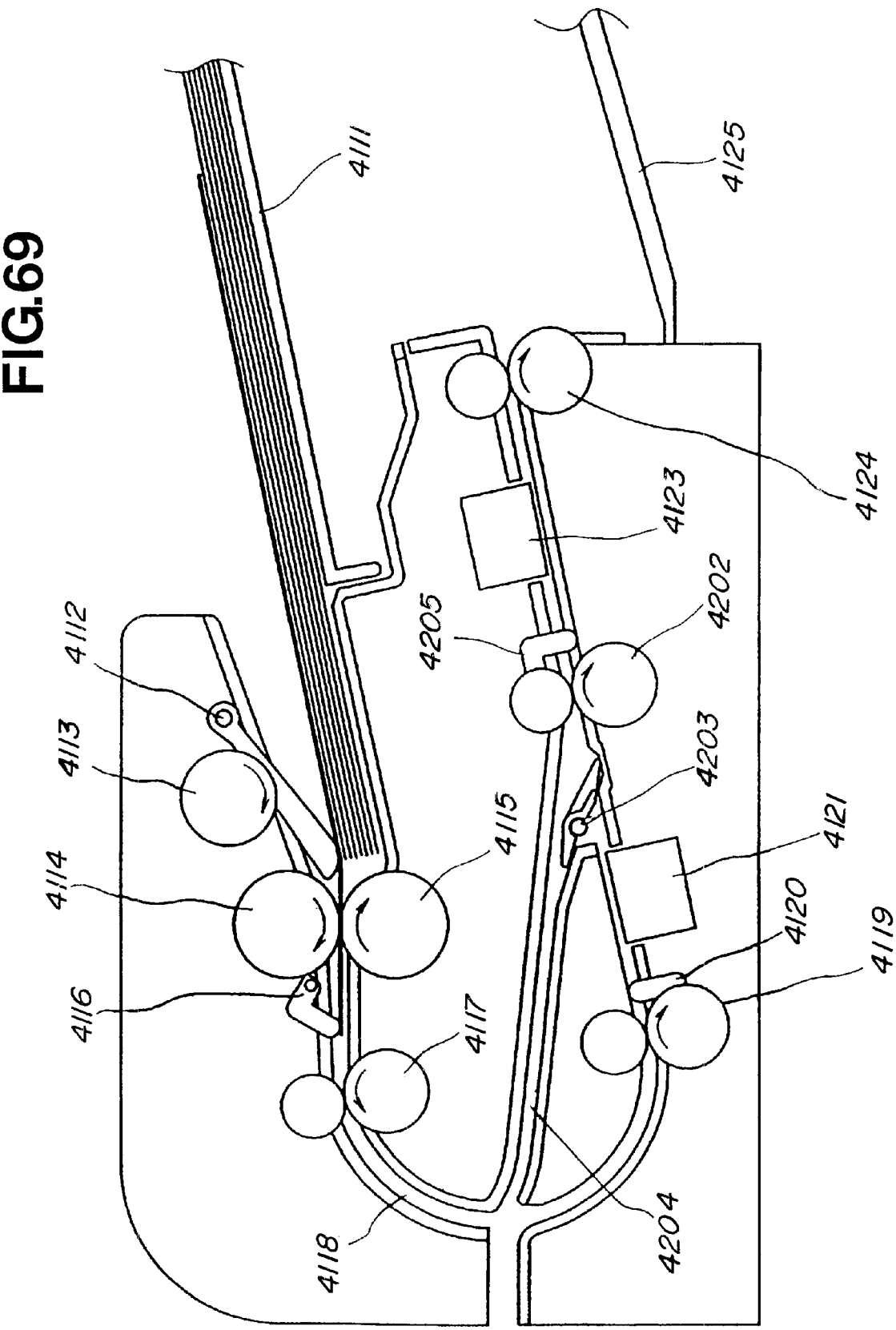

Then, when the original document feeding sensor 4116 detects the front end of the original document (S4208), the original document conveying operation by the pickup roller 4113 is released (S4209, FIG. 69).

The separated original document is conveyed to the U-turn path 4118 by the conveying roller A4117 having a conveying speed faster than the predetermined original document conveying speed (S4210).

At this time, the conveying roller A4117 offsets the delay which is produced by the separating roller 4114 and the reverse roller 4115, and the original document is conveyed at approximately the predetermined speed. The circumferential speed of the conveying roller A4117 is set beforehand so as to offset the delay by the separating roller 4114 and the reverse roller 4115.

Figure 70:
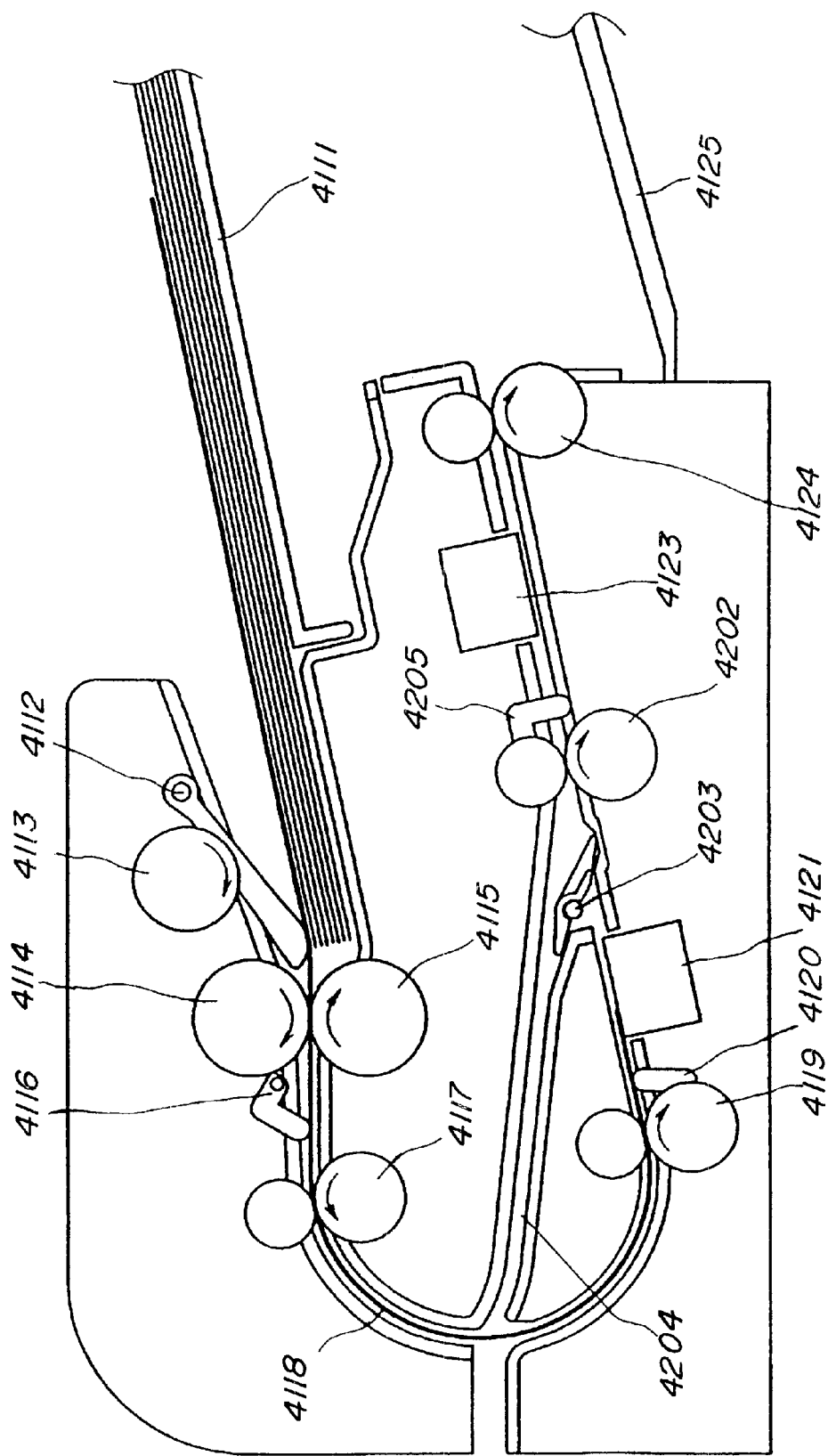

Then, the conveying roller B4119 having a circumferential speed of approximately the set original document conveying speed conveys the original document, and when the original document edge sensor A4201 detects the front end of the original document (S4211), the front surface reading section 4121 starts a reading operation of the front surface of the original document at a place where the original document is conveyed by a predetermined amount from the original document edge sensor A4201 (S4212, FIG. 70).

A circumferential speed of the conveying roller C4202 is set as approximately the set original document conveying speed. The original document is conveyed at approximately the set original document conveying speed. The original document conveying speed of the sheet delivering roller 4124 is set so as to be slightly faster than the set original document conveying speed, and the conveying force of the roller is set so as to be lower than that of the conveying roller C4202. When the sheet delivering roller 4124 starts conveying the original document, a slight difference in the conveying speeds between the conveying roller C4202 and the sheet delivering roller 4124 applies tension to the original document.

However, the original document is conveyed at approximately the set original document conveying speed because the difference in the conveying speeds between the conveying roller C4202 and the sheet delivering roller 4124 is slight and because the conveying force of conveying roller C4202 is set so as to be lower than that of the conveying roller C4202.

Figure 71:
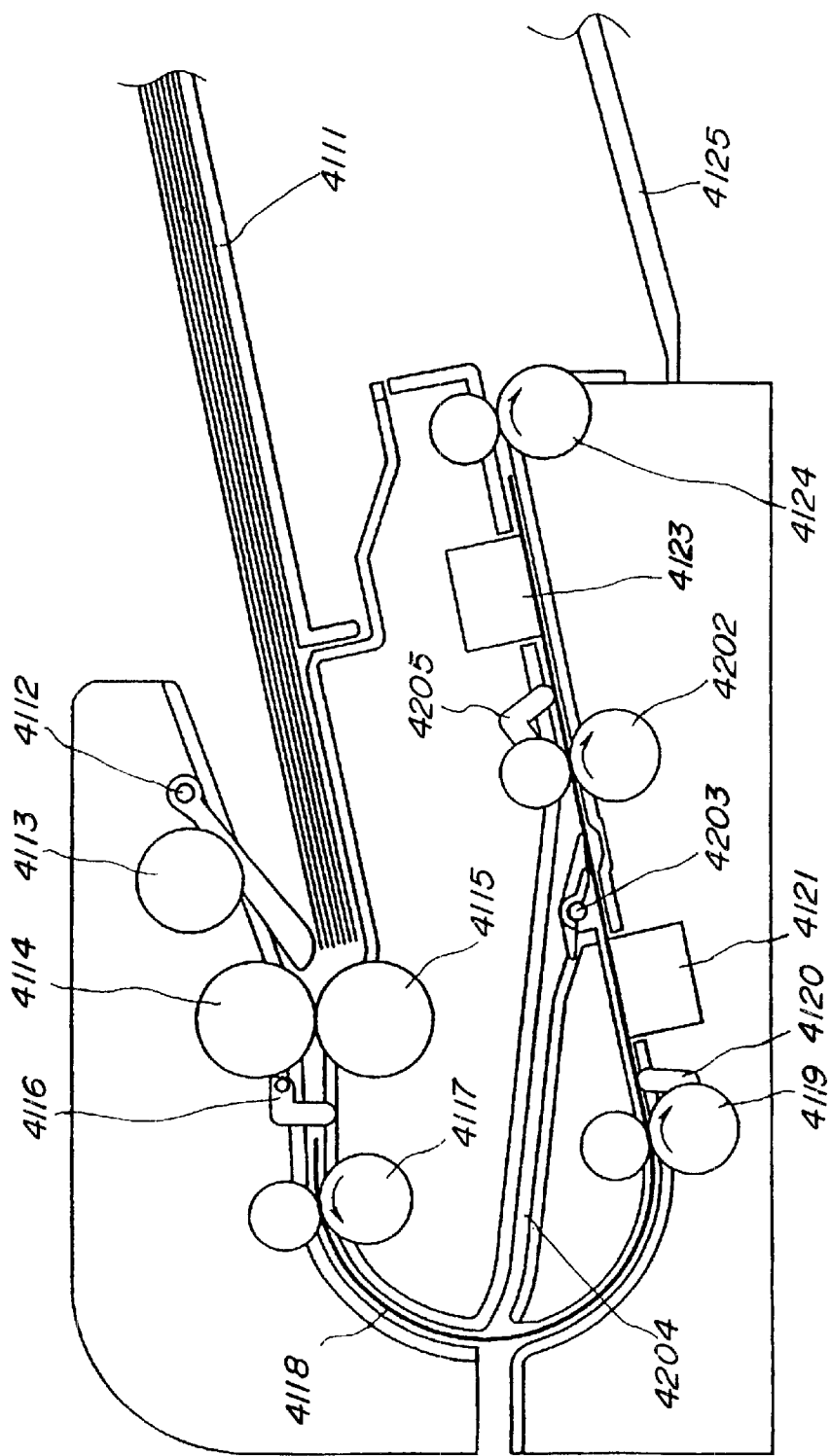
Figure 72:
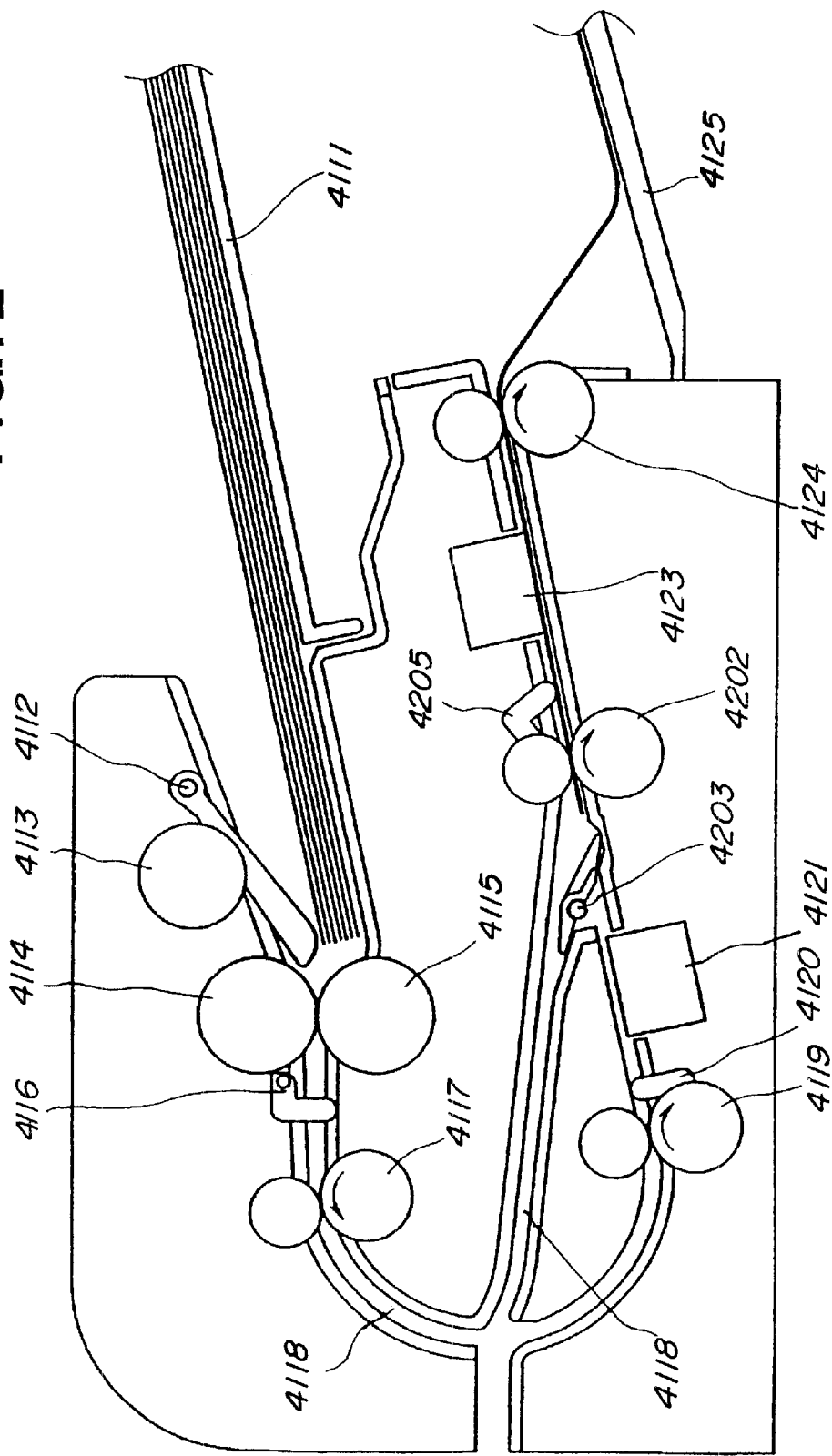

Next, when the original document feeding sensor 4116 detects the rear end of the original document (S4213), the electromagnetic clutch 4127 blocks the driving for the pickup roller 4113, the separating roller 4114, and the reverse roller 4115, and consequently the following original documents are stopped without being conveyed (S4214, FIG. 71).

Then, when the original document edge sensor A4201 detects the rear end of the original document (S4215), the front surface reading section 4121 finishes the reading operation of the front surface of the original document at a place where the original document is conveyed by a predetermined amount from the original document edge sensor A4201 (S4216).

The original document is conveyed further downstream by the conveying roller C4202, and when the rear end of the original document passes the conveying route switching flapper 4203 (S4217, FIG. 72), the drive motor 4126 rotates in a reverse direction (S4218).

Figure 73:
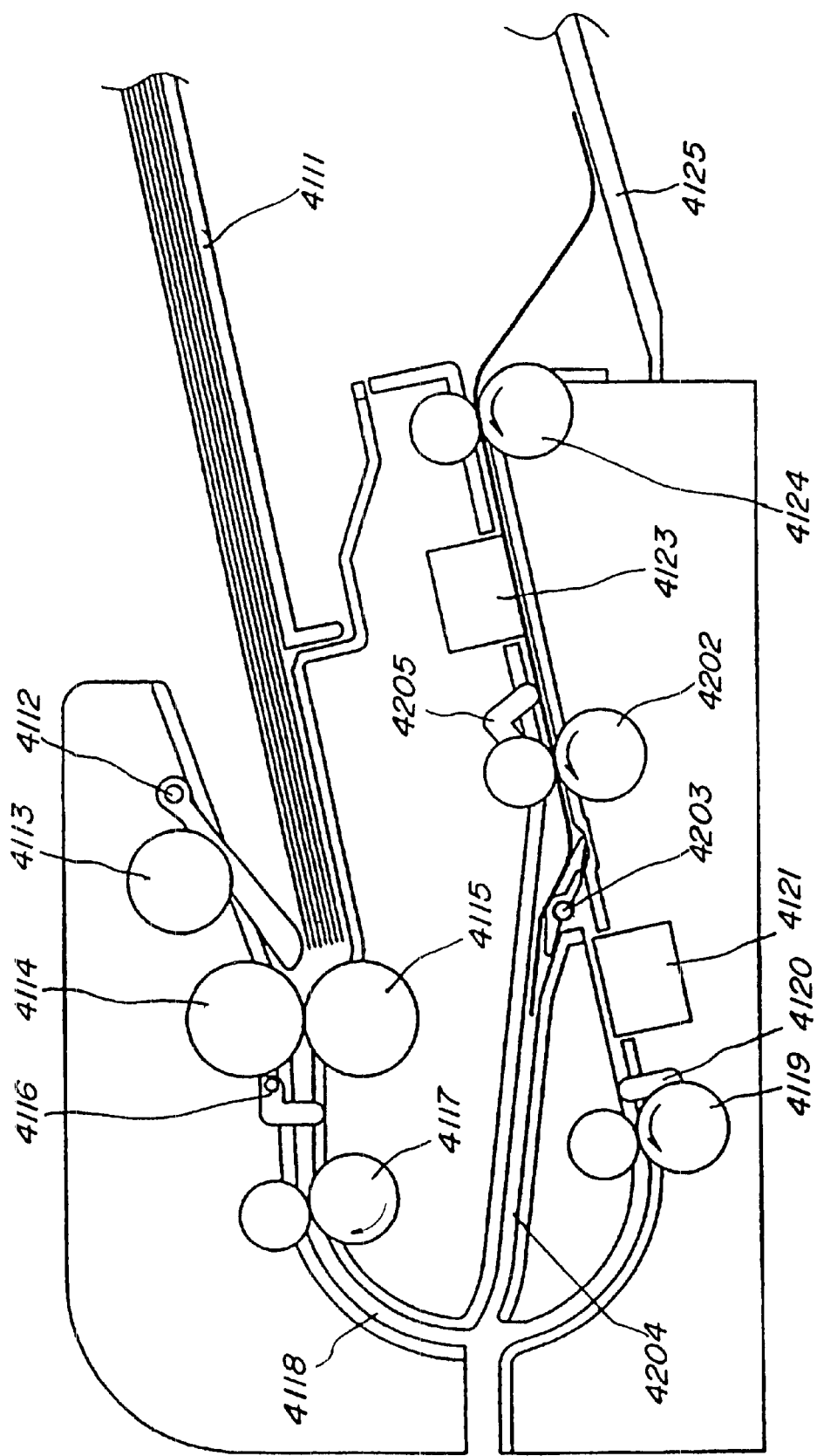

The original document is conveyed in a reverse direction by the conveying roller C4202 and the sheet delivering roller 4124, and is then conveyed to the reverse path 4204 by the conveying route switching flapper 4203 (S4219, FIG. 73). Although the original document becomes slack little by little between the conveying roller C4202 and the sheet delivering roller 4124 by the difference in those conveying speeds, there is no influence on images because the front surface reading section 4121 and the back surface reading section 4123 do not conduct the reading operation during the conveying of the original document in the reverse direction.

Figure 74:
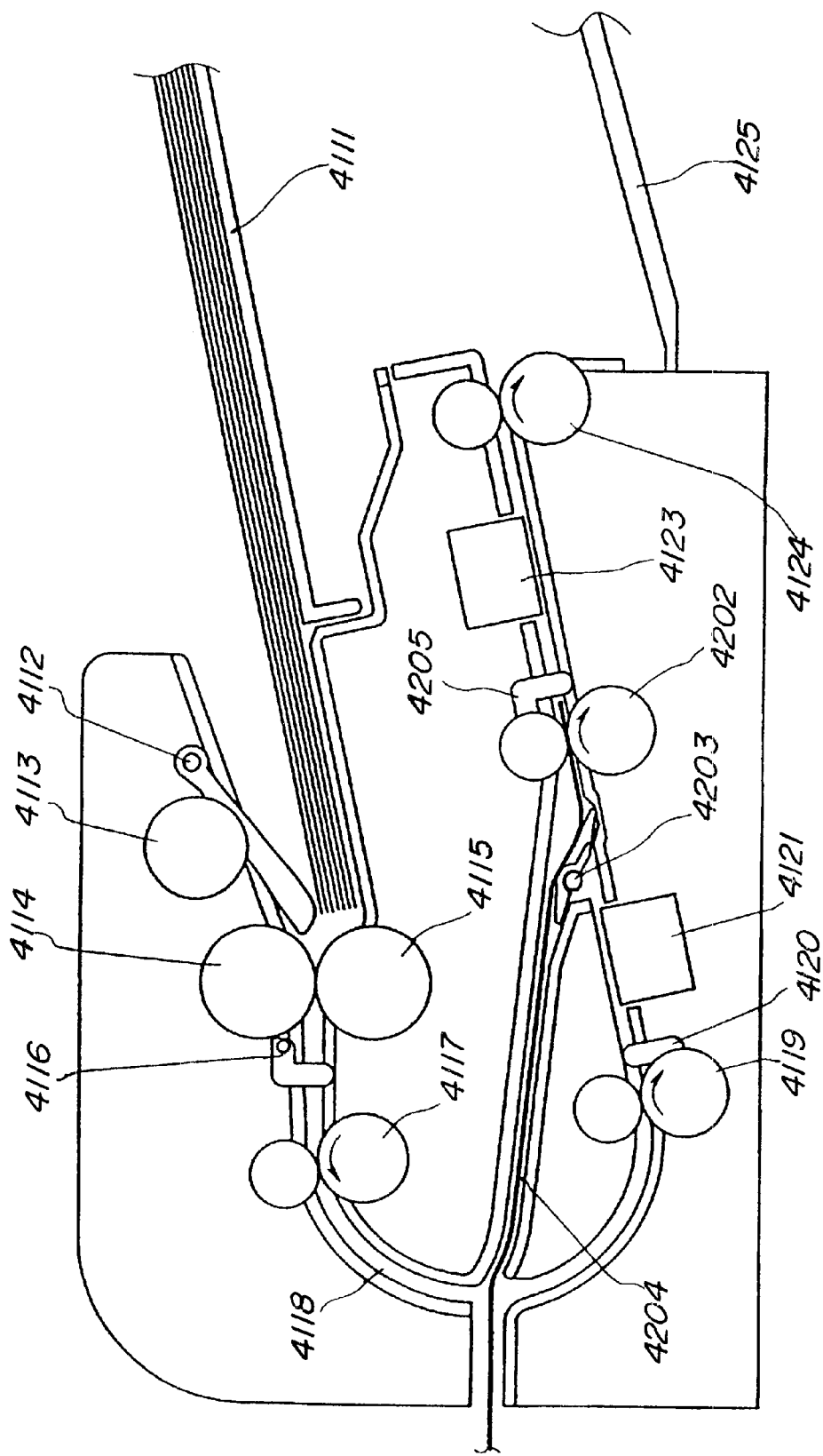

Next, when the original document edge sensor B4205 detects passage of the end of the original document (S4220), the drive motor 4126 again rotates in a forward direction (S4221, FIG. 74). The slackness of the original document is eliminated because the original document is conveyed further to the predetermined position after passing through the sheet delivering roller 4124.

Figure 75:
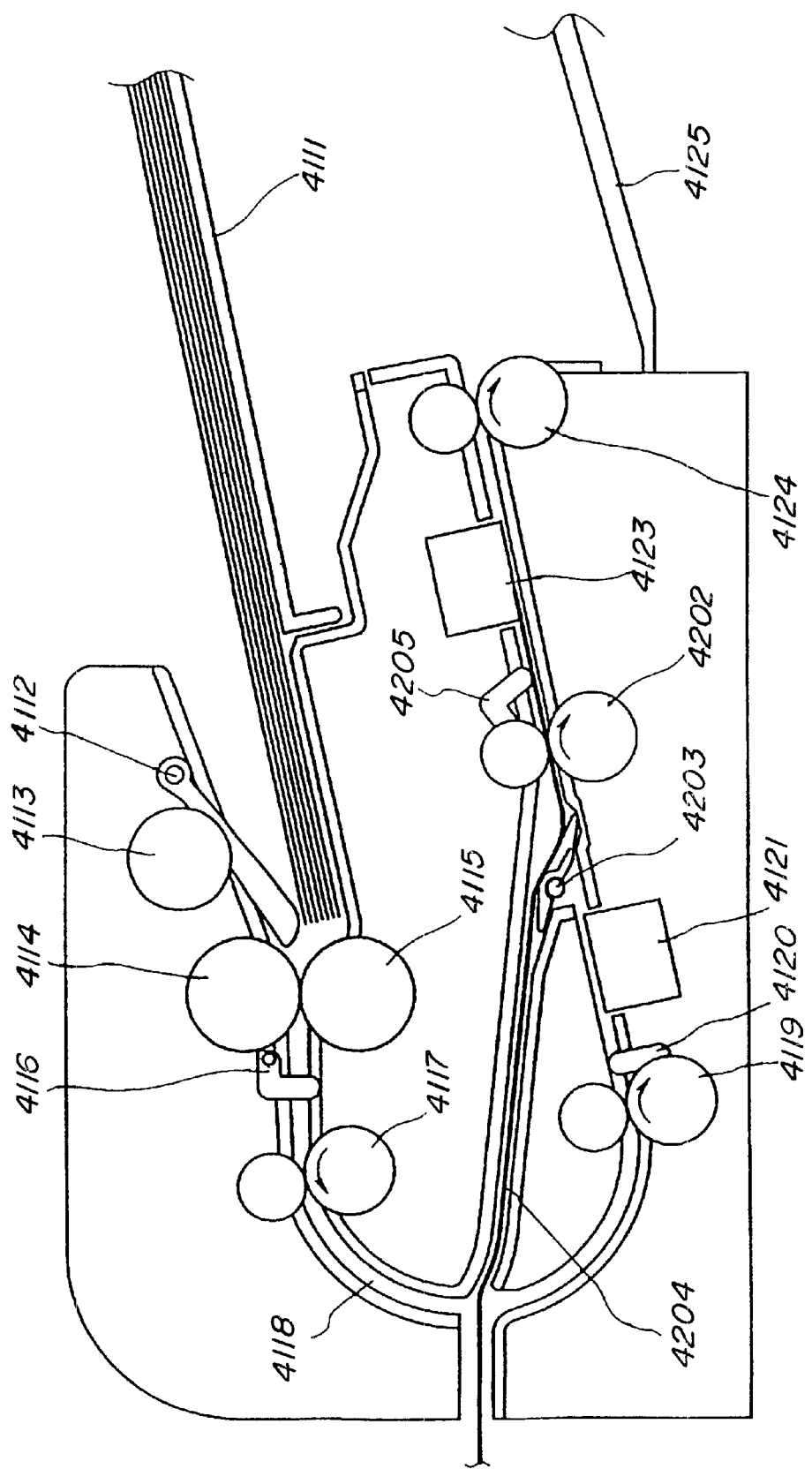

Then, when the original document edge sensor B4205 again detects the front end of the original document (S4222), the back surface reading section 4123 starts a reading operation of the back surface of the original document at a place where the original document is conveyed by a predetermined amount from the original document edge sensor B4205 (S4223, FIG. 75).

The circumferential speed of the sheet delivering roller 4124 is set so as to be slightly faster than the set original document conveying speed, and the conveying force of the roller 4124 is set so as to be lower than that of the conveying roller C4202. When the sheet delivering roller 4124 starts conveying the original document, a slight difference in the conveying speeds between the conveying roller C4202 and the sheet delivering roller 4124 applies tension to the original document, and the original document is conveyed in a position most suitable for the reading operation by the back surface reading section 4123.

Since a difference in the circumferential speeds between the conveying roller C4202 and the sheet delivering roller 4124 is slight and also since a conveying force of the sheet delivering roller 4124 is set so as to be lower than that of the conveying roller C4202, the original document is conveyed, at approximately the set original document conveying speed.

Figure 76:
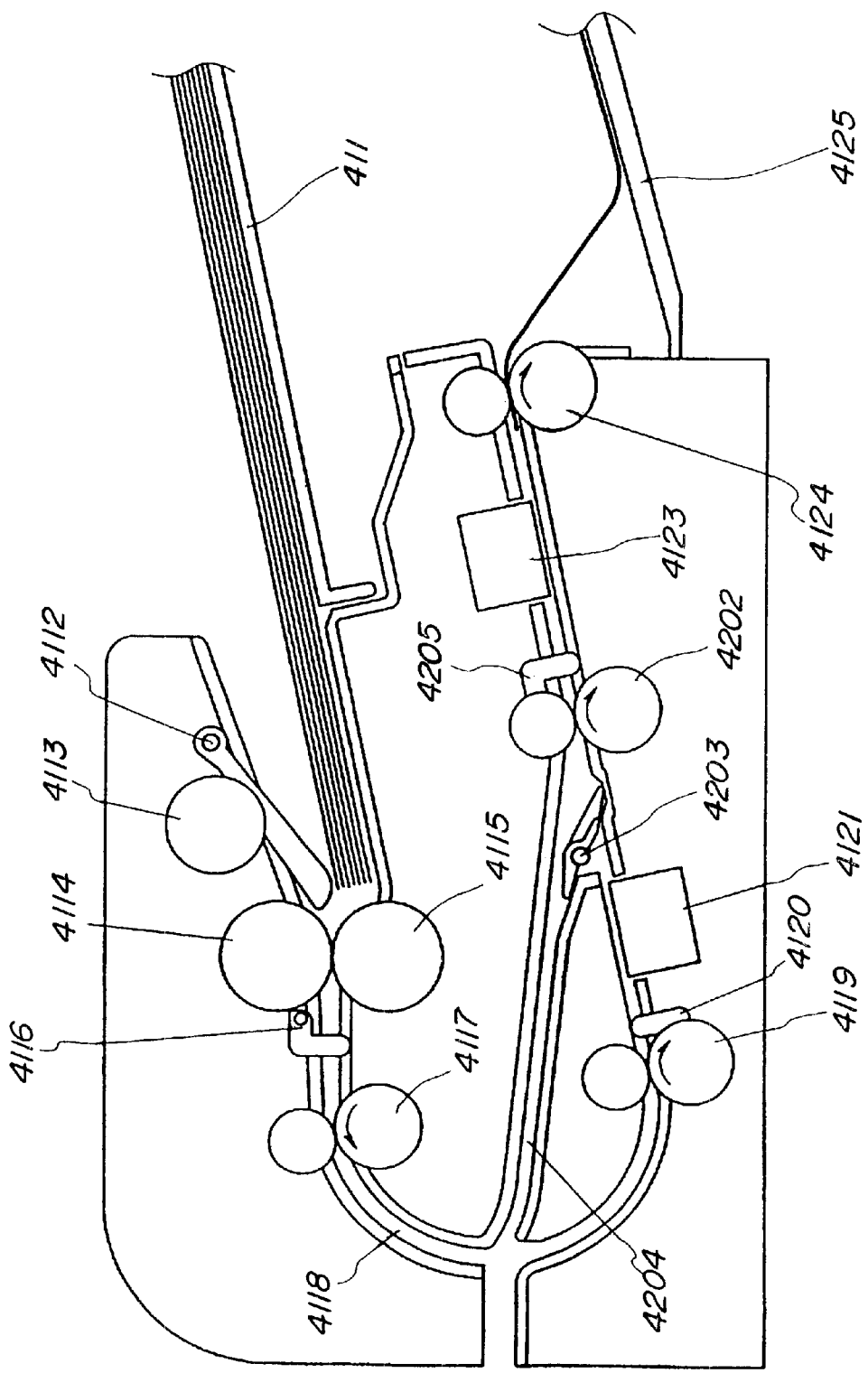

When the original document edge sensor B4205 detects the rear end of the original document (S4224), the back surface reading section 4123 finishes the reading operation of the back surface of the original document at a place where the original document is conveyed by a predetermined amount from the original document edge sensor B4205 (S4225), and consequently the sheet delivering roller 4124 delivers the original document onto the sheet delivering tray 4125 (S4226, FIG. 76).

Making the conveying speed of the sheet delivering roller 4124 faster than the set original document conveying speed can prevent the original document from being slack at the first and second reading means. That is, provided that a conveying speed of the conveying roller A4117 is V1, a conveying speed of the conveying roller B4119 is V2, a conveying speed of the sheet delivering roller 4124 is V3, and a conveying speed of the conveying roller C4202 is V4, the relation of those above is shown as $V1 \geq V2$, $V2 \geq V3$, $V4 \geq V3$, and $V2 \approx V4$.

When the original document existing-nonexisting sensor 4112 detects original documents, operation is returned to Step S4204 where the electromagnetic clutch 4127 connects the driving for the pickup roller 4113, the separating roller 4114, and the reverse roller 4115 to convey the following original documents; when no original documents are detected, then the reading operation is completed (S4227).

Consequently, by making such a structure as mentioned above, the sixth embodiment of the image reading apparatus and image forming apparatus according to the invention can improve the processing ability of the apparatus because the conveying speed of the conveying roller A4117 is set so as to offset the delay caused by the separating roller 4114 and the reverse roller 4115, and can also convey the original document in a position most suitable for a reading operation by the front surface reading section 4121 and the back surface reading section 4123 because the tension due to the slight difference between the conveying speeds of the conveying roller C4202 and the sheet delivering roller 4124 is applied to the original document, and furthermore, the embodiment of the apparatus can achieve a double-sided reading operation while further saving of space.

In the above-mentioned sixth embodiment, the description with respect to the U-turn path is made, but the same advantage is obtained by a straight path.

As apparent from the explanations, in the present invention where a conveying speed V1 of the first conveying means arranged downstream of the original document feeding means, a conveying speed V2 of the second conveying means arranged upstream of the first image reading means, and a conveying speed V3 of the third conveying means arranged downstream of the second image reading means satisfy the condition $V1 \geq V2$, $V2 \leq V3$, such an image reading apparatus and an image forming apparatus can be provided where the first conveying means can eliminate the delay of the conveying speed caused by the automatic original document feeding means; the original document can be conveyed at a set original document conveying speed; and then, by positioning the first conveying means adjacent to the automatic original document feeding means, the delay of the conveying speed by the automatic original document feeding means can immediately be eliminated, thereby making it possible to improve the processing ability.

Also, since the first conveying means eliminates the delay of the conveying speed by the automatic original document feeding means, such an image reading apparatus and an image forming apparatus can be provided where the original document can be conveyed, during the reading operation at the first image reading means, variably at a set original document conveying: speed due to the second conveying means having a circumferential speed of the set original document conveying speed, and where the original document can be conveyed, during the reading operation at the second image reading means, variably at a set original document conveying speed due to the conveyance by the second conveying means having a circumferential speed of the original document conveying speed.

In addition, tension is applied to the original document by a slight difference in the circumferential speeds between the second conveying means and the third conveying means, and consequently the original document can be conveyed in a position most suitable for reading operations by the first and the second image reading means, thus providing an image reading apparatus and an image forming apparatus capable of constantly obtaining good images on both the front and the back sides without image stretching or image shocks.

In the present invention where a conveying speed V1 of the first conveying means arranged downstream of the original document feeding means, a conveying speed V2 of the second conveying means arranged upstream of the first image reading means, a conveying speed V3 of the third conveying means arranged downstream of the second image reading means, and a conveying speed V4 of the fourth conveying means arranged between the first image reading means and the second image reading means satisfy the condition $V1 \geqq V2$, $V4 \leqq V3$, $V2 \approx V4$, such an image reading apparatus and an image forming apparatus can be provided where the first conveying means can eliminate the delay of the conveying speed caused by the automatic original document feeding means; the original document can be conveyed at a set original document conveying speed; and then, by positioning the first conveying means adjacent to the automatic original document feeding means, the delay of the conveying speed by the automatic original document feeding means can immediately be eliminated, making it possible to maximize the processing ability.

Furthermore, tension is applied to the original document by a slight difference in the circumferential speeds between the third conveying means and the fourth conveying means, and, consequently, the original document can be conveyed in a position most suitable for reading operations by the first and the second image reading means, thus providing an image reading apparatus and an image forming apparatus capable of constantly obtaining good images on both the front and the back sides without image stretching or image shocks.

[Seventh Embodiment]

An image reading apparatus according to a seventh embodiment will hereinafter be described with reference to FIG. 77 to FIG. 89. In the present embodiment, a structure of an image reading apparatus in a facsimile machine is explained by way of example.

Figure 78:
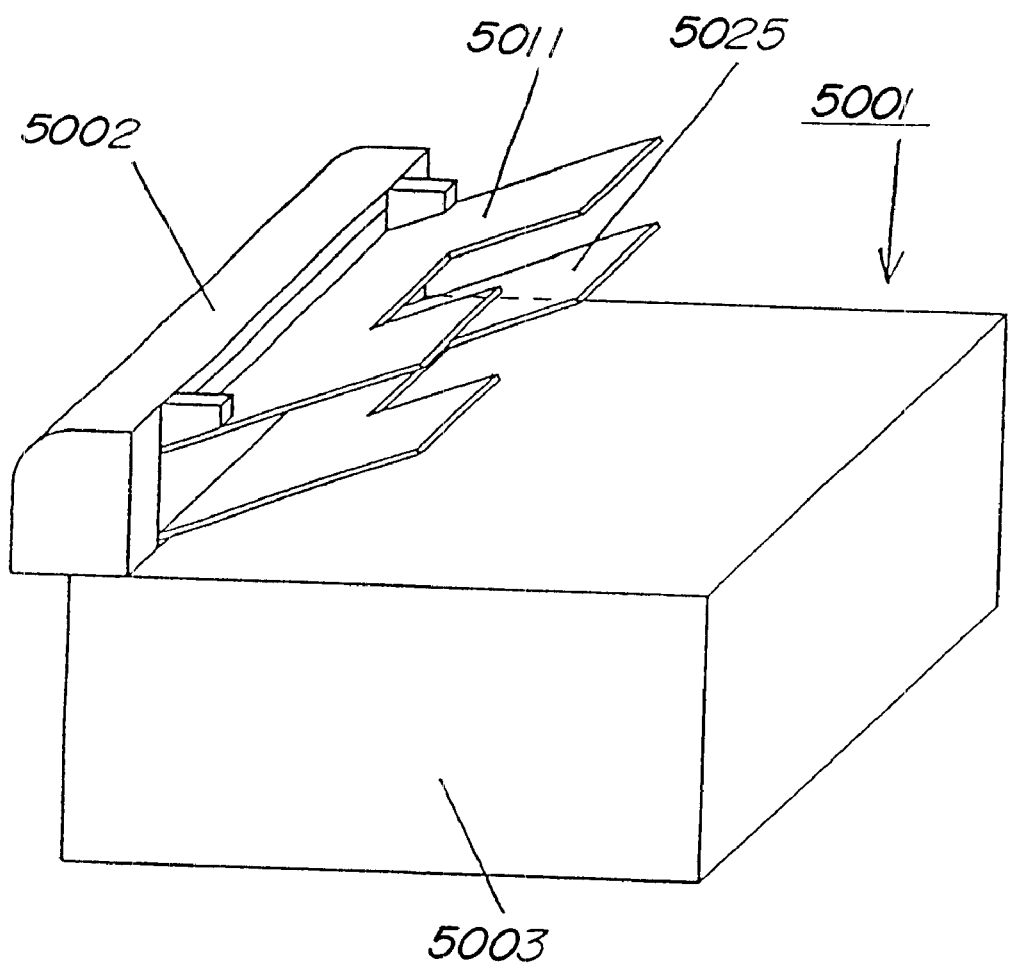
FIG. 78 is a perspective view showing an exterior appearance of a facsimile machine mounting the image reading apparatus according to the seventh embodiment.

FIG. 78 is a perspective view showing an exterior appearance of a facsimile machine. In FIG. 78, numeral 5001 refers to a main body of the machine; numeral 5002 refers to an image reading section according to the invention arranged in an upper portion of the machine main body 5001; numeral 5003 refers to an image forming section arranged in a lower portion of the machine main body 5001; numeral 5011 refers to an original document mounting tray on which original documents D are set; and numeral 5025 refers to a sheet delivering tray.

Figure 77:
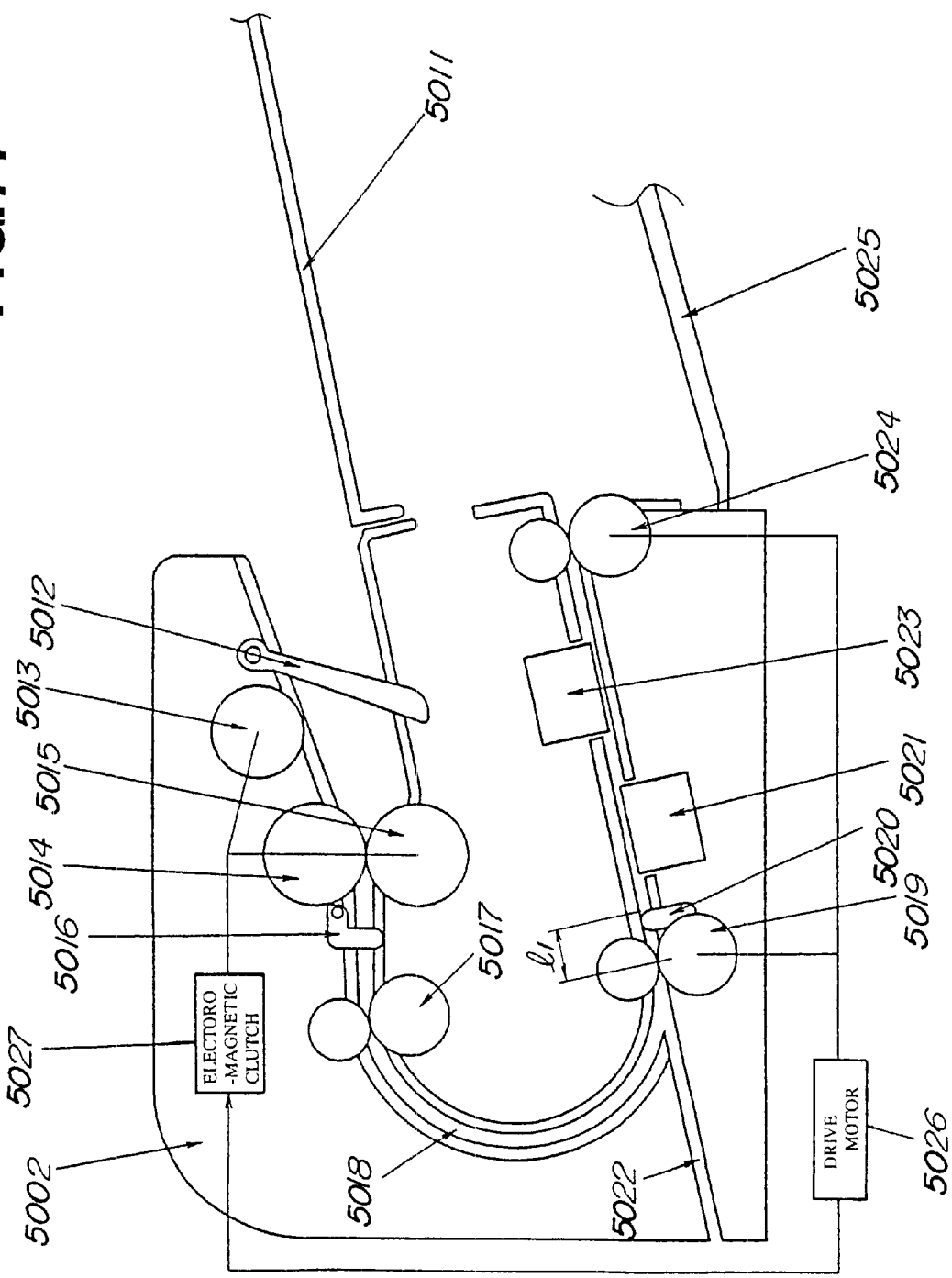
FIG. 77 is a cross-sectional view showing an image reading apparatus of a seventh embodiment.

FIG. 77 is a typified cross-sectional view showing a schematic structure of the image reading section in the facsimile machine. In FIG. 77, numeral 5012 is an original document existing-nonexisting detecting sensor for detecting original documents D which are set on the original document mounting tray 5011; numeral 5013 is a pickup roller for feeding the original documents D thus set into the interior of the image reading section 5002; numerals 5014 and 5015 are respectively a separating roller and a reverse roller working in cooperation with each other for separating the original documents D sheet by sheet and for feeding a separated sheet of the original documents; numeral 5016 is an original document feeding sensor for detecting a front end or rear end of the separated original document D; numeral 5017 is a first conveying roller pair for conveying the separated original document D to a U-turn path 5018 which is a U-turn shaped conveying route; numeral 5019 is a second conveying roller pair for conveying the original document D after performing a U-turn to a front surface reading section 5021 composed of a pressing type image sensor; numeral 5020 is an original document edge sensor for detecting a front end and rear end of the original document D in order to determine the timing of starting and finishing of the reading operation of the original document; numeral 5022 is a reverse path serving as a conveying route for the original document during its reverse movement; numeral 5023 is a back surface reading section composed of a pressing type image sensor; numeral 5024 is a forward and reverse rotatable sheet delivering roller pair for delivering the original document after being read onto the sheet delivering tray 5025; numeral 5026 is a drive motor for driving the pickup roller 5013, the separating roller 5014, the reverse roller 5015, the first conveying roller pair 5017, the second conveying roller pair 5019, and the sheet delivering roller pair 5024; and numeral 5027 is an electromagnetic clutch for temporarily blocking the driving provided by the drive motor 5026 for the pickup roller 5013, the separating roller 5014 and the reverse roller 5015.

In the descriptions given below with reference to FIG. 80 to FIG. 89, V5 indicates an original document conveying speed set for a reading operation; V6 indicates a reverse conveying speed faster than the set original document conveying speed V5; t2 is a time starting from a moment when an end of an original document arrives at the original document edge sensor 5020 when conveyed at a reverse conveying speed V6 until a moment when the original document edge sensor 5020 starts detecting the end of the original document; l1 is a distance from the second conveying roller pair 5019 to the original document edge sensor 5020; and l2 is a distance required for the original document at a reverse conveying speed V6 to be stopped.

The image reading section 5002 is structured so as to be suitably controlled by the controlling circuit (controlling means) although not shown in the figures; for example, control is excercised over an image processing circuit (image processing means) for processing the image information of the original document D read by the front surface reading section 5021 and the back surface reading section 5023 as well as a switching circuit (switching means) for switching, as an inputting source of the image information, to the front surface reading section 5021 or to the back surface reading section 5023. Or, based on detecting signals from the original document existing-nonexisting detecting sensor 5012, original document feeding sensor 5016, original document edge sensor 5020 or the like, control is excercised over driving or drive switching by the drive motor 5026 which rotationally drives the pickup roller 5013, separating roller 5014, and reverse roller 5015 constituting the original document feeding means as well as the first conveying roller pair 5017, the second conveying roller pair 5019, and the sheet delivering roller pair 5024 constituting the original document conveying means; turning-on or -off of the electromagnetic clutch 5027 for temporarily blocking the driving of the drive motor 5026 for the pickup roller 5013, separating roller 5014, and the reverse roller 5015; and timing of starting and finishing of a reading operation by the front surface reading section 5021 and the back surface reading section 5023.

Next, the operation of the image reading section 5002 will be explained based on the flow chart shown in FIG. 79 with reference to FIG. 80 to FIG. 89.

Figure 80:
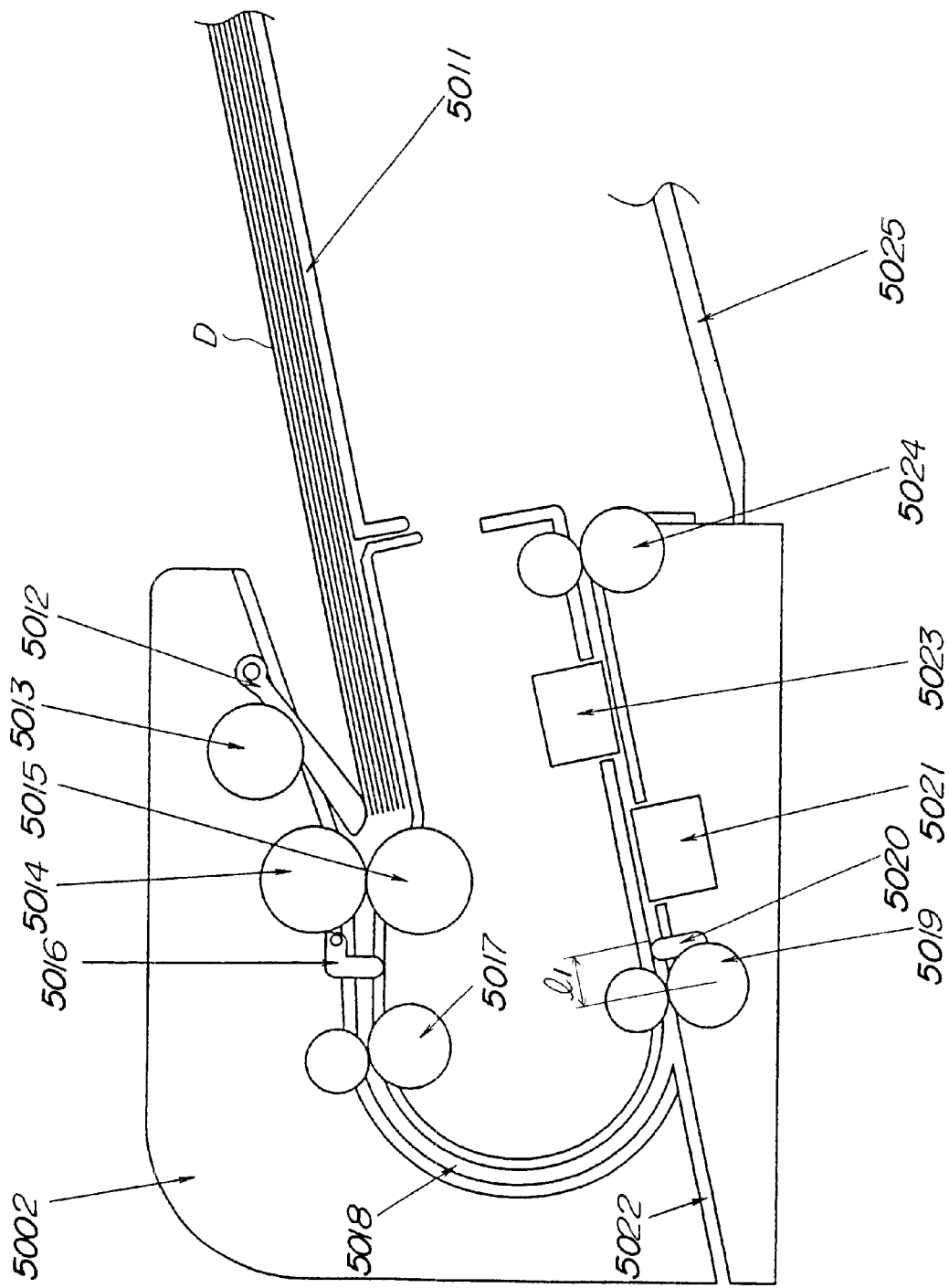
FIG. 80 to FIG. 89 are illustrations showing operations of the image reading apparatus according to the seventh embodiment.

When a user sets original documents D on the original document mounting tray 5011 (S5101), the original document existing-nonexisting detecting sensor 5012 detects the original documents (See, S5102, FIG. 80).

The user selects a double-sided reading mode, and then directs the start of a reading operation (S5103). Here, when the one-sided reading mode is selected, the operation is switched to the conventionally known one-sided reading operation (detailed description omitted).

After receiving the direction for starting a reading operation, the electromagnetic clutch 5027 connects the driving for the pickup roller 5013, the separating roller 5014, and the reverse roller 5015 (S5104).

The drive motor 5026 rotates in a forward direction (S5105), and then the pickup roller 5013 directly presses the original documents D set on the original document mounting tray 5011 to start picking-up and conveying the original document D into the inside of the apparatus (S5106).

Figure 81:
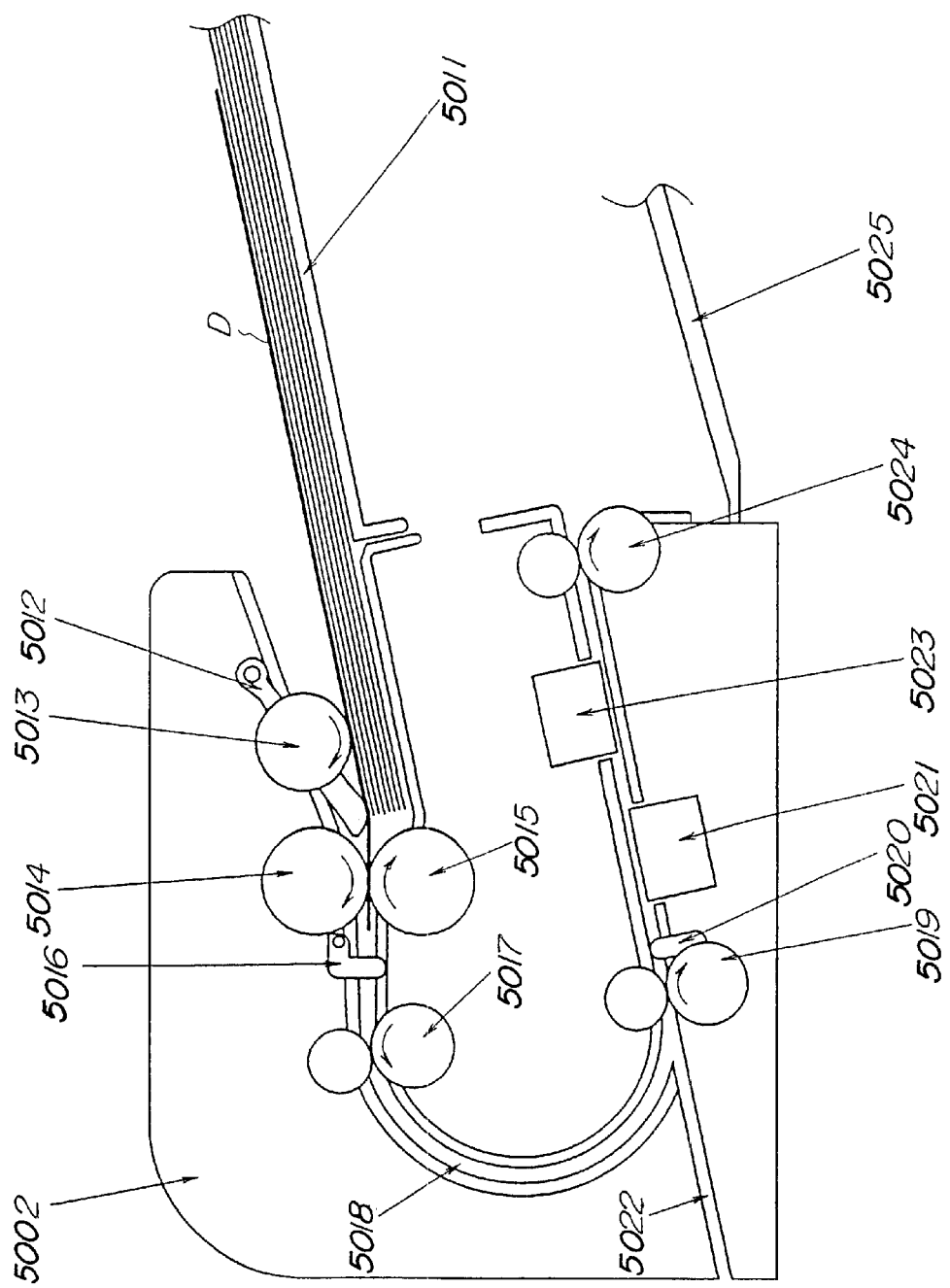

The original documents D after being picked-up and conveying are to be separated by the separating roller 5014 and the reverse roller 5015, and an uppermost sheet of the original documents D is fed separately (See, S5107, FIG. 81). At this time, a conveying speed by the separating roller 5014 is slower than the set original document conveying speed V5 in order to reduce damage to the original documents at the time of separation, and it is also slower because it is subjected to conveying resistance given by the reverse roller 5015.

Figure 82:
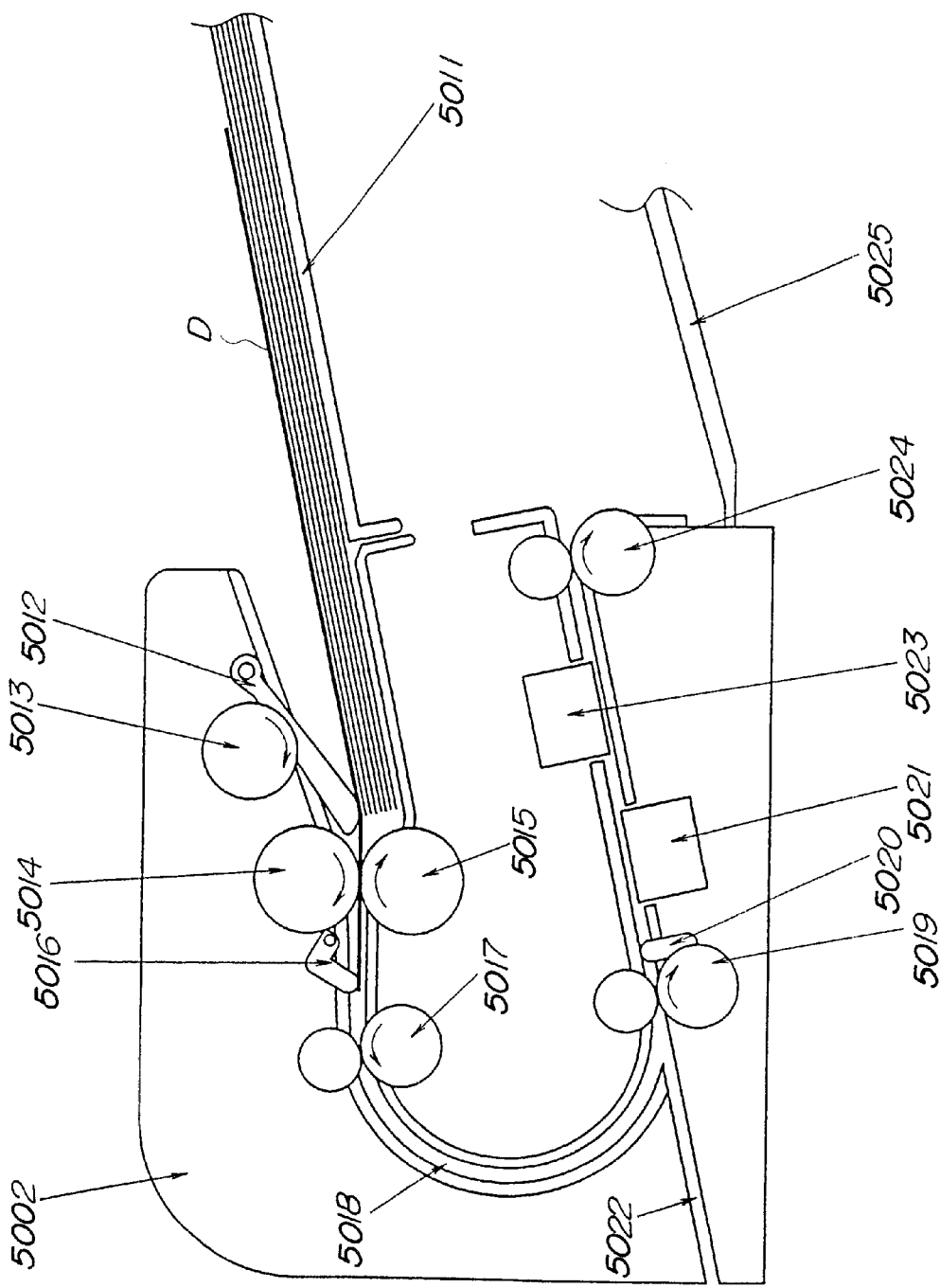

When the original document feeding sensor 5016 detects the front end of the original documents D (S5108), feeding of the original document by the pickup roller 5013 is cancelled (See, S5109, FIG. 82).

The separated original document D is conveyed to the U-turn path 5018 by the first conveying roller pair 5017 having a circumferential speed faster than the set original document conveying speed V5 (S5110). At this time, the first conveying roller pair 5017 offsets the delay which is produced by the separating roller 5014 and the reverse roller 5015, and the original document is conveyed at approximately the set original document conveying speed V5. The circumferential speed of the first conveying roller pair 5017 is set beforehand so as to offset the delay by the separating roller 5014 and the reverse roller 5015.

Figure 83:
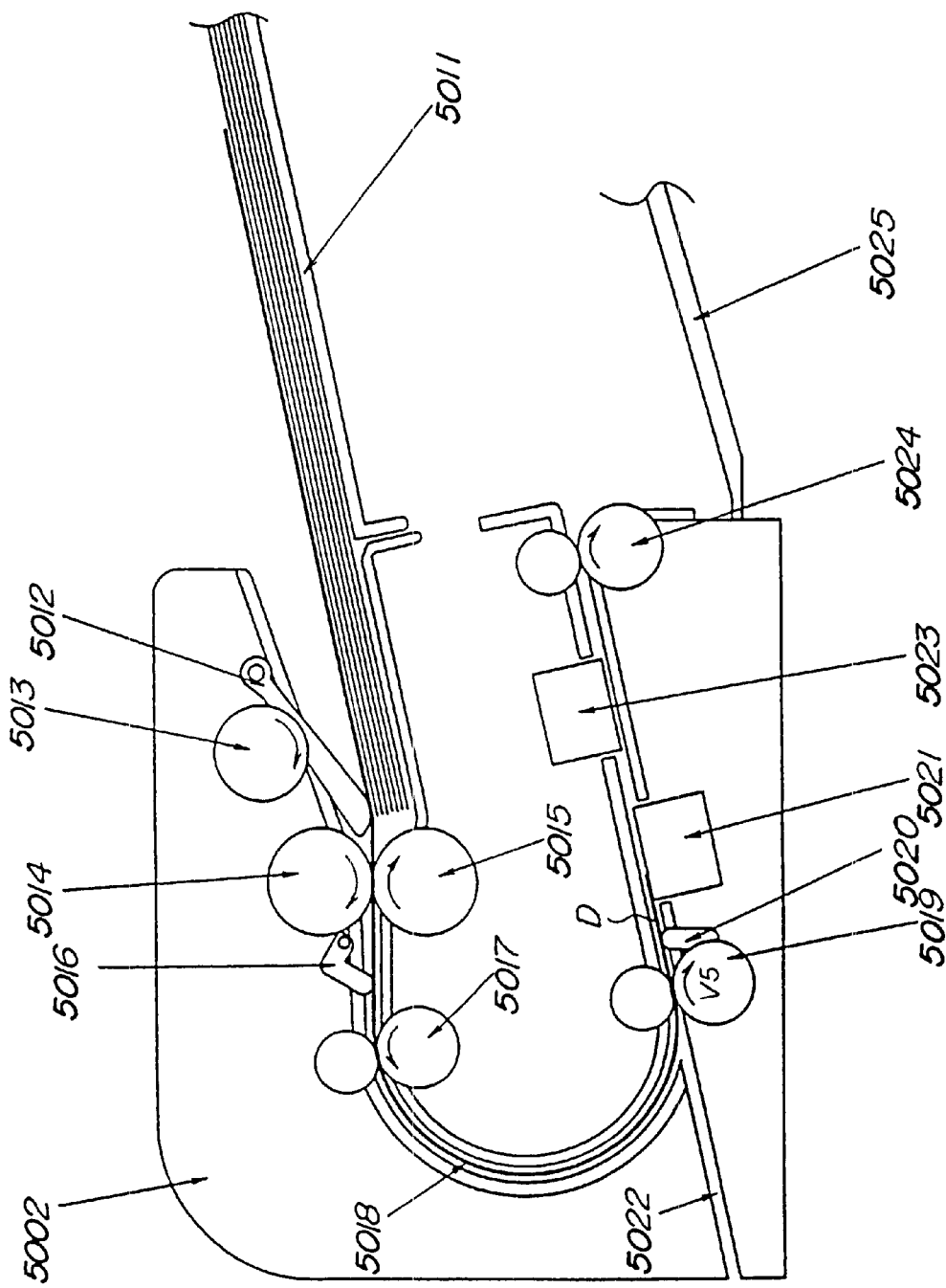

Then, the second conveying roller pair 5019 having a circumferential speed of approximately the set original document conveying speed V5 conveys the original document D, and when the original document edge sensor 5020 detects the front end of the original document D (S5111), the front surface reading section 5021 starts a reading operation of the front surface of the original document at a place where the original document D is conveyed by a predetermined amount from the original document edge sensor 5020 (See, S5112, FIG. 83). The original document D is conveyed at approximately the set original document conveying speed V5. The circumferential speed of the sheet delivering roller pair 5024 is set so as to be slightly faster than the set original document conveying speed V5, and the conveying force of the roller pair 5024 is set so as to be lower than that of the second conveying roller pair 5019. When the sheet delivering roller pair 5024 starts conveying the original document D, a slight difference in the circumferential speeds between the second conveying roller pair 5019 and the sheet delivering roller pair 5024 applies tension to the original document, and, therefore, the original document is conveyed in a position most suitable for reading operations by the front surface reading section 5021 and the back surface reading section 5023. In addition, because the difference in the circumferential speeds between the second conveying roller pair 5019 and the sheet delivering roller pair 5024 is slight and also because a conveying force of the sheet delivering roller pair 5024 is set so as to be lower than that of the second conveying roller pair 5019, the original document is conveyed, at approximately the set original document conveying speed V5.

Figure 84:
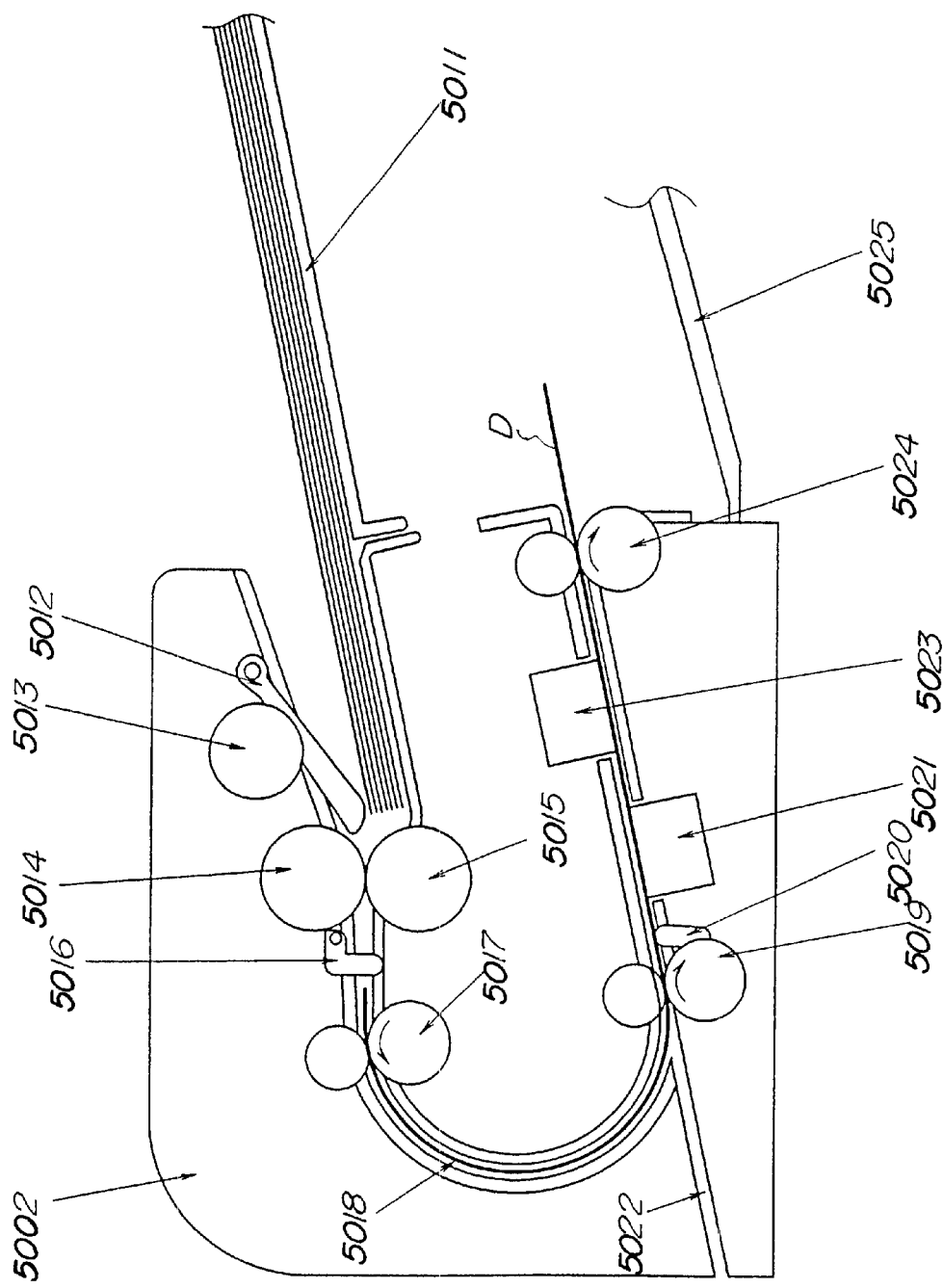

When the original document feeding sensor 5016 detects the rear end of the original document D (S5113), the electromagnetic clutch 5027 blocks the driving for the pickup roller 5013, the separating roller 5014, and the reverse roller 5015, and consequently the following original documents are stopped without being conveyed (See, S5114, FIG. 84).

Figure 85:
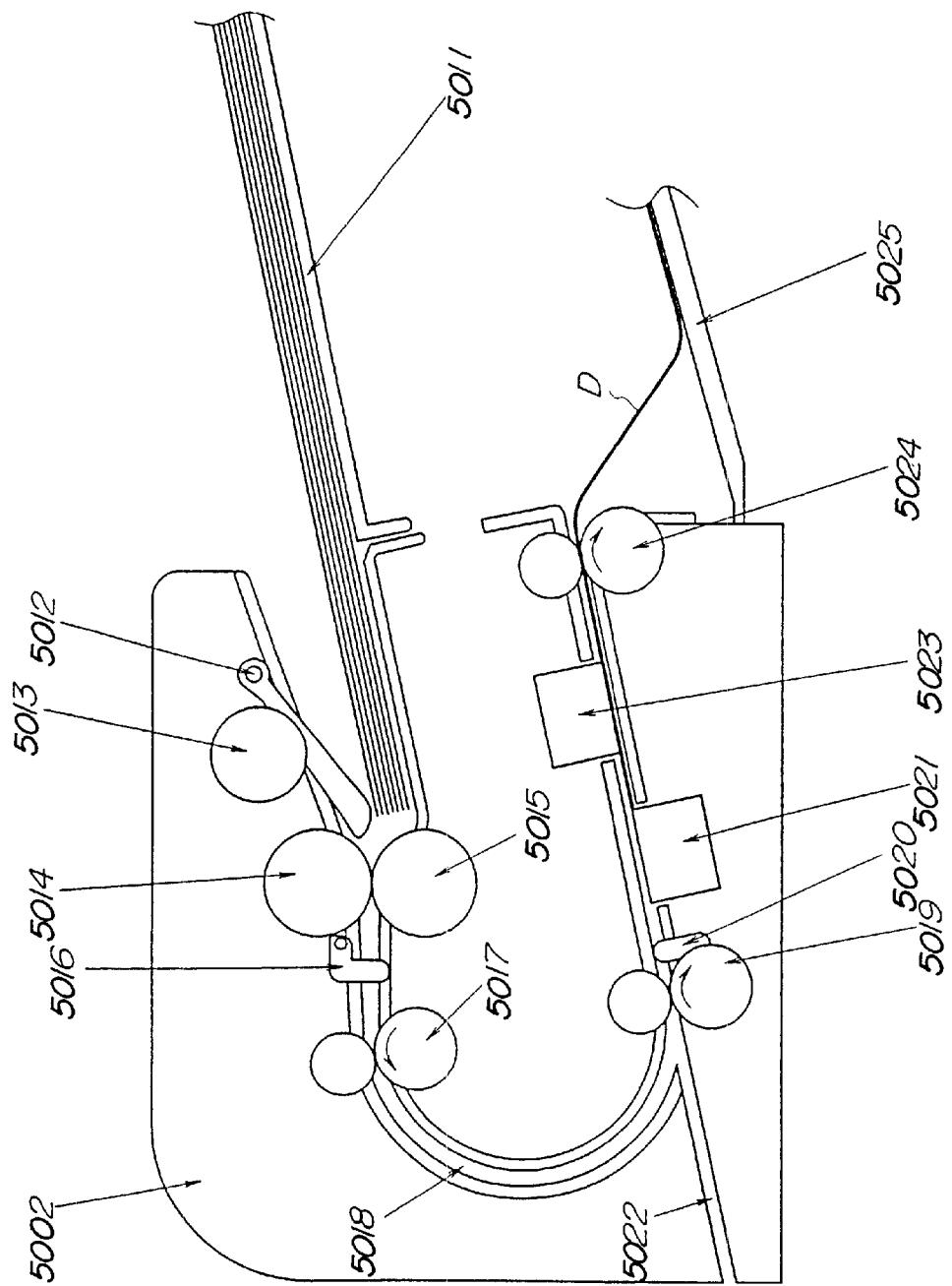

When the original document edge sensor 5020 detects the rear end of the original document D (S5115), the front surface reading section 5021 finishes the reading operation of the front surface of the original document at a place where the original document is conveyed by a predetermined amount from the original document edge sensor 5020 (See, S5116, FIG. 85).

Figure 86:
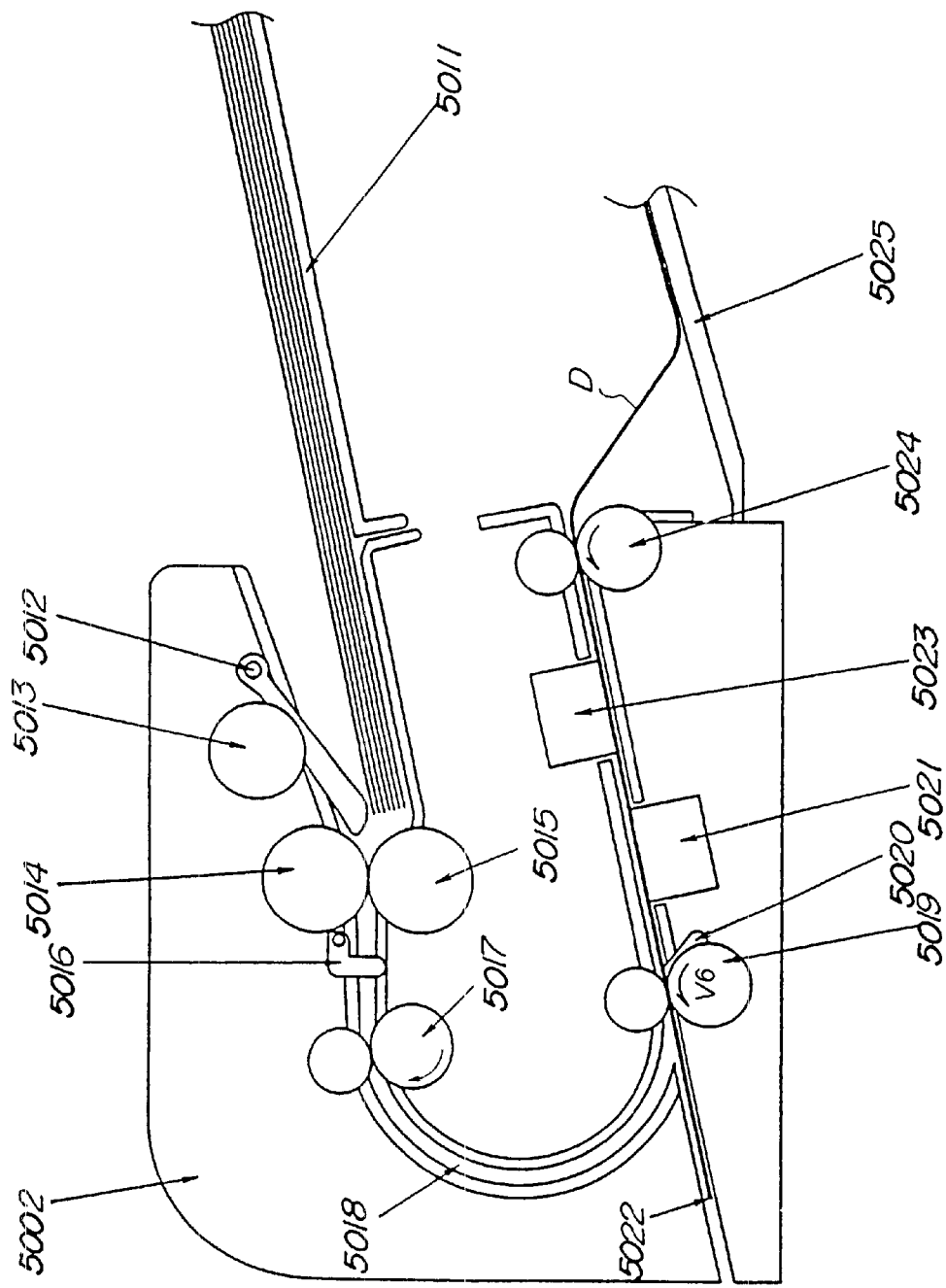
Figure 87:
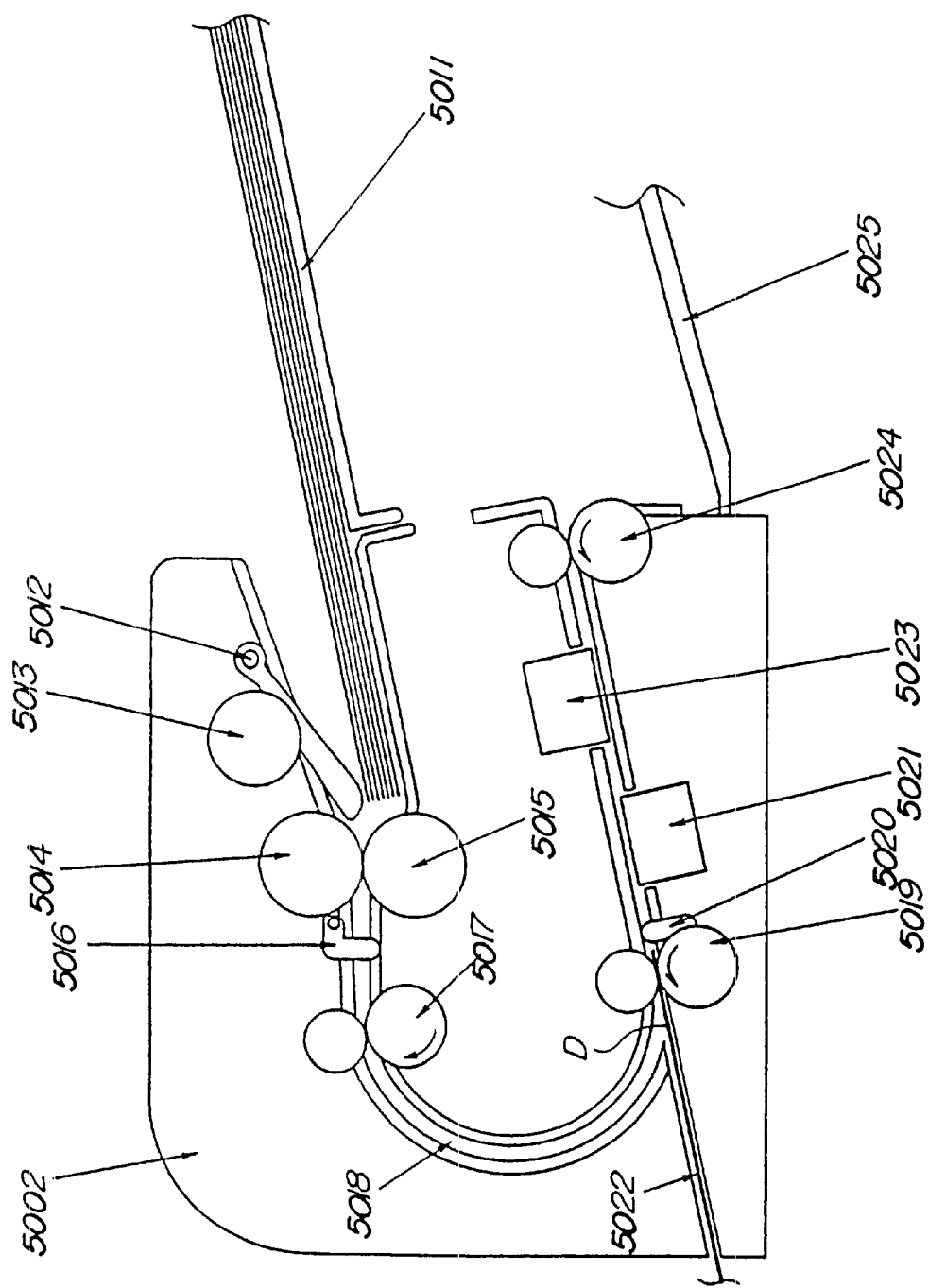

After the reading operation of the front surface of the original document is completed, the drive motor 5026 rotates in a reverse direction (S5117), and the original document D is conveyed by the second conveying roller pair 5019 and the sheet delivering roller 5024 in a reverse direction at a reverse conveying speed V6 which is faster than the approximately set original document conveying speed V5, and is then conveyed to the reverse path 5022 by means of the shape of the intersecting portion of the U-turn path 5018 and the reverse path 5022 (See, S5118, FIG. 86). At this time, since the original document D is conveyed at a reverse conveying speed V6 which is faster than the approximately set original document conveying speed V5 (V5≦V6), the processing speed in a double-sided reading operation becomes fast, thereby increasing operating efficiency. Although the original document D becomes slack little by little between the second conveying roller pair 5019 and the sheet delivering roller pair 5024 by the difference in those circumferential speeds, there is no influence on images because the front surface reading section 5019 and the back surface reading section 5023 do not conduct reading operations during the reverse movement of the original document D.

Because the distance l1 between the original document edge sensor 5020 and the second conveying roller pair 5019 is set so as to be longer than a combined distance of V6×t2, which is a conveyance distance until the original document edge sensor 5020 detects the end of the original document, plus l2, which is a distance required for the original document at a reverse conveying speed V6 to be stopped (l1>V6×t2+l2), the original document will not go out of the second conveying roller pair 5019, with the result that re-conveyance cannot be conducted.

When the original document edge sensor 5020 detects passage of the end of the original document D (See, S5119, FIG. 87), conveying of the original document in a reverse direction is stopped. Then, the drive motor 5026 again rotates in a forward direction (S5120). At this moment, the slackness of the original document is eliminated because the original document is conveyed further to the predetermined position after passing through the sheet delivering roller pair 5024.

Figure 88:
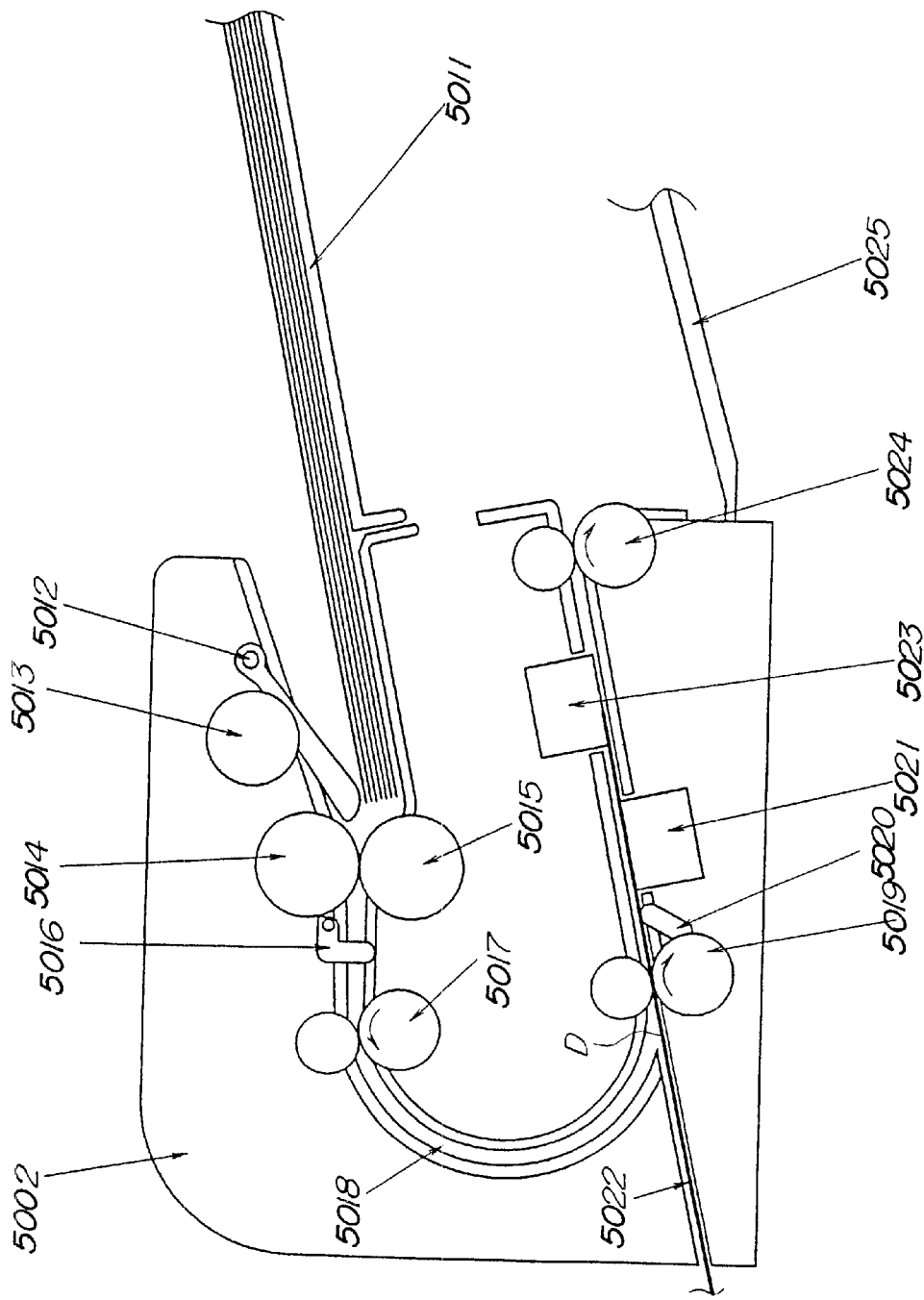

When the original document edge sensor 5020 again detects the front end of the original document D (S5121), the back surface reading section 5023 starts reading operation of the back surface of the original document at a place where the original document is conveyed by a predetermined amount from the original document edge sensor 5020 (See, S5122, FIG. 88). As for the conveying state of the original document, there is a difference between conveyance (during the reading operation of the front surface of the original document) by both the first conveying roller pair 5017, set at a speed so as to offset the delay produced by the separating roller 5014 and the reverse roller 5015 (approximately set to the original document conveying speed V5), and the second conveying roller pair 5019 having a circumferential speed of approximately the set original document conveying speed V5, and conveyance (during the reading operation of the back surface of the original document) only by the second conveying roller pair 5019 having a circumferential speed of approximately the set original document conveying speed V5, but the original document conveying speed during the reading operation of the back surface of the original document is the same as the speed during the reading operation of the front surface of the original document because the original document is conveyed at approximately the set original document conveying speed V5 in the both cases.

Figure 89:
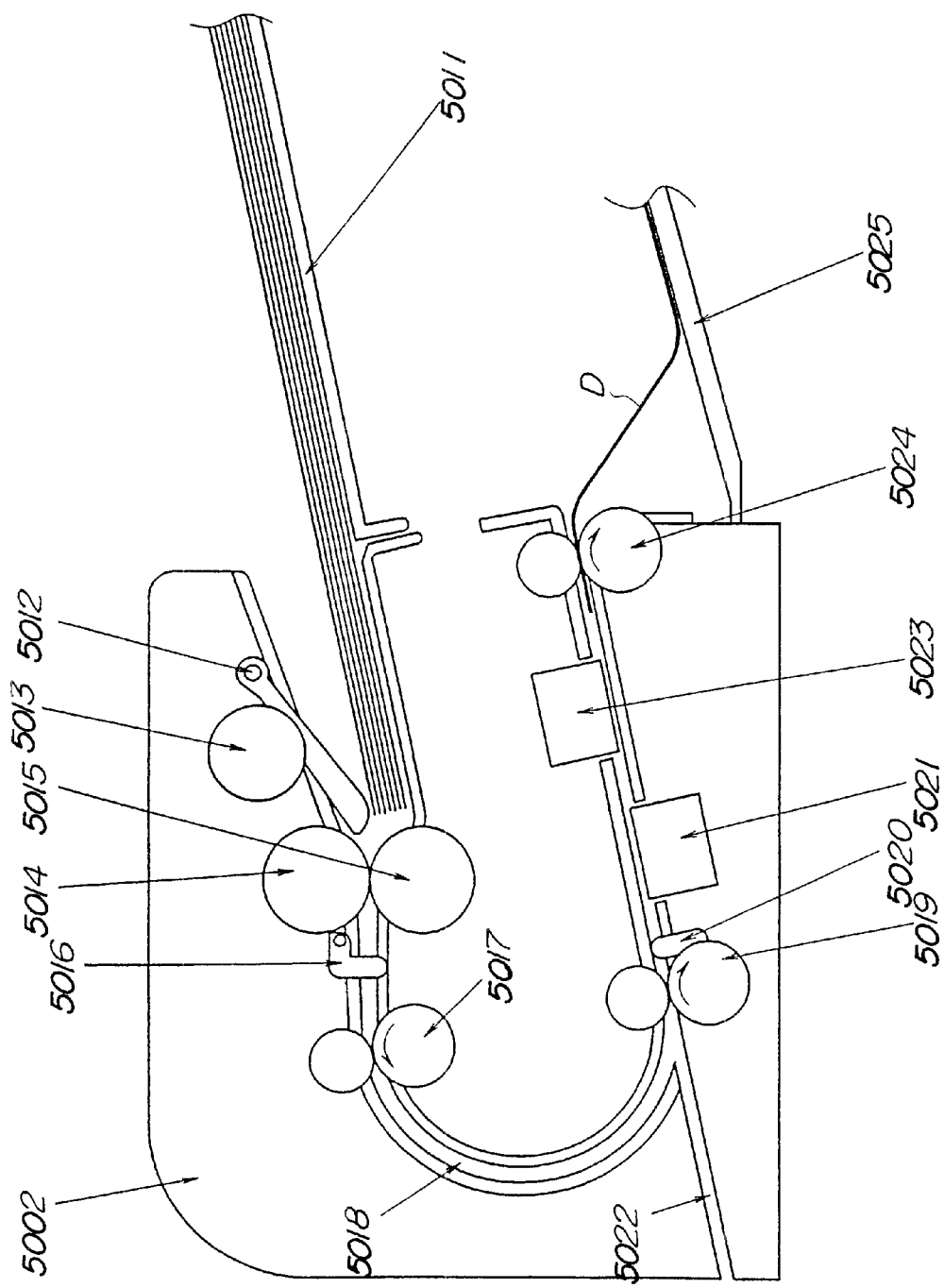

When the original document edge sensor 5020 detects the rear end of the original document D (S5123), the back surface reading section 5023 finishes the reading operation of the back surface of the original document at a place where the original document is conveyed by a predetermined amount from the original document edge sensor 5020 (S5124), and consequently the original document D is delivered by the sheet delivering roller pair 5024 onto the sheet delivering tray 5025 (See, S5125, FIG. 89). Making the circumferential speed of the sheet delivering roller pair 5024 slightly faster than the set original document conveying speed V5 can prevent the original document from being slack at the first reading section 5021 and the back surface reading section 5023.

Then, when the original document existing-nonexisting detecting sensor 5012 detects original documents D, operation is returned to Step S5104 where the electromagnetic clutch 5027 connects the driving for the pickup roller 5013, the separating roller 5014, and the reverse roller 5015 to convey the following original documents; when no original documents are detected, then the reading operation is completed (S5126).

According to this embodiment, as mentioned above, the reverse conveying speed V6 as a conveying speed at the time of conveying the original document in a reverse direction is set so as to be faster than approximately the set original document conveying speed V5 as a conveying speed at the time of reading images, and therefore, the operation time for double-sided reading is reduced, thus making it possible to increase efficiency.

In addition, because the distance l1 between the second conveying roller pair 5019 and the original document edge sensor 5020 (See, FIG. 80) is set so as to be longer than the reverse conveying distance after the detection of the original document edge sensor, or V6×t2+l2, this can prevent the situation that the original document D goes out of the nip part of the second conveying roller pair 5019, with the result that the second conveying roller pair 5019 cannot convey again the original document D.

[Eighth Embodiment]

An image reading apparatus according to an eighth embodiment will hereinafter be described with reference to FIG. 90 to FIG. 101. In the present embodiment, a structure of an image reading apparatus in a facsimile machine is explained by way of example.

As for the following descriptions, members having approximately the same functions as those in the above-mentioned embodiments are given the same numerals.

Figure 90:
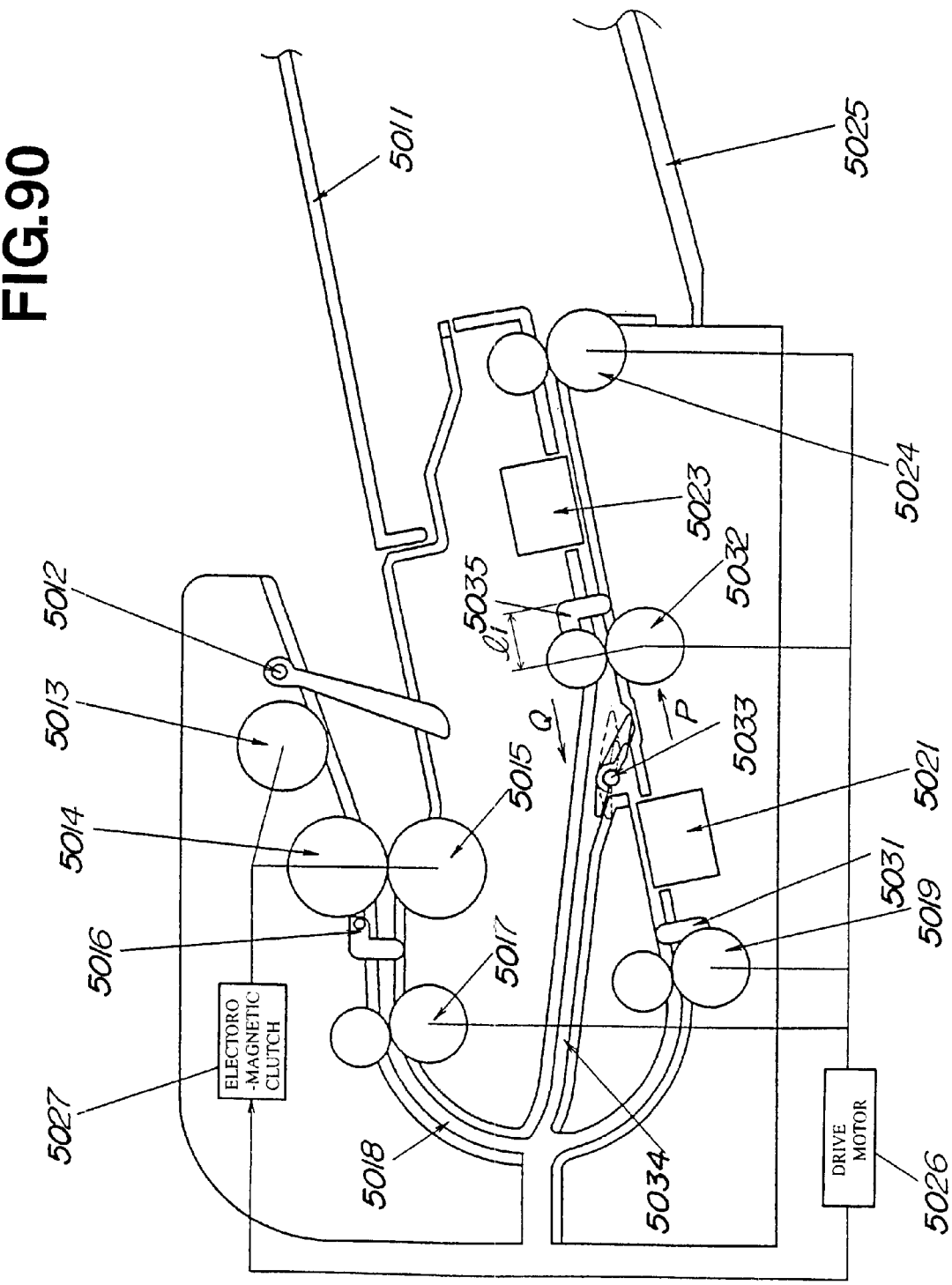
FIG. 90 is a cross-sectional view showing an image reading apparatus of an eighth embodiment.

FIG. 90. is a typical cross-sectional view showing a schematic structure of the image reading section in the facsimile machine. In FIG. 90, numeral 5011 is an original document mounting tray on which original documents D are set; numeral 5012 is an original document existing-nonexisting detecting sensor for detecting the set original documents D on the original document mounting tray 5011; numeral 2013 is a pickup roller for feeding the original documents D thus set to the interior of the image reading section 5002; numerals 5014 and 5015 are respectively are a separating roller and a reverse roller working in cooperation with each other for separating the sent original documents D sheet by sheet and for feeding a separated sheet of the original documents; numeral 5016 is an original document feeding sensor for detecting a front end or rear end of the separated original document D; numeral 5017 is a first conveying roller pair for conveying the separated original document D to a U-turn path 5018 which is a U-turn shaped conveying route; numeral 5019 is a second conveying roller pair for conveying the original document D after performing a U-turn to a front surface reading section 5021 composed of a pressing type image sensor; numeral 5031 is a first original document edge sensor for detecting a front end and rear end of the original document D in order to determine timing of starting and finishing of the reading operation of the front surface of the original document by the front surface reading section 5021; numeral 5032 is a forward and reverse rotatable third conveying roller pair for conveying the original document D further downstream when the front surface is read; numeral 5033 is a conveying route switching flapper which is open when an end of the original document enters from a forward direction (Arrow P direction), or which is closed when an end of the original document enters from a reverse direction (Arrow Q direction) to lead the original document to the reverse path 5034; numeral 5035 is a second original document edge sensor for detecting a front end or rear end of the original document D in order to determine the timing of starting and finishing of the reading operation of the back surface of the original document by a back surface reading section 5023 composed of a pressing type image sensor; numeral 5024 is a forward and reverse rotatable sheet delivering roller pair for delivering the original document when the reading operation is completed onto the sheet delivering tray 5025; numeral 5026 is a drive motor for driving the pickup roller 5013, the separating roller 5014, the reverse roller 5015, the first conveying roller pair 5017, the second conveying roller pair 5019, the third conveying roller pair 5032, and the sheet delivering roller pair 5024; and numeral 5027 is an electromagnetic clutch for temporarily blocking the driving provided by the drive motor 5026 for the pickup roller 5013, the separating roller 5014 and the reverse roller 5015.

In the descriptions made below with reference to FIG. 92 to FIG. 101, V5 indicates an original document conveying speed set for the reading operation; V6 indicates a reverse conveying speed which is faster than the set original document conveying speed V5; t2 is a time starting from a moment when an end of an original document arrives at the second original document edge sensor 5035 when conveyed at a reverse conveying speed V6 until a moment where the second original document edge sensor 5035 detects the end of the original document; l1 is a distance from the third conveying roller pair 5032 to the second original document edge sensor 5035; and l2 is a distance required for the original document at a reverse conveying speed V6 to be stopped.

The image reading section 5002 is structured so as to be suitably controlled by the controlling circuit (controlling means) although not shown in the figures; for example, control is excercised over an image processing circuit (image processing means) for processing the image information of the original document D read by the front surface reading section 5021 and the back surface reading section 5023 as well as a switching circuit (switching means) for switching, as an inputting source of the image information, to the front surface reading section 5021 or to the back surface reading section 5023. Or, based on detecting signals from the original document existing-nonexisting detecting sensor 5012, original document feeding sensor 5016, first original document edge sensor 5031, second original document edge sensor 5035 or the like, control is excercised over driving or drive switching by the drive motor 5026 which rotationally drives the pickup roller 5013, separating roller 5014, and reverse roller 5015 constituting the original document feeding means as well as the first conveying roller pair 5017, the second conveying roller pair 5019, the third conveying roller pair 5032 and the sheet delivering roller pair 5024 constituting the original document conveying means; turning-on or -off of the electromagnetic clutch 5027 for temporarily blocking the driving of the drive motor 5026 for the pickup roller 5013, separating roller 5014, and the reverse roller 5015; and timing of starting and finishing reading operation by the front surface reading section 5021 and the back surface reading section 5023.

Figure 91:
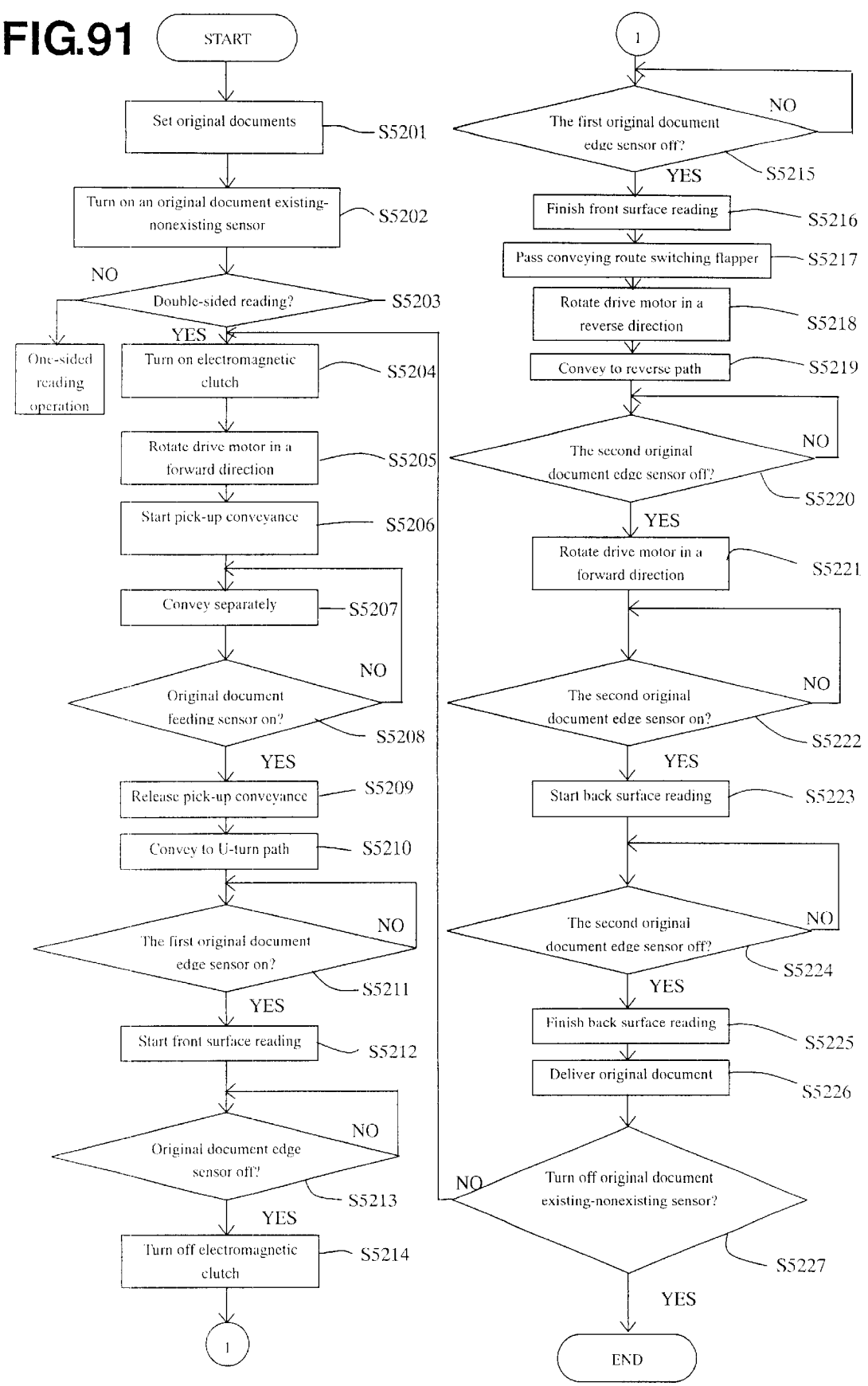
FIG. 91 is a flow chart showing an operation of the image reading apparatus according to the eighth embodiment.

Next, operation of the image reading section 5002 will be explained based on the flow chart shown in FIG. 91 with reference to FIG. 92 to FIG. 101.

Figure 92:
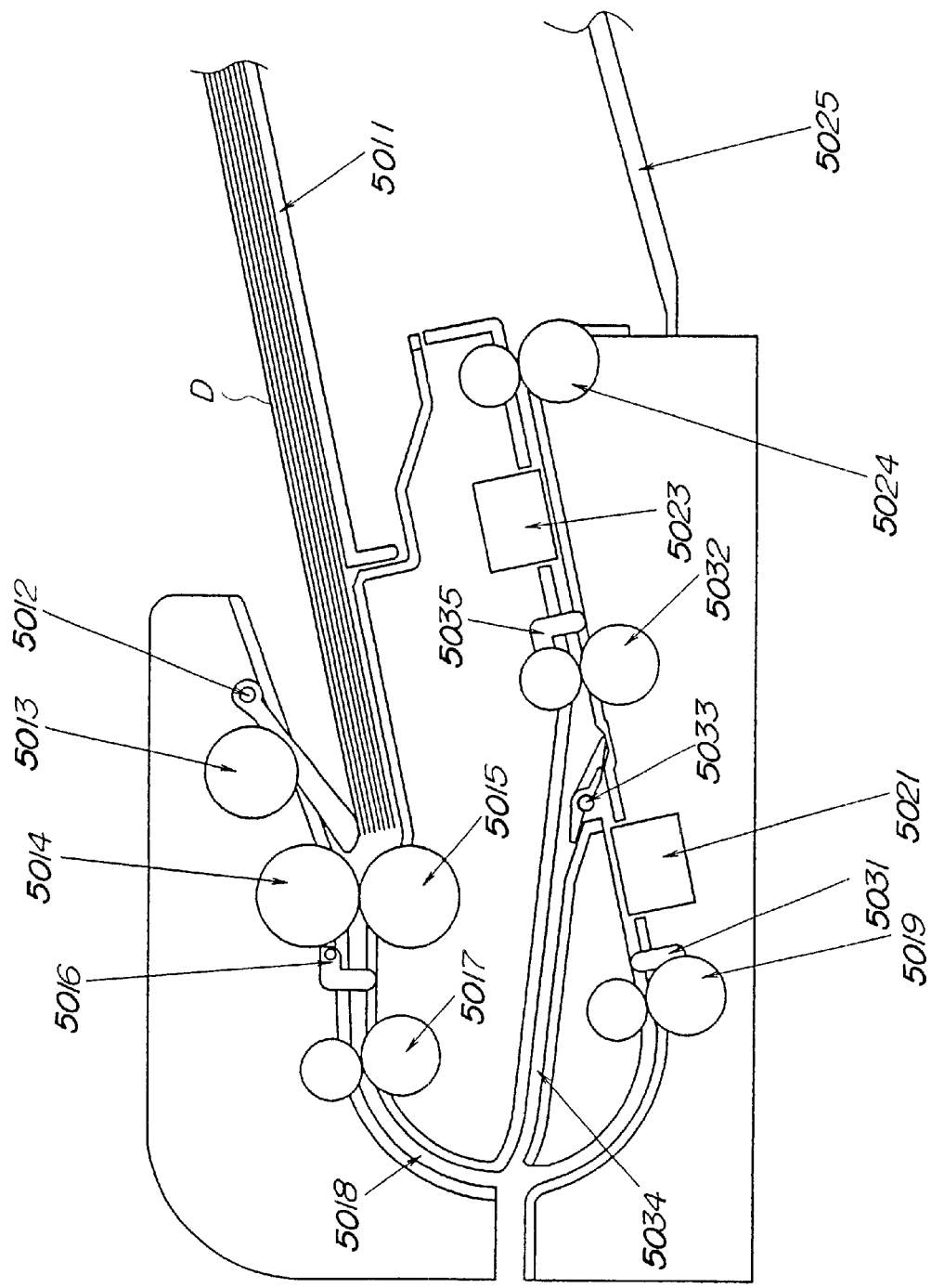
FIG. 92 to FIG. 101 are illustrations showing operations of the image reading apparatus according to the eighth embodiment.

When a user sets original documents D on the original document mounting tray 5011 (S5201), the original document existing-nonexisting detecting sensor 5012 detects the original documents (See, S5202, FIG. 92).

The user selects a double-sided reading mode, and then directs the start of a reading operation (S5203). Here, when a one-sided reading mode is selected, the operation is switched to the conventionally known one-sided reading operation (detailed description omitted).

After receiving the direction for starting the reading operation, the electromagnetic clutch 5027 connects the driving for the pickup roller 5013, the separating roller 5014, and the reverse roller 5015 (S5204).

The drive motor 5026 rotates in a forward direction (S5205), and then the pickup roller 5013 directly presses the original documents D set on the original document mounting tray 5011 to start picking-up and conveying the original documents D into the inside of the apparatus (S5206).

Figure 93:
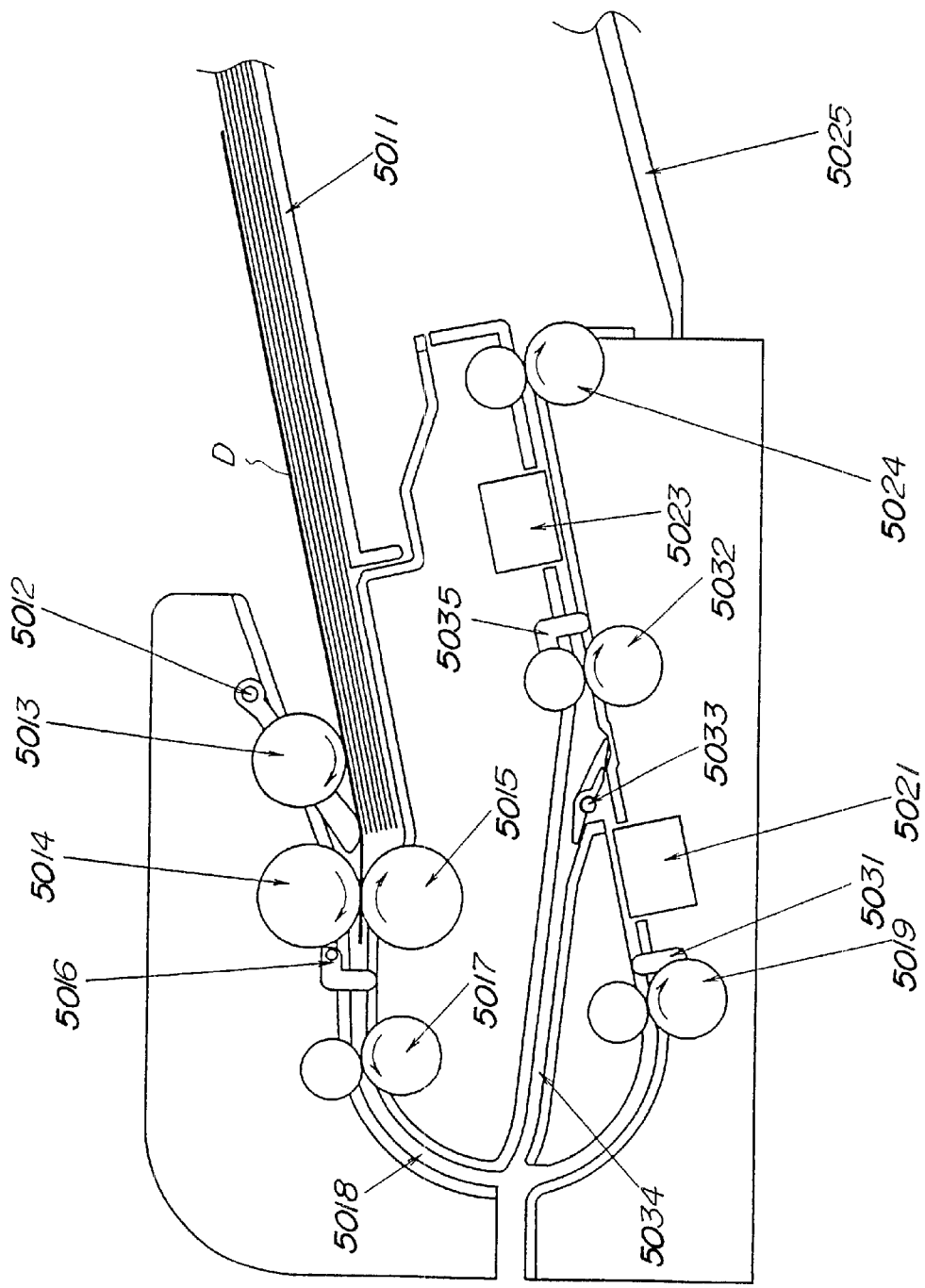

The original documents D after being picked-up and conveyed are to be separated by the separating roller 5014 and the reverse roller 5015, and an uppermost sheet of the original documents D is fed separately (See, S5207, FIG. 93). At this time, a conveying speed by the separating roller 5014 is slower than the set original document conveying speed V5 in order to reduce damage to the original documents at the time of separation, and it is also slower because it is subjected to conveying resistance given by the reverse roller 5015.

Figure 94:
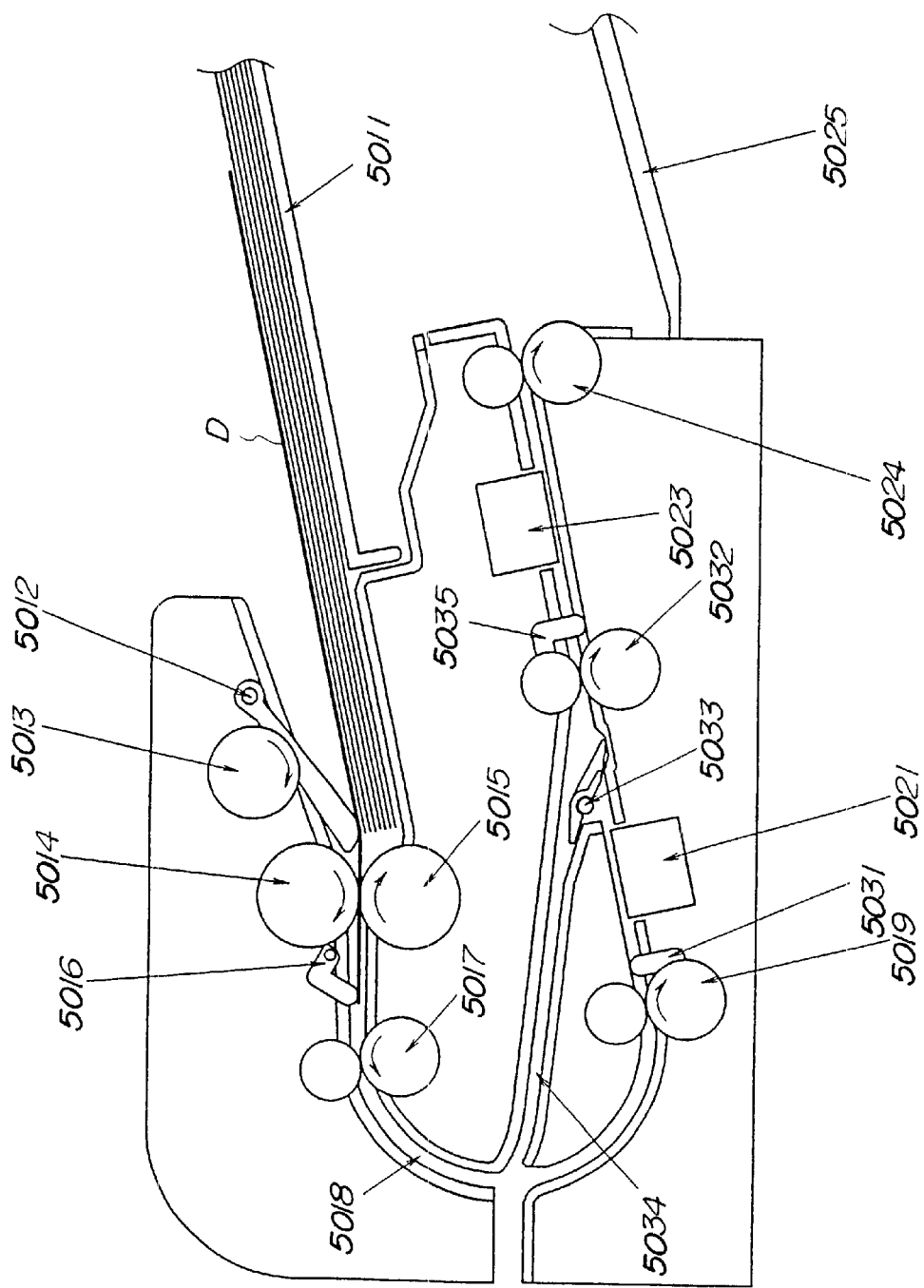

When the original document feeding sensor 5016 detects the front end of the original documents D (S5208), feeding of the original documents by the pickup roller 5013 is cancelled (See, S5209, FIG. 94).

Then, the separated original document D is conveyed to the U-turn path 5018 by the first conveying roller pair 5017 having a circumferential speed faster than the set original document conveying speed V5 (S5210). At this time, the first conveying roller pair 5017 offsets the delay which is produced by the separating roller 5014 and the reverse roller 5015, and the original document is conveyed at approximately the set original document conveying speed V5. The circumferential speed of the first conveying roller pair 5017 is set beforehand so as to offset the delay by the separating roller 5014 and the reverse roller 5015.

Figure 95:
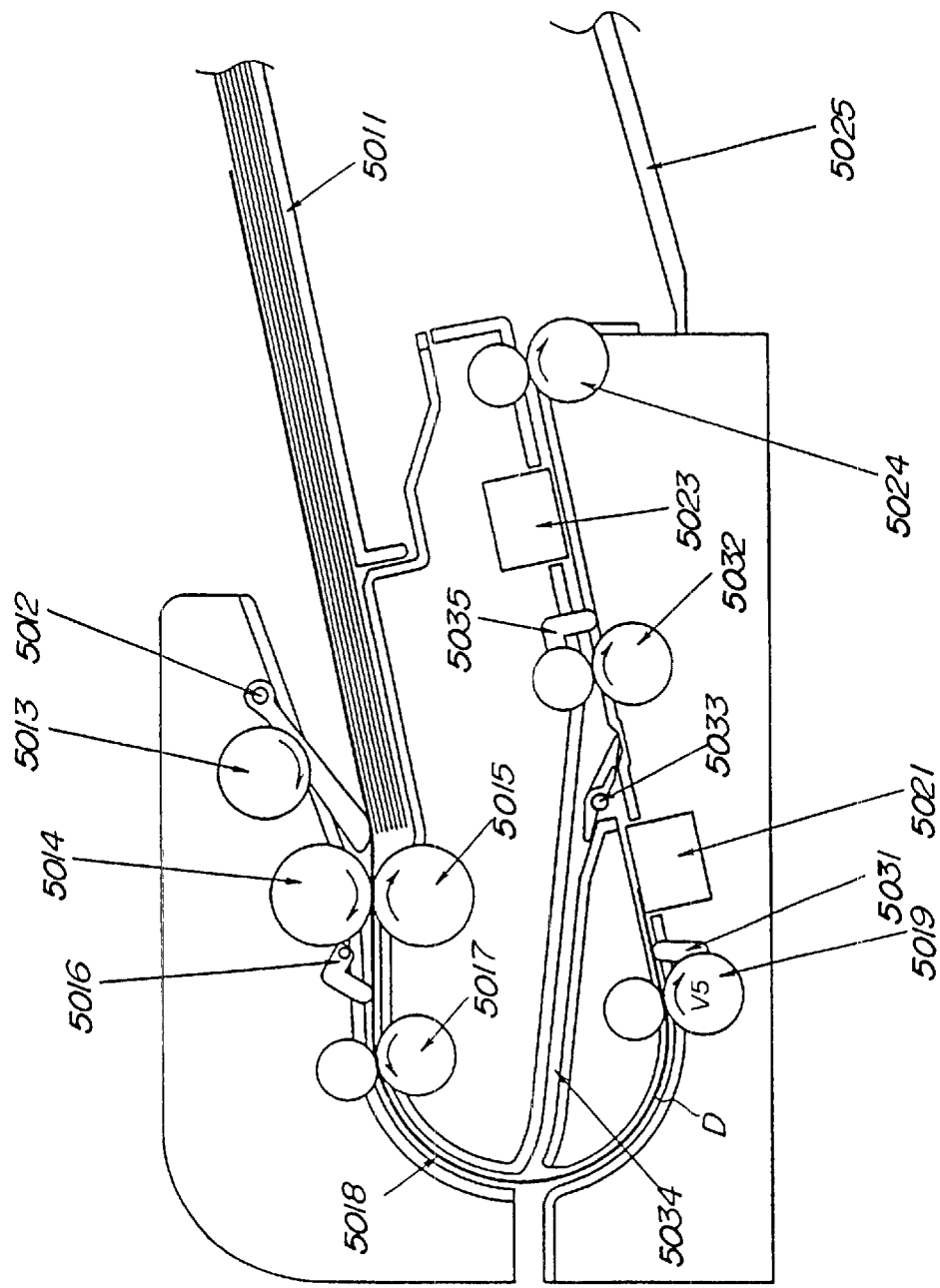

Then, the second conveying roller pair 5019 having a circumferential speed of approximately the set original document conveying speed V5 and the third conveying roller pair 5032 convey the original document D, and when the first original document edge sensor 5031 detects the front end of the original document D (S5211), the front surface reading section 5021 starts a reading operation of the front surface of the original document at a place where the original document is conveyed by a predetermined place from the original document edge sensor 5031 (See, S5212, FIG. 95). The original document is conveyed at approximately the set original document conveying speed V5. The circumferential speed of the sheet delivering roller pair 5024 is set so as to be slightly faster than the set original document conveying speed V5, and its conveying force is set so as to be lower than that of the third conveying roller pair 5032. When the sheet delivering roller pair 5024 starts conveying the original document, a slight difference in the circumferential speeds between the third conveying roller pair 5032 and the sheet delivering roller pair 5024 applies tension to the original document. But, the original document is conveyed, at approximately the set original document conveying speed V5 because the difference in the circumferential speeds between the third conveying roller pair 5032 and the sheet delivering roller pair 5024 is slight and also because a conveying force of the sheet delivering roller pair 5024 is set as to be lower than that of the third conveying roller pair 5032.

Figure 96:
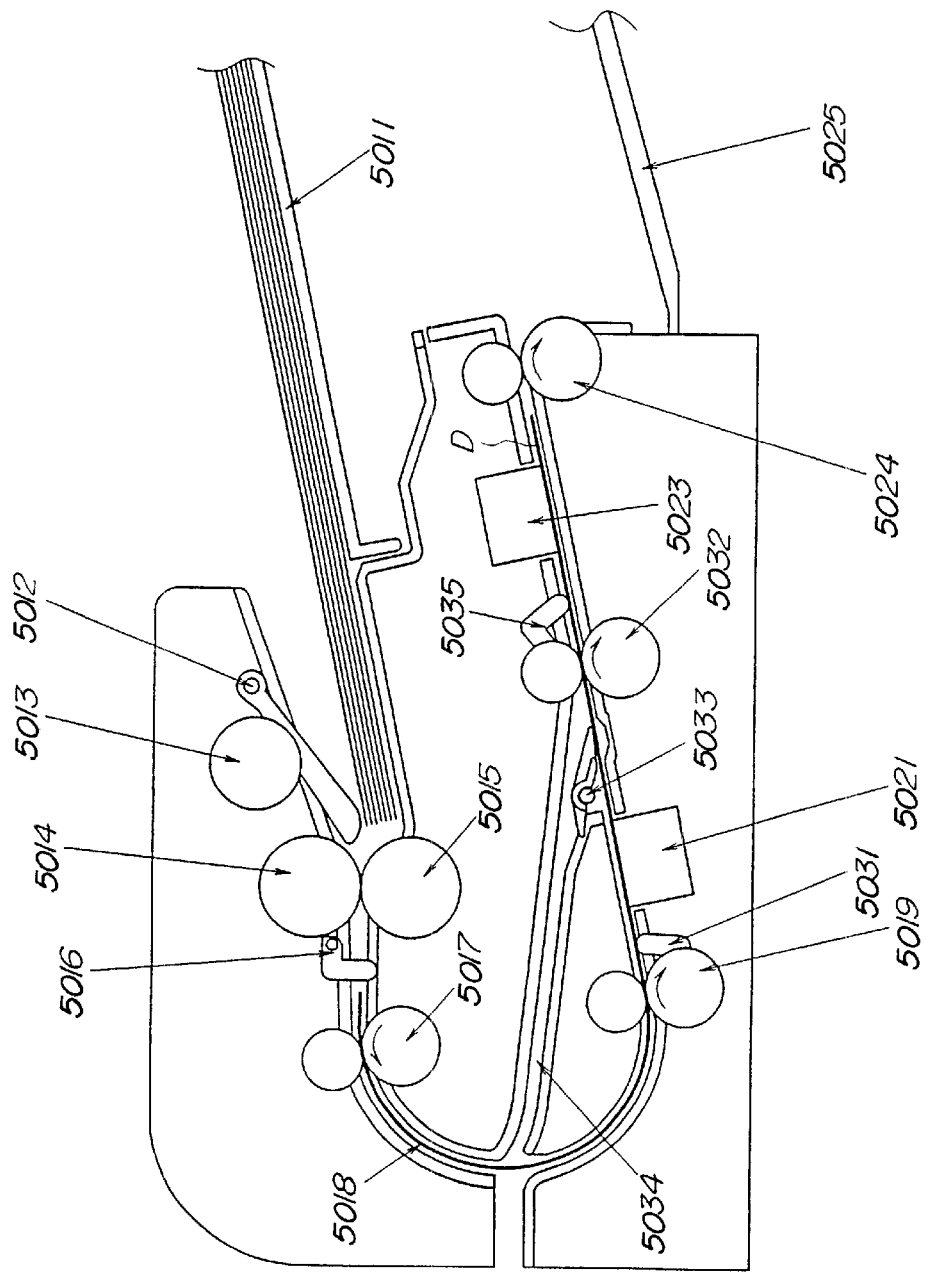
Figure 97:
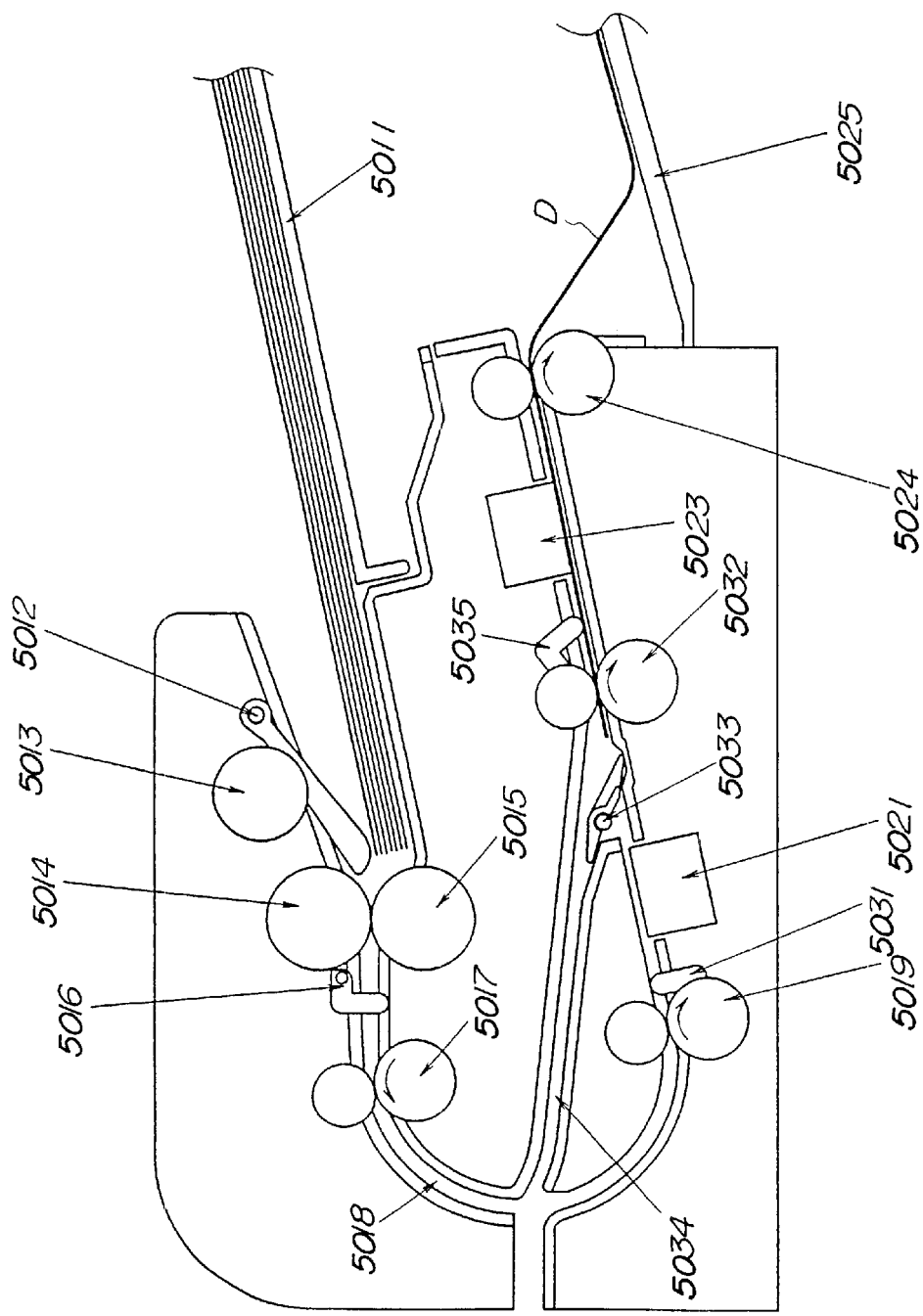

When the original document feeding sensor 5016 detects the rear end of the original document D (S5213), the electromagnetic clutch 5027 blocks the driving for the pickup roller 5013, the separating roller 5014, and the reverse roller 5015, and consequently the following original documents are stopped without being conveyed (See, S5214, FIG. 96).

When the first original document edge sensor 5031 detects the rear end of the original document D (S5215), the front surface reading section 5021 finishes the reading operation of the front surface of the original document at a place where the original document is conveyed by a predetermined amount from the original document edge sensor 5031 (S5216).

The original document D is conveyed further downstream by the third conveying roller pair 5032, and when the rear end of the original document passes the conveying route switching flapper 5033 (See, S5217, FIG. 97), the drive motor 2026 rotates in a reverse direction (S5218).

Figure 98:
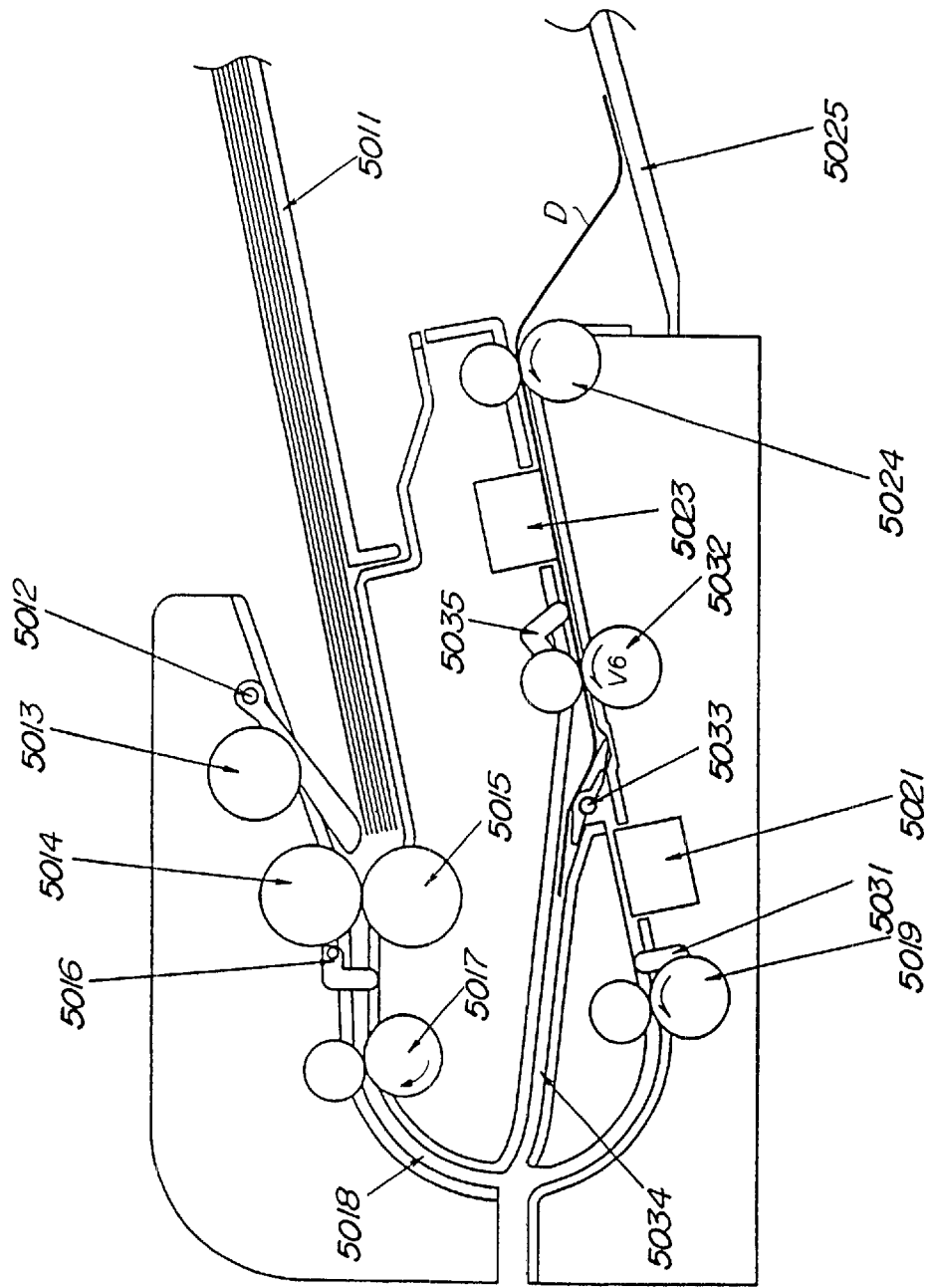
Figure 99:
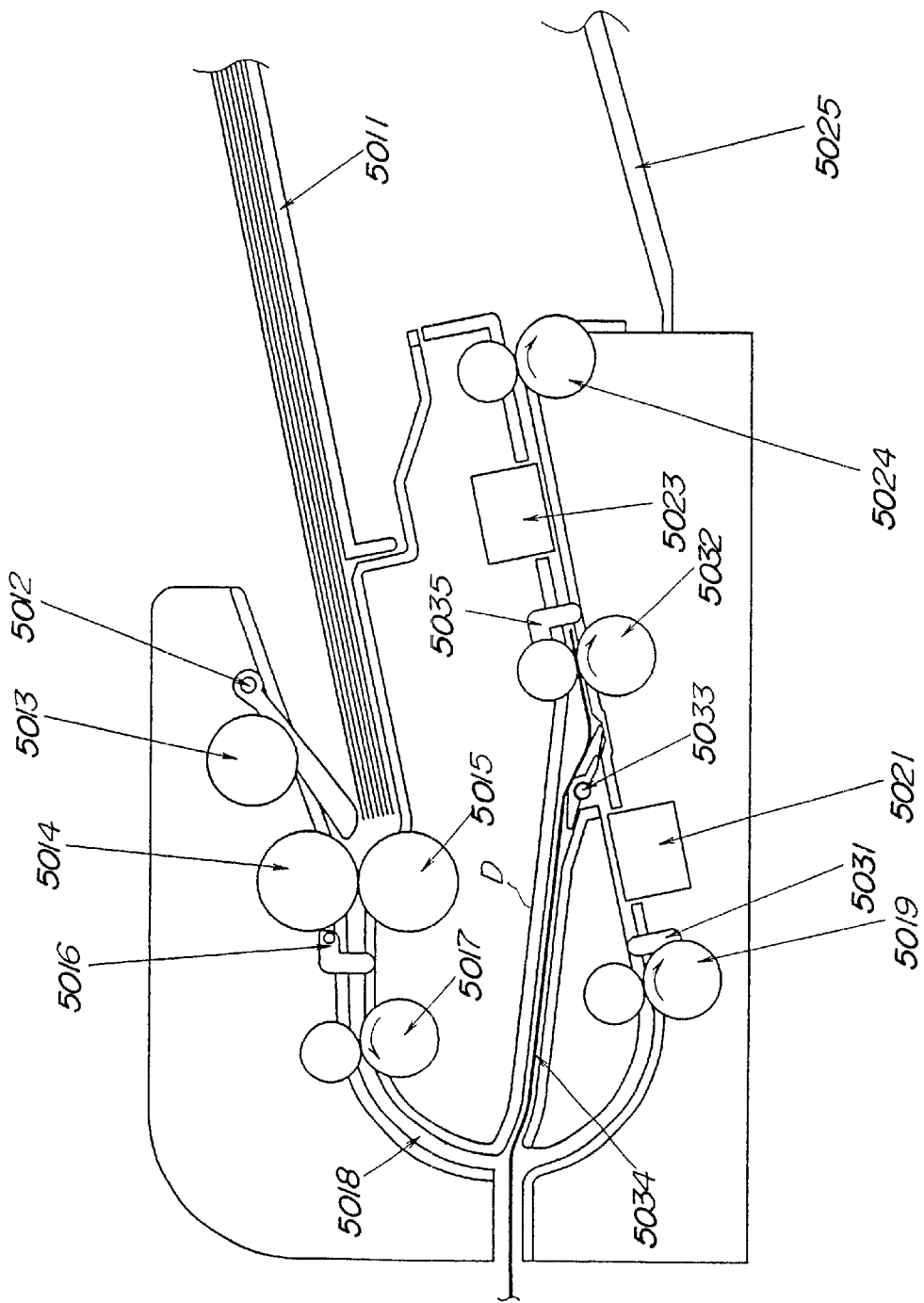

Then, the original document D is conveyed in a reverse direction by the third conveying roller pair 5032 and the sheet delivering roller pair 5024 and is then led to the reverse path 5034 by the conveying route switching flapper 5033 (See, S5219, FIG. 98). At this time, since the original document D is conveyed at a reverse conveying speed V6 which is faster than approximately the set original document conveying speed V5 (V5≤V6), the processing speed in a double-sided reading operation becomes fast, thereby increasing operating efficiency. Although the original document becomes slack little by little between the third conveying roller pair 5032 and the sheet delivering roller pair 5024 by the difference in those circumferential speeds, there is no influence on images because the front surface reading section 5019 and the back surface reading section 5023 do not conduct reading operations during the reverse feeding of the original document D.

Because the distance l1 between the second original document edge sensor 5035 and the third conveying roller pair 5032 is set so as to be longer than a combined distance of V6×t2, which is a conveyance distance until the second original document edge sensor 5035 detects the end of the original document, plus l2, which is a distance required for the original document at a reverse conveying speed V6 to be stopped (l1>V6×t2+l2), the original document will not go out of the third conveying roller pair 5032, with the result that re-conveyance cannot be conducted.

When the second original document edge sensor 5035 detects passage of the end of the original document D (S5220), conveying of the original document in a reverse direction is stopped. Then, the drive motor 5026 again rotates in a forward direction (See, S5221, FIG. 99). In this moment, the slackness of the original document D is eliminated because the original document D is conveyed further to the predetermined position after passing through the sheet delivering roller pair 5024.

Figure 100:
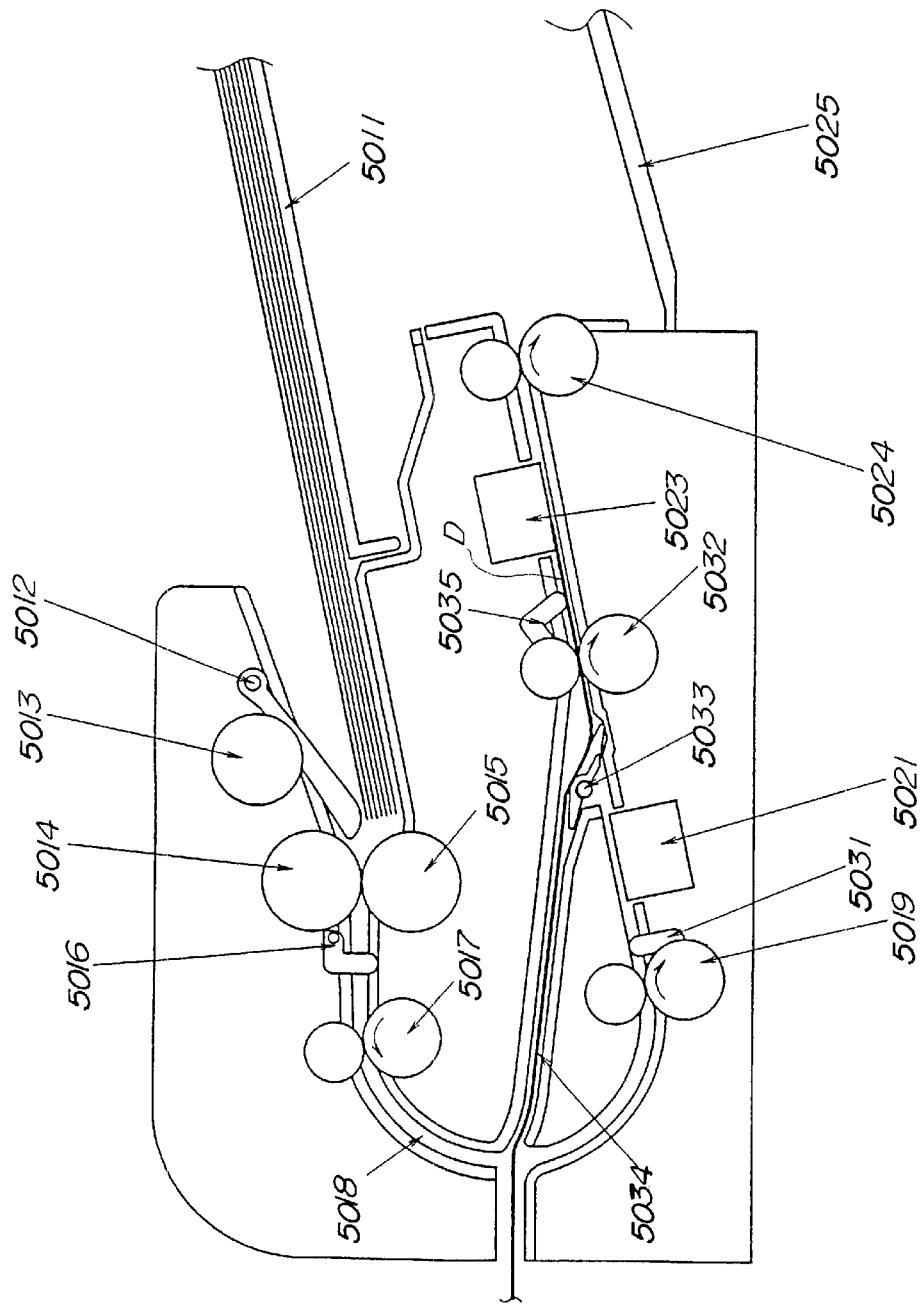

When the second original document edge sensor 5035 again detects the front end of the original document D (S5222), the back surface reading section 5023 starts the reading operation of the back surface of the original document at a place where the original document is conveyed by a predetermined amount from the original document edge sensor 5035 (See, S5223, FIG. 100). The circumferential speed of the sheet delivering roller pair 5024 is set so as to be slightly faster than the set original document conveying speed V5, and the conveying force of the sheet delivering roller pair 5024 is set so as to be lower than that of the third conveying roller pair 5032. When the conveyance of the original document by the sheet delivering roller pair 5024 starts, a slight difference in the circumferential speeds between the third conveying roller pair 5032 and the sheet delivering roller pair 5024 applies tension to the original document, and consequently, the original document is conveyed in a position most suitable for a reading operation by the back surface reading section 5023. In addition, because the difference in the circumferential speeds between the third conveying roller pair 5032 and the sheet delivering roller pair 5024 is slight and also because the conveying force of the sheet delivering roller pair 5024 is set as to be lower than that of the third conveying roller pair 5032, the original document is conveyed, at approximately the set original document conveying speed V5.

Figure 101:
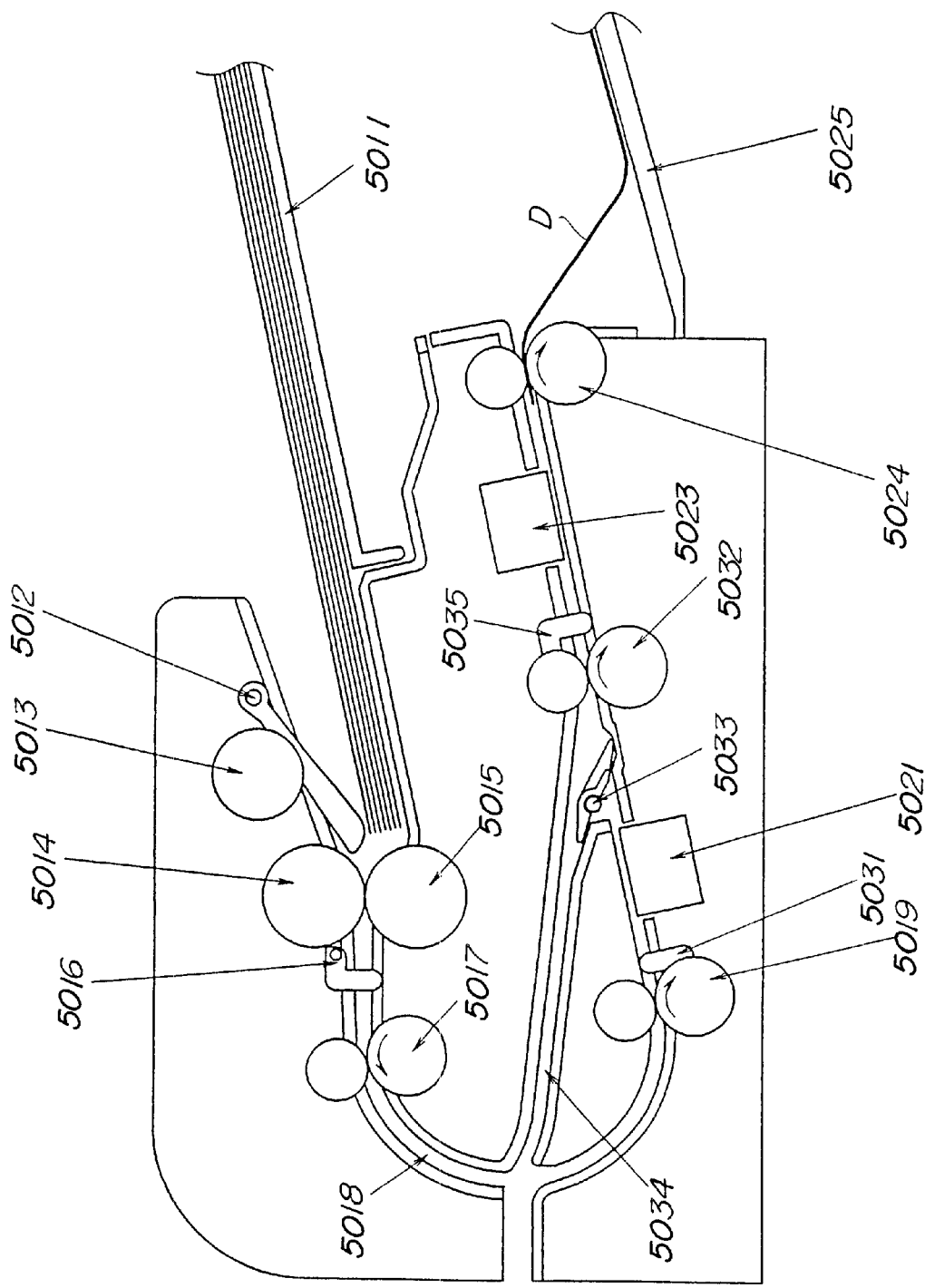

When the second original document edge sensor 5035 detects the rear end of the original document D (S5224), the back surface reading section 5023 finishes the reading operation of the back surface of the original document at a place where the original document is conveyed by a predetermined amount from the original document edge sensor 5035 (S5225), and consequently the original document D is delivered by the sheet delivering roller pair 5024 onto the sheet delivering tray 5025 (See, S5226, FIG. 101). Making the circumferential speed of the sheet delivering roller pair 5024 slightly faster than the set original document conveying speed V5 can prevent the original document from being slack at the first reading section 5021 and the back surface reading section 5023.

Then, when the original document existing-nonexisting detecting sensor 5012 detects original documents D, the operation is returned to Step S5204 where, as mentioned above, the electromagnetic clutch 5027 connects the driving for the pickup roller 5013, the separating roller 5014, and the reverse roller 5015 to convey the following original documents; when no original documents are detected, then the reading operation is completed (S5227).

Similar to the aforementioned: embodiment, in this embodiment as mentioned above, the reverse conveying speed V6 as a conveying speed at the time of conveying the original document in a reverse direction is set so as to be faster than approximately the set original document conveying speed V5 as a conveying speed at the lime of reading images, and therefore, the operation time for double-sided reading is reduced, making increased efficiency possible.

Furthermore, because the distance l1 between the third conveying roller pair 5032 and the second original document edge sensor 5035 (See, FIG. 90) is set so as to be longer than the reverse conveying distance after the detection of the second original document edge sensor, or V6×t2+l2, this can prevent the situation that the original document D goes out of the nip part of the third conveying roller pair 5032, resulting in that the third conveying roller pair 5032 cannot again convey the original document D.

[Other Variations of the Seventh and the Eighth Embodiments]

In the above-mentioned embodiments, a U-turn path is exemplified as an original document conveying route, but the present invention is not limited to this; for example, a straight path can provide the same advantage.

Also in the above-mentioned embodiment, a flapper is exemplified as a conveying route switching means, but the invention is not limited to this; for example, a Mylar or the like can be used where the sheet may progress in a forward direction by pushing the Mylar, while progressing in a reverse direction by introduction of the Mylar along it.

In the above-mentioned embodiments, an image reading section in a facsimile machine is exemplified as an image reading apparatus, but the present invention is not limited to this; the same advantage can be obtained by applying the present invention to, for example, a scanner unit as an image reading apparatus, an image reading apparatus in a copying machine, or an image reading apparatus or the like in a composite apparatus suitably combining a printing function, facsimile function, copying function or the like.

According to the present invention, as mentioned above, the conveying speed V6 at the time of conveying the original document in a reverse direction is set so as to be faster than approximately the set original document conveying speed V5 at the time of reading images, and therefore, the operation time for reading both sides of the original document is reduced, thus making increased efficiency possible.

Also, because the distance l1 between the original document detecting means provided on an upstream side of the reading means and the original document conveying roller pair constituting an original document conveying means provided on an upstream side of the original document detecting means is set so as to be longer than the reverse conveying distance from a point where the end of the original document arrives at the original document detecting means to a point where the original document is stopped, or V6×t2+l2, the situation can be prevented where the original document goes out of the original document conveying roller pair, with the result that re-conveyance cannot be conducted.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined according to the claims set forth below.

What is claimed is:

1. An image reading apparatus, comprising:
   an original document conveying route;
   an original document conveying device for conveying an original document along said original document conveying route, the original document having a first side and a second side;

a first reading device for reading an image on the first side of the original document; and a second reading device for reading an image on the second side of the original document, wherein said first reading device reads the image on the first side of the original document while the original document is conveyed in a forward direction by said original document conveying device, and then, after the original document is conveyed in a reverse direction, said second reading device reads the image on the second side of the original document while the original document is again conveyed in the forward direction.

2. The image reading apparatus according to claim 1, wherein said original document conveying route comprises a U-turn shaped portion, and wherein at least one of said first reading device and said second reading device is provided on a downstream side of the U-turn shaped portion to comprise a downstream side reading device, and said apparatus further comprising:
an automatic document feeding device on an upstream side of said original document conveying device; and
a bypass route provided between the downstream side of the U-turn shaped portion and said downstream side reading device, said bypass route preventing the original document from returning to said automatic document feeding device when the original document is conveyed in the reverse direction.

3. An image reading apparatus, comprising:

an original document conveying route leading from original document feeding means to sheet delivering means;

original document conveying means for conveying an original document along said original document conveying route, the original document having a first side and a second side;

first reading means for reading an image on the first side of the original document;

second reading means for reading an image on the second side of the original document; and a reverse path branching off from a branching point in said original document conveying route, wherein said first reading means reads the image on the first side of the original document while the original document is conveyed in a forward direction from said original document feeding means by the original document conveying means, and, after the original document is conveyed in a reverse direction to said reverse path, said second reading means reads the image on the second side of the original document while the original document is again conveyed in the forward direction, and thereafter the original document is delivered onto said sheet delivering means.

4. The image reading apparatus according to claim 3, wherein said original document conveying route comprises a U-turn shaped portion.

5. The image reading apparatus according to claim 4, wherein said reverse path branches off at the branching point from a downstream side of the U-turn shaped portion and extends from a lower part of the U-turn shaped portion, and wherein the original document conveyed in the reverse direction is introduced, by its own weight, into said reverse path.

6. The image reading apparatus according to claim 4, wherein said reverse path branches off at the branching point from a downstream side of the U-turn shaped portion and intersects with the U-turn shaped portion, and wherein said reverse path comprises conveying route switching means at the branching point for leading the original document conveyed in a reverse direction to the reverse path.

7. An image forming apparatus, comprising:

the image reading apparatus according to any one of claims 1 to 6; and image forming means for forming images on a recording medium based on image formation read by said image reading apparatus.

8. An image reading apparatus, comprising:

original document conveying means for conveying an original document in forward and reverse directions. the original document having a first side and a second side;

an original document conveying route that guides the original document conveyed by said original document conveying means;

first reading means provided on said original document conveying route for reading image information on the first side of the original document;

second reading means provided on said original document conveying route for reading image information on the second side of the original document;

a bypass route branching off from a branching point in said original document conveying route, the branching point being at an upstream side, in the conveying direction, of at least one of said first reading means and said second reading means, said bypass route guiding the original document conveyed in a reverse direction by said original document conveying means; and branch switching means provided at the branching point in said original document conveying route, for switching between said original document conveying route and said bypass route, wherein said first reading means reads image information on the first side of the original document while the original document is conveyed in a forward direction along said original document conveying route by said original document conveying means, and then, after the rear end of the original document passes said branch switching means, the original document is conveyed in a reverse direction along said bypass route by said original document conveying means, and said second reading means, thereafter, reads image information on the second side of the original document while the original document is conveyed again in the forward direction by said original document conveying means.

9. The image reading apparatus according to claim 8, further comprising:

original document feeding means provided on an upstream side, in the conveying direction, of said original document conveying means, said original document feeding means separating an original document from a plurality of original documents and feeding the original documents sheet by sheet; and intersection switching means provided at an intersection point of said bypass route with said original document conveying route, for guiding the original document along said bypass route during the conveying of the original document in the reverse direction, wherein said original document conveying route comprises a U-turn shaped portion, and wherein at least one of said first reading means and said second reading means is arranged on a downstream side, in the conveying direction, of the U-turn shaped portion, wherein the intersection point is formed where said bypass route intersects said original document conveying route on a downstream side, in the conveying direction, of said original document feeding means and on an upstream side; in the conveying direction, of the branching point of the original document conveying route, and wherein said bypass route prevents the original document from returning to said original document feeding means.

10. The image reading apparatus according to claim 9, wherein said branch switching means or said intersection switching means rotates by passage of the original document conveyed in the forward direction in said original document conveying route to open said original document conveying route, and functions as a guide of the original document conveying route at the branching point or the intersecting point, respectively.

11. The image reading apparatus according to claim 10, wherein said branch switching means or said intersection switching means rotates by passage of a rear end of the original document to close said original document conveying route, thus leading the original document conveyed in a reverse direction to said bypass route, and functions as a guide of the bypass route at the branching point or the intersecting point respectively.

12. The image reading apparatus according to claim 9, wherein said bypass route comprises a straight portion.

13. An image forming apparatus, comprising:
the image reading apparatus according to any one of claims 8 to 12; and
image forming means for forming images on a recording medium based on image information read by said image reading apparatus.

14. An image reading apparatus, comprising:
first conveying means for conveying, in a forward direction, an original document set on an original document mounting tray, the original document having a first side and a second side;
a conveying route comprising a U-turn shaped portion which makes the original document conveyed by said first conveying means perform a U-turn;
second conveying means provided between the U-turn shaped portion of said conveying route and said first reading means, for conveying the original document after the original document has performed the U-turn;
first reading means provided on a downstream side of said second conveying means for reading image information on the first side of the original document;
second reading means provided on a downstream side of said first reading means for reading image information on the second side of the original document;
third conveying means provided on a downstream side of said second reading means, said third conveying means for conveying the original document in forward and reverse directions;
a bypass route branching off from a branching point of said conveying route, the branching point being between said first reading means and said second reading means, and said bypass route crossing the U-turn shaped portion of said conveying route;
fourth conveying means provided between the branching point and said second reading means, said fourth conveying means for conveying the original document in forward and reverse directions; and
bypass switching means provided at the branching point for leading the original document conveyed in the reverse direction by said third and fourth conveying means to said bypass route, wherein said first reading means reads image information on the first side of the original document while the original document is conveyed in a forward direction by said second conveying means, wherein the original document is conveyed in the reverse direction by said third and fourth conveying means after a rear end of the original document passes said branch switching means, the original document being led to said bypass route via said bypass switching means, and wherein, after the original document is conveyed in the reverse direction by said fourth conveying means until the front end of the original document is positioned on an upstream side of said second reading means, said second reading means reads image information on the second side of the original document while the original document is again conveyed in the forward direction by said third and fourth conveying means.

15. The image reading apparatus according to claim 14, wherein said bypass route, after crossing the U-turn portion of said conveying route, forms upwardly a U-turn shaped conveying route, leading the original document conveyed in the reverse direction onto the original document mounting tray.

16. The image reading apparatus according to claim 14, wherein an original document sandwiching part of said second conveying means, an original document sandwiching part of said third conveying means, an original document sandwiching part of said fourth conveying means, an original document reading position by said first reading means and an original document reading position by said second reading means are positioned approximately in a straight line.

17. An image reading apparatus, comprising:
an original document conveying route leading from said original document feeding means to original document delivering means, said original document conveying route comprising a U-turn shaped portion;
original document conveying means for sending an original document along said original document conveying route, the original document having a first side and a second side;
first reading means for reading an image on the first side of the original document;
second reading means for reading an image on the second side of the original document; and
a reverse path branching off from a point in said original document conveying route, said reverse path comprising a U-turn shaped portion, wherein said first reading means reads an image on the first side of the original document while the original document is conveyed from the original document feeding means in a forward direction by said original document conveying means, then, by conveying the original document in a reverse direction, the original document is conveyed to said reverse path to be led onto the original document feeding means, then said second reading means reads an image on the second side of the original document while the original document is again conveyed in the forward direction, and then the original document is delivered onto the original document delivering means.

18. An image forming apparatus, comprising:

the image reading apparatus according to any one of claims 14 to 17; and image forming means for forming images on a recording medium based on image information read by said image reading apparatus.

19. The image reading apparatus comprising:

original document feeding means for feeding an original document from stacked original documents, the original document having a first side and a second side;

an original document conveying route along which an original document is fed from said original document feeding means;

first conveying means provided downstream of said original document feeding means, said first conveying means for conveying the original document in said original document conveying route at a conveying speed V1, which is faster than a feeding speed of said original document feeding means;

first image reading means provided downstream of said first conveying means, said first image reading means for reading an image on the first side of the original document;

second conveying means provided between said first conveying means and said first image reading means, said second conveying means for conveying the original document to said first image reading means at a conveying speed V2, wherein a relation between the conveying speed V1 and the conveying speed V2 is V2≦V1;

second image reading means provided in said original document conveying route and downstream of said first image reading means, said second image reading means for reading an image on the second side of the original document which is opposite to the first side of the original document; and third conveying means provided downstream of said second image reading means, said third conveying means for conveying the original document at a conveying speed V3, wherein a relation between the conveying speed V2 and the conveying speed V3 is V2≦V3.

20. The image reading apparatus according to claim 19, further comprising fourth conveying means provided between said first image reading means and said second image reading means, said fourth conveying means for conveying the original document at a conveying speed V4, wherein relations between the conveying speeds V2, V3, and V4 are V4≦V3 and V2≈V4.

21. The image reading apparatus according to claim 19, further comprising an escape conveying route that makes the original document escape from said original document conveying route, said escape conveying route connecting to said original document conveying route at an upstream side of said second conveying means, wherein the original document is conveyed in a forward direction and said first image reading means reads the image on the first side of the original document, the original document is then conveyed in a reverse direction and escapes to said escape conveying route, then the original document is conveyed again in the forward direction and thereafter said second image reading means reads the image on the second side of the original document.

22. The image reading apparatus according to claim 20, further comprising:

an escape conveying route that makes the original document escape from said original document conveying route, said escape conveying route connecting to said original document conveying route between said first image reading means and said fourth conveying means; and leading means for leading the original document to said escape conveying route, said leading means provided in said original document conveying route at a connecting point of said escape conveying route and said original document conveying route, wherein the original document is conveyed in a forward direction and said first image reading means reads the image on the first side of the original document, the original document is then conveyed in a reverse direction and escapes to said escape conveying route, then the original document is conveyed again in the forward direction and thereafter said second image reading means reads the image on the second side of the original document.

23. The image reading apparatus comprising:

original document feeding means for feeding an original document from stacked original documents, the original document having a first side and a second side;

an original document conveying route to which the original document is fed from said original document feeding means;

at least one image reading means provided in said original document conveying route;

a plurality of original document conveying means for conveying the original document in said original document conveying route, wherein an original document conveying speed of said original document feeding means is different from an original document conveying speed of at least one original document conveying means of said plurality of original document conveying means, wherein said plurality of original document conveying means comprises, on said original document conveying route from an upstream side in a following order, first original document conveying means for conveying the original document at a conveying speed V1, second original document conveying means for conveying the original document at a conveying speed V2, fourth original document conveying means for conveying the original document at a conveying speed V4, and third original document conveying means for conveying the original document at a conveying speed V3, wherein said original document conveying route comprises a bent portion located between said first original document conveying means and said second original means, wherein said at least one image reading means comprises (a) first image reading means for reading an image on the first side of the original document, said first image reading means being provided between said second original document conveying means and said fourth original document conveying means, and (b) second image reading means for reading an image on the second side of the original document, said second image reading means being provided between said fourth original document conveying means and said third original document conveying means, and wherein relations between the conveying speeds V1, V2, V3, and V4 are V1≧V2, V2≦V3, V4≦V3, and V2≈V4.

24. An image forming apparatus, comprising:

the image reading apparatus according to any one of claims 19 to 22 and 23, and image forming means for forming images on a recording medium based on image information read by said image reading apparatus.

25. An image reading apparatus, comprising:

original document conveying means for conveying an original document in forward and reverse directions, the original document having a first side and a second side;

an original document conveying route guiding the original document conveyed by said original document conveying means;

first reading means provided on said original document conveying route for reading image information on the first side of the original document; and second reading means provided on said original document conveying route for reading image information on the second side of the original document, wherein said first reading means reads image information on the first side of the original document while the original document is conveyed in the forward direction by said original document conveying means, then, after the reading operation of the image on the first side is completed, the original document is conveyed in the reverse direction by said original document conveying means, and then said second reading means reads image information on the second side of the original document while the original document is again conveyed in the forward direction, and wherein a relation between a forward conveying speed V5 and a reverse conveying speed V6 is V5≦V6.

26. An image reading apparatus, comprising:

original document conveying means for conveying an original document in forward and reverse directions, the original document having a first side and a second side;

an original document conveying route guiding the original document conveyed by said original document conveying means;

first reading means provided on said original document conveying route for reading image information on the first side of the original document;

second reading means provided on the original document conveying route for reading image information on the second side of the original document; and original document detecting means provided on an upstream side, in a forward conveying direction, of at least one of said first reading means and said second reading means and on a downstream side of said original document conveying means, said original document detecting means for detecting the original document, wherein said first reading means reads image information on the first side of the original document while the original document is conveyed in the forward direction by said original document conveying means, then, after the reading operation of the image on the first side is completed, the original document is conveyed in the reverse direction by said original document conveying means, and said second reading means thereafter reads image information on the second side of the original document while the original document is again conveyed in the forward direction, and wherein a relation of $L1 > V6 \times t2 + L2$ is satisfied, where V6 is a conveying speed of conveying the original document in the reverse direction, t2 is a time starting from a moment where an end of the original document arrives at said original document detecting means until a moment where said original document detecting means detects the end of the original document when the original document is conveyed in the reverse direction at conveying speed V6, L2 is a conveyance distance required for the original document at the conveying speed V6 to be stopped, and L1 is a distance from said original document detecting means.

27. The image reading apparatus according to claim 25 or 26, further comprising:

original document feeding means for feeding, sheet by sheet, the original document toward the original document conveying means; and bypass means provided on an upstream side of at least one of said first reading means and said second reading means, said bypass means for preventing the original document from returning to said original document feeding means when the original document is conveyed in the reverse direction.

28. The image reading means according to claim 27, wherein said bypass means is a branch conveying route branching off from said original document conveying route at a branching point on an upstream side of at least one of said first reading means and said second reading means, said branch conveying route guiding the original document conveyed in the reverse direction by said original document conveying means.

29. The image reading means according to claim 27, wherein said bypass means comprises (a) a branch conveying route branching off from a branching point of said original document conveying route, the branching point being on an upstream side of at least one of said first reading means and said second reading means, and said bypass means guiding the original document conveyed in the reverse direction by said original document conveying means, and (b) a conveying route switching means provided at the branching point for switching a conveying route between said original document conveying route and said branch conveying route.

30. The image reading apparatus according to claim 25, wherein the reverse conveying speed V6 is a maximum conveying speed with respect to a driving means which rotationally drives said original document conveying means.

31. An image forming apparatus, comprising:

the image reading apparatus according to any one of claims 25, 26, or 30, and image forming means for forming images on a recording medium based on image information read by said image reading apparatus.

32. A method of reading an image, comprising:

a first conveying step of conveying an original document having a first side and a second side in a forward direction along an original document conveying route;

a first reading step of reading an image on the first side of the original document;

a second conveying step of conveying the original document in a reverse direction along the original document conveying route;

a third conveying step of conveying the original document again in the forward direction along the original document conveying route; and a second reading step of reading an image on the second side of the original document.

33. A method according to claim 32, further comprising:

bypassing the original document conveying route when the original document is conveyed in the reverse direction in said second conveying step.

34. A method according to claim 33, further comprising:

detecting a rear edge of the original document before said second conveying step; and detecting a front edge of the original document before said second reading step.

35. A method according to claim 34, further comprising:

separating the original document from stacked original documents prior to said first conveying step.

36. A method according to claim 35, wherein said first conveying step comprises a step of conveying the original document at a conveying speed V1 and a step of conveying the original document at a conveying speed V2, and wherein a relation between the conveying speeds V1 and V2 is $V2 \leq V1$.

37. A method according to claim 36, wherein said third conveying step comprises a step of conveying the original document at a conveying speed V3 and a step of conveying the original document at a conveying speed V4, wherein relations between the conveying speeds V2, V3, and V4 are $V2 \leq V3$, $V4 \leq V3$, and $V2 \approx V4$.

38. A method according to claim 33, wherein the original document is conveyed in said first and third conveying steps at a forward conveying speed V5, wherein the original document is conveyed in said second conveying step at a reverse conveying speed V6, and wherein a relation between the forward conveying speed V5 and the reverse conveying speed V6 is $V5 \leq V6$.

39. A method according to any one of claims 32 to 38, further comprising:

forming an image on a recording medium based on image formation read in said first and second reading steps.

* * * * *

UNITED STATES PATENT AND TRADEMARK OFFICE
CERTIFICATE OF CORRECTION

PATENT NO.    : 6,438,350 B1
DATED         : August 20, 2002
INVENTOR(S)   : Kazuhiko Hasegawa et al.

It is certified that error appears in the above-identified patent and that said Letters Patent is hereby corrected as shown below:

Title page,
Item [56], References Cited, U.S. PATENT DOCUMENTS, "Lawiczak" should read -- Lawniczak --.

Column 4,
Line 56, "original;" should read -- original --.

Column 5,
Line 37, "documents" should read -- document --.

Column 6,
Line 12, "front" should be deleted.
Line 44, "function" should be deleted.

Column 8,
Line 51, "circuit" should read -- circuit, --.

Column 10,
Line 39, "as" should be deleted.

Column 25,
Line 62, "V2$\geq$ V3," should read -- V2$\leq$ V3, --.
Line 63, "V4$\geq$ V3," should read -- V4$\leq$ V3, --.

Column 29,
Line 16, "conveying,resistance" should read -- conveying resistance --.

Column 31,
Line 54, "of,an" should read -- of an --.

UNITED STATES PATENT AND TRADEMARK OFFICE
CERTIFICATE OF CORRECTION

PATENT NO. : 6,438,350 B1
DATED : August 20, 2002
INVENTOR(S) : Kazuhiko Hasegawa et al.

It is certified that error appears in the above-identified patent and that said Letters Patent is hereby corrected as shown below:

Column 35,
Line 67, "lime" should read -- time --.

Column 38,
Line 18, "directions." should read -- directions, --.

Signed and Sealed this

Twenty-fifth Day of February, 2003

JAMES E. ROGAN
*Director of the United States Patent and Trademark Office*